United States Patent
Hirschmann et al.

(10) Patent No.: US 9,951,274 B2
(45) Date of Patent: Apr. 24, 2018

(54) LIQUID-CRYSTALLINE MEDIUM

(71) Applicant: MERCK PATENT GmbH, Darmstadt (DE)

(72) Inventors: Harald Hirschmann, Darmstadt (DE); Monika Bauer, Seligenstadt (DE); Martina Windhorst, Muenster (DE); Marcus Reuter, Darmstadt (DE); Volker Reiffenrath, Rossdorf (DE); Matthias Bremer, Darmstadt (DE)

(73) Assignee: MERCK PATENT GMBH, Darmstadt (DE)

( * ) Notice: Subject to any disclaimer, the term of this patent is extended or adjusted under 35 U.S.C. 154(b) by 0 days.

(21) Appl. No.: 14/574,788

(22) Filed: Dec. 18, 2014

(65) Prior Publication Data

US 2015/0175884 A1    Jun. 25, 2015

(30) Foreign Application Priority Data

Dec. 19, 2013   (DE) .................. 10 2013 021 683

(51) Int. Cl.
| | | |
|---|---|---|
| *C09K 19/12* | (2006.01) | |
| *C09K 19/30* | (2006.01) | |
| *C09K 19/04* | (2006.01) | |
| *C09K 19/32* | (2006.01) | |
| *C09K 19/56* | (2006.01) | |

(52) U.S. Cl.
CPC ...... *C09K 19/3003* (2013.01); *C09K 19/0403* (2013.01); *C09K 19/12* (2013.01); *C09K 19/32* (2013.01); *C09K 19/56* (2013.01); *C09K 2019/0407* (2013.01); *C09K 2019/0411* (2013.01); *C09K 2019/122* (2013.01); *C09K 2019/301* (2013.01); *C09K 2019/3004* (2013.01); *C09K 2019/3009* (2013.01); *C09K 2019/3016* (2013.01)

(58) Field of Classification Search
CPC .................................... C09K 19/12
See application file for complete search history.

(56) References Cited

U.S. PATENT DOCUMENTS

| | | | |
|---|---|---|---|
| 8,496,850 B2 | 7/2013 | Hattori et al. | |
| 8,535,768 B2 | 9/2013 | Saito et al. | |
| 2011/0140040 A1* | 6/2011 | Hattori | C09K 19/12 |
| | | | 252/299.61 |
| 2011/0155953 A1 | 6/2011 | Hattori et al. | |
| 2011/0272630 A1 | 11/2011 | Shimada et al. | |
| 2011/0272631 A1 | 11/2011 | Saito et al. | |
| 2015/0146155 A1* | 5/2015 | Engel | C09K 19/12 |
| | | | 349/183 |

FOREIGN PATENT DOCUMENTS

| | | |
|---|---|---|
| EP | 2319898 A1 | 5/2011 |
| EP | 2380947 A1 | 10/2011 |
| JP | 0952852 A | 2/1997 |

OTHER PUBLICATIONS

European Search Report for EP14004008 dated May 4, 2015.
English Abstract of JPH0952852, Publication Date: Feb. 25, 1997.

* cited by examiner

*Primary Examiner* — Chanceity Robinson
(74) *Attorney, Agent, or Firm* — Millen White Zelano & Branigan, PC

(57) ABSTRACT

The invention relates to compounds of the formula I, to a liquid-crystalline medium which comprises at least one compound of the formula I,

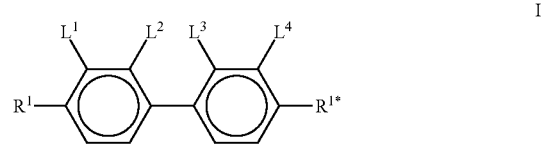

in which
$R^1$, $R^{1*}$, $L^1$, $L^2$, $L^3$ and $L^4$ have the meanings indicated herein,
and to the use thereof for an active-matrix display, in particular based on the VA, PSA, PS-VA, PM-VA, PALC, IPS, PS-IPS, SA-VA, SS-VA, FFS or PS-FFS effect.

28 Claims, No Drawings

LIQUID-CRYSTALLINE MEDIUM

The invention relates to a liquid-crystalline medium which comprises at least one compound of the formula I,

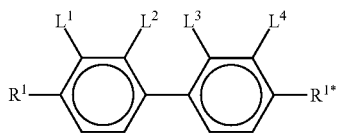

in which
$R^1$ and $R^{1*}$ each, independently of one another, denote an alkyl or alkoxy radical having 1 to 15 C atoms, where, in addition, one or more $CH_2$ groups in these radicals may each be replaced, independently of one another, by —C≡C—, —$CF_2$O—, —O$CF_2$—, —CH=CH—,

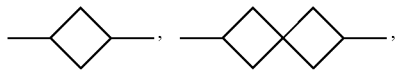

—O—, —CO—CO—, or —O—CO— in such a way that O atoms are not linked directly to one another, and in which, in addition, one or more H atoms may each be replaced by halogen,
$L^1$ to $L^4$ each, independently of one another, denote F, Cl, $CF_3$ or $CHF_2$, where one of the radicals $L^1$ to $L^4$ may also be H.

Media of this type can be used, in particular, for electro-optical displays having active-matrix addressing based on the ECB effect and for IPS (in-plane switching) displays or FFS (fringe field switching) displays.

The principle of electrically controlled birefringence, the ECB effect or also DAP (deformation of aligned phases) effect, was described for the first time in 1971 (M. F. Schieckel and K. Fahrenschon, "Deformation of nematic liquid crystals with vertical orientation in electrical fields", Appl. Phys. Lett. 19 (1971), 3912). This was followed by papers by J. F. Kahn (Appl. Phys. Lett. 20 (1972), 1193) and G. Labrunie and J. Robert (J. Appl. Phys. 44 (1973), 4869).

The papers by J. Robert and F. Clerc (SID 80 Digest Techn. Papers (1980), 30), J. Duchene (Displays 7 (1986), 3) and H. Schad (SID 82 Digest Techn. Papers (1982), 244) showed that liquid-crystalline phases must have high values for the ratio of the elastic constants $K_3/K_1$, high values for the optical anisotropy Δn and values for the dielectric anisotropy of Δ∈≤−0.5 in order to be suitable for use in high-information display elements based on the ECB effect. Electro-optical display elements based on the ECB effect have a homeotropic edge alignment (VA technology=vertically aligned). Dielectrically negative liquid-crystal media can also be used in displays which use the so-called IPS or FFS effect.

Displays which use the ECB effect, as so-called VAN (vertically aligned nematic) displays, for example in the MVA (multi-domain vertical alignment, for example: Yoshide, H. et al., paper 3.1: "MVA LCD for Notebook or Mobile PCs . . . ", SID 2004 International Symposium, Digest of Technical Papers, XXXV, Book I, pp. 6 to 9, and Liu, C. T. et al., paper 15.1: "A 46-inch TFT-LCD HDTV Technology . . . ", SID 2004 International Symposium, Digest of Technical Papers, XXXV, Book II, pp. 750 to 753), PVA (patterned vertical alignment, for example: Kim, Sang Soo, paper 15.4: "Super PVA Sets New State-of-the-Art for LCD-TV", SID 2004 International Symposium, Digest of Technical Papers, XXXV, Book II, pp. 760 to 763), ASV (advanced super view, for example: Shigeta, Mitzuhiro and Fukuoka, Hirofumi, paper 15.2: "Development of High Quality LCDTV", SID 2004 International Symposium, Digest of Technical Papers, XXXV, Book II, pp. 754 to 757) modes, have established themselves as one of the three more recent types of liquid-crystal display that are currently the most important, in particular for television applications, besides IPS (in-plane switching) displays (for example: Yeo, S. D., paper 15.3: "An LC Display for the TV Application", SID 2004 International Symposium, Digest of Technical Papers, XXXV, Book II, pp. 758 & 759) and the long-known TN (twisted nematic) displays. The technologies are compared in general form, for example, in Souk, Jun, SID Seminar 2004, seminar M-6: "Recent Advances in LCD Technology", Seminar Lecture Notes, M-6/1 to M-6/26, and Miller, Ian, SID Seminar 2004, seminar M-7: "LCD-Television", Seminar Lecture Notes, M-7/1 to M-7/32. Although the response times of modern ECB displays have already been significantly improved by addressing methods with overdrive, for example: Kim, Hyeon Kyeong et al., paper 9.1: "A 57-in. Wide UXGA TFT-LCD for HDTV Application", SID 2004 International Symposium, Digest of Technical Papers, XXXV, Book I, pp. 106 to 109, the achievement of video-compatible response times, in particular on switching of grey shades, is still a problem which has not yet been satisfactorily solved.

Industrial application of this effect in electro-optical display elements requires LC phases, which have to satisfy a multiplicity of requirements. Particularly important here are chemical resistance to moisture, air and physical influences, such as heat, infrared, visible and ultraviolet radiation and direct and alternating electric fields.

Furthermore, industrially usable LC phases are required to have a liquid-crystalline mesophase in a suitable temperature range and low viscosity.

None of the hitherto-disclosed series of compounds having a liquid-crystalline mesophase includes a single compound which meets all these requirements. Mixtures of two to 25, preferably three to 18, compounds are therefore generally prepared in order to obtain substances which can be used as LC phases. However, it has not been possible to prepare optimum phases easily in this way since no liquid-crystal materials having significantly negative dielectric anisotropy and adequate long-term stability were hitherto available.

Matrix liquid-crystal displays (MLC displays) are known. Non-linear elements which can be used for individual switching of the individual pixels are, for example, active elements (i.e. transistors). The term "active matrix" is then used, where a distinction can be made between two types:
1. MOS (metal oxide semiconductor) transistors on a silicon wafer as substrate
2. thin-film transistors (TFTs) on a glass plate as substrate.

In the case of type 1, the electro-optical effect used is usually dynamic scattering or the guest-host effect. The use of single-crystal silicon as substrate material restricts the display size, since even modular assembly of various part-displays results in problems at the joints.

In the case of the more promising type 2, which is preferred, the electro-optical effect used is usually the TN effect.

A distinction is made between two technologies: TFTs comprising compound semiconductors, such as, for example, CdSe, or TFTs based on polycrystalline or amorphous silicon. The latter technology is being worked on intensively worldwide.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully color-capable displays, in which a mosaic of red, green and blue filters is arranged in such a way that a filter element is opposite each switchable pixel.

The term MLC displays here covers any matrix display with integrated non-linear elements, i.e. besides the active matrix, also displays with passive elements, such as varistors or diodes (MIM=metal-insulator-metal).

MLC displays of this type are particularly suitable for TV applications (for example pocket TVs) or for high-information displays in automobile or aircraft construction. Besides problems regarding the angle dependence of the contrast and the response times, difficulties also arise in MLC displays due to insufficiently high specific resistance of the liquid-crystal mixtures [TOGASHI, S., SEKIGUCHI, K., TANABE, H., YAMAMOTO, E., SORI-MACHI, K., TAJIMA, E., WATANABE, H., SHIMIZU, H., Proc. Eurodisplay 84, September 1984: A 210-288 Matrix LCD Controlled by Double Stage Diode Rings, pp. 141 ff., Paris; STROMER, M., Proc. Eurodisplay 84, September 1984: Design of Thin Film Transistors for Matrix Addressing of Television Liquid Crystal Displays, pp. 145 ff., Paris]. With decreasing resistance, the contrast of an MLC display deteriorates. Since the specific resistance of the liquid-crystal mixture generally drops over the life of an MLC display owing to interaction with the inside surfaces of the display, a high (initial) resistance is very important for displays that have to have acceptable resistance values over a long operating period.

There is thus still a great demand for MLC displays having fast response times at the same time as a large working-temperature range and a low threshold voltage, with the aid of which various grey shades can be generated.

The disadvantage of the MLC-TN displays frequently used is due to their comparatively low contrast, the relatively high viewing-angle dependence and the difficulty of generating grey shades in these displays.

VA displays have significantly better viewing-angle dependences and are therefore principally used for televisions and monitors. However, there continues to be a need to improve the response times here, in particular in view of use for televisions having frame rates (image change frequency/refresh rate) of greater than 60 Hz. However, the properties, such as, for example, the low-temperature stability, must not be impaired at the same time.

The invention is based on the object of providing liquid-crystal mixtures, in particular for monitor and TV applications, based on the ECB effect or on the IPS or FFS effect, which do not have the disadvantages indicated above, or only do so to a reduced extent. In particular, it must be ensured for monitors and televisions that they also work at extremely high and extremely low temperatures and at the same time have very short response times and at the same time have improved reliability behavior, in particular exhibit no or significantly reduced image sticking after long operating times.

Upon further study of the specification and appended claims, other objects, aspects and advantages of the invention will become apparent.

Surprisingly, it is possible to reduce the ratio of rotational viscosities $\gamma_1$ and the elastic constants and thus to improve the response times if polar compounds of the general formula I are used in liquid-crystal mixtures, in particular in LC mixtures having negative dielectric anisotropy, preferably for VA, IPS and FFS displays, furthermore for PM (passive matrix)-VA displays.

Surprisingly, the compounds of the formula I simultaneously have very low rotational viscosities and high absolute values of the dielectric anisotropy. It is therefore possible to prepare liquid-crystal mixtures, preferably VA, IPS and FFS mixtures, which have short response times, at the same time good phase properties and good low-temperature behavior.

The invention thus relates to a liquid-crystalline medium which comprises at least one compound of the formula I. The present invention likewise relates to compounds of the formula I.

The mixtures according to the invention preferably exhibit very broad nematic phase ranges with clearing points ≥68° C., preferably ≥70° C., very favorable values of the capacitive threshold, relatively high values of the holding ratio and at the same time very good low-temperature stabilities at −20° C. and −30° C., as well as low rotational viscosities and short response times. The mixtures according to the invention are furthermore distinguished by the fact that, in addition to the improvement in the rotational viscosity $\gamma_1$, relatively high values of the elastic constants $K_{33}$ for improving the response times can be observed.

Some preferred embodiments of the mixtures according to the invention are indicated below.

In the compounds of the formula I, $R^1$ and $R^{1*}$ each, independently of one another, preferably denote straight-chain alkoxy, in particular $OC_2H_5$, $OC_3H_7$, $OC_4H_9$, $OC_5H_{11}$, and $OC_6H_{13}$, furthermore alkenyloxy, in particular $OCH_2CH=CH_2$, $OCH_2CH=CHCH_3$, $OCH_2CH=CHC_2H_5$, furthermore alkyl, in particular n-$C_3H_7$, n-$C_4H_9$, n-$C_5H_{11}$, and n-$C_6H_{13}$.

$R^1$ and $R^{1*}$ each, independently of one another, preferably denote straight-chain alkoxy having 1-6 C atoms, in particular ethoxy, butoxy, pentoxy, hexoxy or straight-chain alkenyloxy having 2-6 C atoms, in particular $OCH_2CH=CH_2$.

Preferred compounds of the formula I are the compounds of the formulae I-1 to I-11, where $L^3$=H,

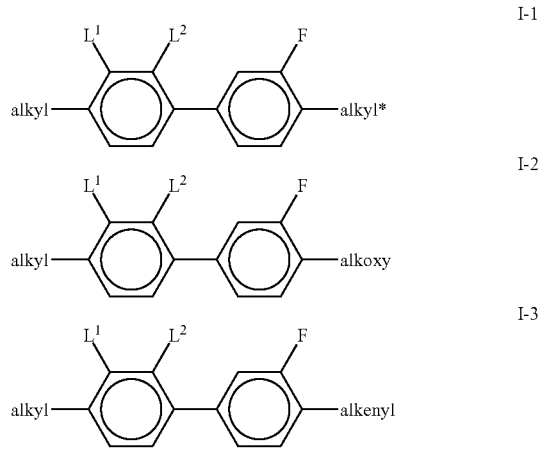

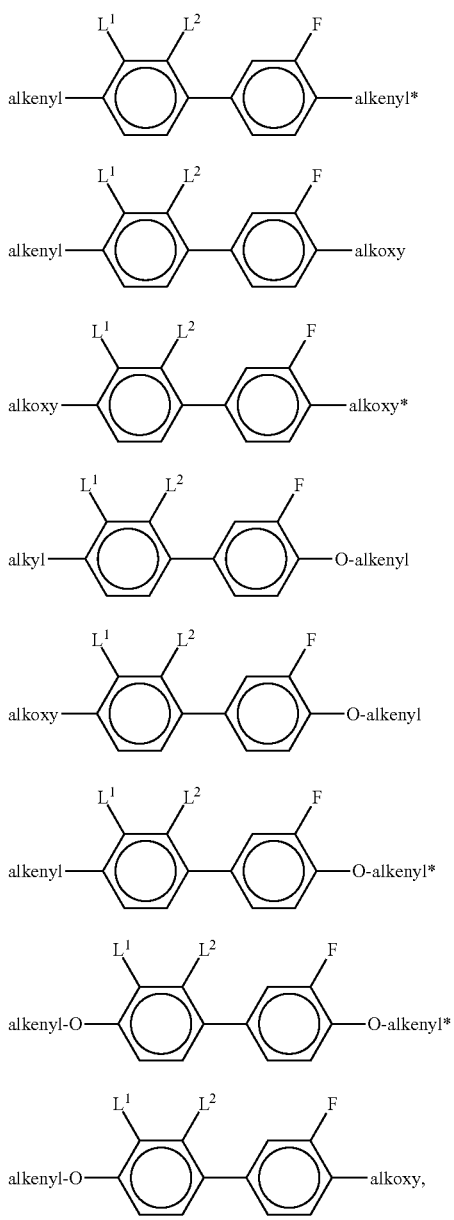

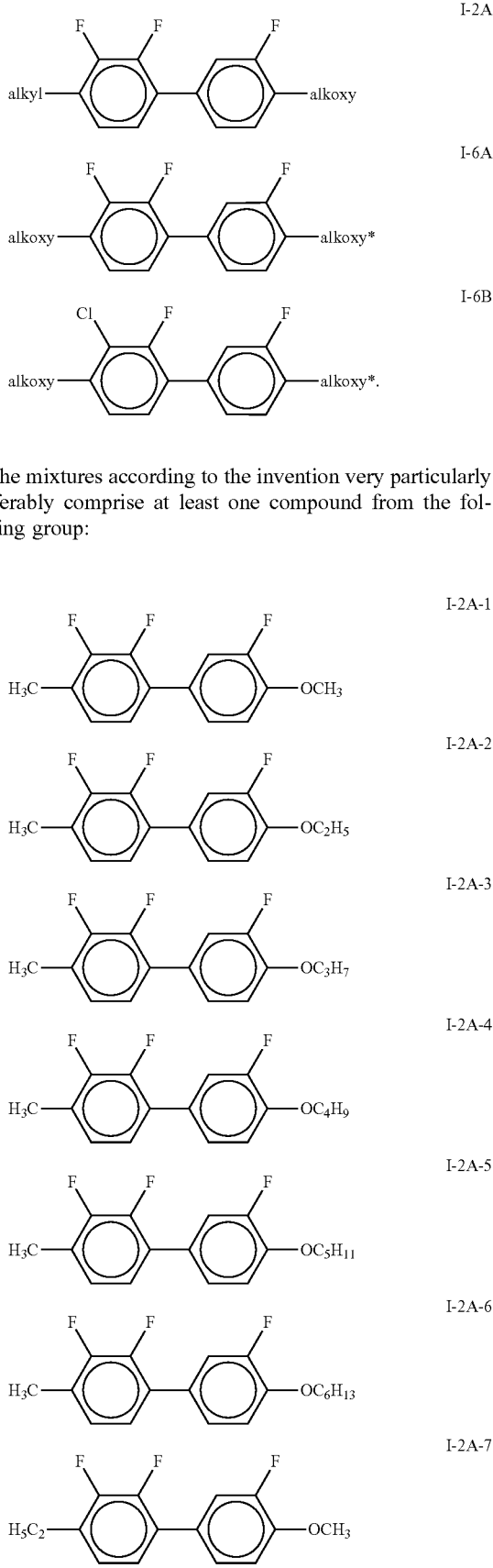

in which
alkyl and alkyl* each, independently of one another, denote a straight-chain alkyl radical having 1-6 C atoms, alkenyl and alkenyl* each, independently of one another, denote a straight-chain alkenyl radical having 2-6 C atoms, alkoxy and alkoxy* each, independently of one another, denote a straight-chain alkoxy radical having 1-6 C atoms, and $L^1$ and $L^2$ each, independently of one another, denote F or Cl.

In the compounds of the formulae I-1 to I-11, $L^1$ and $L^2$ each, independently of one another, preferably denote F or Cl, in particular F. Particular preference is given to the compounds of the formulae I-6, I-8 and I-11. In the formula I-6, preferably $L^1=L^2=F$.

The mixture according to the invention very particularly preferably comprises at least one compound of the formula I-2A, I-6A or I-6B:

The mixtures according to the invention very particularly preferably comprise at least one compound from the following group:

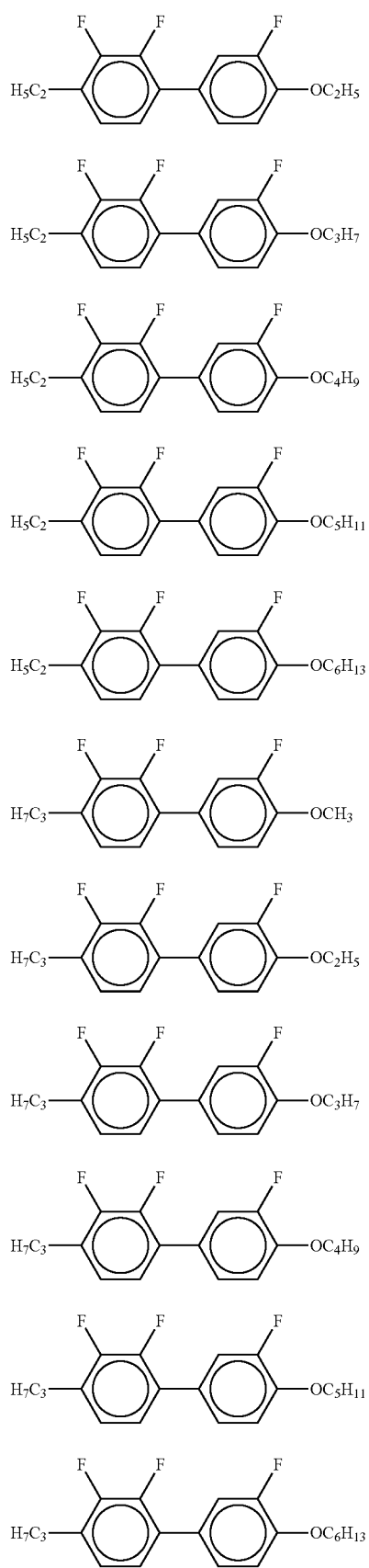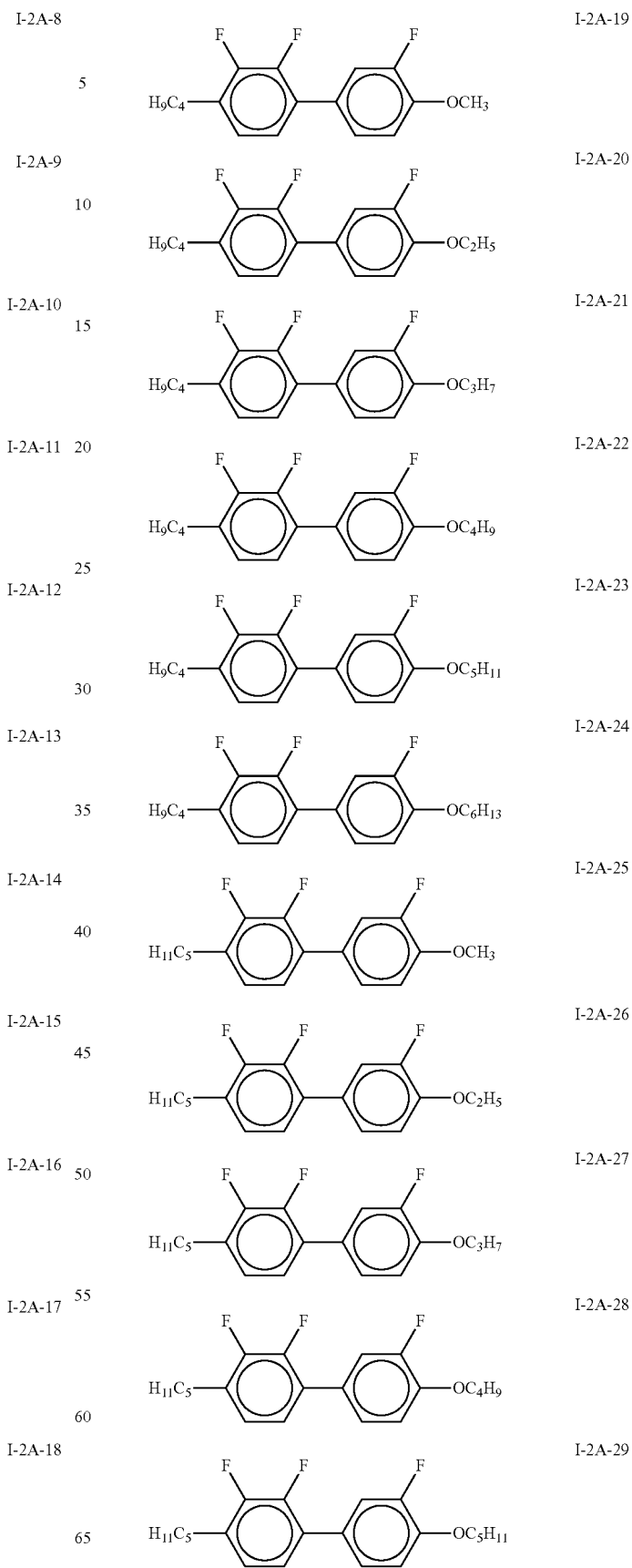

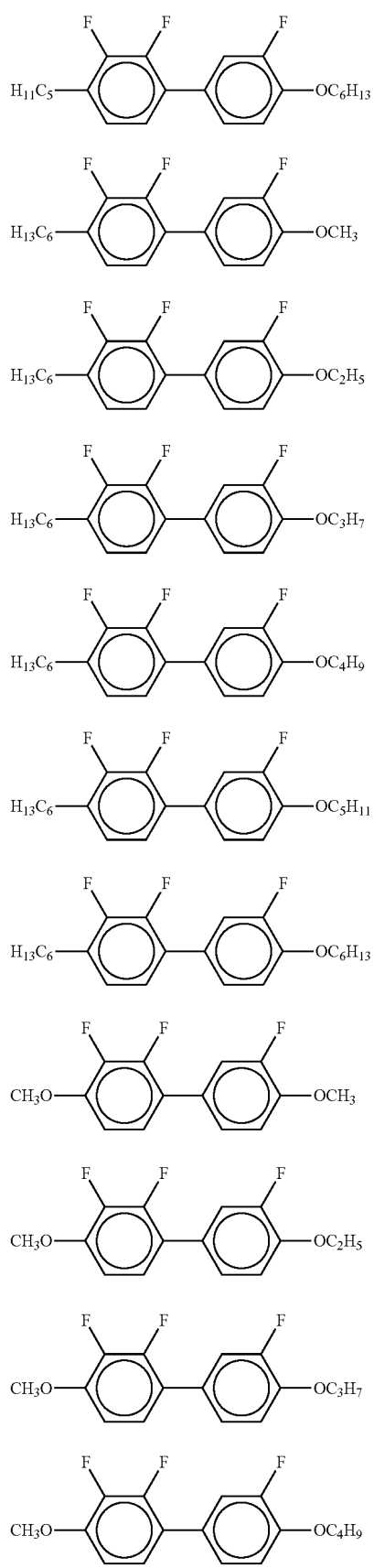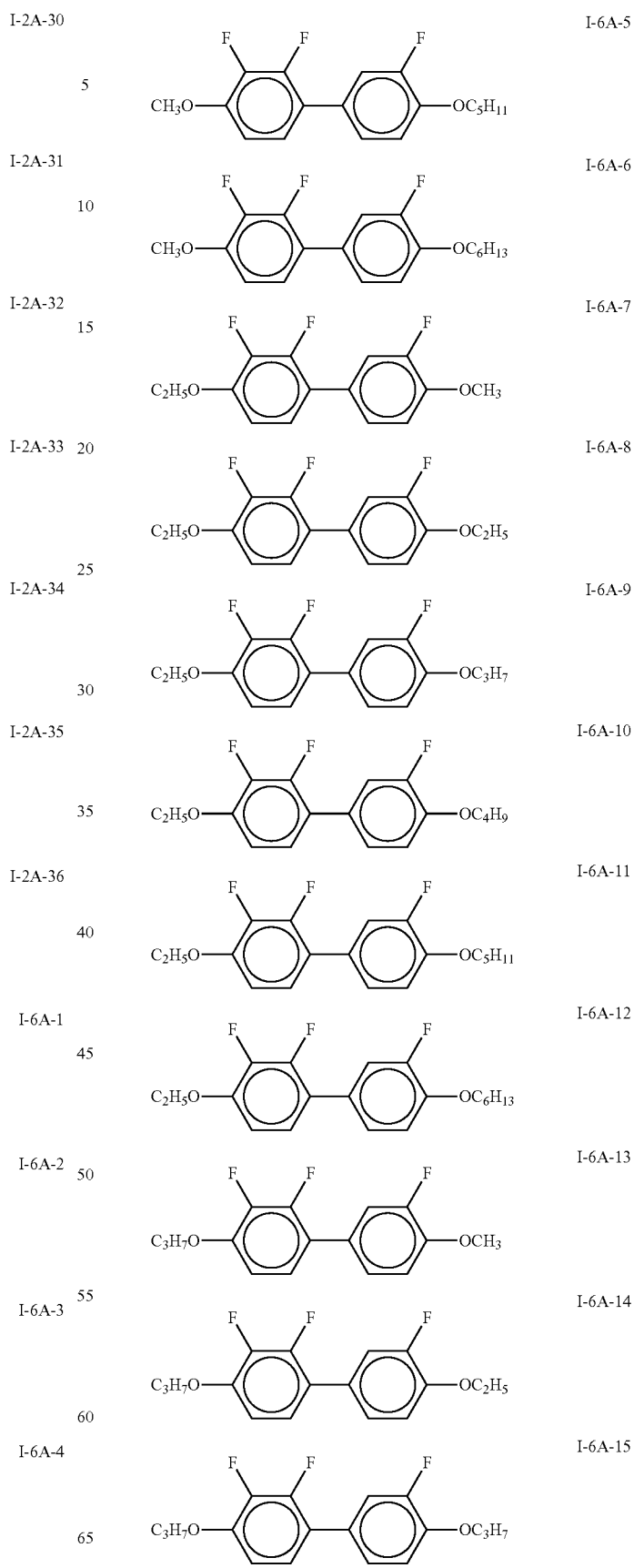

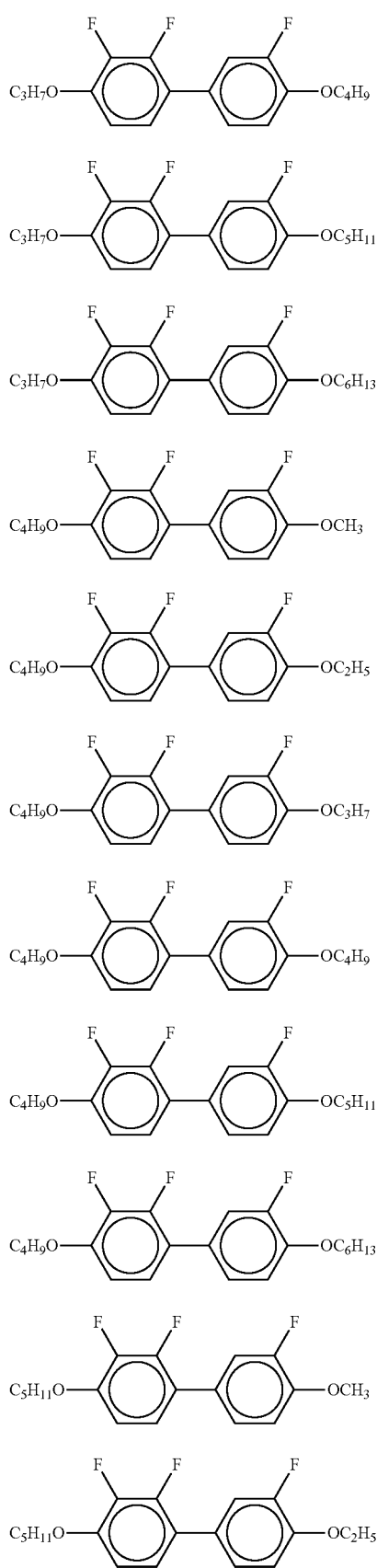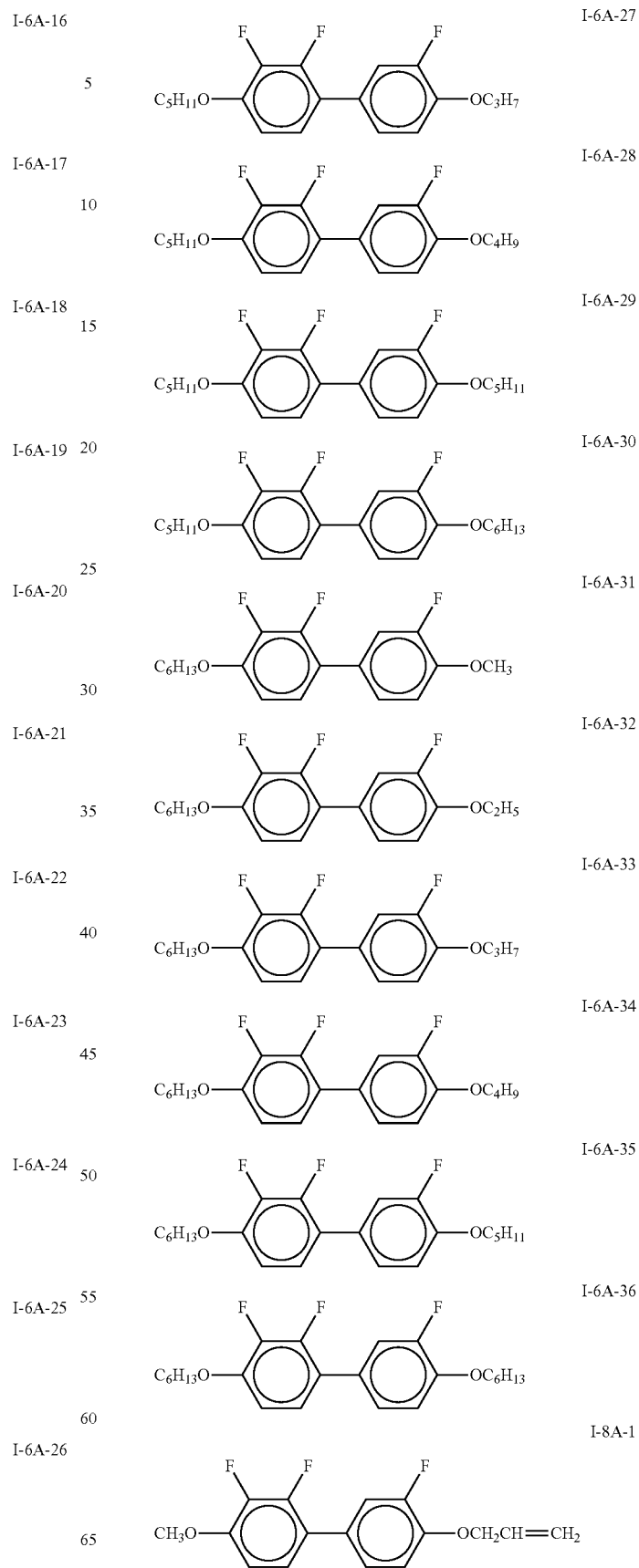

In the compounds of the formula I and the sub-formulae, $L^1$ and $L^2$ each, independently of one another, preferably denote F or Cl, in particular F. $R^1$ and $R^{1*}$ preferably both denote alkoxy.

Preferred compounds of the formula I are furthermore the compounds of the formulae I-12 to I-21, where $L^4$=H,

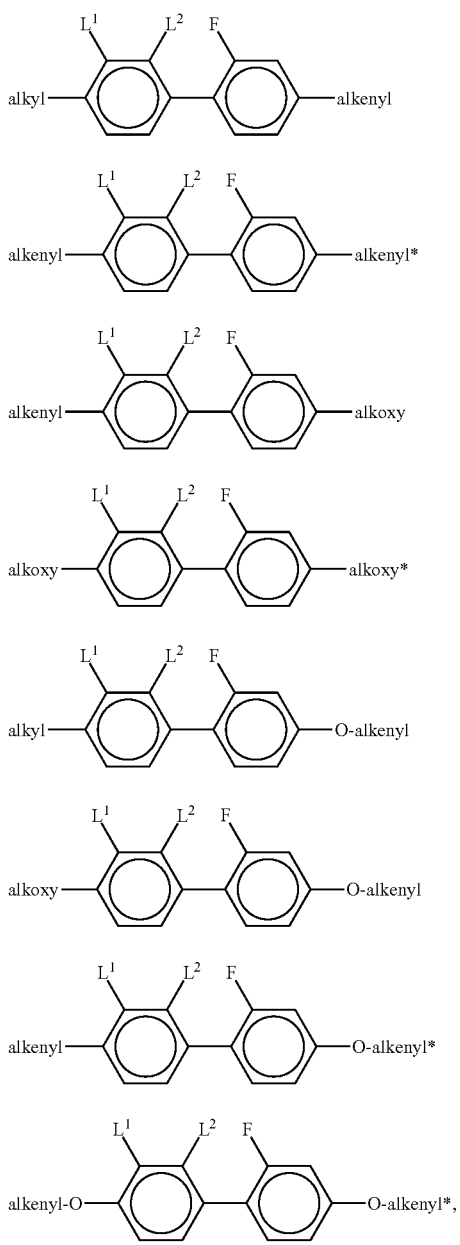
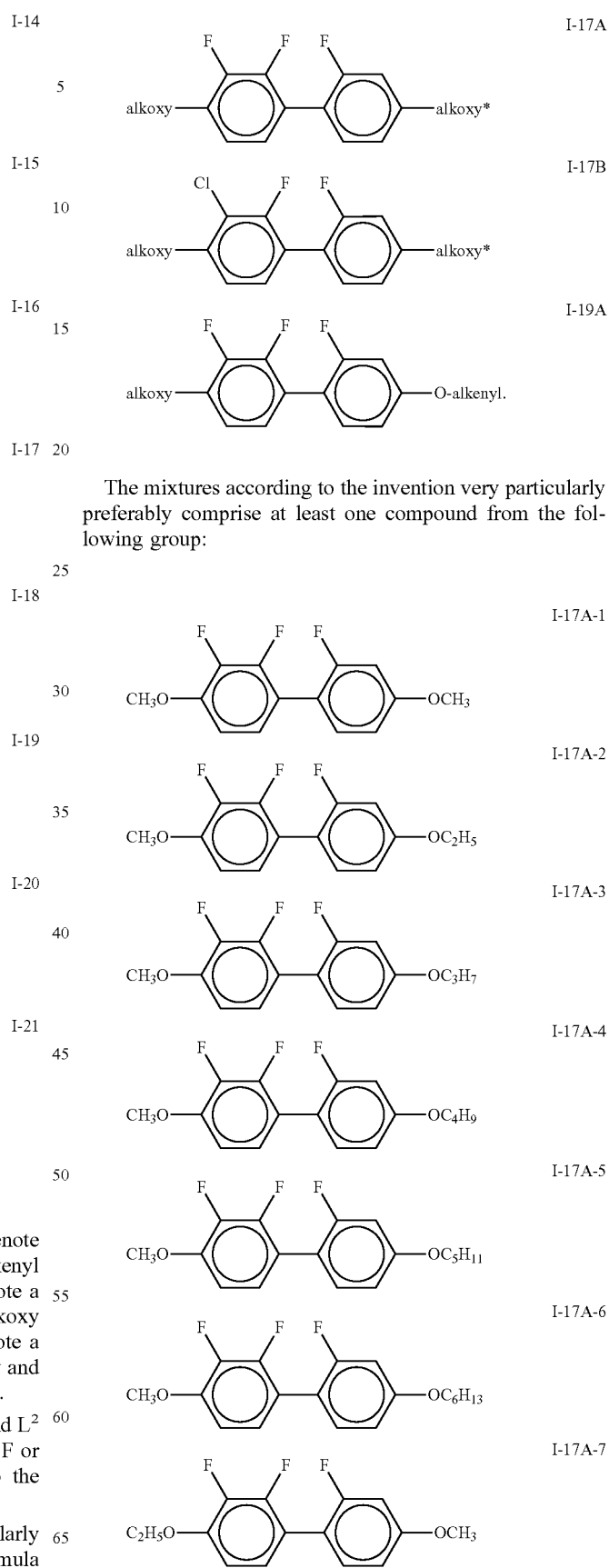

in which
alkyl and alkyl* each, independently of one another, denote a straight-chain alkyl radical having 1-6 C atoms, alkenyl and alkenyl* each, independently of one another, denote a straight-chain alkenyl radical having 2-6 C atoms, alkoxy and alkoxy* each, independently of one another, denote a straight-chain alkoxy radical having 1-6 C atoms, and $L^1$ and $L^2$ each, independently of one another, denote F or Cl.

In the compounds of the formulae I-12 to I-21, $L^1$ and $L^2$ each, independently of one another, preferably denote F or Cl, in particular F. Particular preference is given to the compounds of the formula I-17.

The mixture according to the invention very particularly preferably comprises at least one compound of the formula I-17A, I-17B or I-19A:

The mixtures according to the invention very particularly preferably comprise at least one compound from the following group:

I-17A-8

C₂H₅O–(F,F)–(F)–OC₂H₅

I-17A-9

C₂H₅O–(F,F)–(F)–OC₃H₇

I-17A-10

C₂H₅O–(F,F)–(F)–OC₄H₉

I-17A-11

C₂H₅O–(F,F)–(F)–OC₅H₁₁

I-17A-12

C₂H₅O–(F,F)–(F)–OC₆H₁₃

I-17A-13

C₃H₇O–(F,F)–(F)–OCH₃

I-17A-14

C₃H₇O–(F,F)–(F)–OC₂H₅

I-17A-15

C₃H₇O–(F,F)–(F)–OC₃H₇

I-17A-16

C₃H₇O–(F,F)–(F)–OC₄H₉

I-17A-17

C₃H₇O–(F,F)–(F)–OC₅H₁₁

I-17A-18

C₃H₇O–(F,F)–(F)–OC₆H₁₃

I-17A-19

C₄H₉O–(F,F)–(F)–OCH₃

I-17A-20

C₄H₉O–(F,F)–(F)–OC₂H₅

I-17A-21

C₄H₉O–(F,F)–(F)–OC₃H₇

I-17A-22

C₄H₉O–(F,F)–(F)–OC₄H₉

I-17A-23

C₄H₉O–(F,F)–(F)–OC₅H₁₁

I-17A-24

C₄H₉O–(F,F)–(F)–OC₆H₁₃

I-17A-25

C₅H₁₁O–(F,F)–(F)–OCH₃

I-17A-26

C₅H₁₁O–(F,F)–(F)–OC₂H₅

I-17A-27

C₅H₁₁O–(F,F)–(F)–OC₃H₇

I-17A-28

C₅H₁₁O–(F,F)–(F)–OC₄H₉

I-17A-29

C₅H₁₁O–(F,F)–(F)–OC₅H₁₁

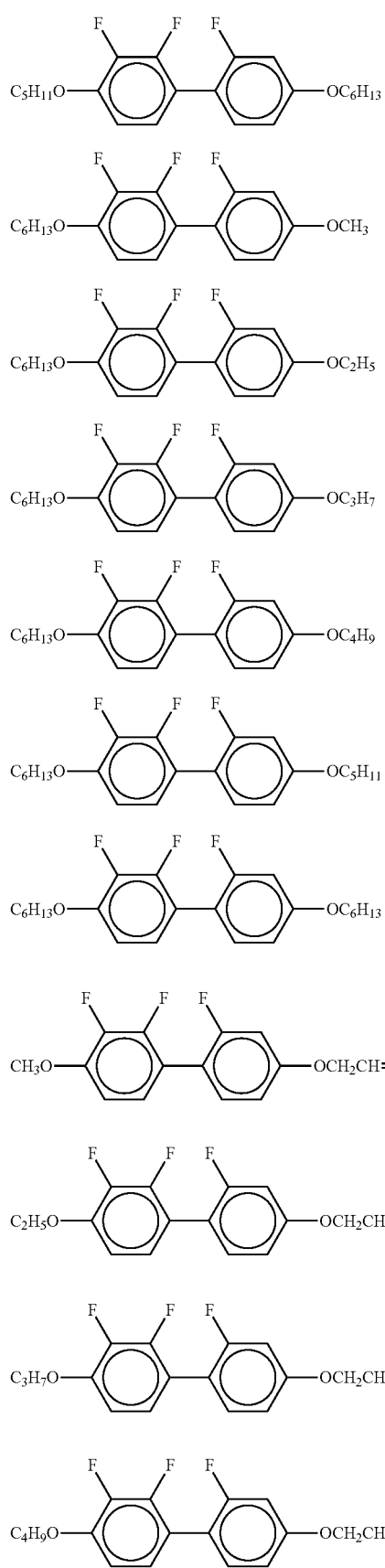
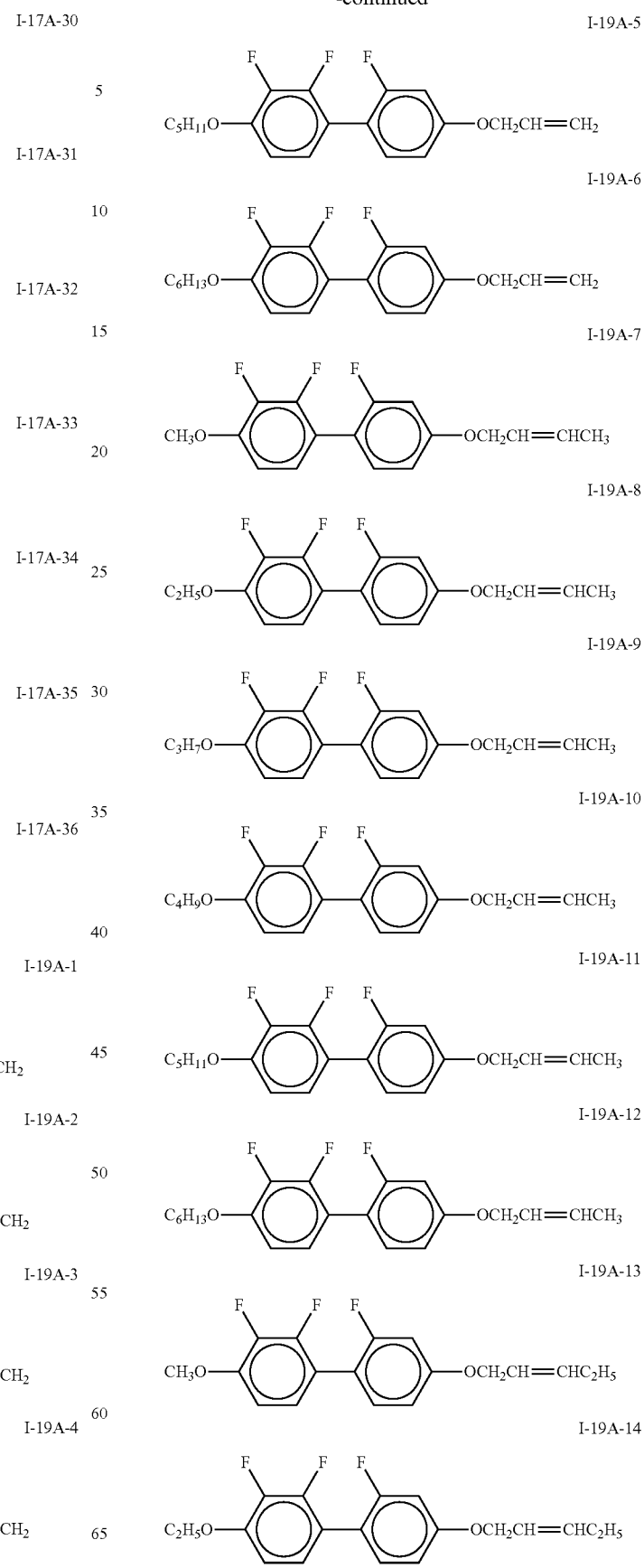

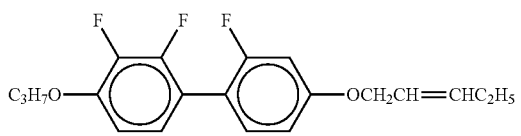
I-19A-15

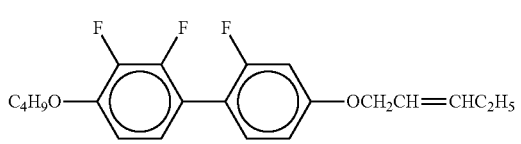
I-19A-16

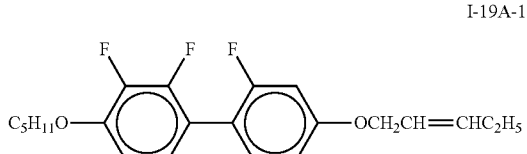
I-19A-17

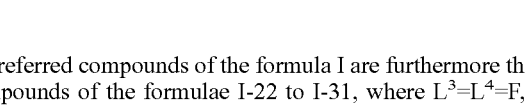
I-19A-19

Preferred compounds of the formula I are furthermore the compounds of the formulae I-22 to I-31, where $L^3=L^4=F$,

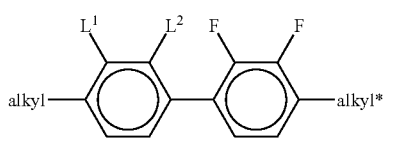
I-22

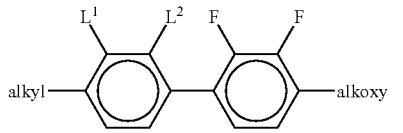
I-23

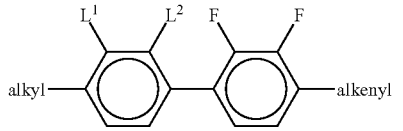
I-24

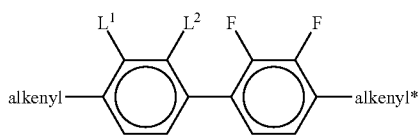
I-25

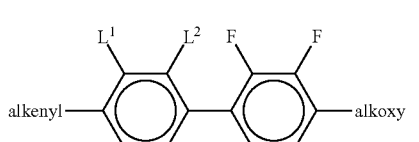
I-26

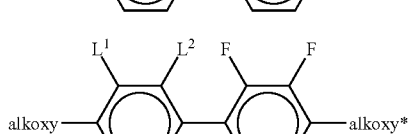
I-27

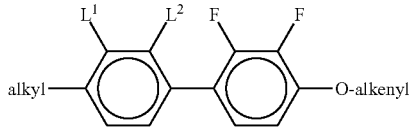
I-28

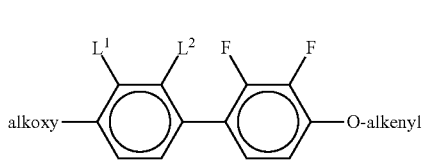
I-29

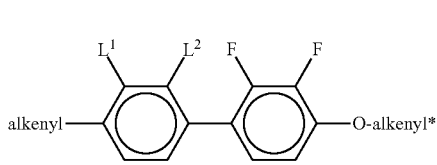
I-30

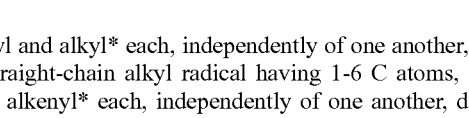
I-31 alkyl and alkyl* each, independently of one another, denote a straight-chain alkyl radical having 1-6 C atoms, alkenyl and alkenyl* each, independently of one another, denote a straight-chain alkenyl radical having 2-6 C atoms, alkoxy and alkoxy* each, independently of one another, denote a straight-chain alkoxy radical having 1-6 C atoms, and $L^1$ and $L^2$ each, independently of one another, denote F or Cl.

In the compounds of the formulae I-22 to I-31, $L^1$ and $L^2$ each, independently of one another, preferably denote F or Cl, in particular F. Particular preference is given to the compounds of the formulae I-27, I-29 and I-30.

The mixture according to the invention very particularly preferably comprises at least one compound of the formula I-27A, I-27B or I-29A:

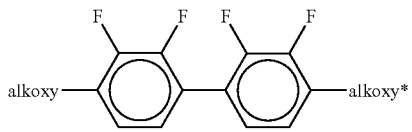
I-27A

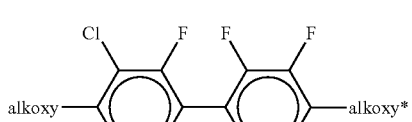
I-27B

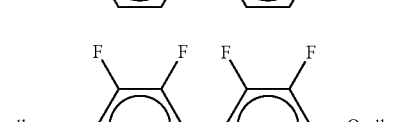
I-29A

The mixtures according to the invention very particularly preferably comprise at least one compound from the following group:

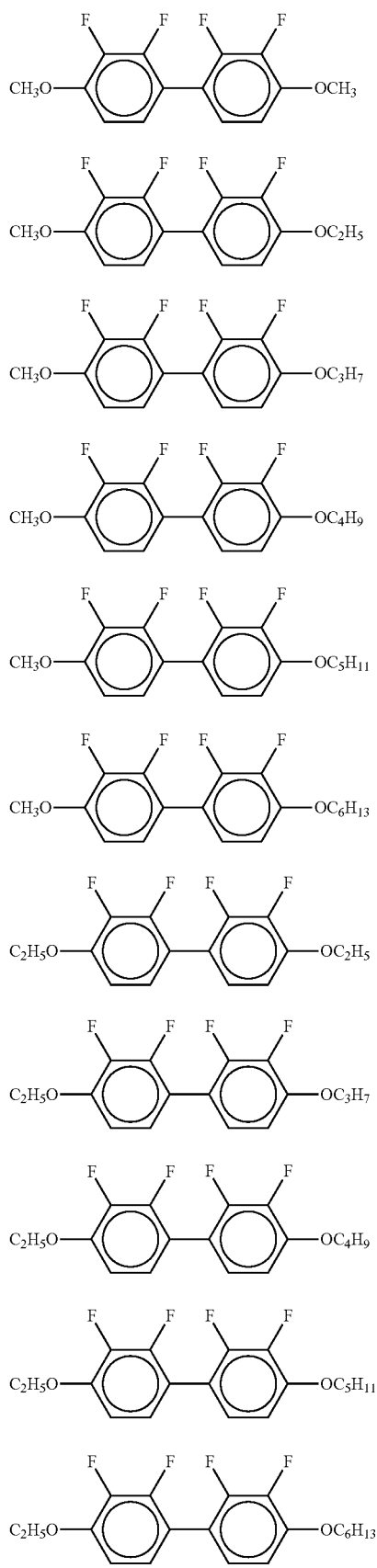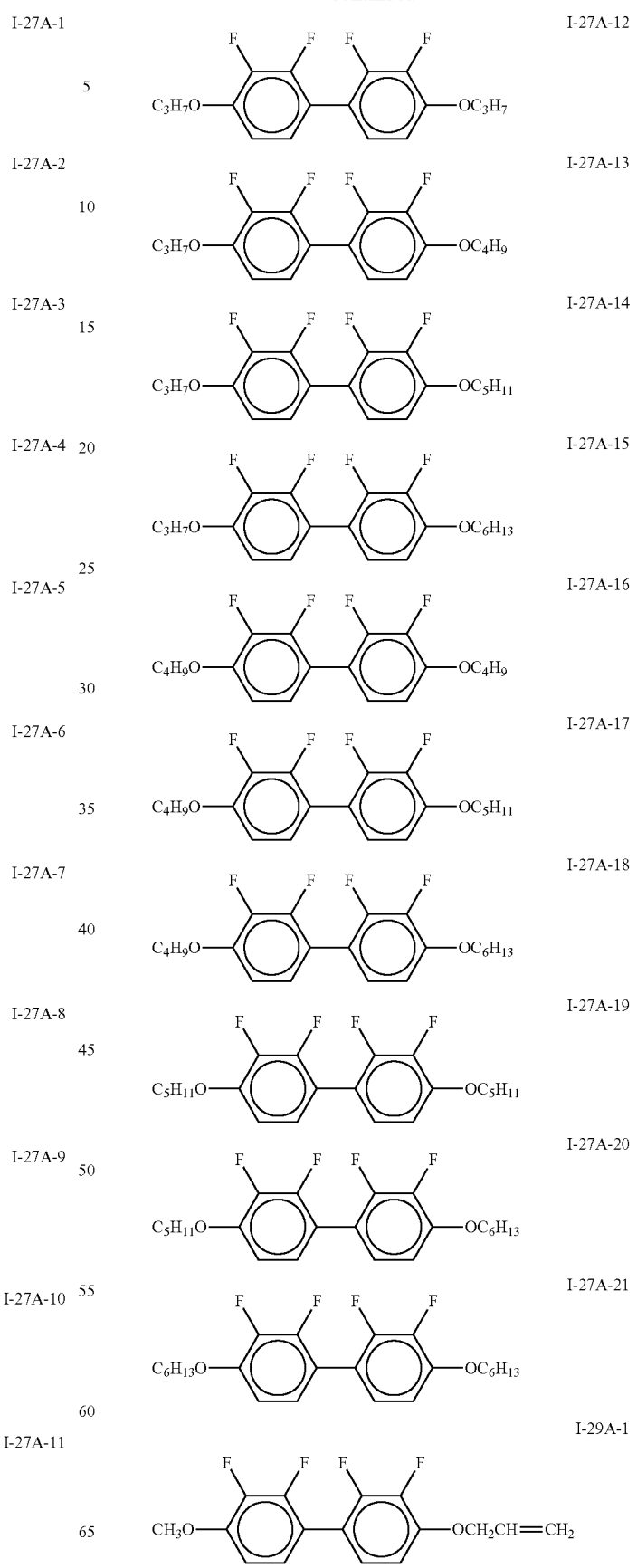

I-29A-2
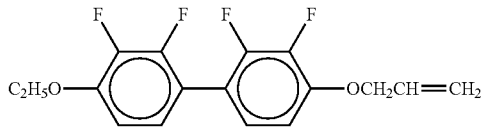
I-29A-3
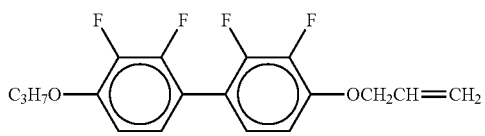
I-29A-4
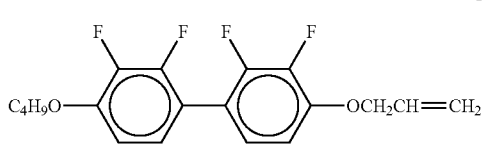
I-29A-5
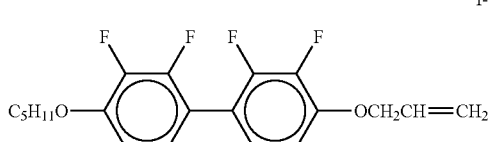
I-29A-6
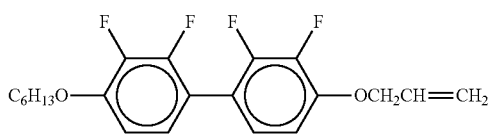
I-29A-7
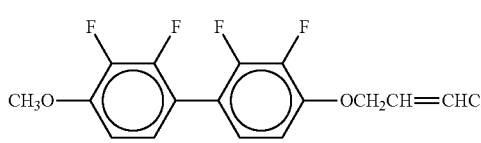
I-29A-8
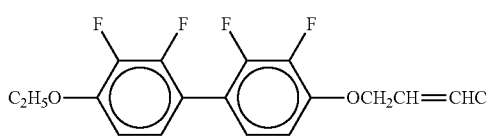
I-29A-9
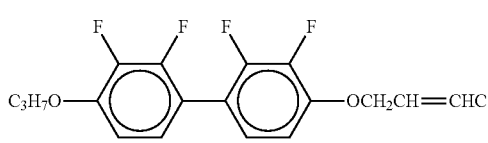
I-29A-10
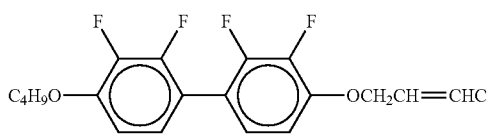
I-29A-11
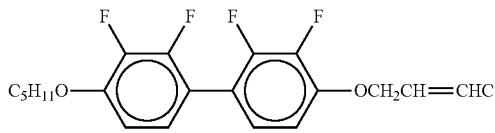
I-29A-12
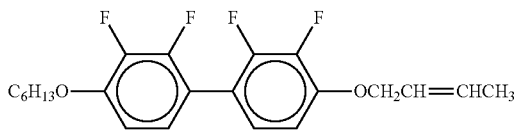
I-29A-13
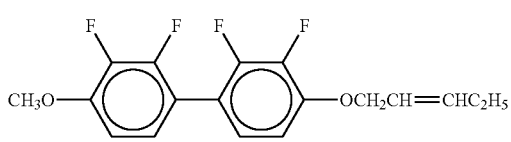
I-29A-14
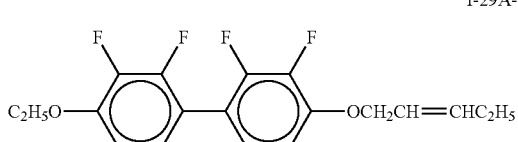
I-29A-15
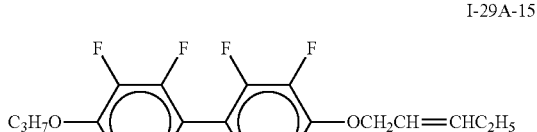
I-29A-16
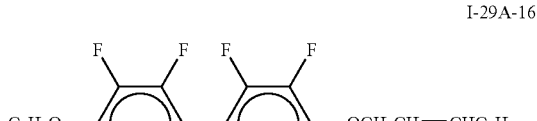
I-29A-17
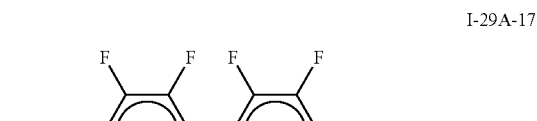
I-29A-18
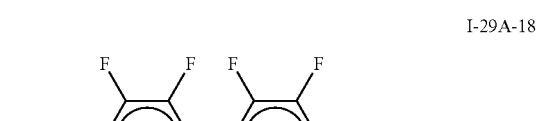
The compounds of the formula I can be prepared, for example, as follows:
Scheme 1
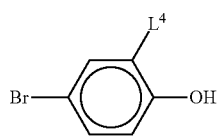
↓ alkyl*-OH, PPh$_3$,
i-prop-OOC—N═N—COO-i-prop

27
-continued

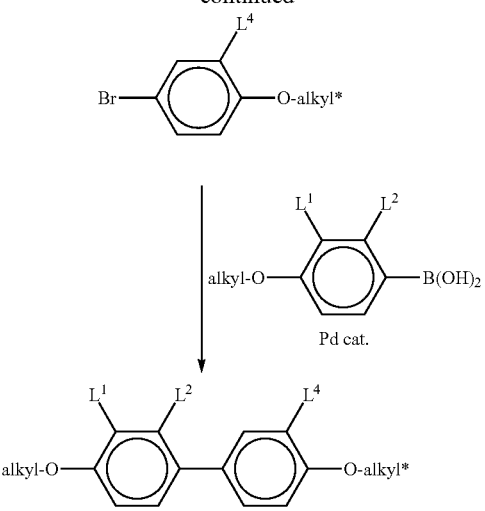

(L¹ = L² = L⁴ ≠ H and alkyl and alkyl* each, independently of one another, denote an alkyl radical having 1-15 C atoms.)

Scheme 2

28
-continued

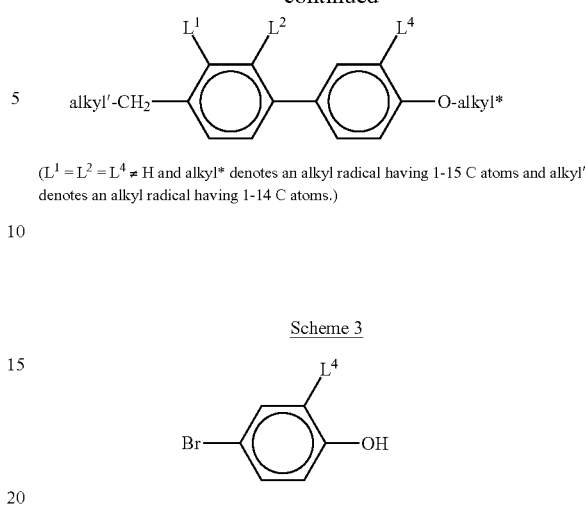

(L¹ = L² = L⁴ ≠ H and alkyl* denotes an alkyl radical having 1-15 C atoms and alkyl' denotes an alkyl radical having 1-14 C atoms.)

Scheme 3

(L¹ = L² = L⁴ ≠ H and alkyl* denotes an alkyl radical having 1-15 C atoms and alkenyl denotes an alkenyl radical having 2-15 C atoms.)

Scheme 4

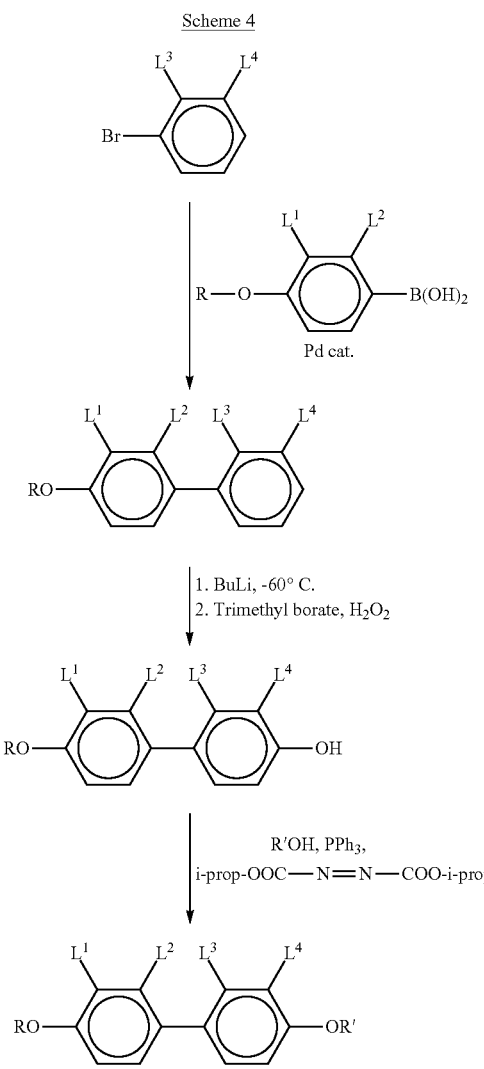

($L^1 = L^2 = L^3 = L^4 \neq H$ and R and R' each, independently of one another, denote an alkyl radical having 1-15 C atoms or an alkenyl radical having 2-15 C atoms.)

Scheme 5

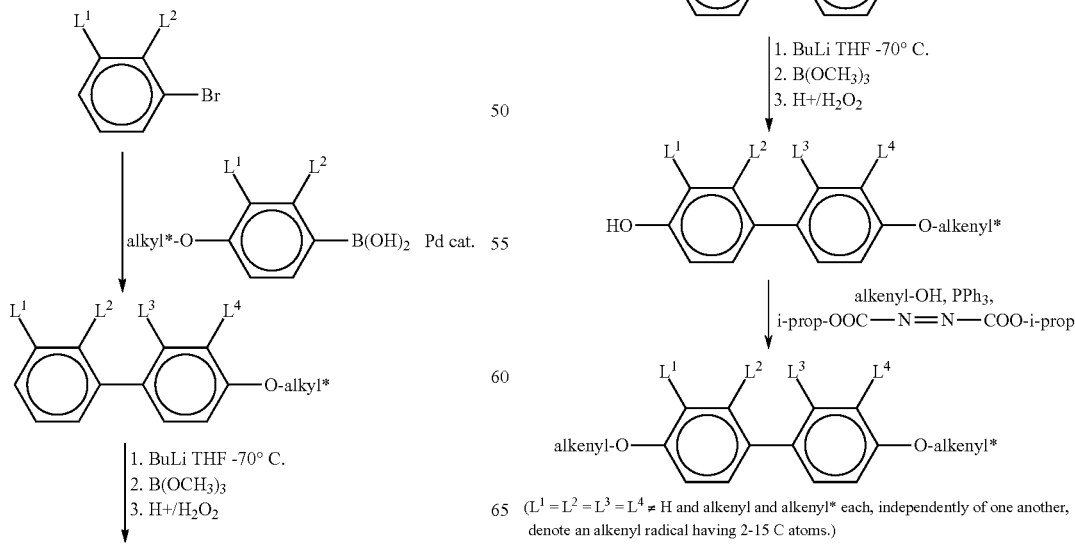

($L^1 = L^2 = L^3 = L^4 \neq H$ and alkyl* denotes an alkyl radical having 1-15 C atoms and alkenyl denotes an alkenyl radical having 2-15 C atoms.)

Scheme 6

($L^1 = L^2 = L^3 = L^4 \neq H$ and alkenyl and alkenyl* each, independently of one another, denote an alkenyl radical having 2-15 C atoms.)

Scheme 7

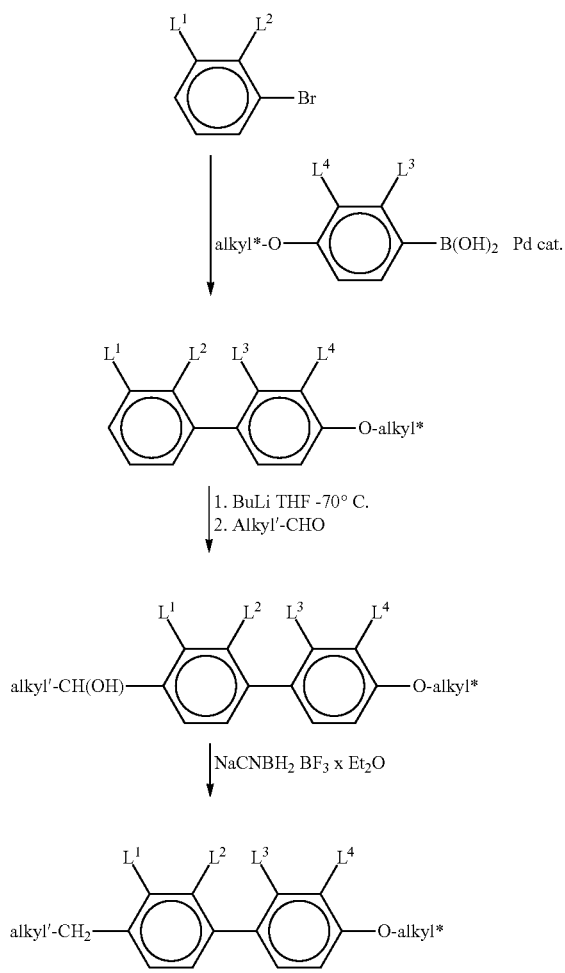

($L^1 = L^2 = L^3 = L^4 \neq H$ and alkyl' denotes an alkyl radical having 1-15 C atoms and alkyl' denotes an alkyl radical having 1-14 C atoms.)

Scheme 8

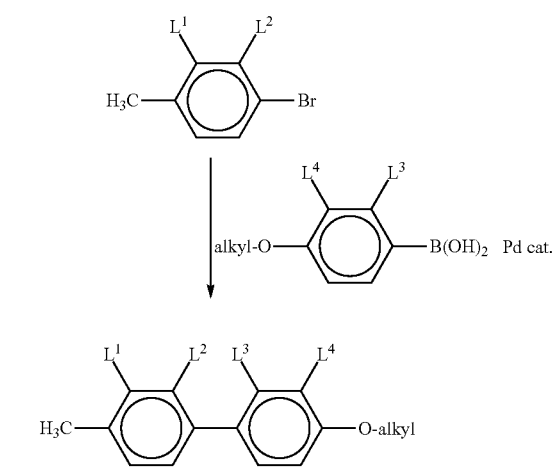

($L^1 = L^2 = L^3 = L^4 \neq H$ and alkyl denotes an alkyl radical having 1-15 C atoms.)

Scheme 9

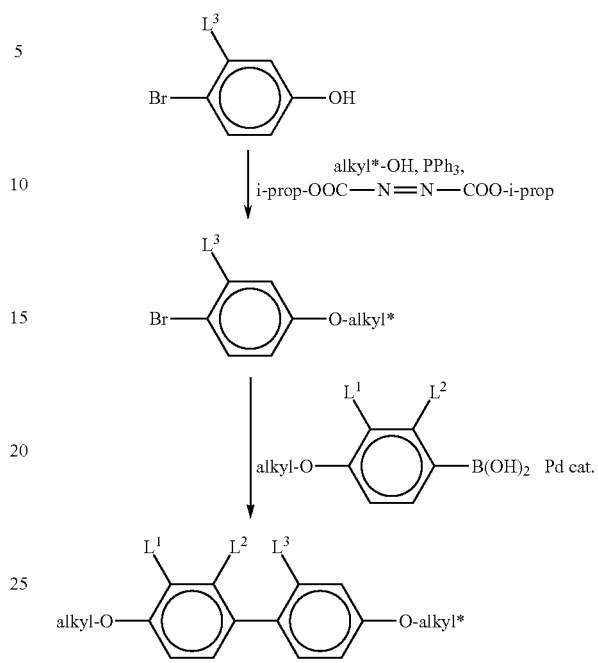

($L^1 = L^2 = L^3 = L^4 \neq H$ and alkyl and alkyl* each, independently of one another, denote an alkyl radical having 1-15 C atoms.)

Particularly preferred compounds of the formula I are prepared, for example, as follows:

Scheme 10

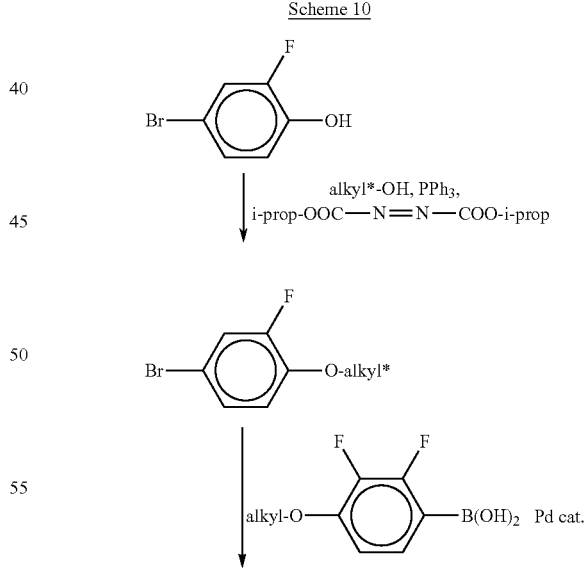

(alkyl and alkyl* each, independently of one another, denote an alkyl radical having 1-15 C atoms.)

Scheme 11
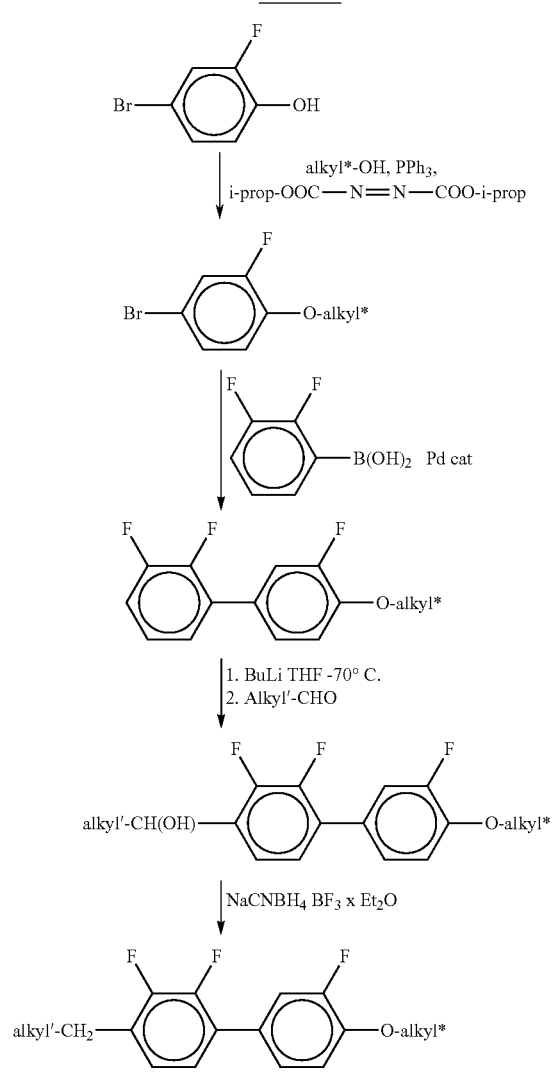
(alkyl* denotes an alkyl radical having 1-15 atoms and alkyl' denotes an alkyl radical having 1-14 C atoms.)
Scheme 12
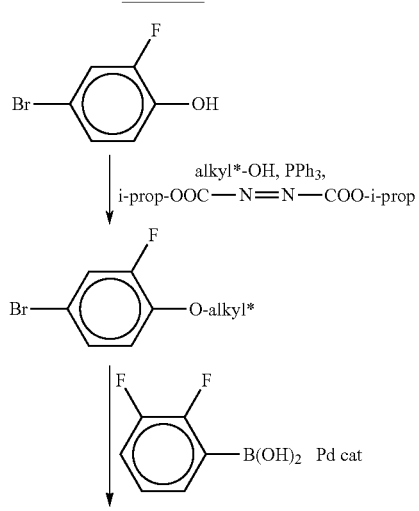
-continued
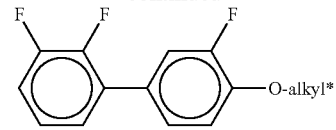
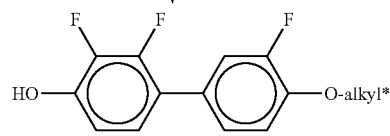
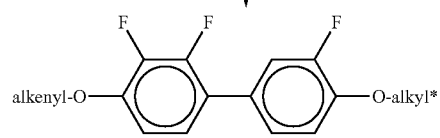
(alkyl* denotes an alkyl radical having 1-15 C atoms and alkenyl denotes an alkenyl radical having 2-15 C atoms.)
Scheme 13
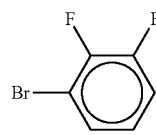
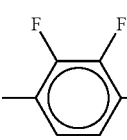
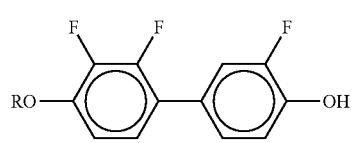
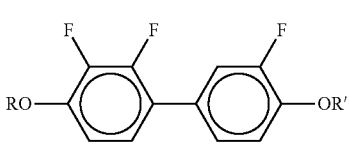
(R and R' each, independently of one another, denote an alkyl radical having 1-15 C atoms or an alkenyl radical having 2-15 C atoms.)

Scheme 14, Scheme 15, and Scheme 16 (reaction schemes shown as images).

(alkyl* denotes an alkyl radical having 1-15 C atoms and alkenyl denotes an alkenyl radical having 2-15 C atoms.)

(alkenyl and alkenyl* each, independently of one another, denote an alkenyl radical having 2-15 C atoms.)

(alkyl* denotes an alkyl radical having 1-15 C atoms and alkyl' denotes an alkyl radical having 1-14 C atoms.)

Scheme 17

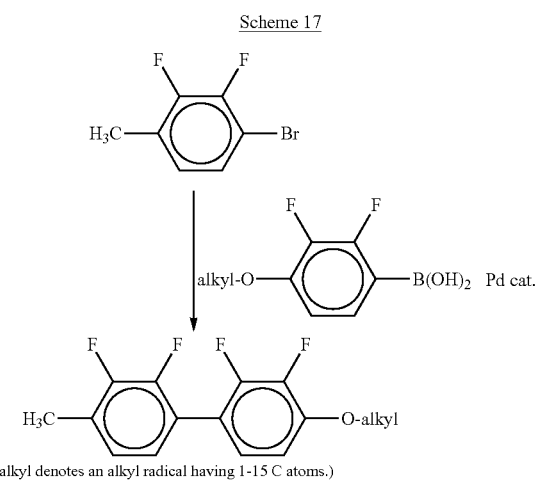

(alkyl denotes an alkyl radical having 1-15 C atoms.)

Scheme 18

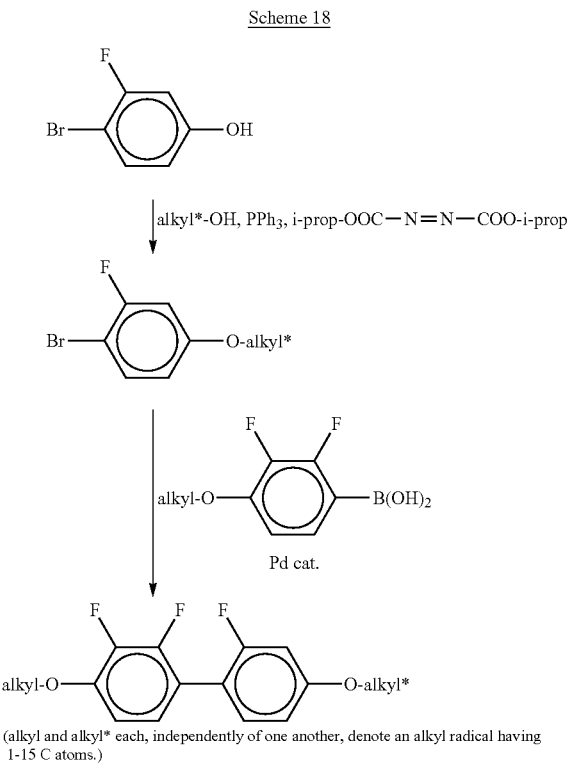

(alkyl and alkyl* each, independently of one another, denote an alkyl radical having 1-15 C atoms.)

The present invention likewise relates to the compounds of the formula I.

The media according to the invention preferably comprise one, two, three, four or more, preferably one, two or three, compounds of the formula I.

The compounds of the formula I are preferably employed in the liquid-crystalline medium in amounts of ≥1% by weight, preferably ≥3% by weight, based on the mixture as a whole. Particular preference is given to liquid-crystalline media which comprise 1-30% by weight, very particularly preferably 2-15% by weight, of one or more compounds of the formula I.

Preferred embodiments of the liquid-crystalline medium according to the invention are indicated below:

a) Liquid-crystalline medium which additionally comprises one or more compounds selected from the group of the compounds of the formulae IIA, IIB and IIC,

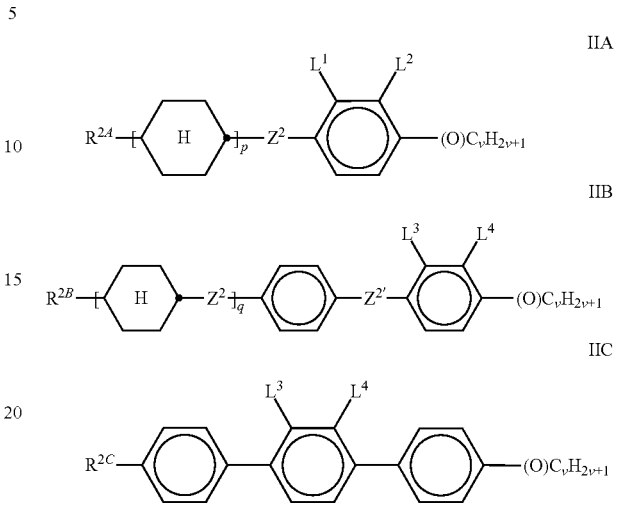

in which $R^{2A}$, $R^{2B}$ and $R^{2C}$ each, independently of one another, denote H, an alkyl radical having up to 15 C atoms which is unsubstituted, monosubstituted by CN or $CF_3$ or at least monosubstituted by halogen, where, in addition, one or more $CH_2$ groups in these radicals may each be replaced by —O—, —S—,

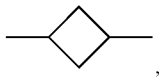

,

—C≡C—, —CH=CH—, —$CF_2$O—, —O$CF_2$—, —OC—O— or —O—CO— in such a way that O atoms are not linked directly to one another, $L^{1-4}$ each, independently of one another, denote F, Cl, $CF_3$ or $CHF_2$, $Z^2$ and $Z^{2'}$ each, independently of one another, denote a single bond, —$CH_2CH_2$—, —CH=CH—, —$CF_2$O—, —O$CF_2$—, —$CH_2$O—, —O$CH_2$—, —COO—, —OCO—, —$C_2F_4$—, —CF=CF—, or —CH=CH$CH_2$O—, (O) denotes —O— or a single bond, p denotes 0, 1 or 2, q denotes 0 or 1, and v denotes 1 to 6.

In the compounds of the formulae IIA and IIB, $Z^2$ may have identical or different meanings. In the compounds of the formula IIB, $Z^2$ and $Z^{2'}$ may have identical or different meanings.

In the compounds of the formulae IIA, IIB and IIC, $R^{2A}$, $R^{2B}$ and $R^{2C}$ each preferably denote alkyl having 1-6 C atoms, in particular $CH_3$, $C_2H_5$, n-$C_3H_7$, n-$C_4H_9$, or n-$C_5H_{11}$.

In the compounds of the formulae IIA and IIB, $L^1$, $L^2$, $L^3$ and $L^4$ preferably denote $L^1=L^2=F$ and $L^3=L^4=F$, furthermore $L^1=F$ and $L^2=Cl$, $L^1=Cl$ and $L^2=F$, $L^3=F$ and $L^4=Cl$, $L^3=Cl$ and $L^4=F$. $Z^2$ and $Z^{2'}$ in the formulae IIA and IIB preferably each, independently of one another, denote a single bond, furthermore a —$C_2H_4$— bridge.

If in the formula IIB $Z^2$=—$C_2H_4$— or —$CH_2O$—, $Z^{2'}$ is preferably a single bond or, if $Z^{2'}$=—$C_2H_4$— or —$CH_2O$—, $Z^2$ is preferably a single bond. In the compounds of the formulae IIA and IIB, (O)$C_vH_{2v+1}$ preferably denotes $OC_vH_{2v+1}$, furthermore $C_vH_{2v+1}$. In the compounds of the formula IIC, (O) $C_vH_{2v+1}$ preferably denotes $C_vH_{2v+1}$. In the compounds of the formula IIC, $L^3$ and $L^4$ preferably each denote F.

Preferred compounds of the formulae IIA, IIB and IIC are indicated below:

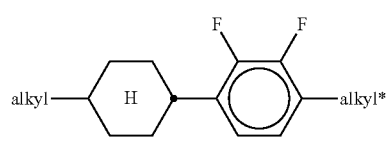
IIA-1

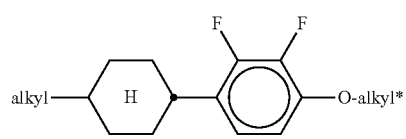
IIA-2

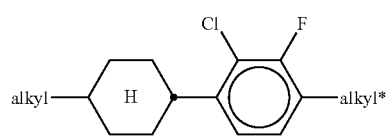
IIA-3

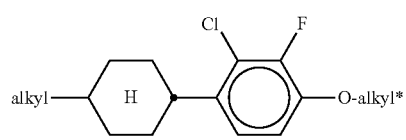
IIA-4

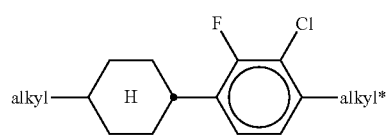
IIA-5

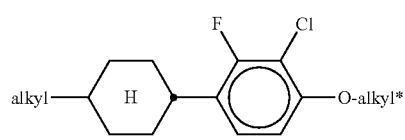
IIA-6

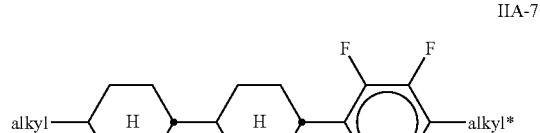
IIA-7

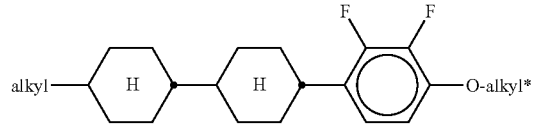
IIA-8

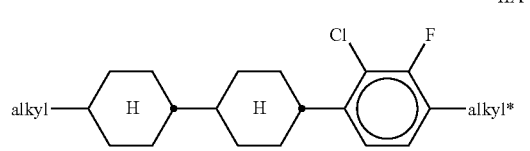
IIA-9

-continued

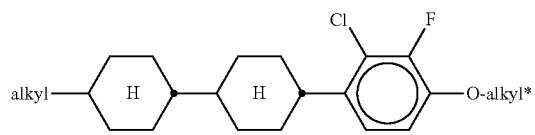
IIA-10

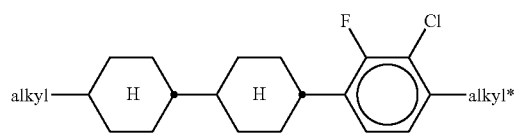
IIA-11

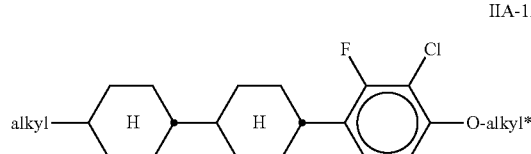
IIA-12

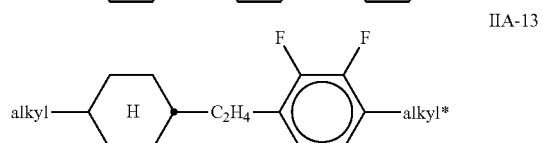
IIA-13

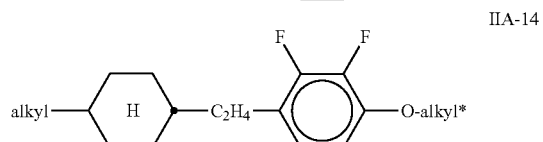
IIA-14

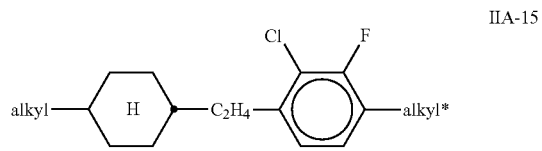
IIA-15

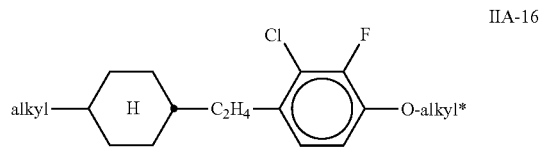
IIA-16

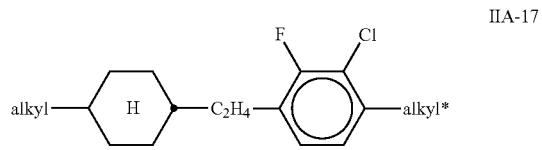
IIA-17

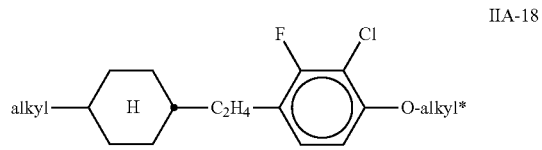
IIA-18

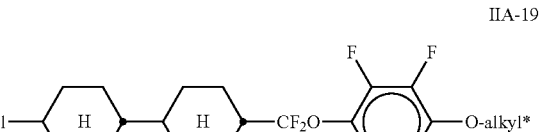
IIA-19

IIA-20

IIA-21
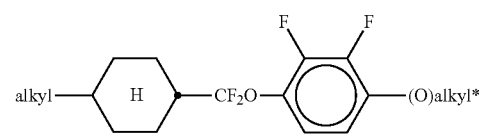
IIA-22
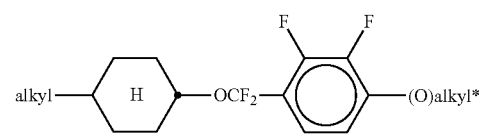
IIA-23
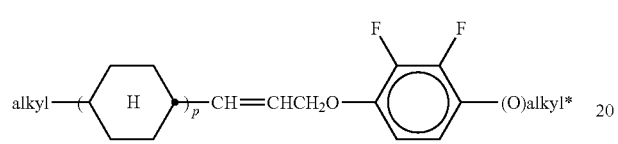
IIA-24
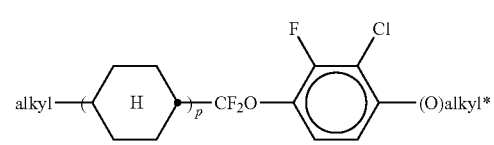
IIA-25
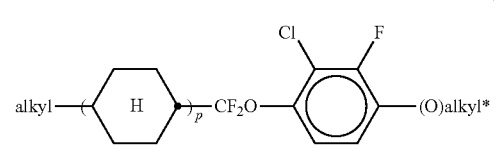
IIA-26
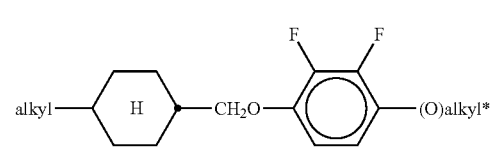
IIA-27
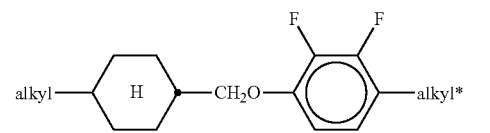
IIA-28
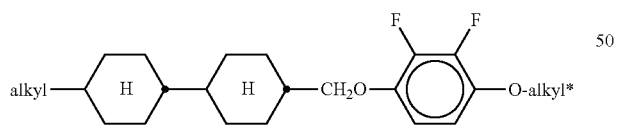
IIA-29
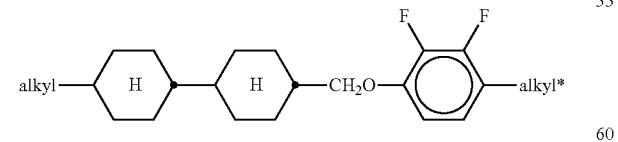
IIA-30
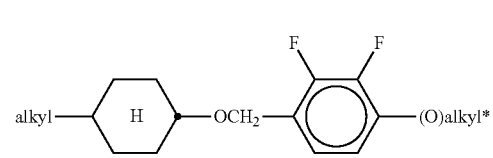
IIA-31
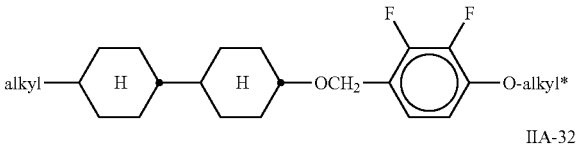
IIA-32
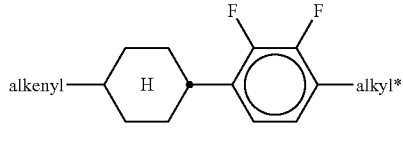
IIA-33
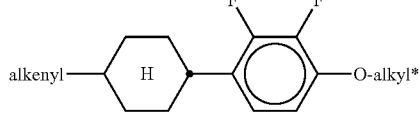
IIA-34
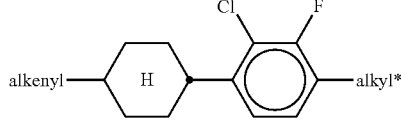
IIA-35
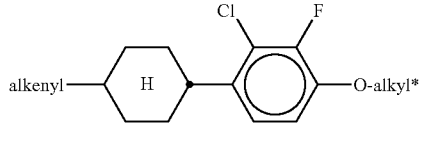
IIA-36
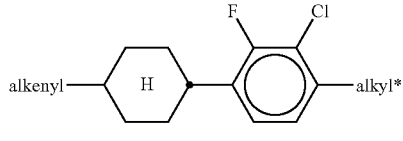
IIA-37
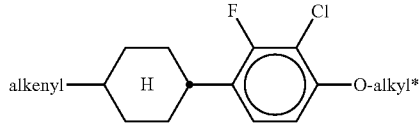
IIA-38
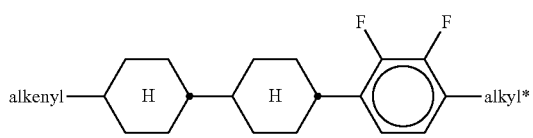
IIA-39
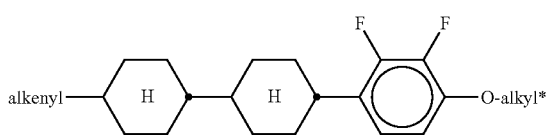
IIA-40
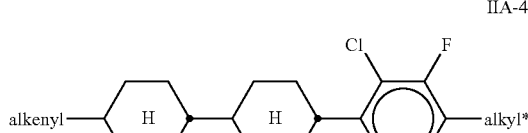
IIA-41
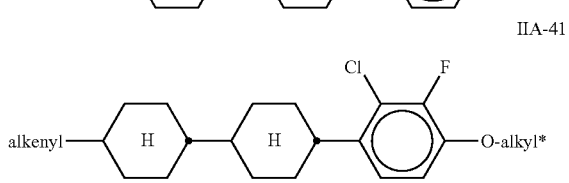

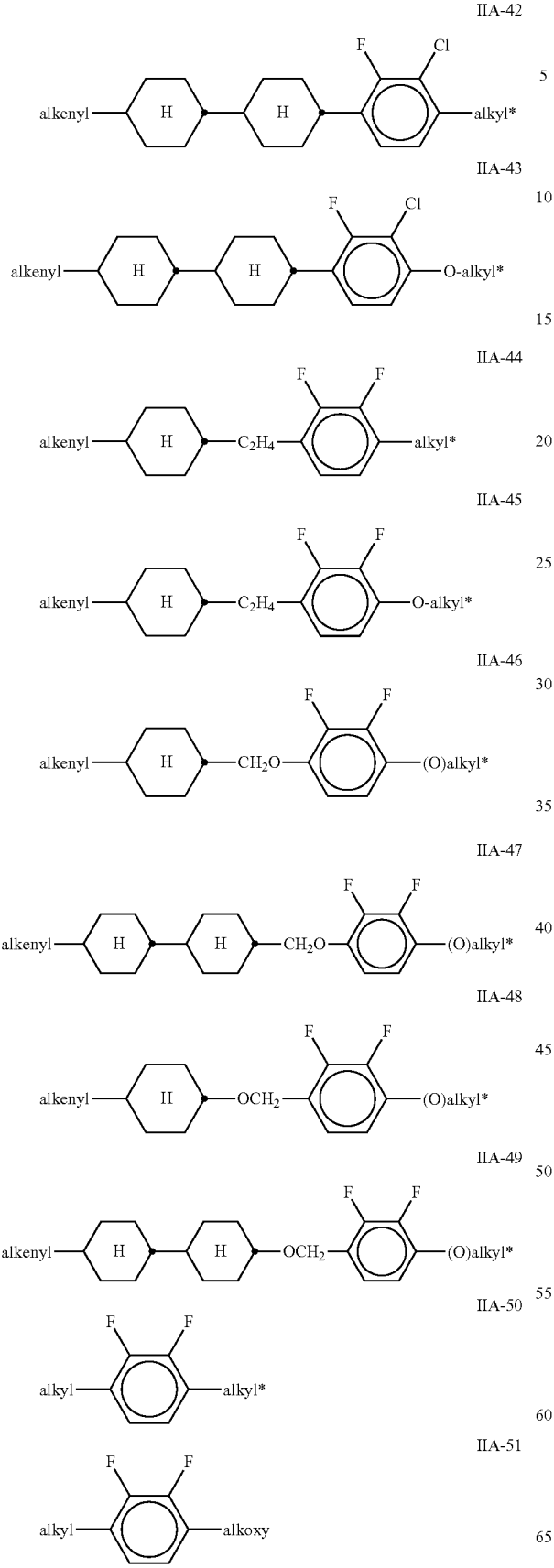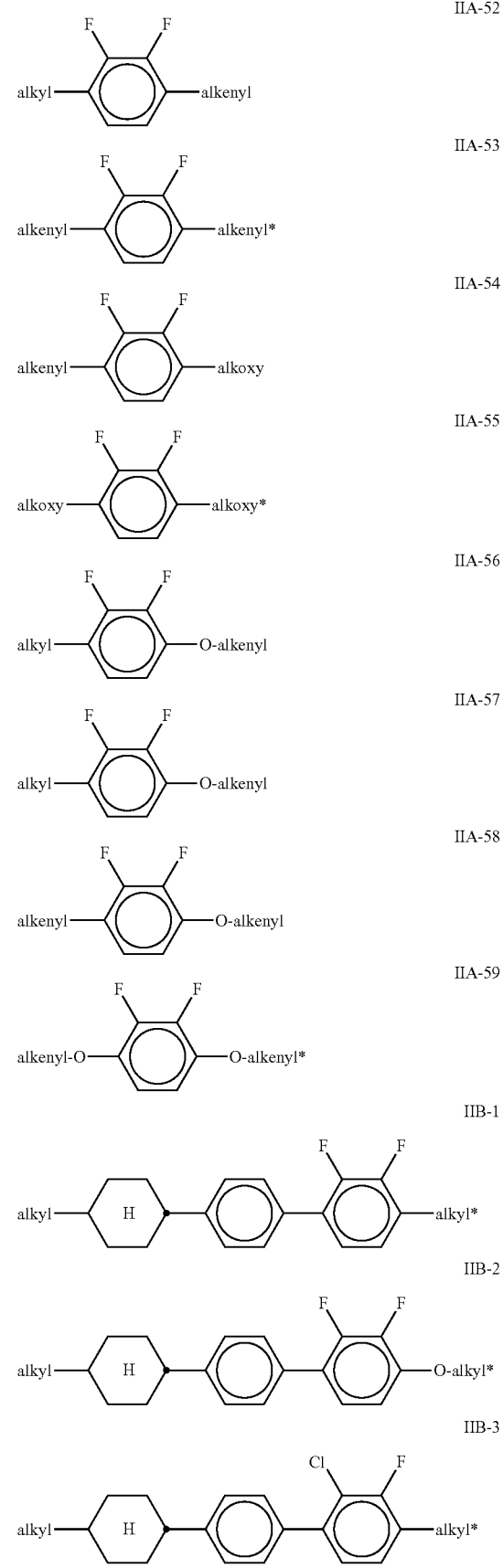

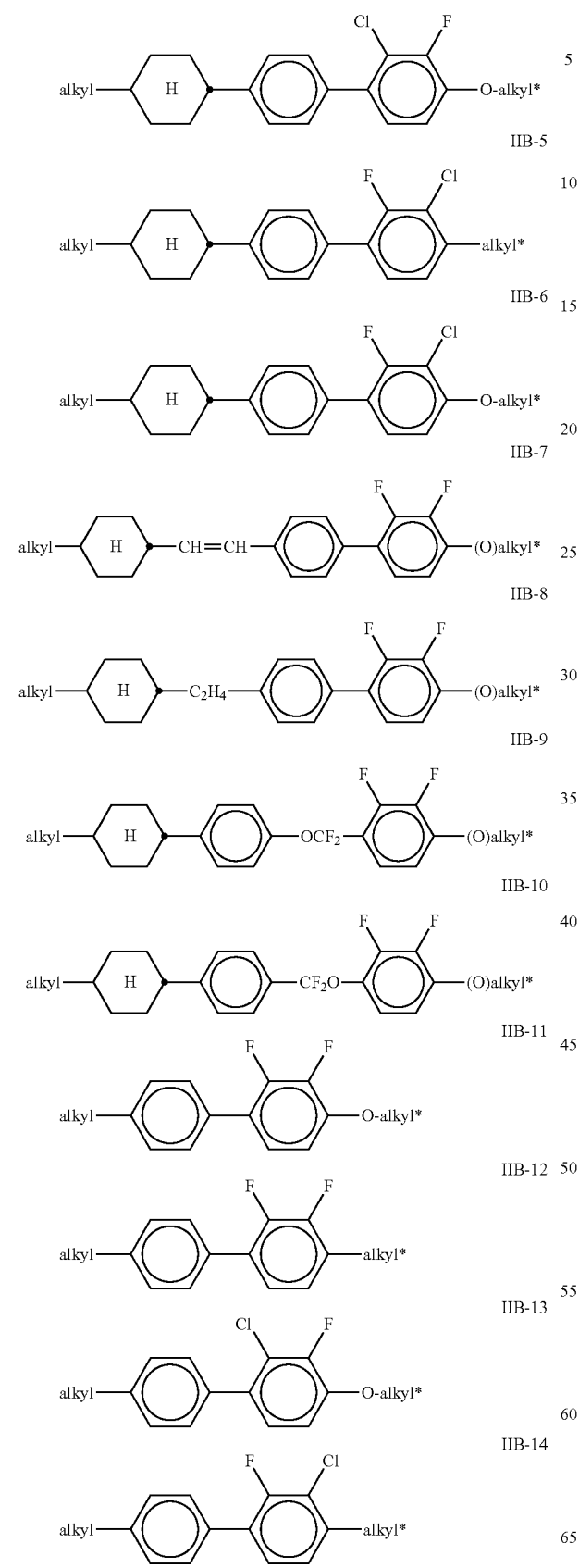

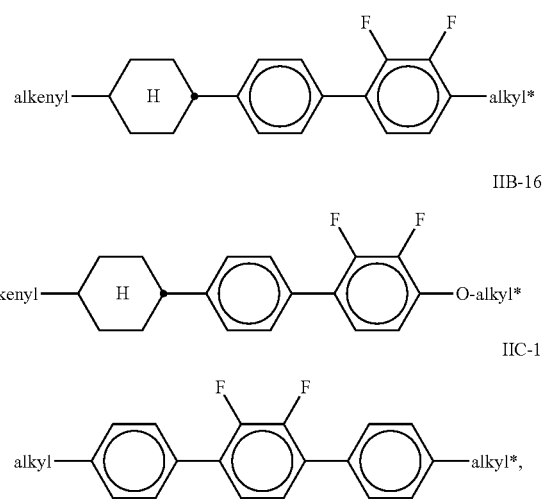

in which alkyl and alkyl* each, independently of one another, denote a straight-chain alkyl radical having 1-6 C atoms, (O) denotes —O— or a single bond, and p denotes 0, 1 or 2.

Particularly preferred mixtures according to the invention comprise one or more compounds of the formulae IIA-2, IIA-8, IIA-14, IIA-26, IIA-28, IIA-33, IIA-39, IIA-45, IIA-46, IIA-47, IIA-55, IIB-2, IIB-11, IIB-16 and IIC-1.

The proportion of compounds of the formulae IIA and/or IIB in the mixture as a whole is preferably at least 20% by weight.

Particularly preferred media according to the invention comprise at least one compound of the formula IIC-1,

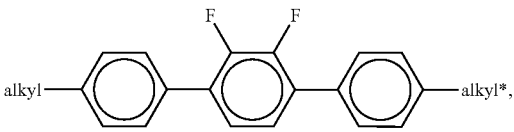

in which alkyl and alkyl* have the meanings indicated above, preferably in amounts of >3% by weight, in particular >5% by weight and particularly preferably 5-25% by weight.

b) Liquid-crystalline medium which additionally comprises one or more compounds of the formula III,

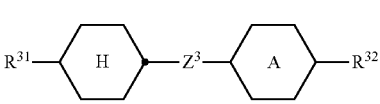

in which
$R^{31}$ and $R^{32}$ each, independently of one another, denote a straight-chain alkyl, alkoxyalkyl or alkoxy radical having up to 12 C atoms, and

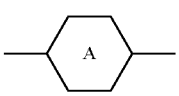

denotes

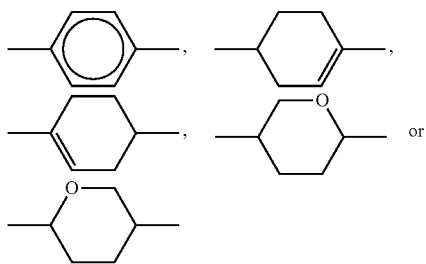

$Z^3$ denotes a single bond, —CH$_2$CH$_2$—, —CH=CH—, —CF$_2$O—, —OCF$_2$—, —CH$_2$O—, —OCH$_2$—, —COO—, —OCO—, —C$_2$F$_4$—, —C$_4$H$_8$—, or —CF=CF—.

Preferred compounds of the formula III are indicated below:

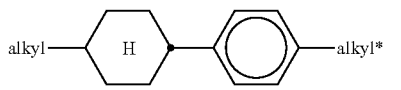
IIIa

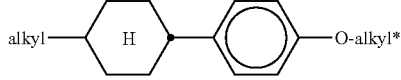
IIIb

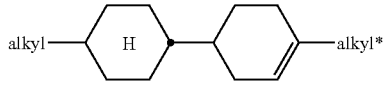
IIIc

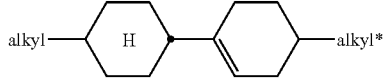
IIId in which alkyl and alkyl* each, independently of one another, denote a straight-chain alkyl radical having 1-6 C atoms.

The medium according to the invention preferably comprises at least one compound of the formula IIIa and/or formula IIIb.

The proportion of compounds of the formula III in the mixture as a whole is preferably at least 5% by weight.

c) Liquid-crystalline medium additionally comprising at least one compound selected from the group of the compounds of the formulae

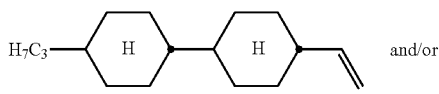
and/or

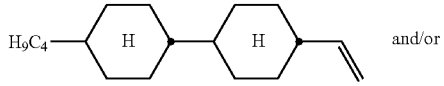
and/or

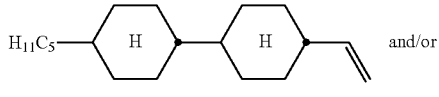
and/or

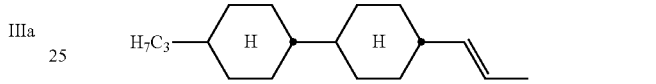
and/or

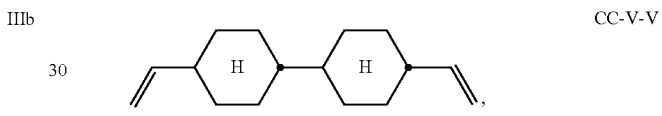

preferably in total amounts of ≥5% by weight, in particular ≥10% by weight.

Preference is furthermore given to mixtures according to the invention comprising the compound CC-3-V1 and/or CC-V-V,

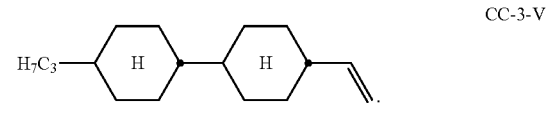
CC-3-V1

CC-V-V preferably CC-3-V1 in amounts of 3-15% and preferably CC-V-V in amounts of 5-60%.

Preferred mixtures comprise 5-60% by weight, preferably 10-55% by weight, in particular 20-50% by weight, of the compound of the formula

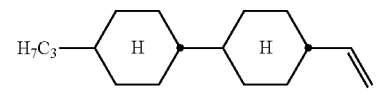
CC-3-V

Preference is furthermore given to mixtures which comprise the compound CC-3-V and the compound CC-3-V1

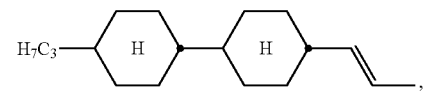

preferably in amounts of in total 3-60% by weight.

d) Liquid-crystalline medium which additionally comprises one or more tetracyclic compounds of the formulae

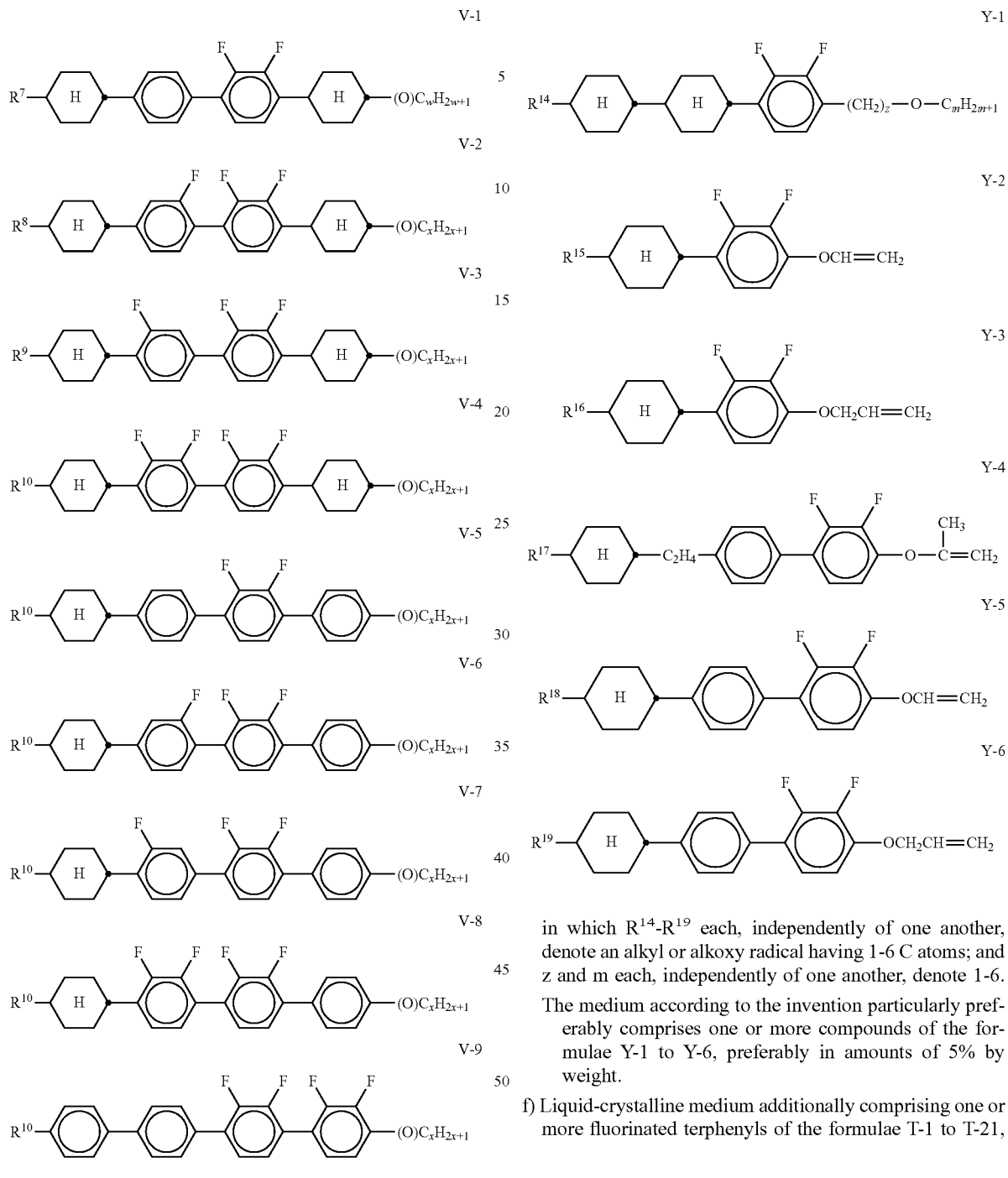

in which

R$^{7-10}$ each, independently of one another, have the meanings indicated for R$^{24}$, (O) denotes —O— or a single bond, and w and x each, independently of one another, denote 1 to 6.

Particular preference is given to mixtures comprising at least one compound of the formula V-9.

e) Liquid-crystalline medium which additionally comprises one or more compounds of the formulae Y-1 to Y-6, in which R$^{14}$-R$^{19}$ each, independently of one another, denote an alkyl or alkoxy radical having 1-6 C atoms; and z and m each, independently of one another, denote 1-6.

The medium according to the invention particularly preferably comprises one or more compounds of the formulae Y-1 to Y-6, preferably in amounts of 5% by weight.

f) Liquid-crystalline medium additionally comprising one or more fluorinated terphenyls of the formulae T-1 to T-21,

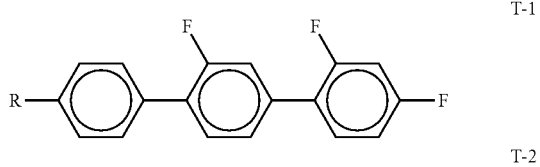

T-3
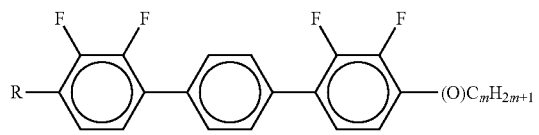
T-4
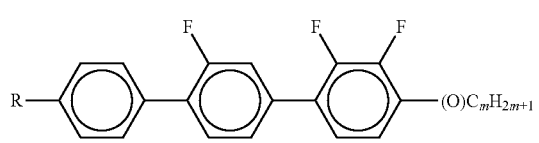
T-5
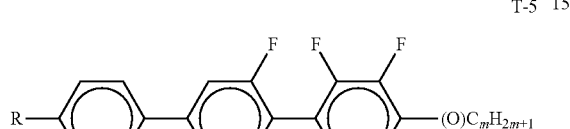
T-6
T-7
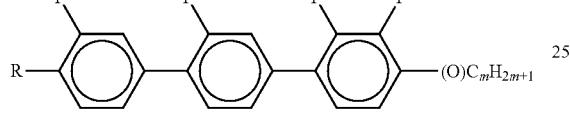
T-8
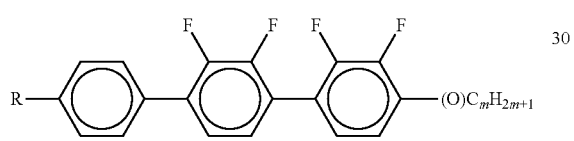
T-9
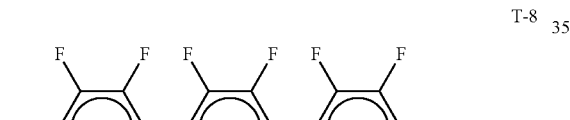
T-10
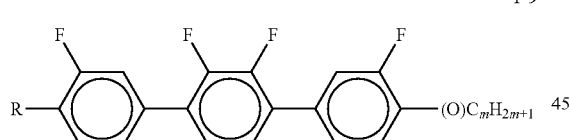
T-11
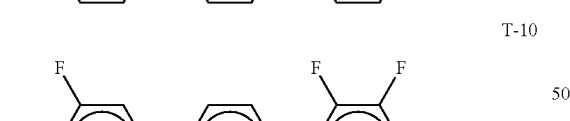
T-12
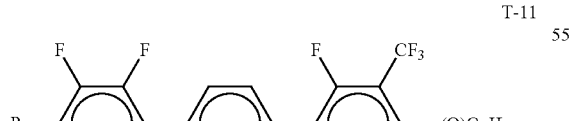
T-13
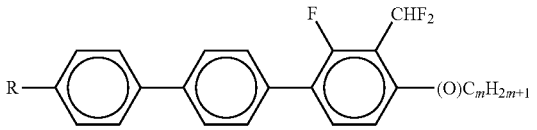
T-14
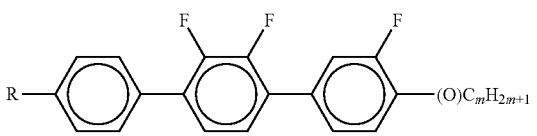
T-15
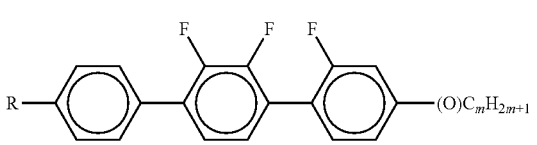
T-16
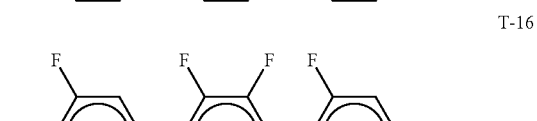
T-17
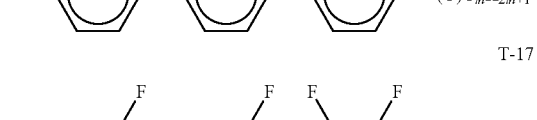
T-18
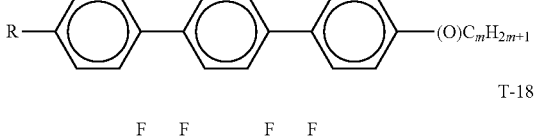
T-19
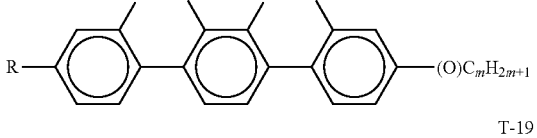
T-20
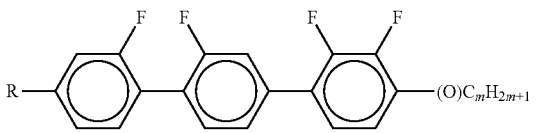
T-21
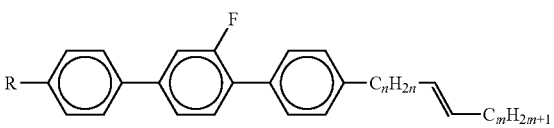
in which
R denotes a straight-chain alkyl or alkoxy radical having 1-7 C atoms, (O) denotes —O— or a single bond, and m=0, 1, 2, 3, 4, 5 or 6 and n denotes 0, 1, 2, 3 or 4.
R preferably denotes methyl, ethyl, propyl, butyl, pentyl, hexyl, methoxy, ethoxy, propoxy, butoxy, or pentoxy.

The medium according to the invention preferably comprises the terphenyls of the formulae T-1 to T-21 in amounts of 2-30% by weight, in particular 5-20% by weight.

Particular preference is given to compounds of the formulae T-1, T-2, T-20 and T-21. In these compounds, R preferably denotes alkyl, furthermore alkoxy, each having 1-5 C atoms. In the compounds of the formula T-20, R preferably denotes alkyl or alkoxy, in particular alkyl. In the compound of the formula T-21, R preferably denotes alkyl.

The terphenyls are preferably employed in the mixtures according to the invention if the Δn value of the mixture is to be ≥0.1. Preferred mixtures comprise 2-20% by weight of one or more terphenyl compounds selected from the group of the compounds T-1 to T-21.

g) Liquid-crystalline medium additionally comprising one or more biphenyls of the formulae B-1 to B-4,

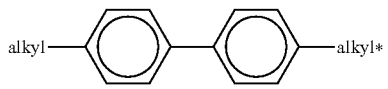

B-1

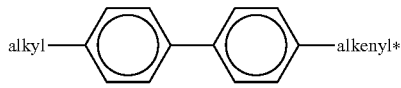

B-2

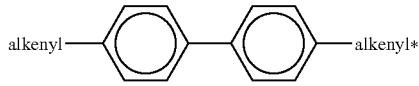

B-3

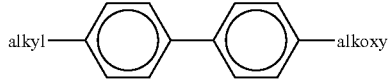

B-4 in which
alkyl and alkyl* each, independently of one another, denote a straight-chain alkyl radical having 1-6 C atoms,
alkenyl and alkenyl* each, independently of one another, denote a straight-chain alkenyl radical having 2-6 C atoms, and
alkoxy denotes a straight-chain alkoxy radical having 1-6 C atoms.

The proportion of the biphenyls of the formulae B-1 to B-4 in the mixture as a whole is preferably at least 3% by weight, in particular ≥5% by weight.

Of the compounds of the formulae B-1 to B-4, the compounds of the formula B-2 are particularly preferred.

Particularly preferred biphenyls are

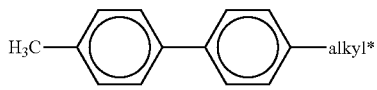

B-1a

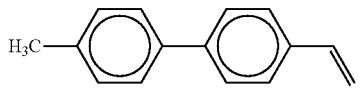

B-2a

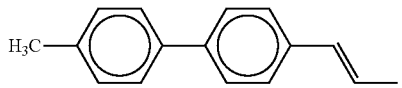

B-2b

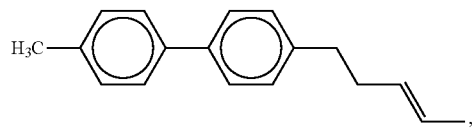

B-2c in which alkyl* denotes an alkyl radical having 1-6 C atoms. The medium according to the invention particularly preferably comprises one or more compounds of the formulae B-1a and/or B-2c.

h) Liquid-crystalline medium comprising at least one compound of the formulae Z-1 to Z-8,

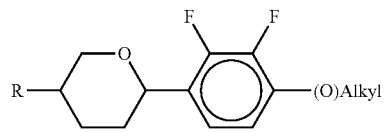

Z-1

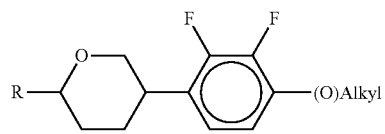

Z-2

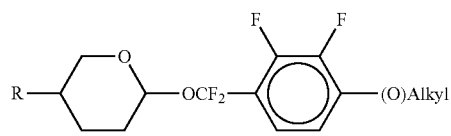

Z-3

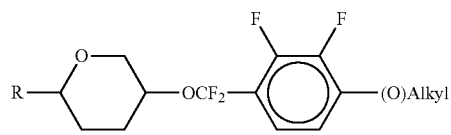

Z-4

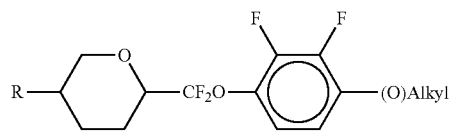

Z-5

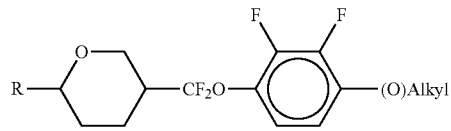

Z-6

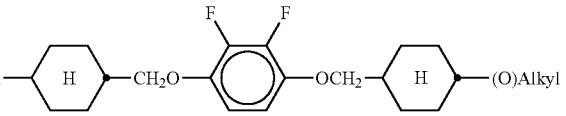

Z-7

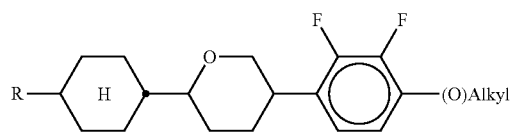

Z-8 in which R, (O), and alkyl denotes a straight-chain alkyl with 1-6 carbon atoms.

i) Liquid-crystalline medium comprising at least one compound of the formulae O-1 to O-17,

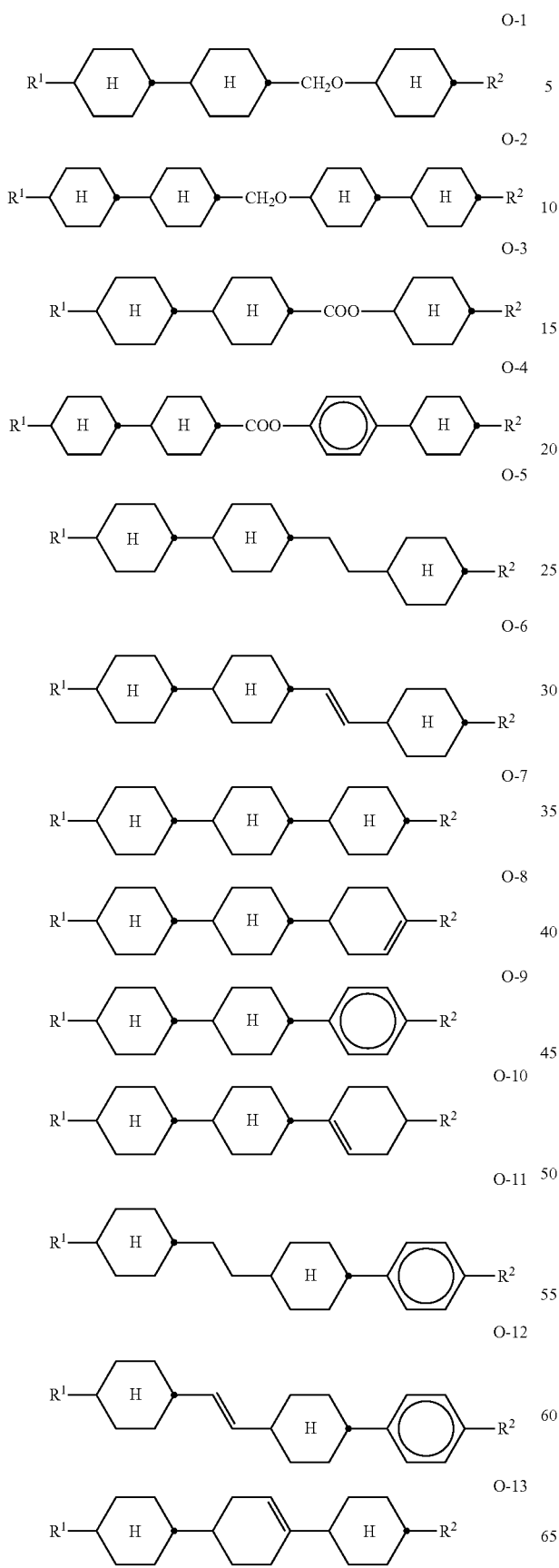
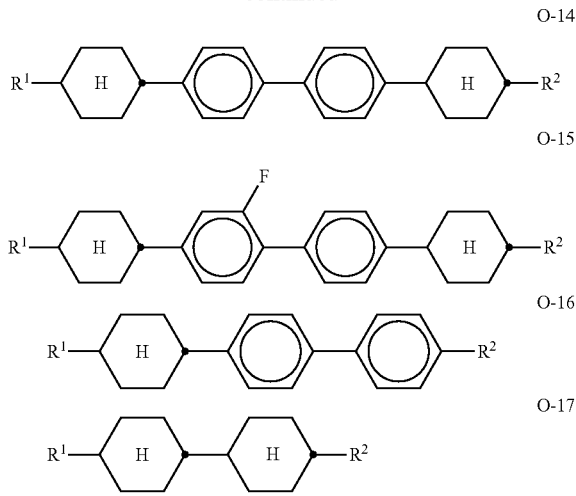

in which $R^1$ and $R^2$ have the meanings indicated for $R^{2A}$. $R^1$ and $R^2$ preferably each, independently of one another, denote straight-chain alkyl.

Preferred media comprise one or more compounds of the formulae O-1, O-3, O-4, O-5, O-9, O-12, O-14, O-15, O-16 and/or O-17.

Mixtures according to the invention very particularly preferably comprise one or more compounds of the formulae O-9, O-12, O-16 and/or O-17, in particular in amounts of 5-30%.

Preferred compounds of the formulae O-9 and O-17 are indicated below:

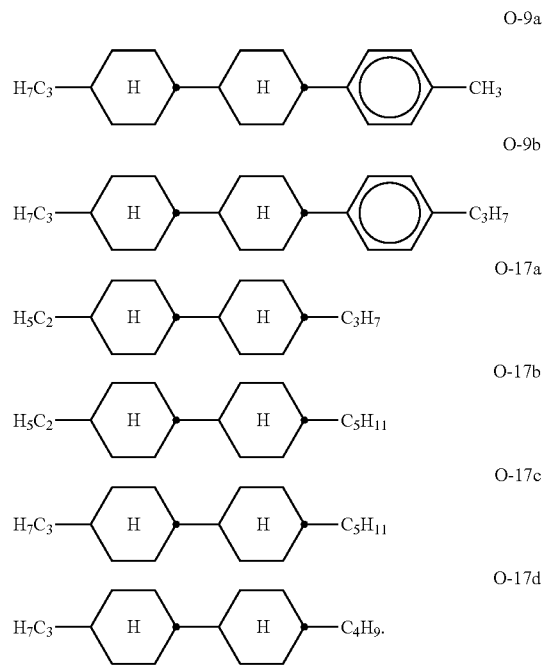

The medium according to the invention particularly preferably comprises the tricyclic compounds of the formula O-9a and/or of the formula O-9b in combination with one or more bicyclic compounds of the formulae O-17a to O-17d. The total proportion of the compounds of the formulae O-9a and/or O-9b in combination with one or more compounds selected from the bicyclic compounds of the formulae O-17a to O-17d is preferably 5-40%, very particularly preferably 15-35%.

Very particularly preferred mixtures comprise the compounds O-9a and O-17a:

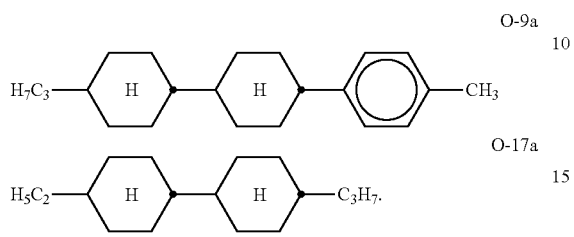

O-9a

O-17a

The compounds O-9a and O-17a are preferably present in the mixture in a concentration of 15-35%, particularly preferably 15-25% and especially preferably 18-22%, based on the mixture as a whole.

Very particularly preferred mixtures comprise the compounds O-9b and O-17a:

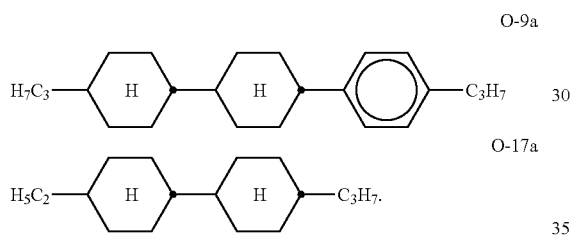

O-9a

O-17a

The compounds O-9b and O-17a are preferably present in the mixture in a concentration of 15-35%, particularly preferably 15-25% and especially preferably 18-22%, based on the mixture as a whole.

Very particularly preferred mixtures comprise the following three compounds:

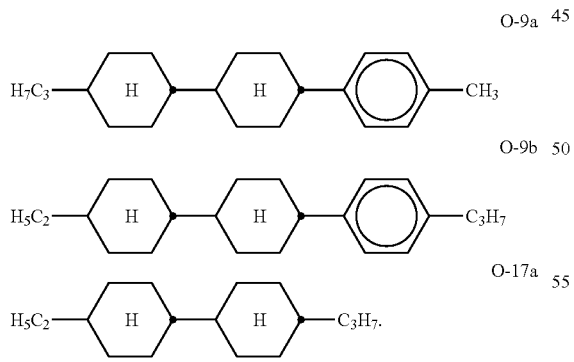

O-9a

O-9b

O-17a

The compounds O-9a, O-9b and O-17a are preferably present in the mixture in a concentration of 15-35%, particularly preferably 15-25% and especially preferably 18-22%, based on the mixture as a whole.

j) Preferred liquid-crystalline media according to the invention comprise one or more substances which contain a tetrahydronaphthyl or naphthyl unit, such as, for example, the compounds of the formulae N-1 to N-5,

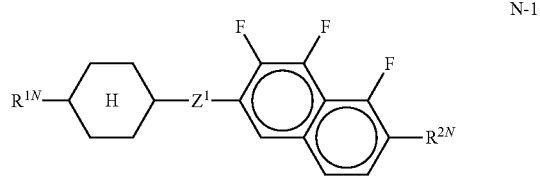

N-1

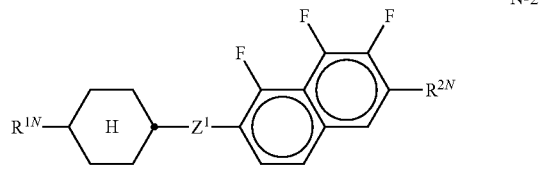

N-2

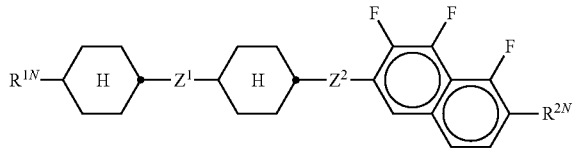

N-3

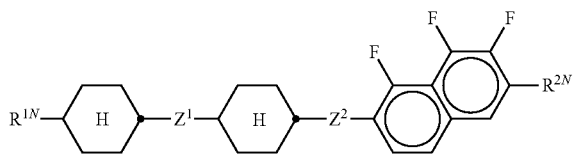

N-4

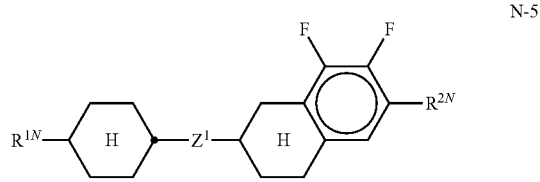

N-5 in which $R^{1N}$ and $R^{2N}$ each, independently of one another, have the meanings indicated for $R^{2A}$, and preferably denote straight-chain alkyl, straight-chain alkoxy or straight-chain alkenyl, and $Z^1$ and $Z^2$ each, independently of one another, denote —$C_2H_3$—, —CH=CH—, —$(CH_2)_4$—, —$(CH_2)_3O$—, —$O(CH_2)_3$—, —CH=CHCH$_2$CH$_2$—, —CH$_2$CH$_2$CH=CH—, —CH$_2$O—, —OCH$_2$—, —COO—, —OCO—, —C$_2$F$_4$—, —CF=CF—, —CF=CH—, —CH=CF—, —CF$_2$O—, —OCF$_2$—, —CH$_2$— or a single bond.

k) Preferred mixtures comprise one or more compounds selected from the group of the difluorodibenzochroman compounds of the formula BC, chromans of the formula CR, fluorinated phenanthrenes of the formulae PH-1 and PH-2, fluorinated dibenzofurans of the formulae BF-1 and BF-2,

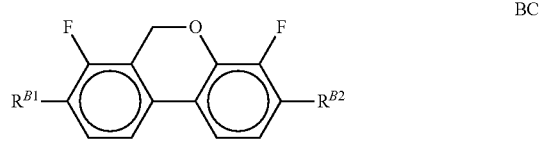

BC

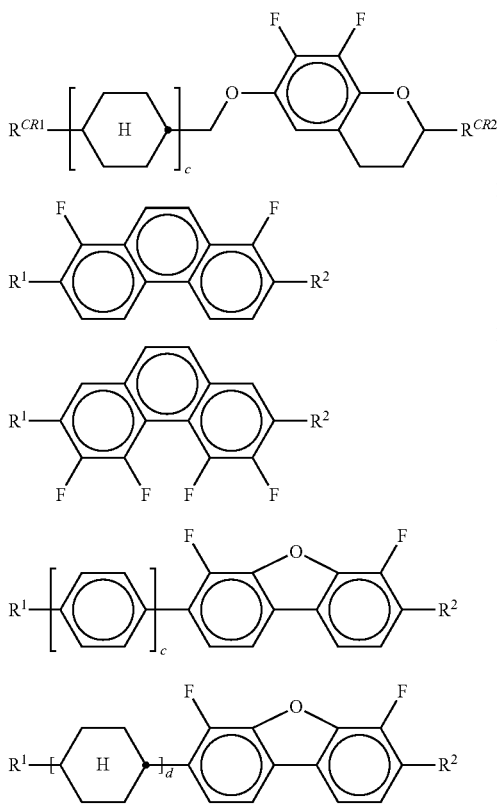

in which
$R^{B1}$, $R^{B2}$, $R^{CR1}$, $R^{CR2}$, $R^1$, $R^2$ each, independently of one another, have the meaning of $R^{2A}$. c is 0, 1 or 2. d is 1 or 2. $R^1$ and $R^2$ preferably, independently of one another, denote alkyl, alkoxy or alkenyloxy having up to 6 C atoms.

The mixtures according to the invention preferably comprise the compounds of the formulae BC, CR, PH-1, PH-2, BF-1 and/or BF-2 in amounts of 3 to 20% by weight, in particular in amounts of 3 to 15% by weight.

Particularly preferred compounds of the formulae BC and CR are the compounds BC-1 to BC-7, CR-1 to CR-5, BF-1a and BF-1b,

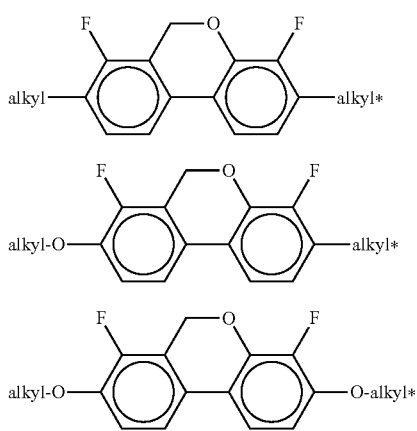

-continued

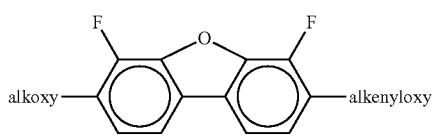
BF-1b in which
alkyl and alkyl* each, independently of one another, denote a straight-chain alkyl radical having 1-6 C atoms,
alkoxy and alkoxy* each, independently of one another, denote a straight-chain alkoxy radical having 1-6 C atoms,
alkenyl and alkenyl* each, independently of one another, denote a straight-chain alkenyl radical having 2-6 C atoms, and
alkenyloxy denotes a straight-chain alkenyloxy radical having 2-6 C atoms.

Very particular preference is given to mixtures comprising one, two or three compounds of the formulae BC-2 and/or BF-1a.

l) Preferred mixtures comprise one or more indane compounds of the formula In,

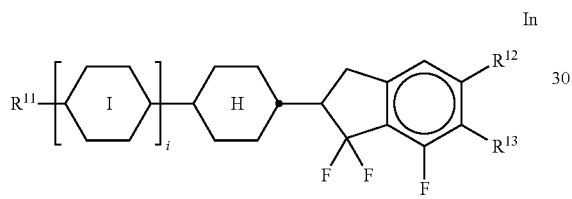
In in which
$R^{11}$, $R^{12}$,
$R^{13}$ each, independently of one another, denote a straight-chain alkyl, alkoxy, alkoxyalkyl or alkenyl radical having 1-6 C atoms,
$R^{12}$ and $R^{13}$ additionally may also denote halogen, preferably F,

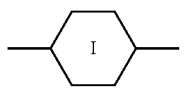

denotes

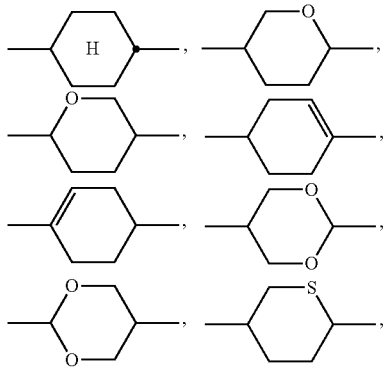

-continued

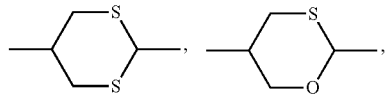

i denotes 0, 1 or 2.

Preferred compounds of the formula In are the compounds of the formulae In-1 to In-16 indicated below:

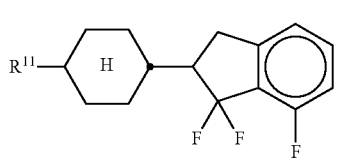
In-1

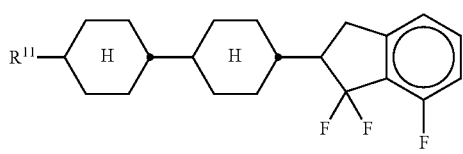
In-2

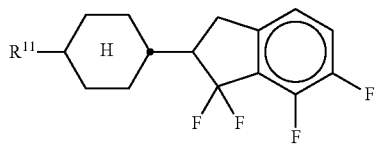
In-3

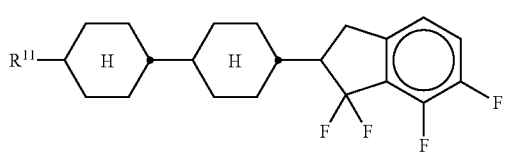
In-4

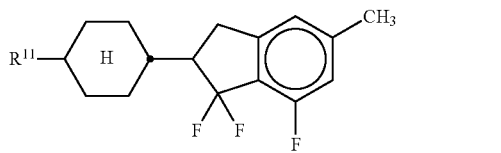
In-5

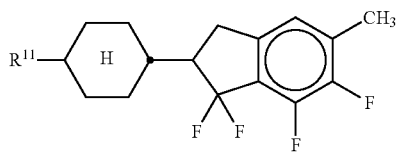
In-6

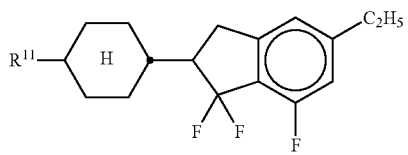
In-7

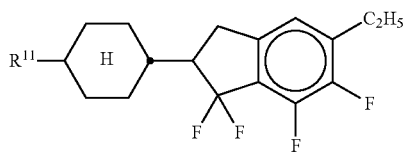
In-8

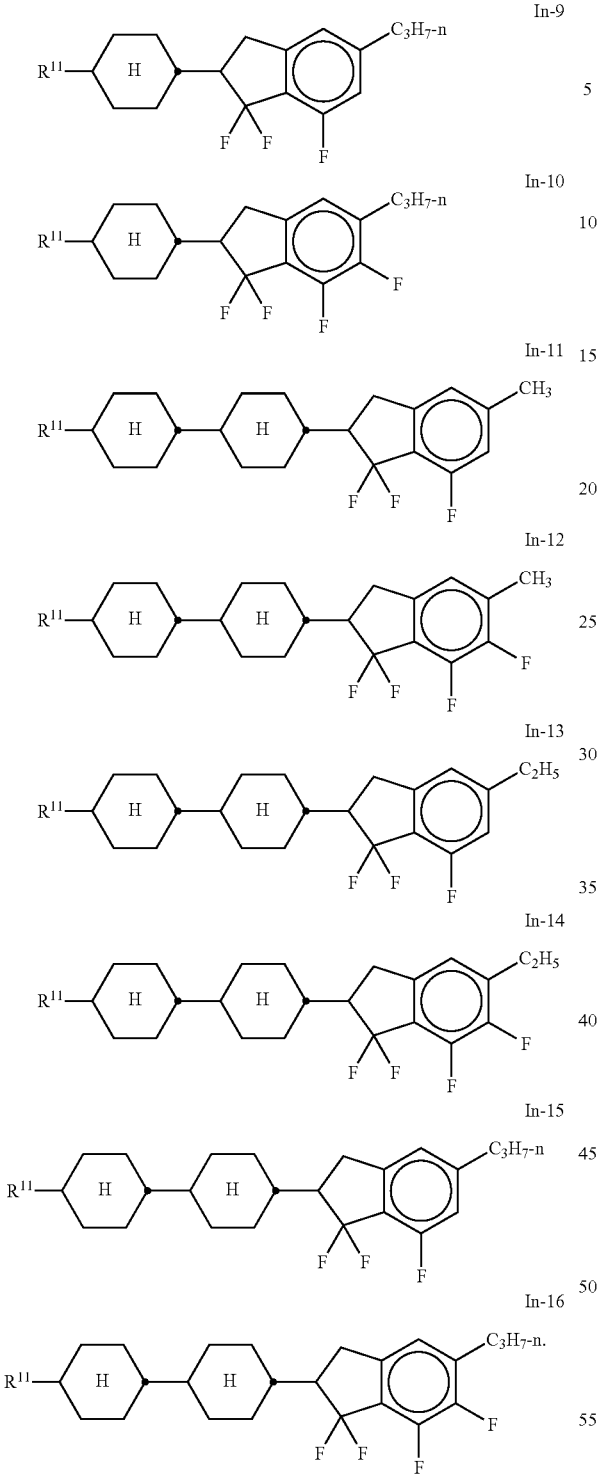

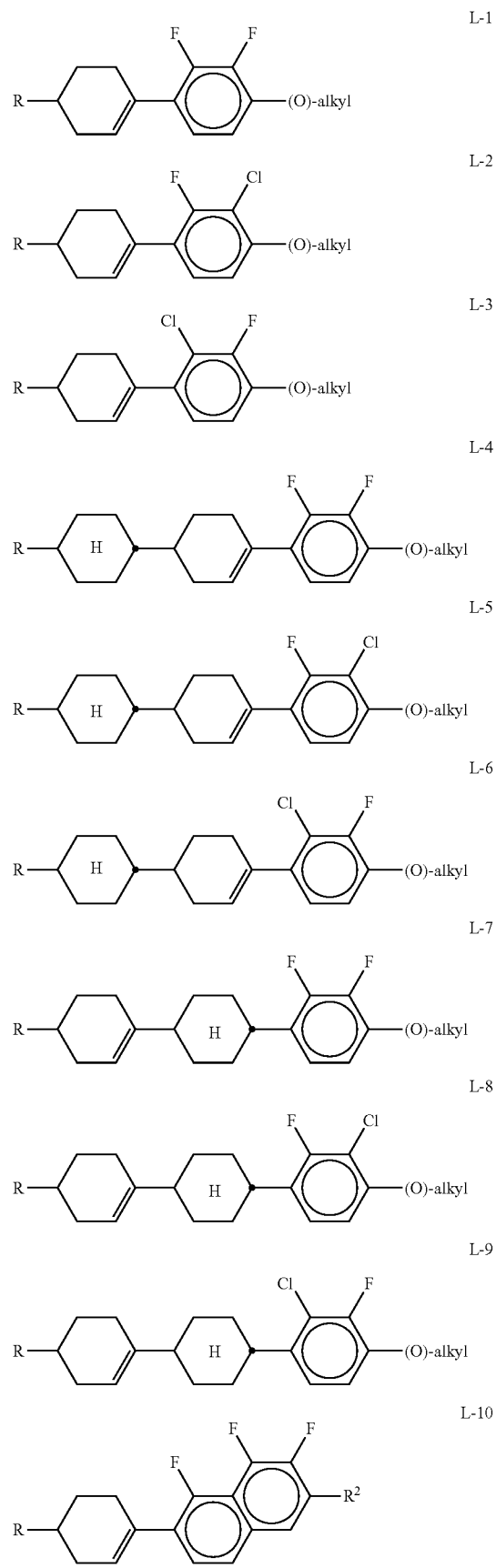

Particular preference is given to the compounds of the formulae In-1, In-2, In-3 and In-4.

The compounds of the formula In and the sub-formulae In-1 to In-16 are preferably employed in the mixtures according to the invention in concentrations ≥5% by weight, in particular 5-30% by weight and very particularly preferably 5-25% by weight.

m) Preferred mixtures additionally comprise one or more compounds of the formulae L-1 to L-11, -continued

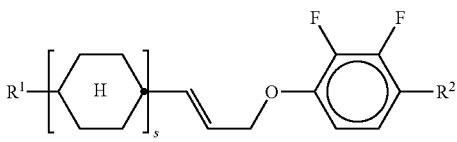

L-11 in which
R, $R^1$ and $R^2$ each, independently of one another, have the meanings indicated for $R^{2,4}$, (O) denotes —O— or a single bond, and alkyl denotes an alkyl radical having 1-6 C atoms. s denotes 1 or 2.

Particular preference is given to the compounds of the formulae L-1 and L-4, in particular L-4.

The compounds of the formulae L-1 to L-11 are preferably employed in concentrations of 5-50% by weight, in particular 5-40% by weight and very particularly preferably 10-40% by weight.

Particularly preferred mixture concepts are indicated below: (the acronyms used are explained in Table A. n and m here each, independently of one another, denote 1-6).

The mixtures according to the invention preferably comprise a compound of the formula I in which $L^1=L^2=L^3=F$, $L^4=H$ and $R^1=R^{1*}=$alkoxy, CPY-n-Om, in particular CPY-2-O2, CPY-3-O2 and/or CPY-5-O2, preferably in concentrations >5%, in particular 10-30%, based on the mixture as a whole,
and/or
CY-n-Om, preferably CY-3-O2, CY-3-O4, CY-5-O2 and/or CY-5-O4, preferably in concentrations >5%, in particular 15-50%, based on the mixture as a whole,
and/or
CCY-n-Om, preferably CCY-4-O2, CCY-3-O2, CCY-3-O3, CCY-3-O1 and/or CCY-5-O2, preferably in concentrations >5%, in particular 10-30%, based on the mixture as a whole,
and/or
CLY-n-Om, preferably CLY-2-O4, CLY-3-O2 and/or CLY-3-O3, preferably in concentrations >5%, in particular 10-30%, based on the mixture as a whole,
and/or
CK-n-F, preferably CK-3-F, CK-4-F and/or CK-5-F, preferably >5%, in particular 5-25%, based on the mixture as a whole.

Preference is furthermore given to mixtures according to the invention which comprise the following mixture concepts:
(n and m each, independently of one another, denote 1-6.)

CPY-n-Om and CY-n-Om, preferably in concentrations of 10-80%, based on the mixture as a whole,
and/or
CPY-n-Om and CK-n-F, preferably in concentrations of 10-70%, based on the mixture as a whole,
and/or
CPY-n-Om and PY-n-Om, preferably CPY-2-02 and/or CPY-3-02 and PY-3-02, preferably in concentrations of 10-40%, based on the mixture as a whole,
and/or
CPY-n-Om and CLY-n-Om, preferably in concentrations of 10-80%, based on the mixture as a whole,
and/or
CC-3-V, preferably in concentrations of 5-60% by weight, based on the mixture as a whole,
and/or
CC-V-V, preferably in concentrations of 5-60% by weight, based on the mixture as a whole,
and/or
CC-3-V und CC-V-V, preferably in a total concentration of 5-60% by weight, based on the mixture as a whole,
and/or
CCVC-3-V and/or CC-3-2V1, preferably in combination with CC-3-V
and/or
at least one compound of the formula Y-nO-Om.

The invention furthermore relates to an electro-optical display having active-matrix addressing based on the ECB, VA, PS-VA, PVA, PM-VA, IPS, PS-IPS, FFS or PS-FFS effect, characterized in that it contains, as dielectric, a liquid-crystalline medium according to the invention.

The liquid-crystalline medium according to the invention preferably has a nematic phase from ≤−20° C. to ≥70° C., particularly preferably from ≤−30° C. to ≥80° C., very particularly preferably from ≤−40° C. to ≥90° C.

The expression "have a nematic phase" here means on the one hand that no smectic phase and no crystallization are observed at low temperatures at the corresponding temperature and on the other hand that clearing still does not occur on heating from the nematic phase. The investigation at low temperatures is carried out in a flow viscometer at the corresponding temperature and checked by storage in test cells having a layer thickness corresponding to the electro-optical use for at least 100 hours. If the storage stability at a temperature of −20° C. in a corresponding test cell is 1000 h or more, the medium is referred to as stable at this temperature. At temperatures of −30° C. and −40° C., the corresponding times are 500 h and 250 h respectively. At high temperatures, the clearing point is measured by conventional methods in capillaries.

The liquid-crystal mixture preferably has a nematic phase range of at least 60 K and a flow viscosity $\nu_{20}$ of at most 30 mm$^2 \cdot$s$^{-1}$ at 20° C.

The values of the birefringence Δn in the liquid-crystal mixture are generally between 0.07 and 0.16, preferably between 0.08 and 0.13.

The liquid-crystal mixture according to the invention has a Δ∈ of −0.5 to −8.0, in particular −2.5 to −6.0, where Δ∈ denotes the dielectric anisotropy. The rotational viscosity $\gamma_1$ at 20° C. is preferably ≤150 mPa·s, in particular ≤120 mPa·s.

The liquid-crystal media according to the invention have relatively low values for the threshold voltage ($V_0$). They are preferably in the range from 1.7 V to 3.0 V, particularly preferably ≤2.5 V and very particularly preferably ≤2.3 V.

For the present invention, the term "threshold voltage" relates to the capacitive threshold ($V_0$), also known as the Freedericks threshold, unless explicitly indicated otherwise.

In addition, the liquid-crystal media according to the invention have high values for the voltage holding ratio in liquid-crystal cells.

In general, liquid-crystal media having a low addressing voltage or threshold voltage exhibit a lower voltage holding ratio than those having a higher addressing voltage or threshold voltage and vice versa.

For the present invention, the term "dielectrically positive compounds" denotes compounds having a Δ∈>1.5, the term "dielectrically neutral compounds" denotes those where −1.5≤Δ∈≤1.5 and the term "dielectrically negative compounds" denotes those having Δ∈<−1.5. The dielectric anisotropy of the compounds is determined here by dissolving 10% of the compounds in a liquid-crystalline host and determining the capacitance of the resultant mixture in at least one test cell in each case having a layer thickness of 20 µm with homeotropic and with homogeneous surface alignment at 1 kHz. The measurement voltage is typically 0.5 V to 1.0 V, but is always lower than the capacitive threshold of the respective liquid-crystal mixture investigated.

All temperature values indicated for the present invention are in °C.

The mixtures according to the invention are suitable for all VA-TFT applications, such as, for example, VAN, MVA, (S)-PVA, ASV, PSA (polymer sustained VA), SA-VA (surface aligned VA), SS-VA (surface stabilized VA) and PS-VA (polymer stabilized VA). They are furthermore suitable for IPS (in-plane switching) and FFS (fringe field switching) applications having negative Δ∈.

The nematic liquid-crystal mixtures in the displays according to the invention generally comprise two components A and B, which themselves consist of one or more individual compounds.

Component A has significantly negative dielectric anisotropy and gives the nematic phase a dielectric anisotropy of ≤−0.5. Besides one or more compounds of the formula I, it preferably comprises the compounds of the formulae IIA, IIB and/or IIC, furthermore compounds of the formula III.

The proportion of component A is preferably between 45 and 100%, in particular between 60 and 100% by weight based on the mixture as a whole.

For component A, one (or more) individual compound(s) which has (have) a value of Δ∈≤−0.8 is (are) preferably selected. This value must be more negative, the smaller the proportion A in the mixture as a whole.

Component B has pronounced nematogeneity and a flow viscosity of not greater than 30 mm$^2$·s$^{-1}$, preferably not greater than 25 mm$^2$·s$^{-1}$, at 20° C.

A multiplicity of suitable materials is known to the person skilled in the art from the literature. Particular preference is given to compounds of the formula III.

Particularly preferred individual compounds in component B are extremely low-viscosity nematic liquid crystals having a flow viscosity of not greater than 18 mm$^2$·s$^{-1}$, preferably not greater than 12 mm$^2$·s$^{-1}$, at 20° C.

Component B is monotropically or enantiotropically nematic, has no smectic phases and is able to prevent the occurrence of smectic phases down to very low temperatures in liquid-crystal mixtures. For example, if various materials of high nematogeneity are in each case added to a smectic liquid-crystal mixture, the nematogeneity of these materials can be compared through the degree of suppression of smectic phases that is achieved.

The mixture may optionally also comprise a component C, comprising compounds having a dielectric anisotropy of Δ∈≥1.5. These so-called positive compounds are generally present in a mixture of negative dielectric anisotropy in amounts of ≤20% by weight, based on the mixture as a whole.

If the mixture according to the invention comprises one or more compounds having a dielectric anisotropy of Δ∈≥1.5, these are preferably one or more compounds of the formulae P-1 and/or P-2,

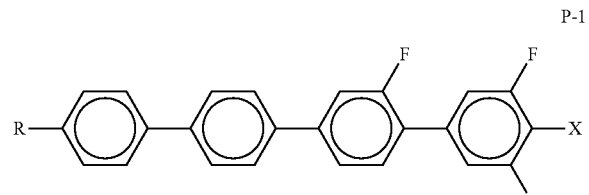

P-1

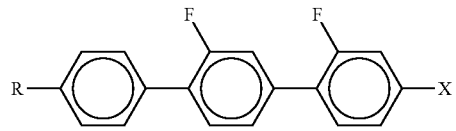

P-2 in which

R denotes straight-chain alkyl, alkoxy or alkenyl, each having 1 to 6 or 2 to 6 C atoms respectively, and X denotes F, Cl, CF$_3$, OCF$_3$, OCHFCF$_3$ or CF$_2$CHFCF$_3$, preferably F or OCF$_3$.

The compounds of the formulae P-1 and/or P-2 are preferably employed in the mixtures according to the invention in concentrations of 0.5-10% by weight, in particular 0.5-8% by weight.

Particular preference is given to the compound of the formula

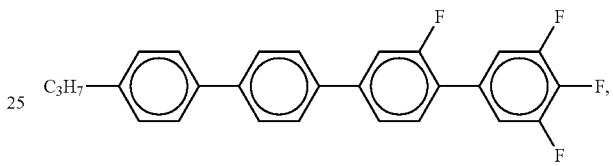

which is preferably employed in amounts of 0.5-3% by weight.

In addition, these liquid-crystal phases may also comprise more than 18 components, preferably 18 to 25 components.

Besides one or more compounds of the formula I, the phases preferably comprise 4 to 15, in particular 5 to 12, and particularly preferably <10, compounds of the formulae IIA, IIB and/or IIC and optionally III.

Besides compounds of the formula I and the compounds of the formulae IIA, IIB and/or IIC and optionally III, other constituents may also be present, for example in an amount of up to 45% of the mixture as a whole, but preferably up to 35%, in particular up to 10%.

The other constituents are preferably selected from nematic or nematogenic substances, in particular known substances, from the classes of the azoxybenzenes, benzylideneanilines, biphenyls, terphenyls, phenyl or cyclohexyl benzoates, phenyl or cyclohexyl cyclo hexanecarboxylates, phenylcyclohexanes, cyclohexylbiphenyls, cyclohexylcyclohexanes, cyclohexylnaphthalenes, 1,4-biscyclohexylbiphenyls or cyclohexylpyrimidines, phenyl- or cyclohexyldioxanes, optionally halogenated stilbenes, benzyl phenyl ethers, tolans and substituted cinnamic acid esters.

The most important compounds which are suitable as constituents of liquid-crystal phases of this type can be characterized by the formula IV, $$R^{20}\text{-L-G-E-}R^{21}\qquad\text{IV}$$

in which L and E each denote a carbo- or heterocyclic ring system from the group formed by 1,4-disubstituted benzene and cyclohexane rings, 4,4'-disubstituted biphenyl, phenylcyclohexane and cyclohexylcyclohexane systems, 2,5-disubstituted pyrimidine and 1,3-dioxane rings, 2,6-disubstituted naphthalene, di- and tetrahydronaphthalene, quinazoline and tetrahydroquinazoline, G denotes —CH=CH— —N(O)=N—
 CH=CQ- —CH=N(O)—
 —C≡C— —CH$_2$—CH$_2$—
 —CO—O— —CH$_2$—O—

—CO—S— —CH$_2$—S—
—CH=N— —COO-Phe-COO—
—CF$_2$O— —CF=CF—
—OCF$_2$— —OCH$_2$—
—(CH$_2$)$_4$— —(CH$_2$)$_3$O— or a C—C single bond, Q denotes halogen, preferably chlorine, or —CN, and R$^{20}$ and R$^{21}$ each denote alkyl, alkenyl, alkoxy, alkoxyalkyl or alkoxycarbonyloxy having up to 18, preferably up to 8, carbon atoms, or one of these radicals alternatively denotes CN, NC, NO$_2$, NCS, CF$_3$, SF$_5$, OCF$_3$, F, Cl or Br.

In most of these compounds, R$^{20}$ and R$^{21}$ are different from one another, one of these radicals usually being an alkyl or alkoxy group. Other variants of the proposed substituents are also common. Many such substances or also mixtures thereof are commercially available. All these substances can be prepared by methods known from the literature.

It goes without saying for the person skilled in the art that the VA, IPS or FFS mixture according to the invention may also comprise compounds in which, for example, H, N, O, Cl and F have been replaced by the corresponding isotopes.

Polymerizable compounds, so-called reactive mesogens (RMs), for example as disclosed in U.S. Pat. No. 6,861,107, may furthermore be added to the mixtures according to the invention in concentrations of preferably 0.01-5% by weight, particularly preferably 0.2-2% by weight, based on the mixture. These mixtures may optionally also comprise an initiator, as described, for example, in U.S. Pat. No. 6,781,665. The initiator, for example Irganox-1076 from BASF, is preferably added to the mixture comprising polymerizable compounds in amounts of 0-1%. Mixtures of this type can be used for so-called polymer-stabilized VA modes (PS-VA) or PSA (polymer sustained VA), in which polymerization of the reactive mesogens is intended to take place in the liquid-crystalline mixture. The prerequisite for this is that the liquid-crystalline compounds of the LC host do not react under the polymerization conditions of the reactive mesogens, i.e. generally with UV exposure in the wavelength range 320-360 nm. Liquid-crystalline compounds containing an alkenyl side chain, such as, for example, CC-3-V, exhibit no reaction under the polymerization conditions (UV polymerization) for the RMs.

In a preferred embodiment of the invention, the polymerizable compounds are selected from the compounds of the formula M $$R^{Ma}\text{-}A^{M1}\text{-}(Z^{M1}\text{-}A^{M2})_{m1}\text{-}R^{Mb} \quad \text{M}$$

in which the individual radicals have the following meaning:
R$^{Ma}$ and R$^{Mb}$ each, independently of one another, denote P, P-Sp-, H, halogen, SF$_5$, NO$_2$, an alkyl, alkenyl or alkynyl group, where at least one of the radicals R$^{Ma}$ and R$^{Mb}$ preferably denotes or contains a group P or P-Sp-,
P denotes a polymerizable group,
Sp denotes a spacer group or a single bond,
A$^{M1}$ and A$^{M2}$ each, independently of one another, denote an aromatic, heteroaromatic, alicyclic or heterocyclic group, preferably having 4 to 25 ring atoms, preferably C atoms, which also includes or may contain annellated rings, and which may optionally be mono- or polysubstituted by L,
L denotes P, P-Sp-, H, OH, CH$_2$OH, F, Cl, Br, I, —CN, —NO$_2$, —NCO, —NCS, —OCN, —SCN, —C(=O)N(R$^x$)$_2$, —C(=O)Y$^1$, —C(=O)R$^x$, —N(R$^x$)$_2$, optionally substituted silyl, optionally substituted aryl having 6 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may be replaced by F, Cl, P or P-Sp-, L preferably denotes P, P-Sp-, H, OH, CH$_2$OH, halogen, SF$_5$, NO$_2$, an alkyl, alkenyl or alkynyl group,
Y$^1$ denotes halogen,
Z$^{M1}$ denotes —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH=CH—, —CF=CF—, —C≡C—, —CH=CH—, —COO—, —OCO—CH=CH—, CR$^0$R$^{00}$ or a single bond,
R$^0$ and R$^{00}$ each, independently of one another, denote H or alkyl having 1 to 12 C atoms,
R$^x$ denotes P, P-Sp-, H, halogen, straight-chain, branched or cyclic alkyl having 1 to 25 C atoms, in which, in addition, one or more non-adjacent CH$_2$ groups may each be replaced by —O—, —S—, —CO—, —CO—O—, —O—CO—, or —O—CO—O— in such a way that O and/or S atoms are not linked directly to one another, and in which, in addition, one or more H atoms may each be replaced by F, Cl, P or P-Sp-, an optionally substituted aryl or aryloxy group having 6 to 40 C atoms, or an optionally substituted heteroaryl or heteroaryloxy group having 2 to 40 C atoms,
m1 denotes 0, 1, 2, 3 or 4, and
n1 denotes 1, 2, 3 or 4,
where at least one, preferably one, two or three, particularly preferably one or two, from the group R$^{Ma}$, R$^{Mb}$ and the substituents L present denotes a group P or P-Sp- or contains at least one group P or P-Sp-.

Particularly preferred compounds of the formula M are those in which
R$^{Ma}$ and R$^{Mb}$ each, independently of one another, denote P, P-Sp-, H, F, Cl, Br, I, —CN, —NO$_2$, —NCO, —NCS, —OCN, —SCN, SF$_5$ or straight-chain or branched alkyl having 1 to 25 C atoms, in which, in addition, one or more non-adjacent CH$_2$ groups may each be replaced, independently of one another, by —C(R$^0$)=C(R$^{00}$)—, —C≡C—, —N(R$^{00}$)—, —O—, —S—, —CO—, —CO—O—, —O—CO—, or —O—CO—O— in such a way that O and/or S atoms are not linked directly to one another, and in which, in addition, one or more H atoms may each be replaced by F, Cl, Br, I, CN, P or P-Sp-, where at least one of the radicals R$^{Ma}$ and R$^{Mb}$ preferably denotes or contains a group P or P-Sp-,
A$^{M1}$ and A$^{M2}$ each, independently of one another, denote 1,4-phenylene, naphthalene-1,4-diyl, naphthalene-2,6-diyl, phenanthrene-2,7-diyl, anthracene-2,7-diyl, fluorene-2,7-diyl, coumarine, flavone, where, in addition, one or more CH groups in these groups may be replaced by N, cyclohexane-1,4-diyl, in which, in addition, one or more non-adjacent CH$_2$ groups may be replaced by O and/or S, 1,4-cyclohexenylene, bicyclo[1.1.1]-pentane-1,3-diyl, bicyclo[2.2.2]octane-1,4-diyl, spiro[3.3]heptane-2,6-diyl, piperidine-1,4-diyl, decahydronaphthalene-2,6-diyl, 1,2,3,4-tetrahydronaphthalene-2,6-diyl, indane-2,5-diyl or octahydro-4,7-methanoindane-2,5-diyl, where all these groups may be unsubstituted or mono- or polysubstituted by L,
L denotes P, P-Sp-, OH, CH$_2$OH, F, Cl, Br, I, —CN, —NO$_2$, —NCO, —NCS, —OCN, —SCN, —C(=O)N(R$^x$)$_2$, —C(=O)Y$^1$, —C(=O)R$^x$, —N(R$^x$)$_2$, optionally substituted silyl, optionally substituted aryl having 6 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may each be replaced by F, Cl, P or P-Sp-, P denotes a polymerizable group, $Y^1$ denotes halogen, $R^x$ denotes P, P-Sp-, H, halogen, straight-chain, branched or cyclic alkyl having 1 to 25 C atoms, in which, in addition, one or more non-adjacent $CH_2$ groups may each be replaced by —O—, —S—, —CO—, —CO—O—, —O—CO—, or —O—CO—O— in such a way that O and/or S atoms are not linked directly to one another, and in which, in addition, one or more H atoms may each be replaced by F, Cl, P or P-Sp-, an optionally substituted aryl or aryloxy group having 6 to 40 C atoms, or an optionally substituted heteroaryl or heteroaryloxy group having 2 to 40 C atoms.

Very particular preference is given to compounds of the formula M in which one of $R^{Ma}$ and $R^{Mb}$ or both denote P or P-Sp-.

Suitable and preferred RMs for use in liquid-crystalline media and PS-VA, PS-IPS, PS-FFS displays or PSA displays according to the invention are selected, for example, from the following formulae:

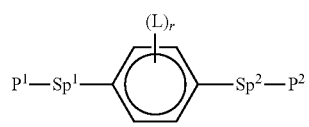

M1

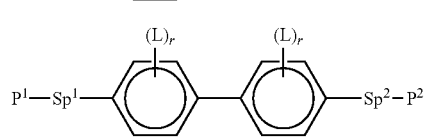

M2

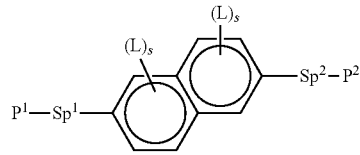

M3

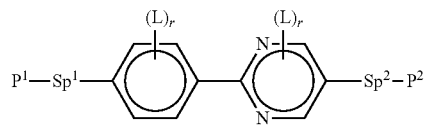

M4

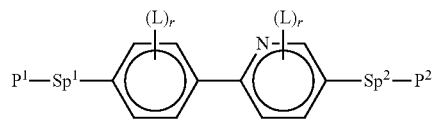

M5

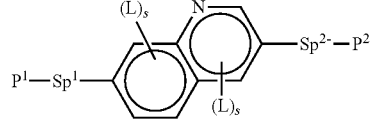

M6

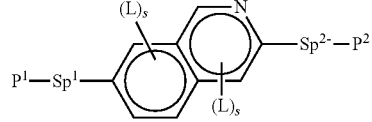

M7

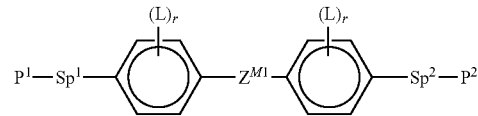

M8

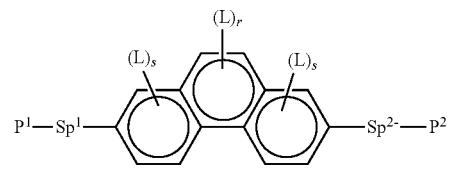

M9

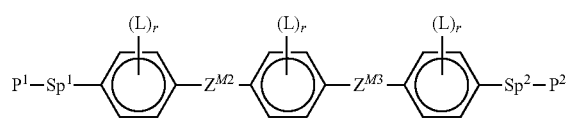

M10

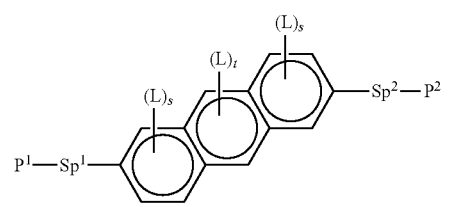

M11

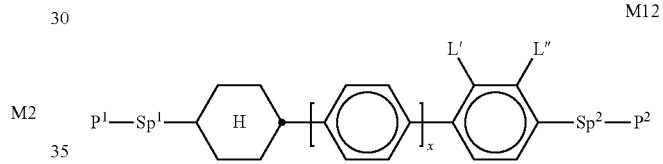

M12

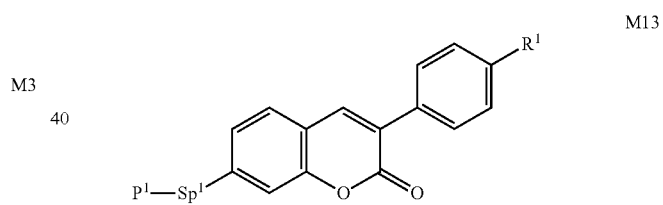

M13

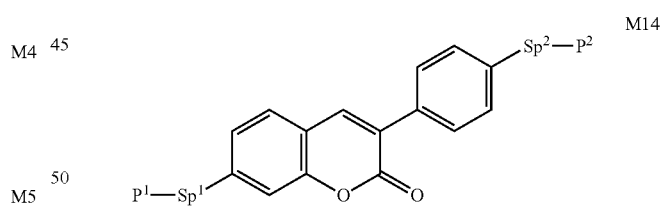

M14

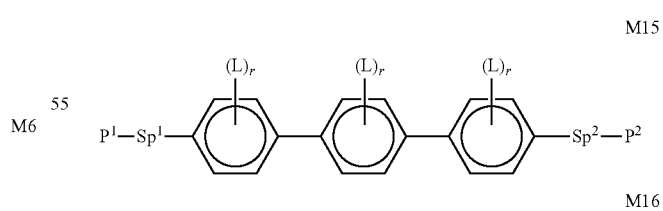

M15

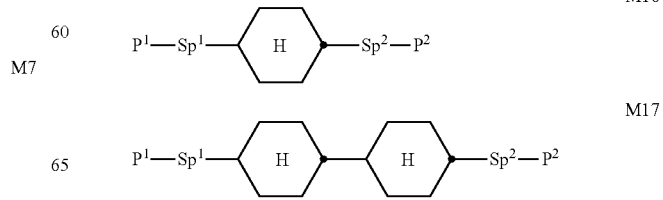

M16

M17

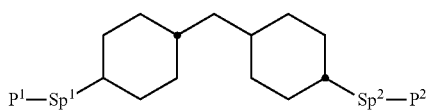
M18

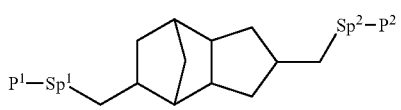
M19

M20

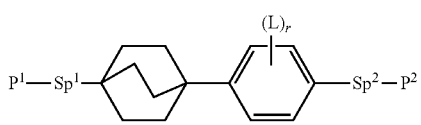
M21

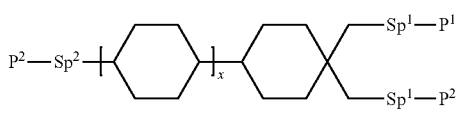
M22

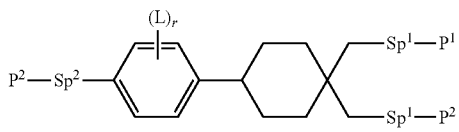
M23

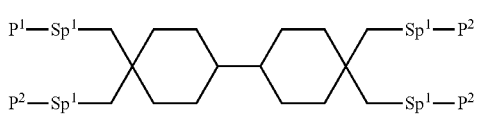
M24

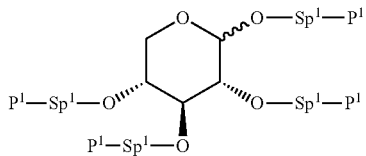
M25

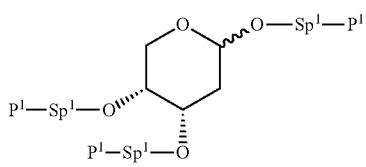
M26

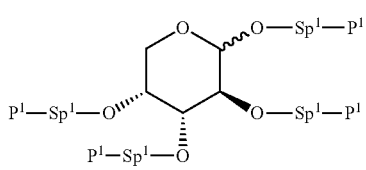
M27

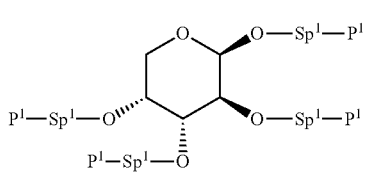
M28

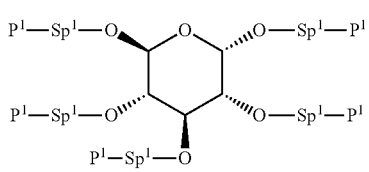
M29 in which the individual radicals have the following meaning:

$P^1$ and $P^2$ each, independently of one another, denote a polymerizable group, preferably having one of the meanings indicated above and below for P, particularly preferably an acrylate, methacrylate, fluoroacrylate, oxetane, vinyloxy or epoxy group, $Sp^1$ and $Sp^2$ each, independently of one another, denote a single bond or a spacer group, preferably having one of the meanings indicated above and below for Sp, and particularly preferably —(CH$_2$)$_{p1}$—, —(CH$_2$)$_{p1}$—O—, —(CH$_2$)$_{p1}$—CO—O— or —(CH$_2$)$_{p1}$—O—CO—O—, in which p1 is an integer from 1 to 12, and where in the last-mentioned groups the linking to the adjacent ring takes place via the O atom, where one of the radicals $P^1$-$Sp^1$- and $P^2$-$Sp^2$- may also denote $R^{aa}$, $R^{aa}$ denotes H, F, Cl, CN or straight-chain or branched alkyl having 1 to 25 C atoms, in which, in addition, one or more non-adjacent CH$_2$ groups may each be replaced, independently of one another, by —C(R$^0$)=C(R$^{00}$)—, —C≡C—, —N(R$^0$)—, —O—, —S—, —CO—, —CO—O—, —O—CO—, —O—CO—O— in such a way that O and/or S atoms are not linked directly to one another, and in which, in addition, one or more H atoms may be replaced by F, Cl, CN or $P^1$-$Sp^1$-, particularly preferably straight-chain or branched, optionally mono- or polyfluorinated, alkyl, alkoxy, alkenyl, alkynyl, alkylcarbonyl, alkoxycarbonyl or alkylcarbonyloxy having 1 to 12 C atoms (where the alkenyl and alkynyl radicals have at least two and the branched radicals at least three C atoms), $R^0$, $R^{00}$ each, independently of one another and on each occurrence identically or differently, denote H or alkyl having 1 to 12 C atoms, $R^1$ denotes P, P-Sp-, H, halogen, straight-chain, branched or cyclic alkyl having 1 to 25 C atoms, in which, in addition, one or more non-adjacent CH$_2$ groups may each be replaced by —O—, —S—, —CO—, —CO—O—, —O—CO—, or —O—CO—O— in such a way that O and/or S atoms are not linked directly to one another, and in which, in addition, one or more H atoms may each be replaced by F, Cl, P or P-Sp-, an optionally substituted aryl or aryloxy group having 6 to 40 C atoms, or an optionally substituted heteroaryl or heteroaryloxy group having 2 to 40 C atoms, $Z^{M1}$ denotes —O—, —CO—, —C(R$^y$R$^z$)— or —CF$_2$CF$_2$—, $Z^{M2}$ and $Z^{M3}$ each, independently of one another, denote —CO—O—, —O—CO—, —CH$_2$O—, —OCH$_2$—, —CF$_2$O—, —OCF$_2$— or —(CH$_2$)$_n$—, where n is 2, 3 or 4, L on each occurrence, identically or differently, denotes F, Cl, CN, or straight-chain or branched, optionally mono- or polyfluorinated, alkyl, alkoxy, alkenyl, alkynyl, alkylcarbonyl, alkoxycarbonyl or alkylcarbonyloxy having up to 12 C atoms, preferably F, L' and L" each, independently of one another, denote H, F or Cl, r denotes 0, 1, 2, 3 or 4, s denotes 0, 1, 2 or 3,
t denotes 0, 1 or 2, and
x denotes 0 or 1.

Suitable polymerizable compounds are listed, for example, in Table E.

The liquid-crystalline media in accordance with the present application preferably comprise in total 0.1 to 10%, preferably 0.2 to 4.0%, particularly preferably 0.2 to 2.0%, of polymerizable compounds.

Particular preference is given to the polymerizable compounds of the formula M and of the formulae RM-1 to RM-94.

The mixtures according to the invention may furthermore comprise conventional additives, such as, for example, stabilizers, antioxidants, UV absorbers, nanoparticles, microparticles, etc.

The structure of the liquid-crystal displays according to the invention corresponds to the usual geometry, as described, for example, in EP-A 0 240 379.

The following examples are intended to explain the invention without limiting it. Above and below, percent data denote percent by weight; all temperatures are indicated in degrees Celsius.

Throughout the patent application, 1,4-cyclohexylene rings and 1,4-phenylene rings are depicted as follows:

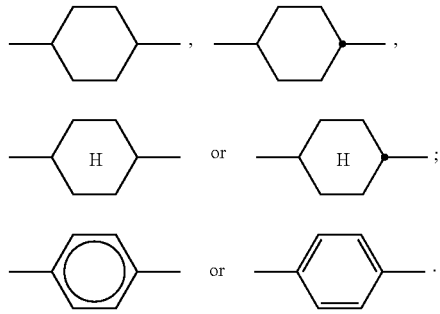

The cyclohexylene rings are trans-1,4-cyclohexylene rings.

Besides the compounds of the formula I, the mixtures according to the invention preferably comprise one or more compounds of the compounds from Table A indicated below.

TABLE A

The following abbreviations are used:
(n, m, m', z: each, independently of one another, 1, 2, 3, 4, 5 or 6;
$(O)C_mH_{2m+1}$ means $OC_mH_{2m+1}$ or $C_mH_{2m+1}$)

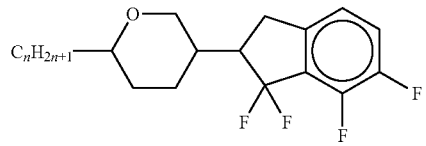

AIK-n-F

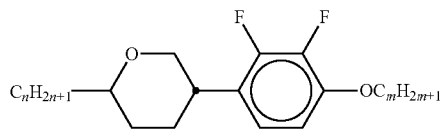

AIY-n-Om

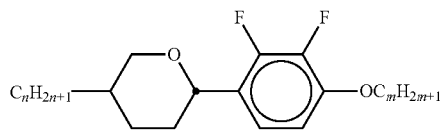

AY-n-Om

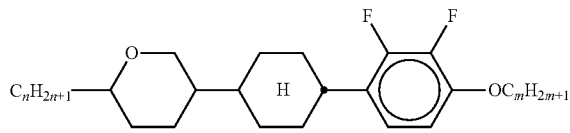

AICY-n-Om

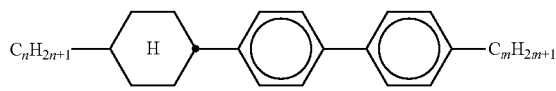

BCH-nm

TABLE A-continued
The following abbreviations are used:
(n, m, m', z: each, independently of one another, 1, 2, 3, 4, 5 or 6;
$(O)C_mH_{2m+1}$ means $OC_mH_{2m+1}$ or $C_mH_{2m+1}$)
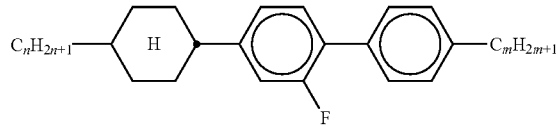
BCH-nmF
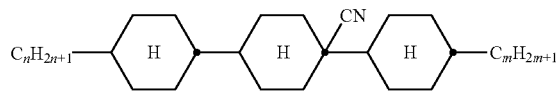
BCN-nm
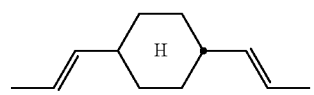
C—1V—V1
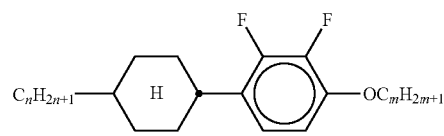
CY-n-Om
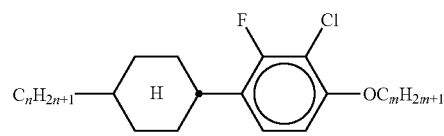
CY(F,Cl)-n-Om
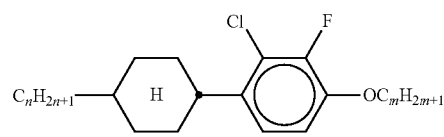
CY(Cl,F)-n-Om
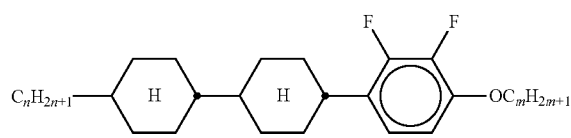
CCY-n-Om
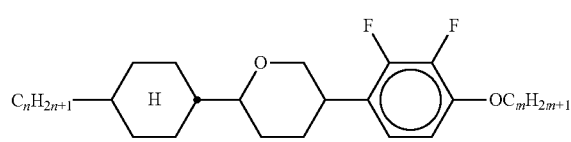
CAIY-n-Om
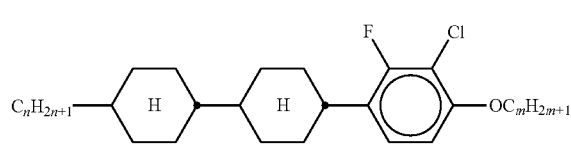
CCY(F,Cl)-n-Om TABLE A-continued
The following abbreviations are used:
(n, m, m', z: each, independently of one another, 1, 2, 3, 4, 5 or 6;
(O)$C_mH_{2m+1}$ means $OC_mH_{2m+1}$ or $C_mH_{2m+1}$)
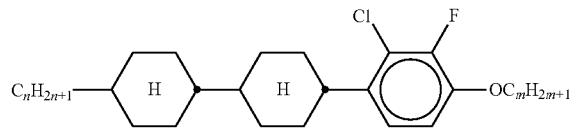
CCY(Cl,F)-n-Om
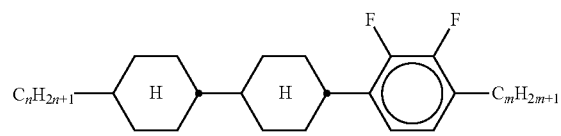
CCY-n-m
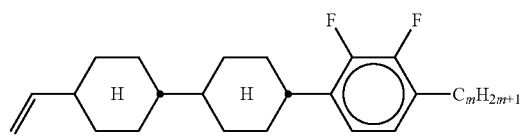
CCY—V-m
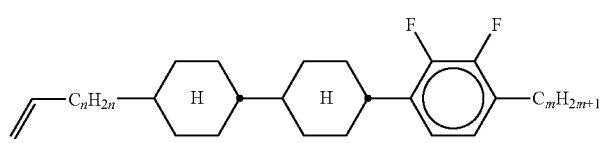
CCY—Vn-m
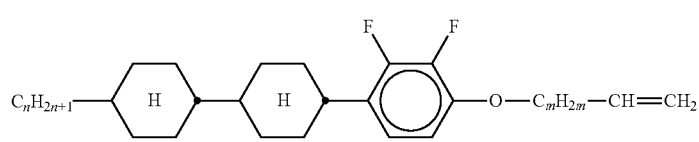
CCY-n-OmV
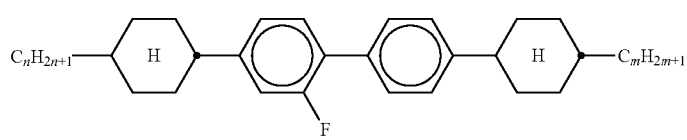
CBC-nmF
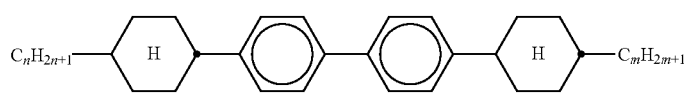
CBC-nm
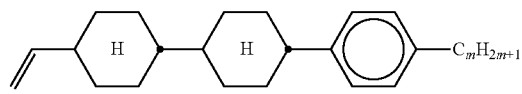
CCP—V-m
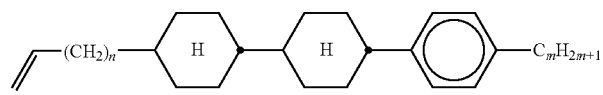
CCP—Vn-m TABLE A-continued
The following abbreviations are used:
(n, m, m', z: each, independently of one another, 1, 2, 3, 4, 5 or 6;
$(O)C_mH_{2m+1}$ means $OC_mH_{2m+1}$ or $C_mH_{2m+1}$)
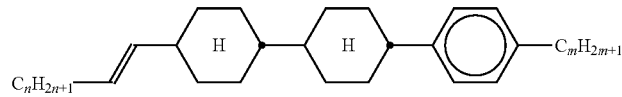
CCP-nV-m
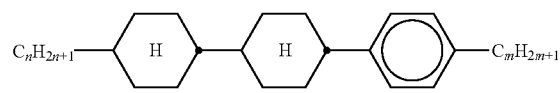
CCP-n-m
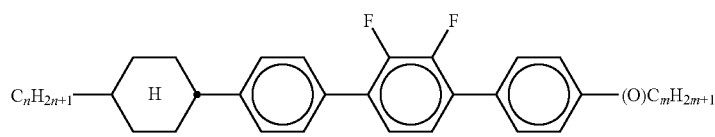
CPYP-n-(O)m
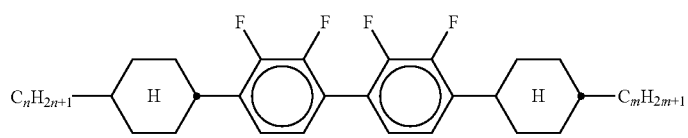
CYYC-n-m
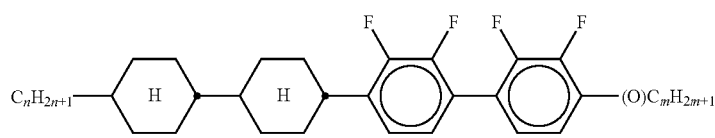
CCYY-n-(O)m
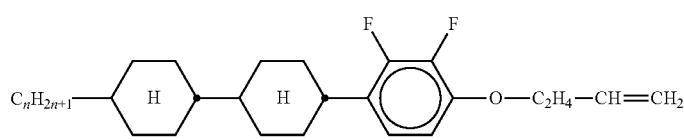
CCY-n-O2V
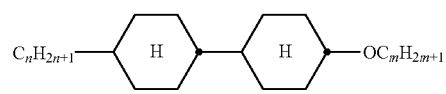
CCH-nOm
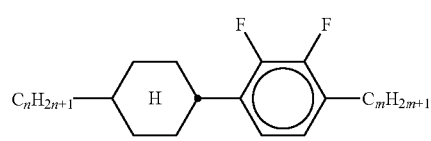
CY-n-m
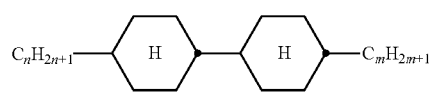
CCH-nm TABLE A-continued
The following abbreviations are used:
(n, m, m', z: each, independently of one another, 1, 2, 3, 4, 5 or 6;
$(O)C_mH_{2m+1}$ means $OC_mH_{2m+1}$ or $C_mH_{2m+1}$)
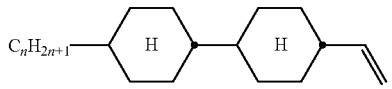
CC-n-V
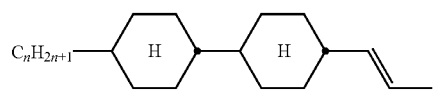
CC-n-V1
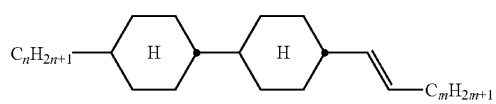
CC-n-Vm
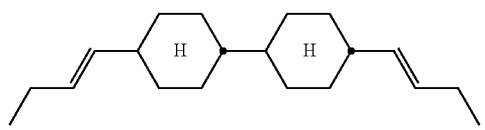
CC—2V—V2
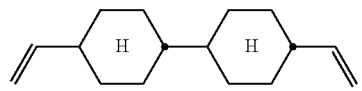
CC—V—V
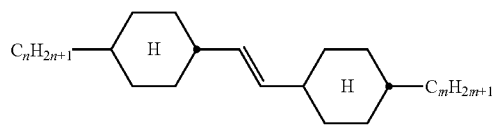
CVC-n-m
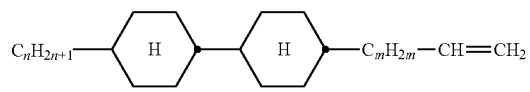
CC-n-mV
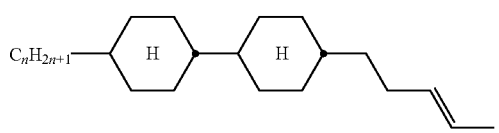
CC-n-2V1
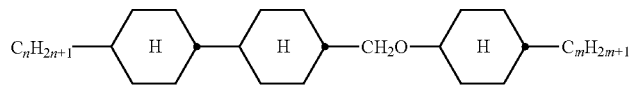
CCOC-n-m
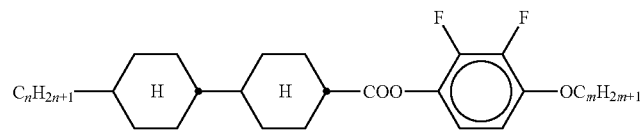
CP-nOmFF TABLE A-continued
The following abbreviations are used:
(n, m, m', z: each, independently of one another, 1, 2, 3, 4, 5 or 6;
$(O)C_mH_{2m+1}$ means $OC_mH_{2m+1}$ or $C_mH_{2m+1}$)
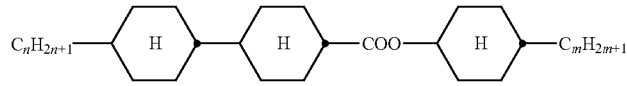
CH-nm
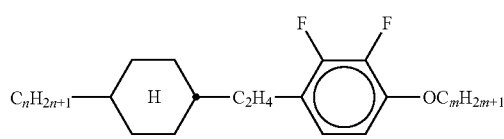
CEY-n-Om
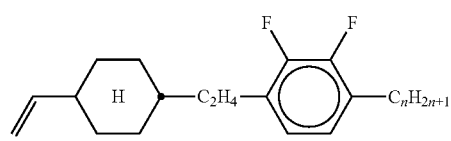
CEY—V-n
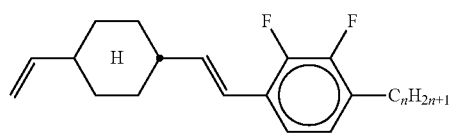
CVY—V-n
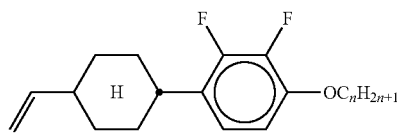
CY—V—On
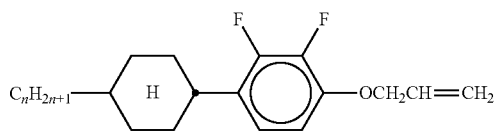
CY-n-O1V
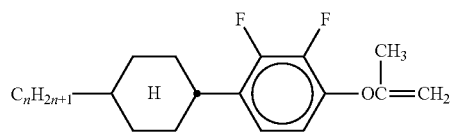
CY-n-OC(CH$_3$)=CH$_2$
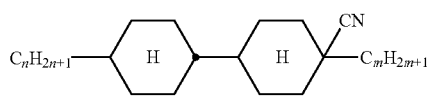
CCN-nm
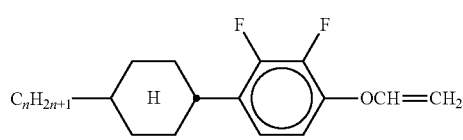
CY-n-OV TABLE A-continued
The following abbreviations are used:
(n, m, m', z: each, independently of one another, 1, 2, 3, 4, 5 or 6;
$(O)C_mH_{2m+1}$ means $OC_mH_{2m+1}$ or $C_mH_{2m+1}$)
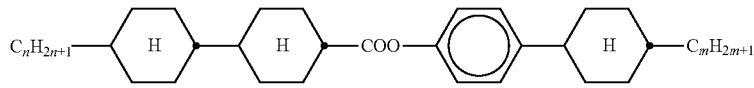
CCPC-nm
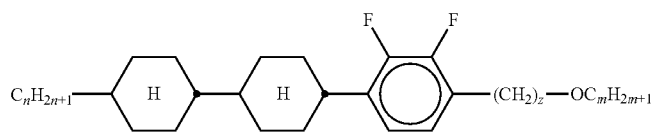
CCY-n-zOm
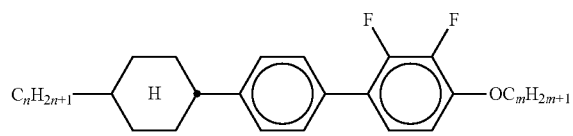
CPY-n-Om
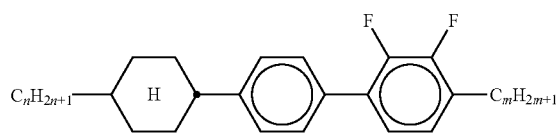
CPY-n-m
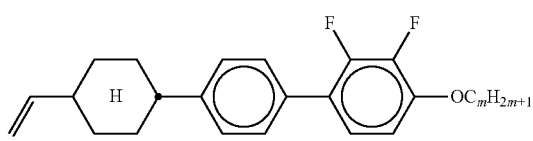
CPY—V—Om
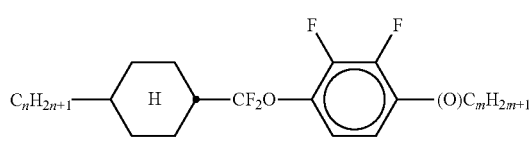
CQY-n-(O)m
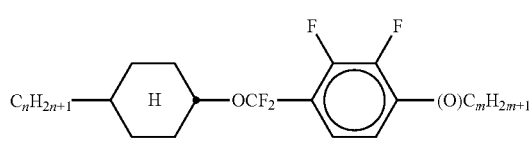
CQIY-n-(O)m
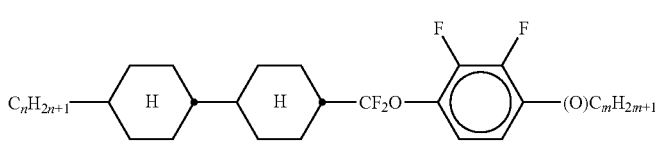
CCQY-n-(O)m TABLE A-continued
The following abbreviations are used:
(n, m, m', z: each, independently of one another, 1, 2, 3, 4, 5 or 6;
(O)$C_mH_{2m+1}$ means $OC_mH_{2m+1}$ or $C_mH_{2m+1}$)
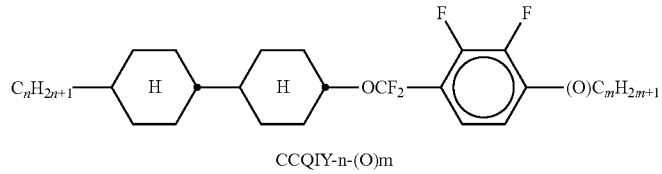
CCQIY-n-(O)m
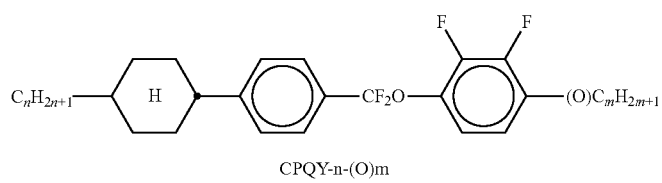
CPQY-n-(O)m
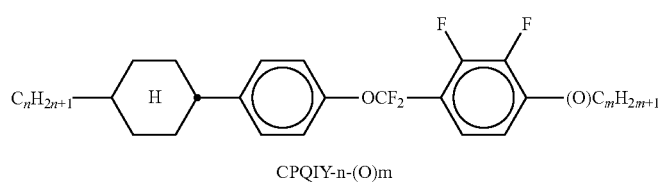
CPQIY-n-(O)m
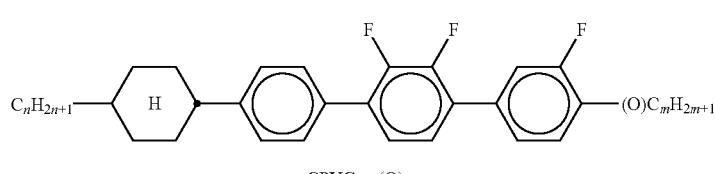
CPYG-n-(O)m
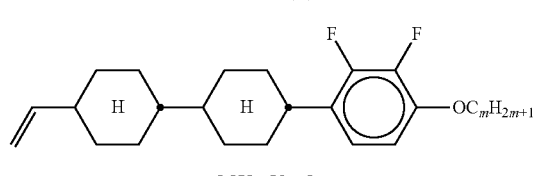
CCY—V—Om
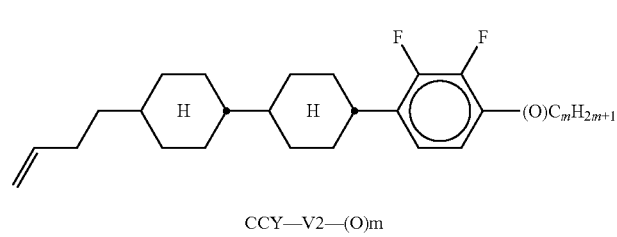
CCY—V2—(O)m
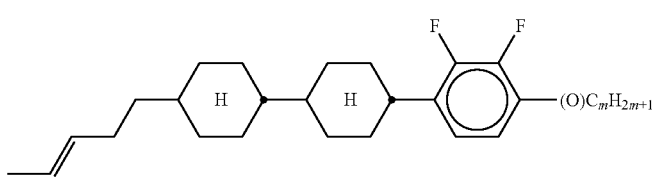
CCY—1V2—(O)m
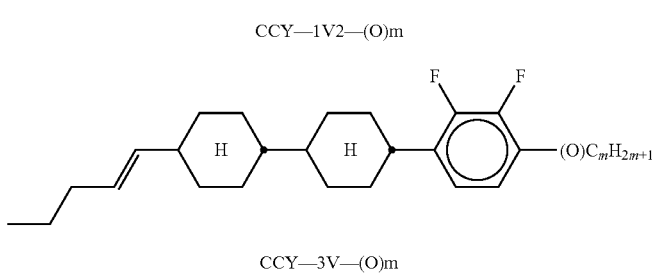
CCY—3V—(O)m TABLE A-continued
The following abbreviations are used:
(n, m, m', z: each, independently of one another, 1, 2, 3, 4, 5 or 6;
$(O)C_mH_{2m+1}$ means $OC_mH_{2m+1}$ or $C_mH_{2m+1}$)
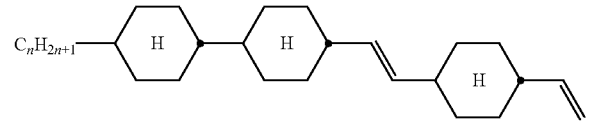
CCVC-n-V
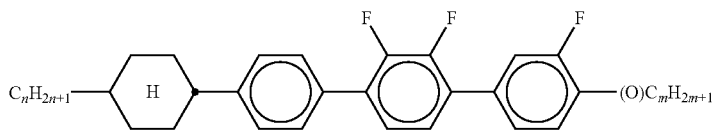
CPYG-n-(O)m
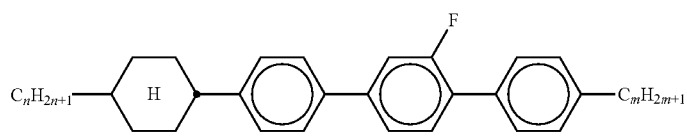
CPGP-n-m
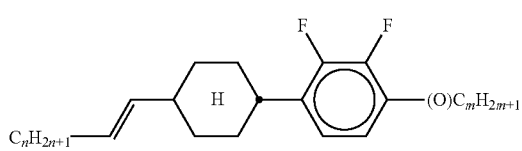
CY-nV—(O)m
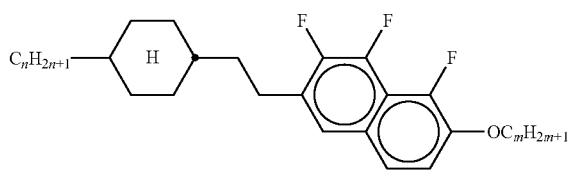
CENaph-n-Om
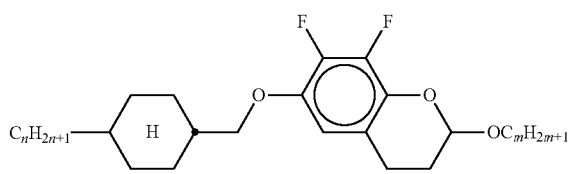
COChrom-n-Om
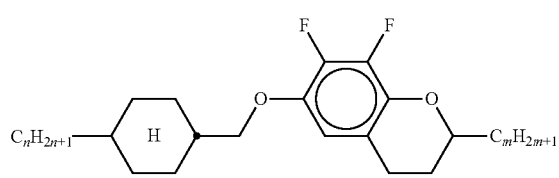
COChrom-n-m TABLE A-continued
The following abbreviations are used:
(n, m, m', z: each, independently of one another, 1, 2, 3, 4, 5 or 6;
(O)$C_mH_{2m+1}$ means $OC_mH_{2m+1}$ or $C_mH_{2m+1}$)
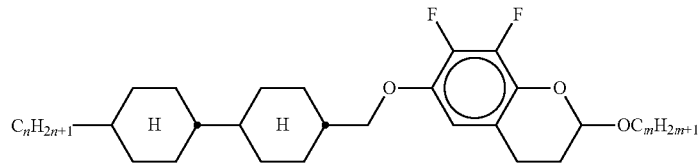
CCOChrom-n-Om
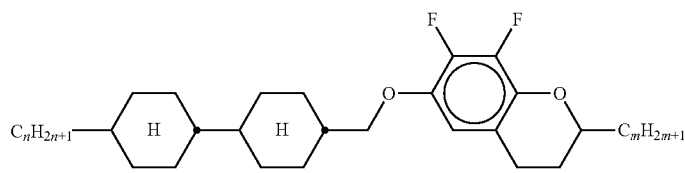
CCOChrom-n-m
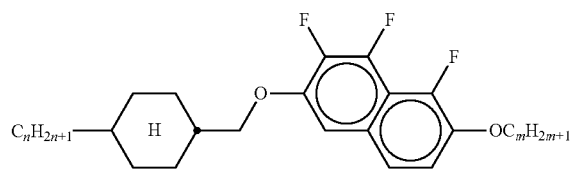
CONaph-n-Om
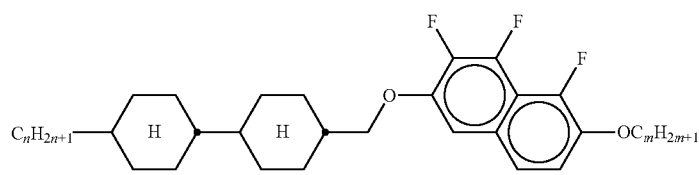
CCONaph-n-Om
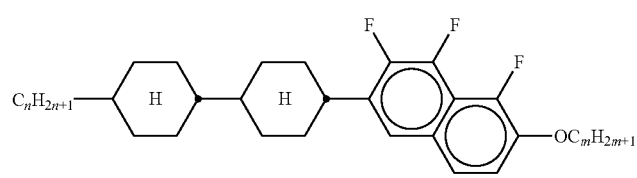
CCNaph-n-Om
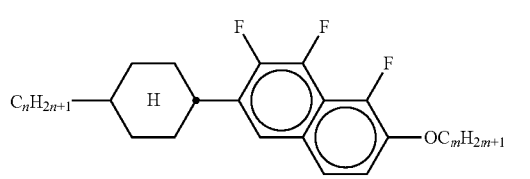
CNaph-n-Om
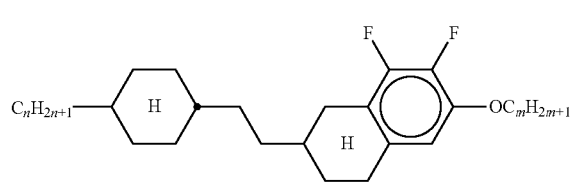
CETNaph-n-Om TABLE A-continued
The following abbreviations are used:
(n, m, m', z: each, independently of one another, 1, 2, 3, 4, 5 or 6;
(O)$C_mH_{2m+1}$ means $OC_mH_{2m+1}$ or $C_mH_{2m+1}$)
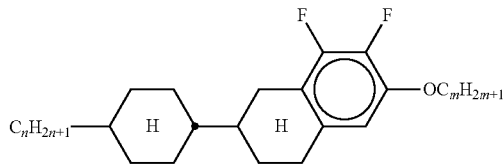
CTNaph-n-Om
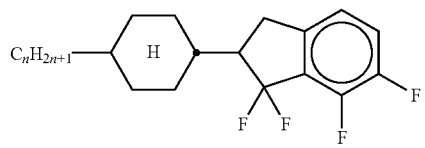
CK-n-F
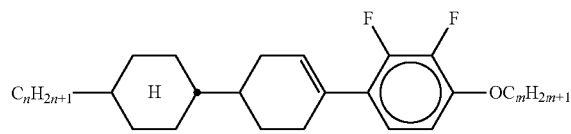
CLY-n-Om
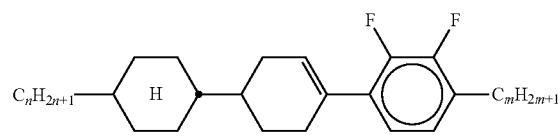
CLY-n-m
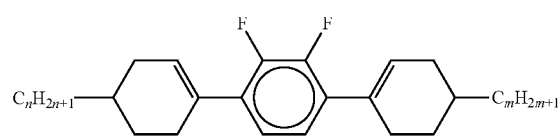
LYLI-n-m
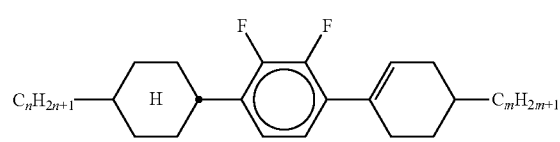
CYLI-n-m
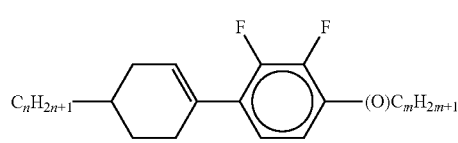
LY-n-(O)m
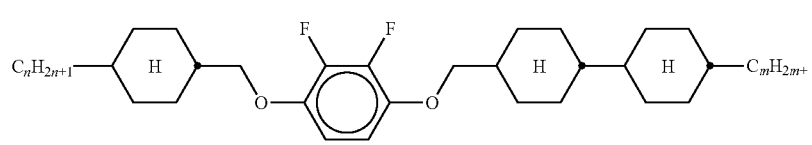
COYOICC-n-m TABLE A-continued
The following abbreviations are used:
(n, m, m', z: each, independently of one another, 1, 2, 3, 4, 5 or 6;
$(O)C_mH_{2m+1}$ means $OC_mH_{2m+1}$ or $C_mH_{2m+1}$)
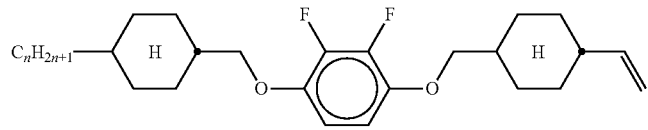
COYOIC-n-V
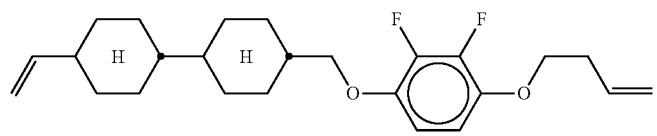
CCOY—V—O2V
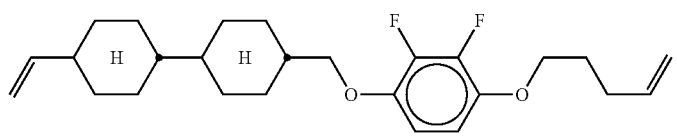
CCOY—V—O3V
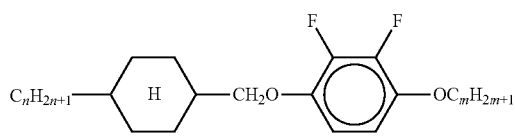
COY-n-Om
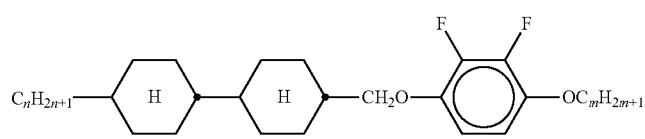
CCOY-n-Om
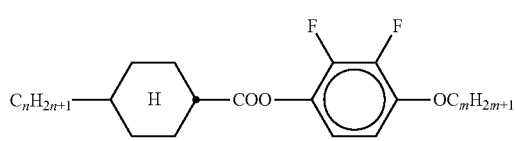
D-nOmFF
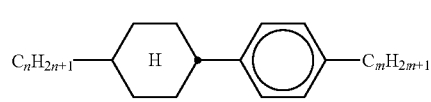
PCH-nm
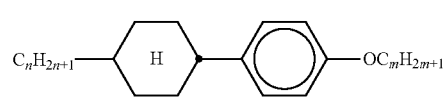
PCH-nOm
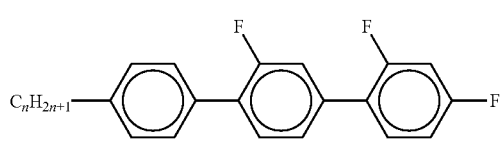
PGIGI-n-F TABLE A-continued
The following abbreviations are used:
(n, m, m', z: each, independently of one another, 1, 2, 3, 4, 5 or 6;
$(O)C_mH_{2m+1}$ means $OC_mH_{2m+1}$ or $C_mH_{2m+1}$)
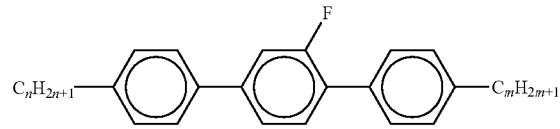
PGP-n-m
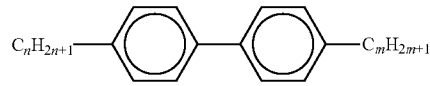
PP-n-m
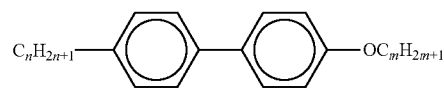
PP-n-Om
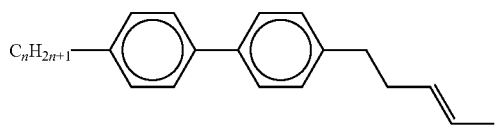
PP-n-2V1
PP-n-mVk
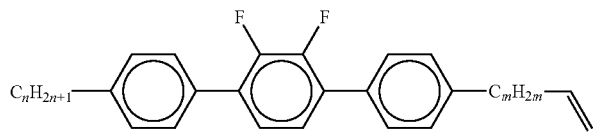
PYP-n-mV
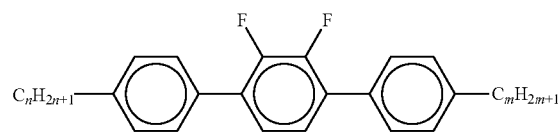
PYP-n-m
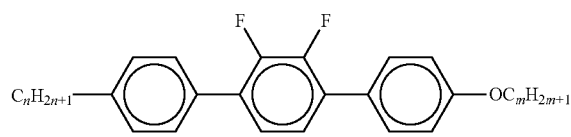
PYP-n-Om
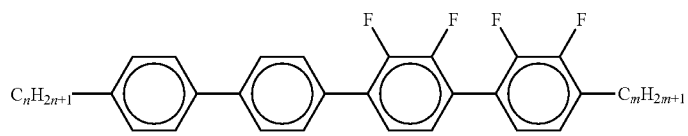
PPYY-n-m TABLE A-continued
The following abbreviations are used:
(n, m, m', z: each, independently of one another, 1, 2, 3, 4, 5 or 6;
$(O)C_mH_{2m+1}$ means $OC_mH_{2m+1}$ or $C_mH_{2m+1}$)
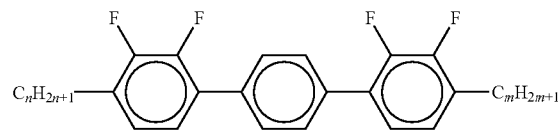
YPY-n-m
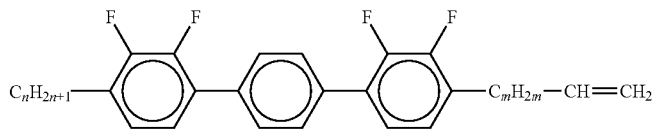
YPY-n-mV
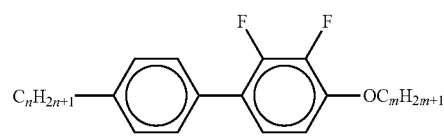
PY-n-Om
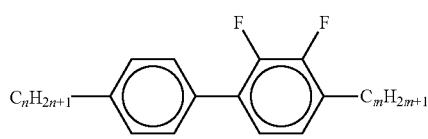
PY-n-m
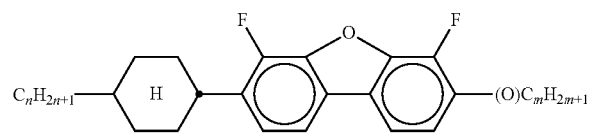
C—DFDBF-n-(O)m
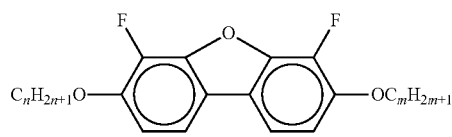
B-nO—Om
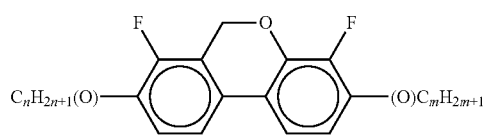
DFDBC-n(O)—(O)m
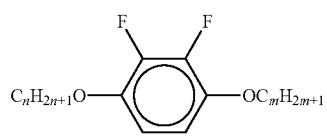
Y-nO—Om TABLE A-continued
The following abbreviations are used:
(n, m, m', z: each, independently of one another, 1, 2, 3, 4, 5 or 6;
(O)$C_mH_{2m+1}$ means $OC_mH_{2m+1}$ or $C_mH_{2m+1}$)
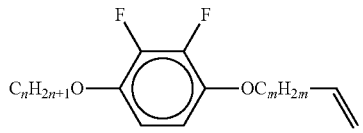
Y-nO—OmV
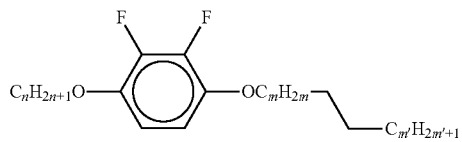
Y-nO—OmVm'
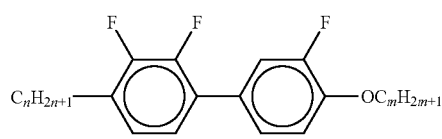
YG-n-Om
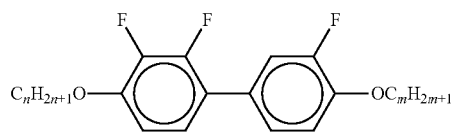
YG-nO—Om
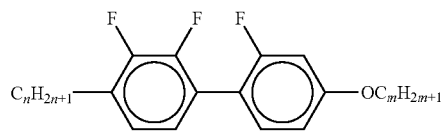
YGI-n-Om
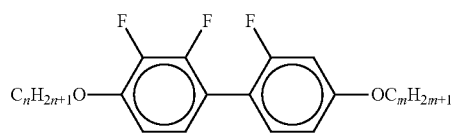
YGI-nO—Om
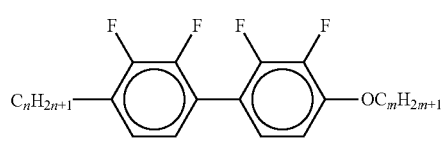
YY-n-Om
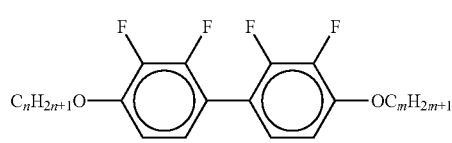
YY-nO—Om TABLE A-continued The following abbreviations are used:
(n, m, m', z: each, independently of one another, 1, 2, 3, 4, 5 or 6;
$(O)C_mH_{2m+1}$ means $OC_mH_{2m+1}$ or $C_mH_{2m+1}$)

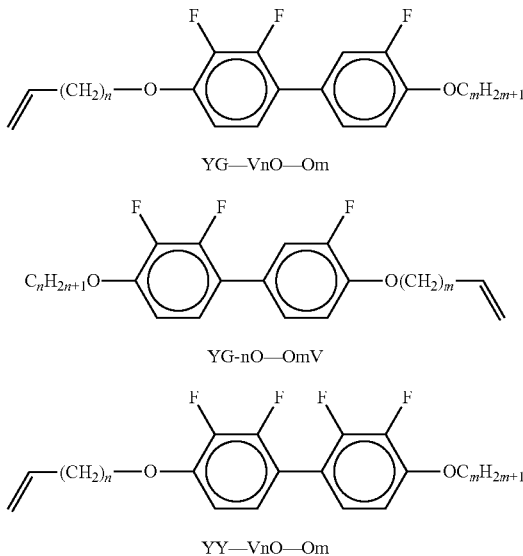

The liquid-crystal mixtures which can be used in accordance with the invention are prepared in a manner which is conventional per se. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

By means of suitable additives, the liquid-crystal phases according to the invention can be modified in such a way that they can be employed in any type of, for example, ECB, VAN, IPS, GH or ASM-VA LCD display that has been disclosed to date.

The dielectrics may also comprise further additives known to the person skilled in the art and described in the literature, such as, for example, UV absorbers, antioxidants, nanoparticles and free-radical scavengers. For example, 0-15% of pleochroic dyes, stabilizers or chiral dopants may be added. Suitable stabilizers for the mixtures according to the invention are, in particular, those listed in Table D.

For example, 0-15% of pleochroic dyes, furthermore conductive salts, preferably ethyldimethyldodecylammonium 4-hexoxybenzoate, tetrabutylammonium tetraphenylboranate or complex salts of crown ethers (cf., for example, Haller et al., Mol. Cryst. Liq. Cryst., Volume 24, pages 249-258 (1973)), may be added in order to improve the conductivity or substances may be added in order to modify the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728.

Table B shows possible dopants which can be added to the mixtures according to the invention. If the mixtures comprise a dopant, it is employed in amounts of 0.01-4% by weight, preferably 0.1-1.0% by weight.

TABLE C

Table C shows possible dopants which are generally added to the mixtures according to the invention. The mixtures preferably comprise 0-10% by weight, in particular 0.01-5% by weight and particularly preferably 0.01-3% by weight of dopants.

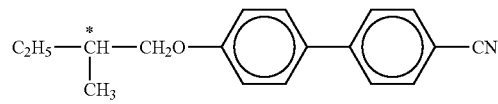

C 15

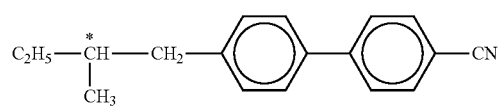

CB 15

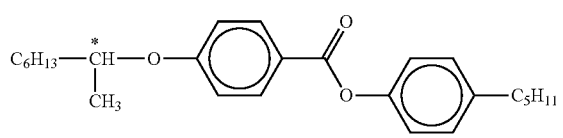

CM 21

TABLE C-continued
Table C shows possible dopants which are generally added to the mixtures according to the invention. The mixtures preferably comprise 0-10% by weight, in particular 0.01-5% by weight and particularly preferably 0.01-3% by weight of dopants.
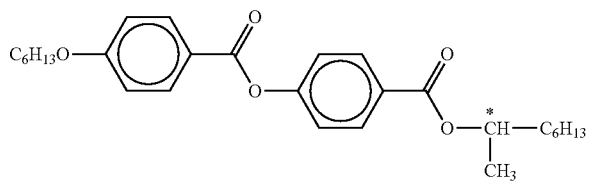
R/S-811
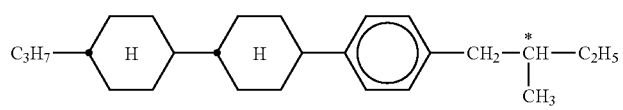
CM 44
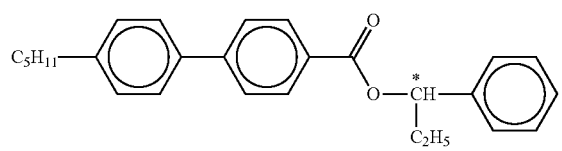
CM 45
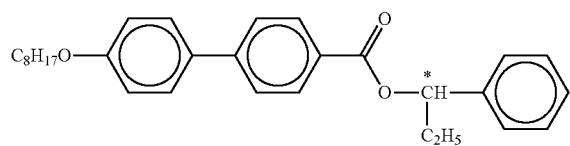
CM 47
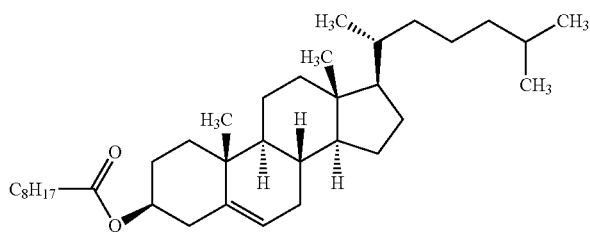
CN
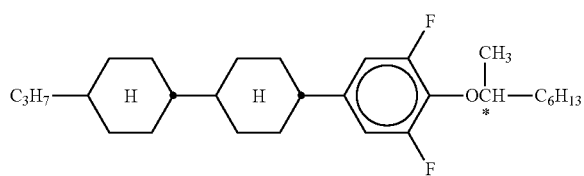
R/S-2011
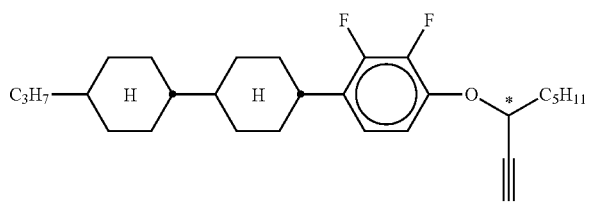
R/S-3011
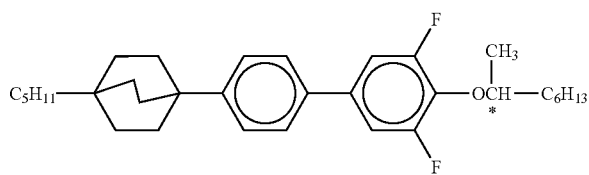
R/S-4011

TABLE C-continued

Table C shows possible dopants which are generally added to the mixtures according to the invention. The mixtures preferably comprise 0-10% by weight, in particular 0.01-5% by weight and particularly preferably 0.01-3% by weight of dopants.

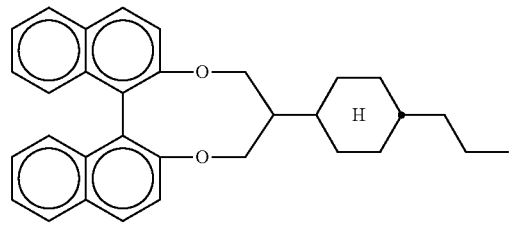

R/S-5011

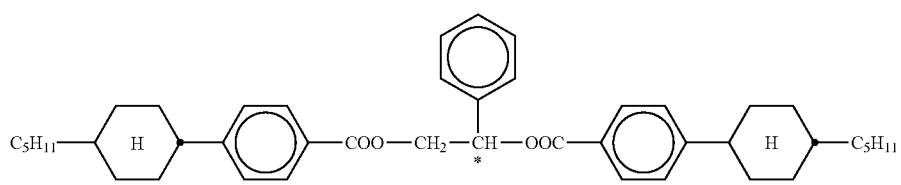

R/S-1011

TABLE D

Stabilizers which can be added, for example, to the mixtures according to the invention in amounts of 0-10% by weight are shown below.

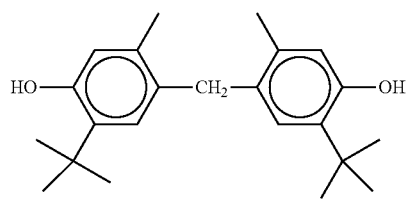

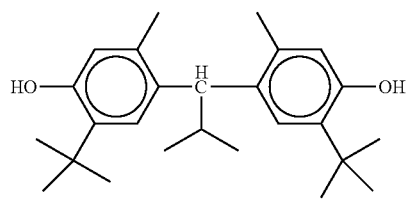

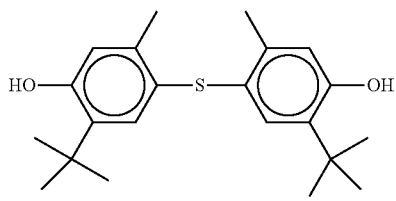

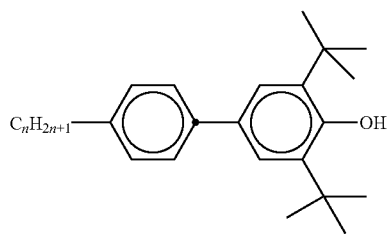

n = 1, 2, 3, 4, 5, 6 or 7

TABLE D-continued
Stabilizers which can be added, for example, to the mixtures according to the invention in amounts of 0-10% by weight are shown below.
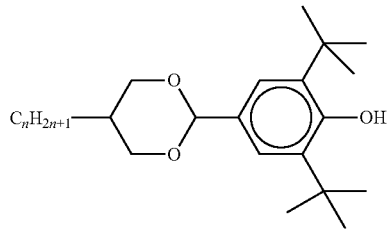
n = 1, 2, 3, 4, 5, 6 or 7
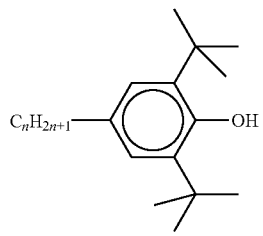
n = 1, 2, 3, 4, 5, 6 or 7
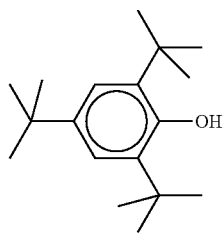
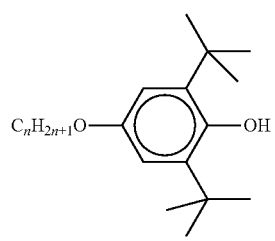
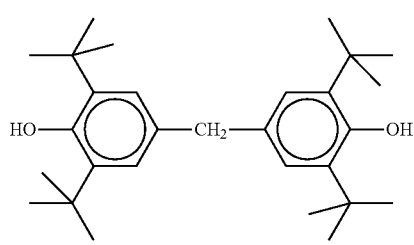
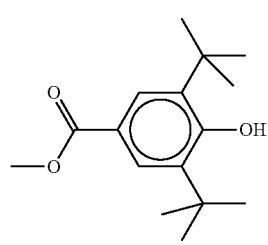

TABLE D-continued
Stabilizers which can be added, for example, to the mixtures according to the invention in amounts of 0-10% by weight are shown below.
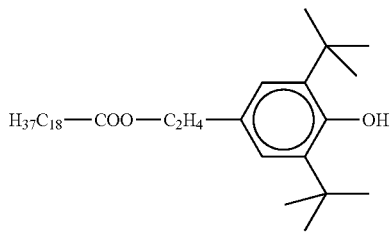
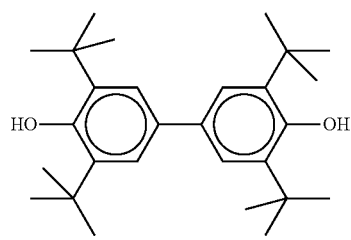
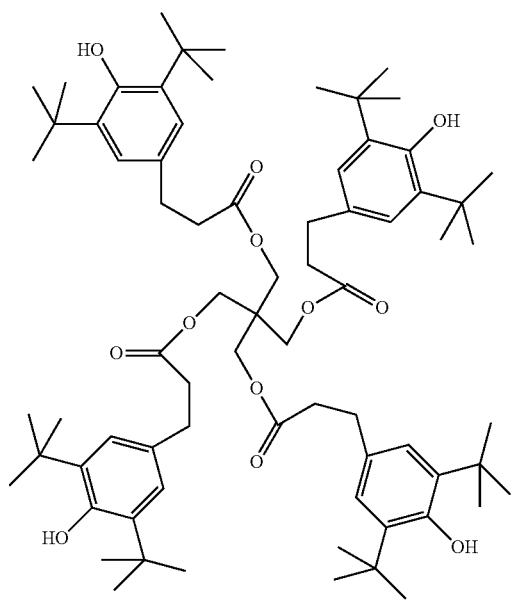 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]
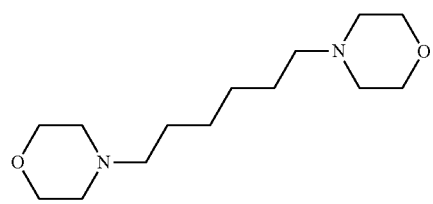 [SMILES: C(CCCN1CCOCC1)CCN1CCOCC1]
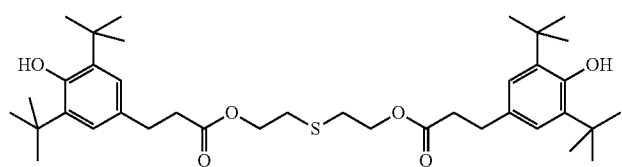 [SMILES: CC(C)(C)c1cc(CCC(=O)OCCSCCOC(=O)CCc2cc(C(C)(C)C)c(O)c(C(C)(C)C)c2)cc(C(C)(C)C)c1O]

TABLE D-continued
Stabilizers which can be added, for example, to the mixtures according to the invention in amounts of 0-10% by weight are shown below.
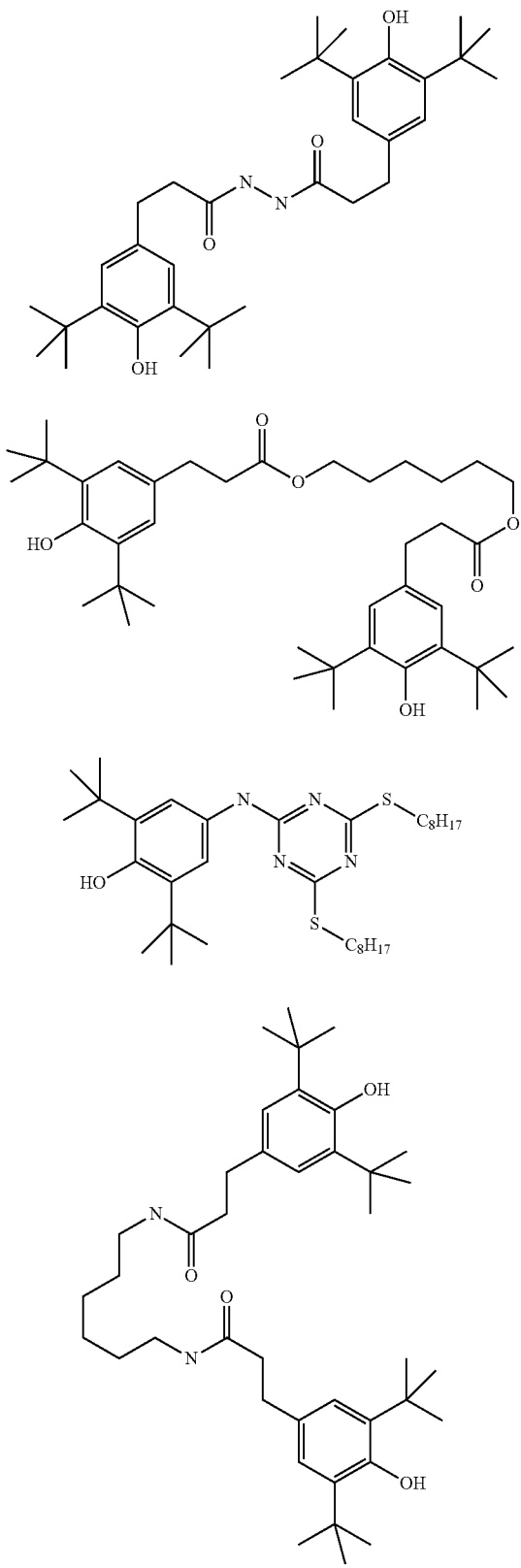

TABLE D-continued
Stabilizers which can be added, for example, to the mixtures according to the invention in amounts of 0-10% by weight are shown below.
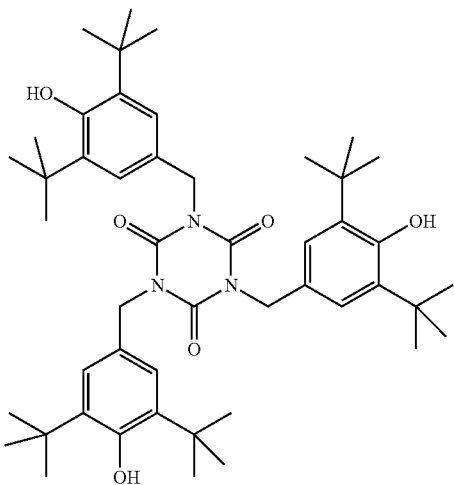 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
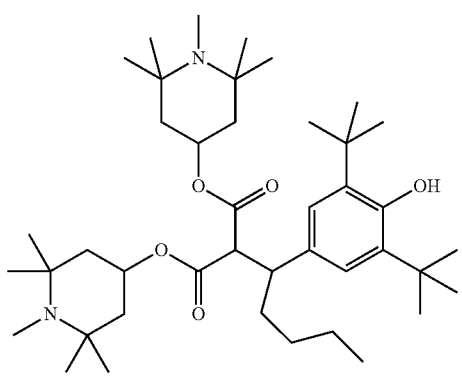 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]
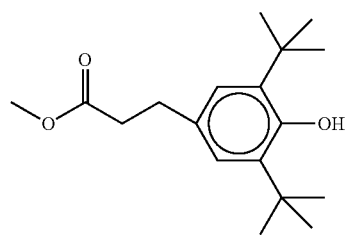
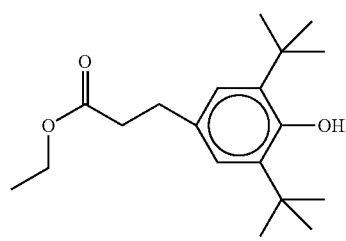
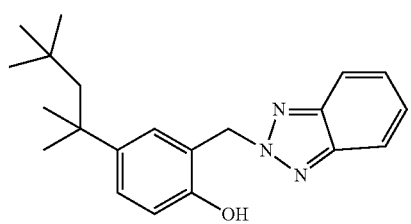 [SMILES: CC(C)(C)CC(C)(C)c1ccc(O)c(Cn2nc3ccccc3n2)c1]

TABLE D-continued
Stabilizers which can be added, for example, to the mixtures according to the invention in amounts of 0-10% by weight are shown below.
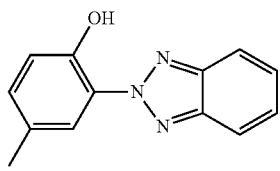 [SMILES: Cc1ccc(O)c(-n2nc3ccccc3n2)c1]
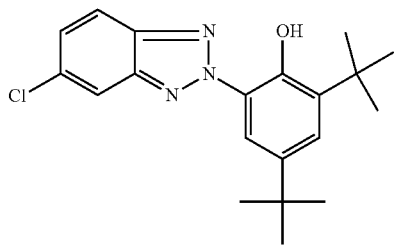 [SMILES: CC(C)(C)c1cc(-n2nc3ccc(Cl)cc3n2)c(O)c(C(C)(C)C)c1]
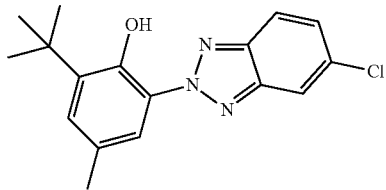 [SMILES: Cc1cc(-n2nc3ccc(Cl)cc3n2)c(O)c(C(C)(C)C)c1]
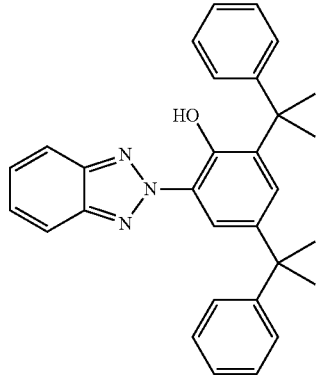 [SMILES: CC(C)(c1ccccc1)c1cc(-n2nc3ccccc3n2)c(O)c(C(C)(C)c2ccccc2)c1]
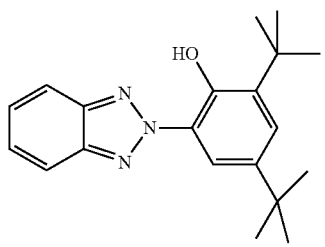 [SMILES: CC(C)(C)c1cc(-n2nc3ccccc3n2)c(O)c(C(C)(C)C)c1]
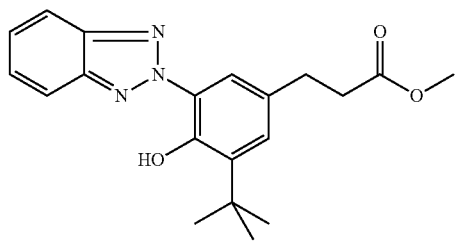 [SMILES: COC(=O)CCc1cc(-n2nc3ccccc3n2)c(O)c(C(C)(C)C)c1]

TABLE D-continued
Stabilizers which can be added, for example, to the mixtures according to the invention in amounts of 0-10% by weight are shown below.
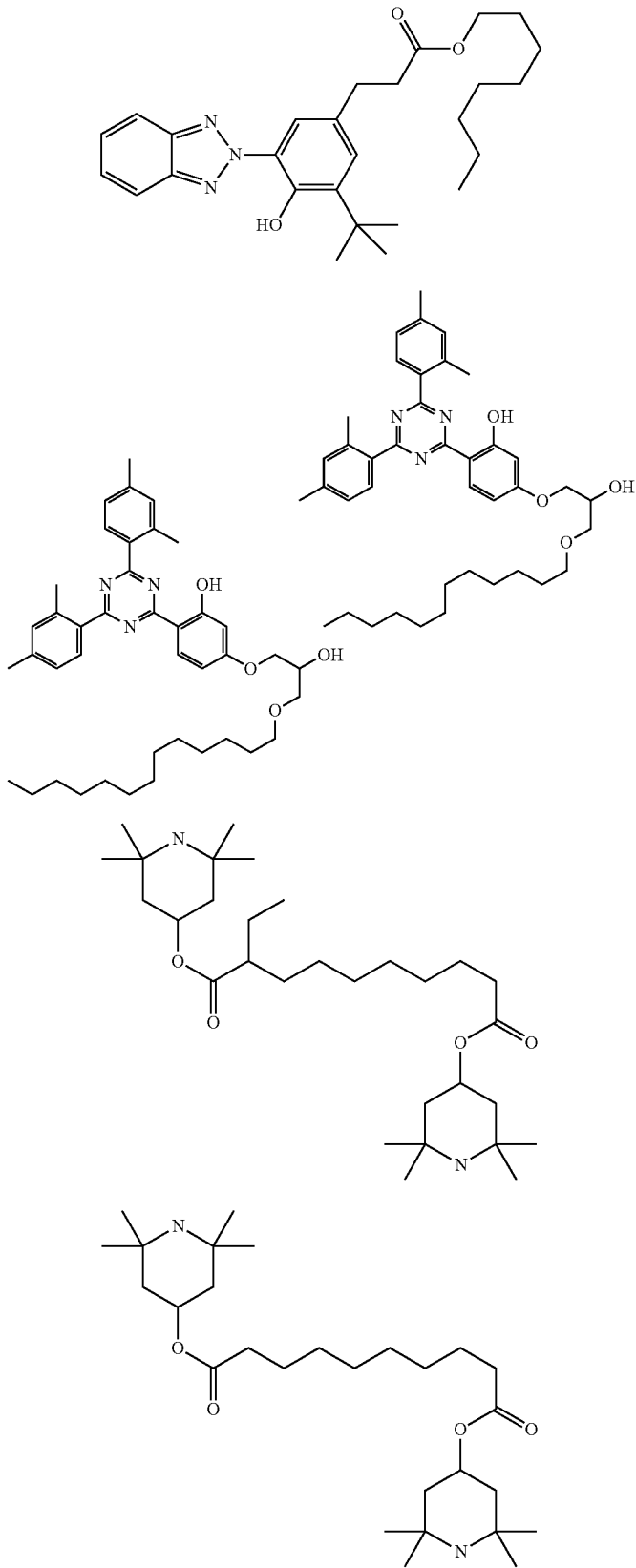

TABLE D-continued
Stabilizers which can be added, for example, to the mixtures according to the invention in amounts of 0-10% by weight are shown below.
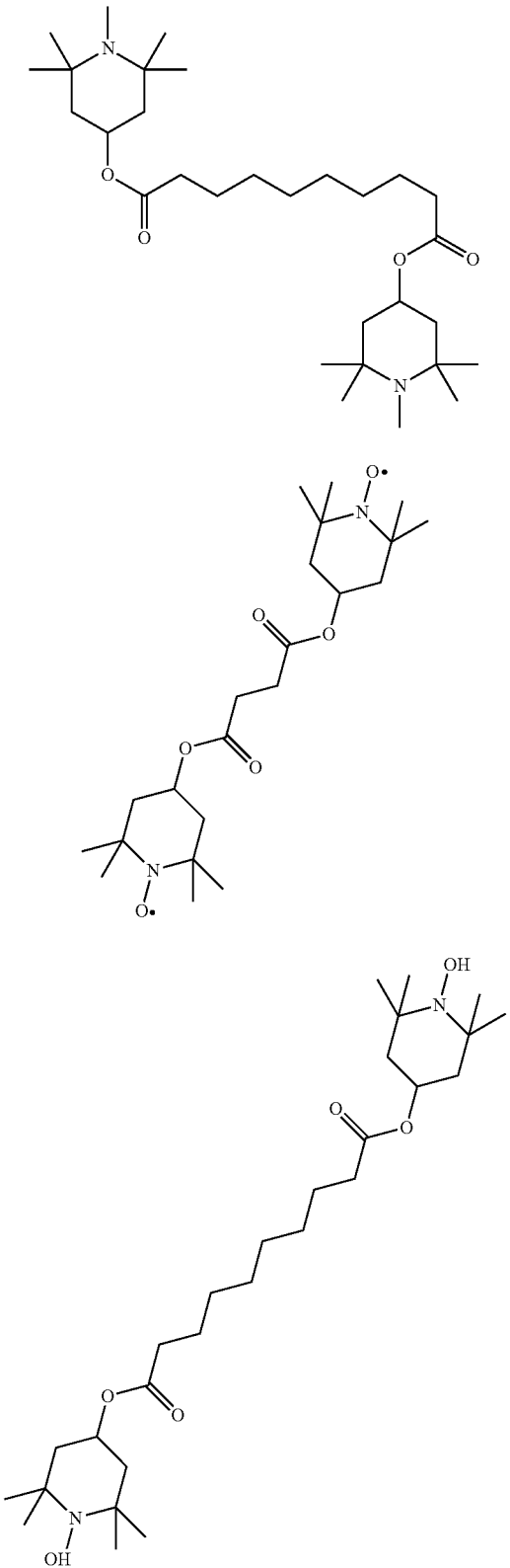

TABLE E

Table E shows example compounds which can preferably be used as reactive mesogenic compounds in the LC media in accordance with the present invention. If the mixtures according to the invention comprise one or more reactive compounds, they are preferably employed in amounts of 0.01-5% by weight. It may also be necessary to add an initiator or a mixture of two or more initiators for the polymerization. The initiator or initiator mixture is preferably added in amounts of 0.001-2% by weight, based on the mixture. A suitable initiator is, for example, Irgacure (BASF) or Irganox (BASF).

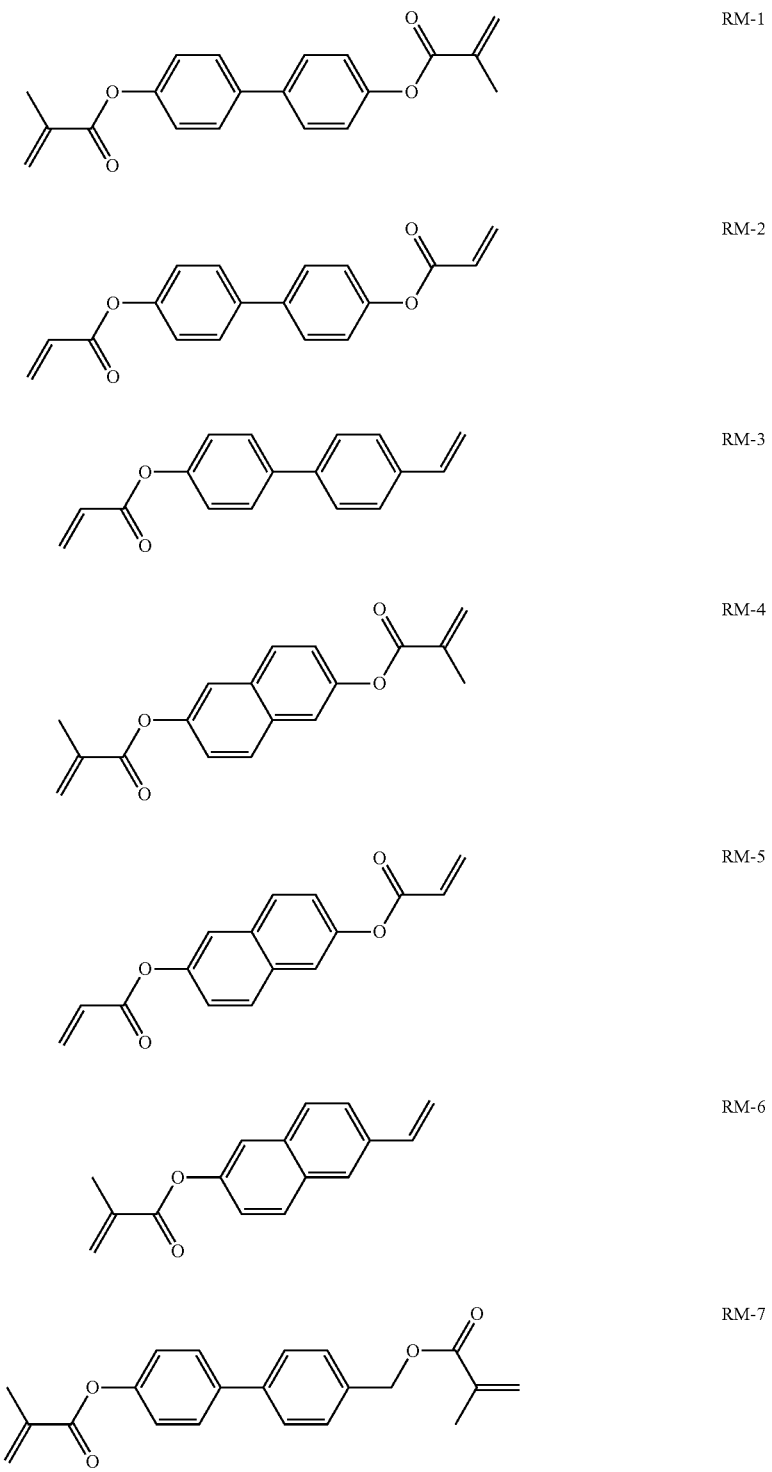

TABLE E-continued

Table E shows example compounds which can preferably be used as reactive mesogenic compounds in the LC media in accordance with the present invention. If the mixtures according to the invention comprise one or more reactive compounds, they are preferably employed in amounts of 0.01-5% by weight. It may also be necessary to add an initiator or a mixture of two or more initiators for the polymerization. The initiator or initiator mixture is preferably added in amounts of 0.001-2% by weight, based on the mixture. A suitable initiator is, for example, Irgacure (BASF) or Irganox (BASF).

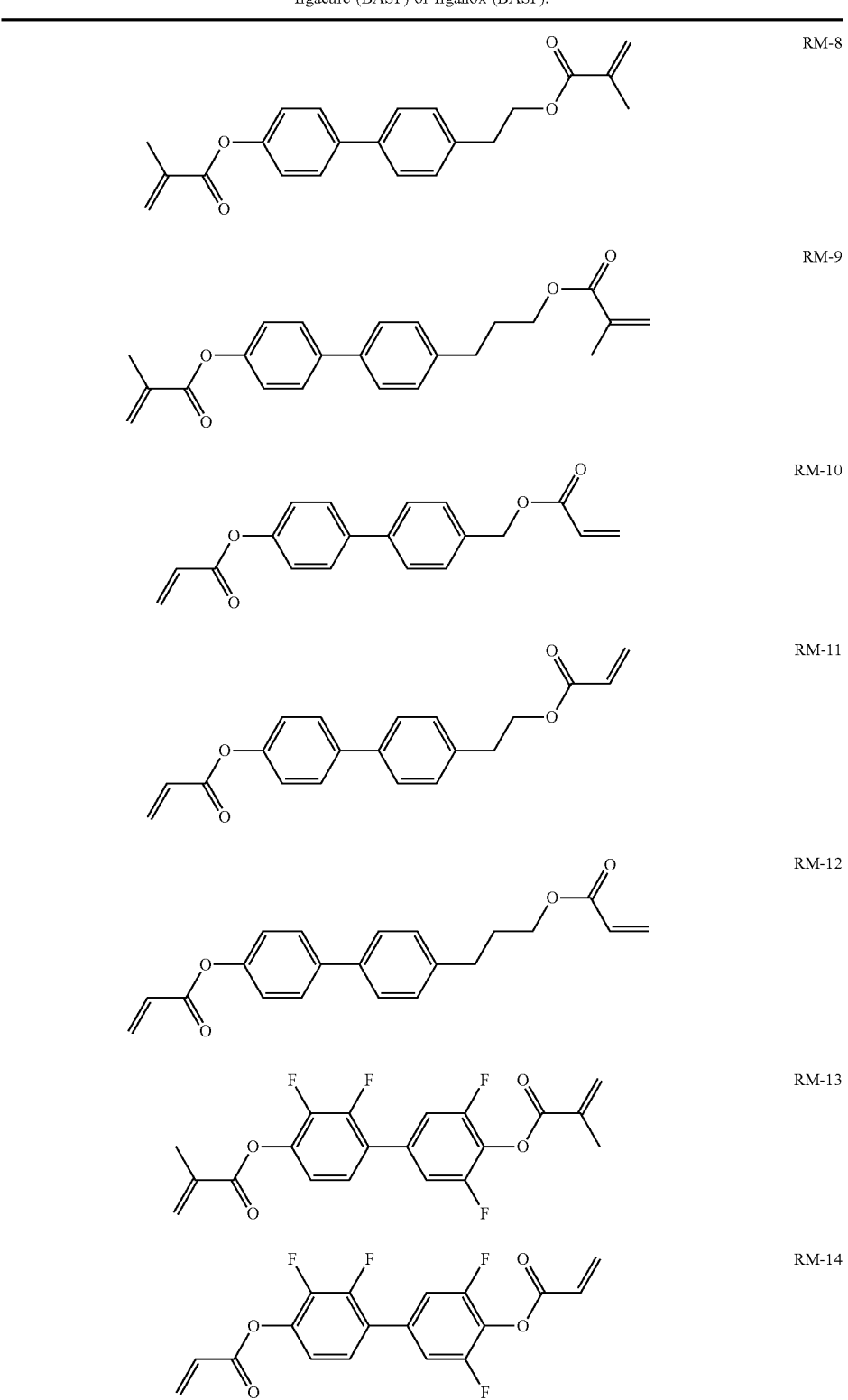

TABLE E-continued

Table E shows example compounds which can preferably be used as reactive mesogenic compounds in the LC media in accordance with the present invention. If the mixtures according to the invention comprise one or more reactive compounds, they are preferably employed in amounts of 0.01-5% by weight. It may also be necessary to add an initiator or a mixture of two or more initiators for the polymerization. The initiator or initiator mixture is preferably added in amounts of 0.001-2% by weight, based on the mixture. A suitable initiator is, for example, Irgacure (BASF) or Irganox (BASF).

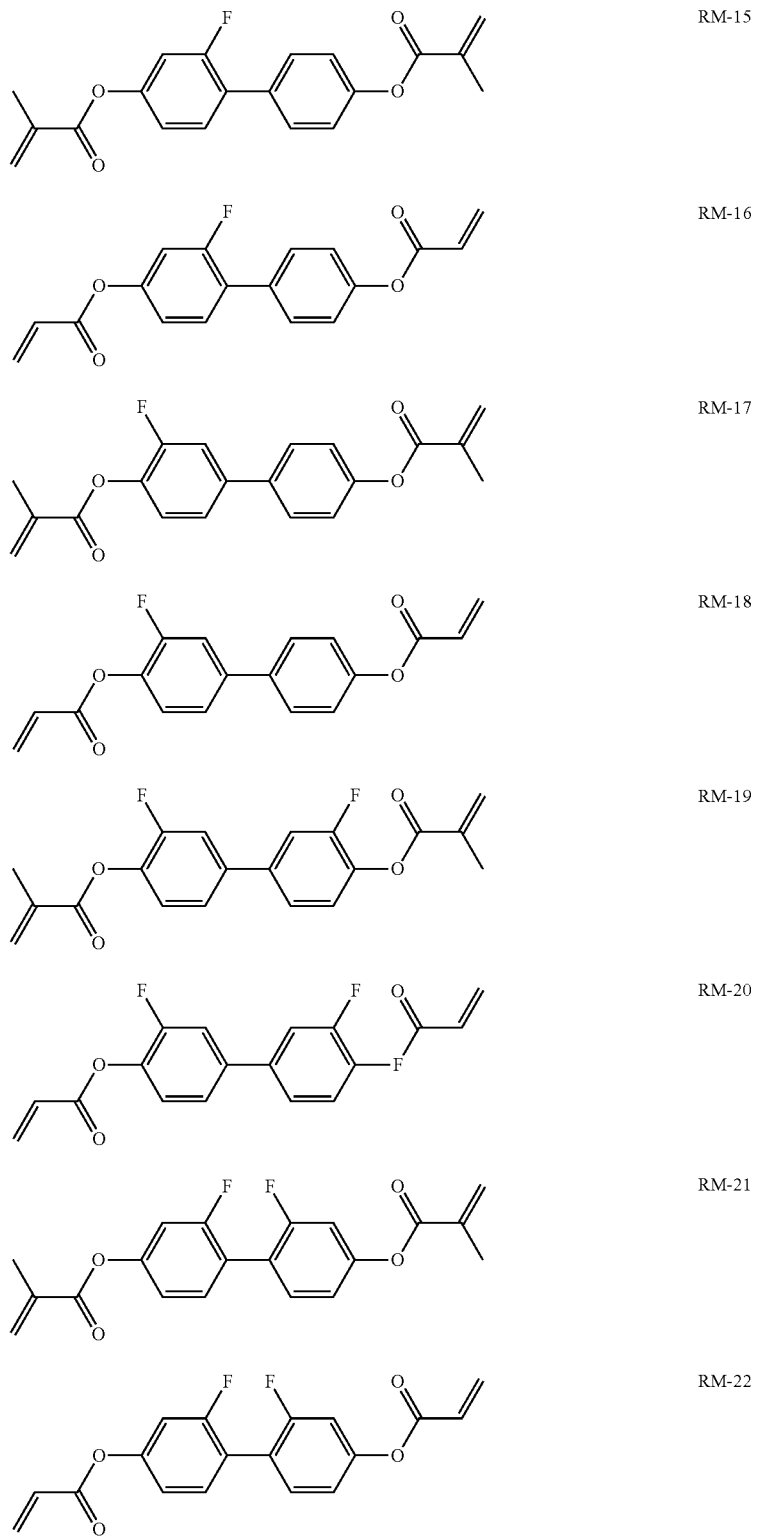

RM-15

RM-16

RM-17

RM-18

RM-19

RM-20

RM-21

RM-22

TABLE E-continued

Table E shows example compounds which can preferably be used as reactive mesogenic compounds in the LC media in accordance with the present invention. If the mixtures according to the invention comprise one or more reactive compounds, they are preferably employed in amounts of 0.01-5% by weight. It may also be necessary to add an initiator or a mixture of two or more initiators for the polymerization. The initiator or initiator mixture is preferably added in amounts of 0.001-2% by weight, based on the mixture. A suitable initiator is, for example, Irgacure (BASF) or Irganox (BASF).

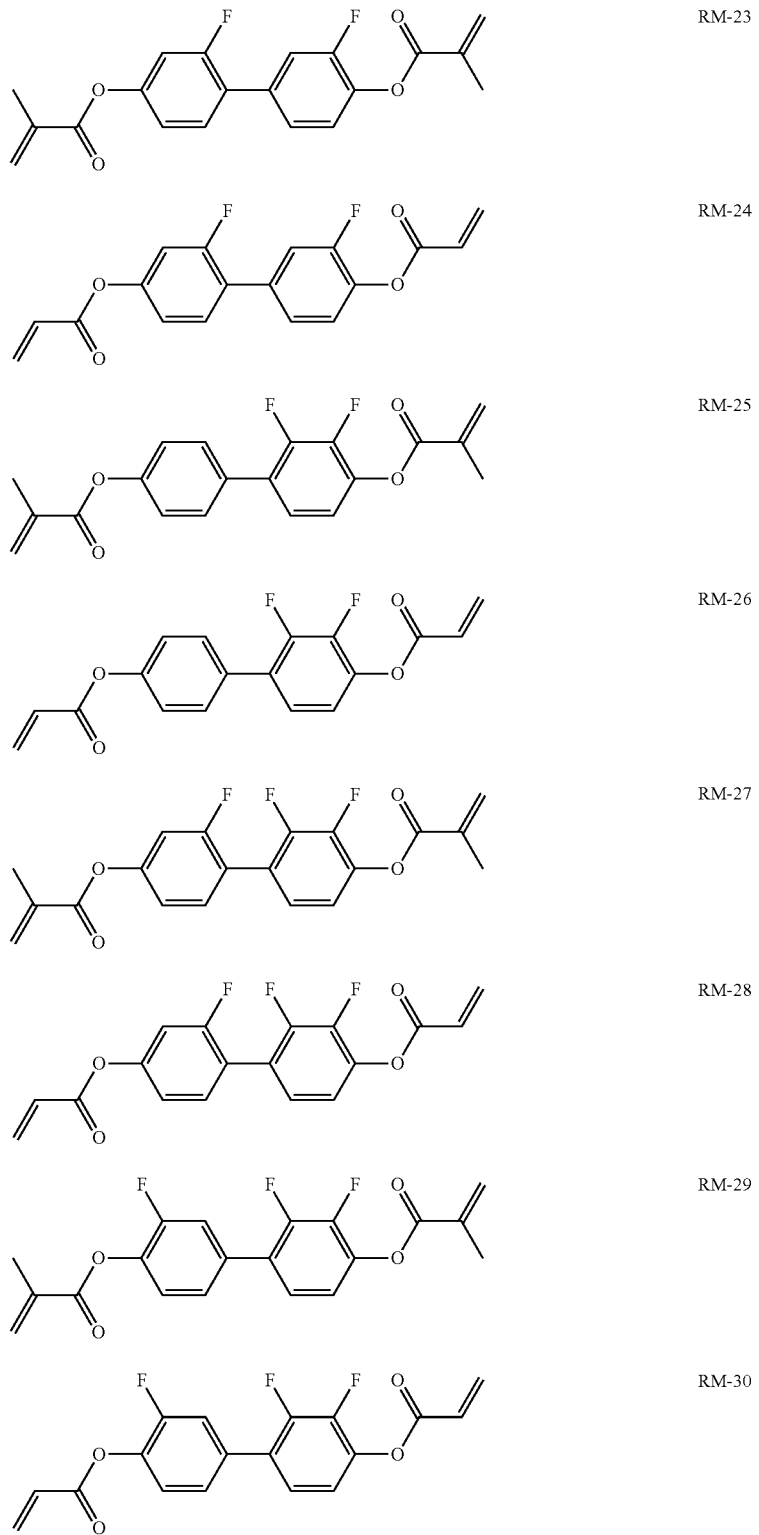

TABLE E-continued

Table E shows example compounds which can preferably be used as reactive mesogenic compounds in the LC media in accordance with the present invention. If the mixtures according to the invention comprise one or more reactive compounds, they are preferably employed in amounts of 0.01-5% by weight. It may also be necessary to add an initiator or a mixture of two or more initiators for the polymerization. The initiator or initiator mixture is preferably added in amounts of 0.001-2% by weight, based on the mixture. A suitable initiator is, for example, Irgacure (BASF) or Irganox (BASF).

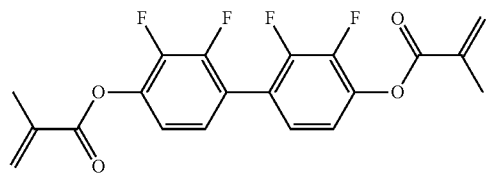 [SMILES: C=C(C)C(=O)Oc1ccc(-c2ccc(OC(=O)C(=C)C)c(F)c2F)c(F)c1F]
RM-31

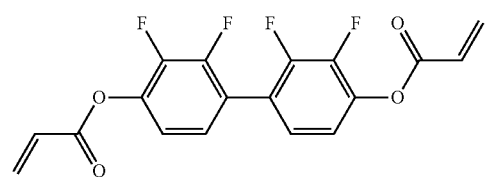 [SMILES: C=CC(=O)Oc1ccc(-c2ccc(OC(=O)C=C)c(F)c2F)c(F)c1F]
RM-32

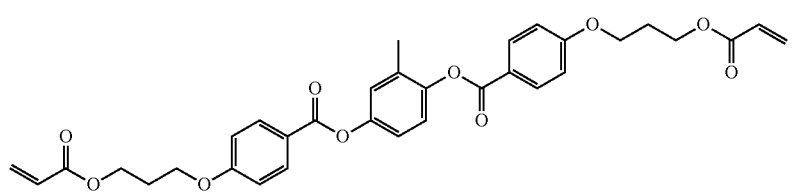 [SMILES: C=CC(=O)OCCCOc1ccc(C(=O)Oc2ccc(OC(=O)c3ccc(OCCCOC(=O)C=C)cc3)c(C)c2)cc1]
RM-33

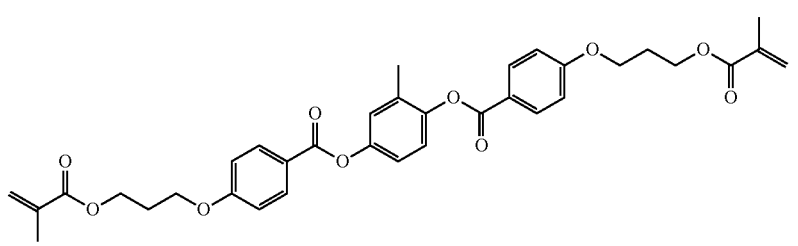 [SMILES: C=C(C)C(=O)OCCCOc1ccc(C(=O)Oc2ccc(OC(=O)c3ccc(OCCCOC(=O)C(=C)C)cc3)c(C)c2)cc1]
RM-34

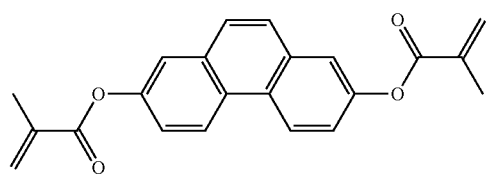 [SMILES: C=C(C)C(=O)Oc1ccc2c(ccc3cc(OC(=O)C(=C)C)ccc32)c1]
RM-35

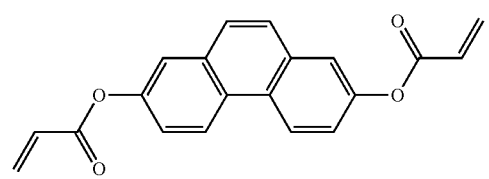 [SMILES: C=CC(=O)Oc1ccc2c(ccc3cc(OC(=O)C=C)ccc32)c1]
RM-36

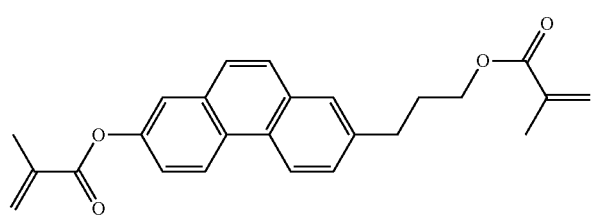 [SMILES: C=C(C)C(=O)OCCCc1ccc2c(ccc3cc(OC(=O)C(=C)C)ccc32)c1]
RM-37

TABLE E-continued

Table E shows example compounds which can preferably be used as reactive mesogenic compounds in the LC media in accordance with the present invention. If the mixtures according to the invention comprise one or more reactive compounds, they are preferably employed in amounts of 0.01-5% by weight. It may also be necessary to add an initiator or a mixture of two or more initiators for the polymerization. The initiator or initiator mixture is preferably added in amounts of 0.001-2% by weight, based on the mixture. A suitable initiator is, for example, Irgacure (BASF) or Irganox (BASF).

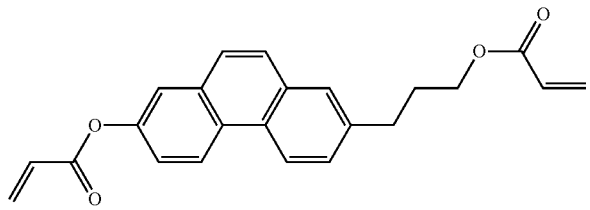 [SMILES: C=CC(=O)OCCCc1ccc2c(ccc3cc(OC(=O)C=C)ccc32)c1]

RM-38

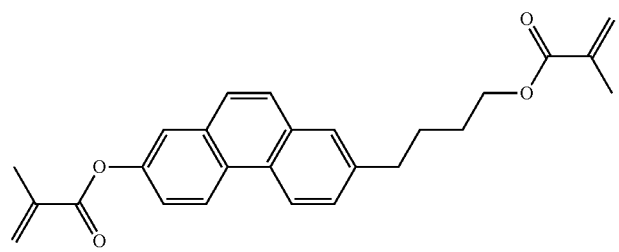 [SMILES: C=C(C)C(=O)OCCCCc1ccc2c(ccc3cc(OC(=O)C(=C)C)ccc32)c1]

RM-39

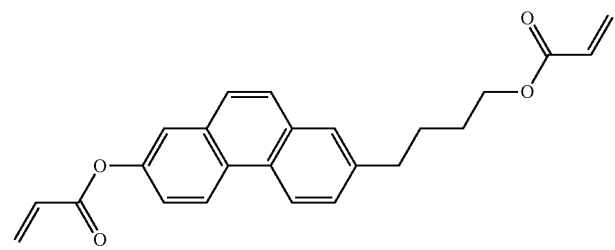 [SMILES: C=CC(=O)OCCCCc1ccc2c(ccc3cc(OC(=O)C=C)ccc32)c1]

RM-40

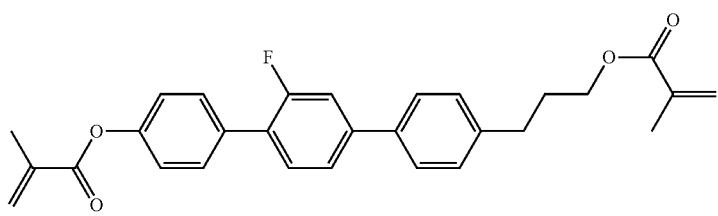 [SMILES: C=C(C)C(=O)OCCCc1ccc(-c2ccc(-c3ccc(OC(=O)C(=C)C)cc3)c(F)c2)cc1]

RM-41

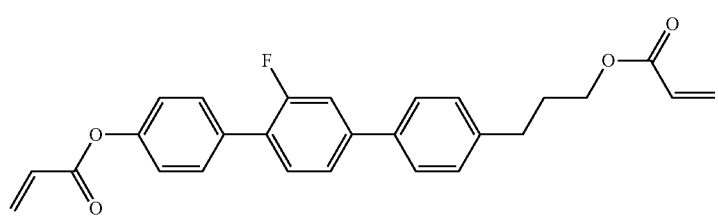 [SMILES: C=CC(=O)OCCCc1ccc(-c2ccc(-c3ccc(OC(=O)C=C)cc3)c(F)c2)cc1]

RM-42

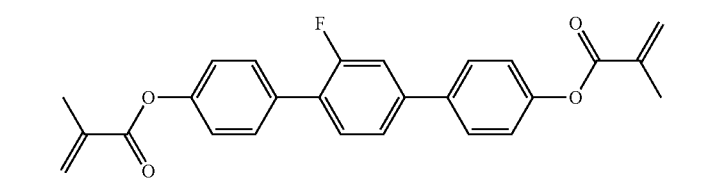 [SMILES: C=C(C)C(=O)Oc1ccc(-c2ccc(-c3ccc(OC(=O)C(=C)C)cc3)c(F)c2)cc1]

RM-43

TABLE E-continued

Table E shows example compounds which can preferably be used as reactive mesogenic compounds in the LC media in accordance with the present invention. If the mixtures according to the invention comprise one or more reactive compounds, they are preferably employed in amounts of 0.01-5% by weight. It may also be necessary to add an initiator or a mixture of two or more initiators for the polymerization. The initiator or initiator mixture is preferably added in amounts of 0.001-2% by weight, based on the mixture. A suitable initiator is, for example, Irgacure (BASF) or Irganox (BASF).

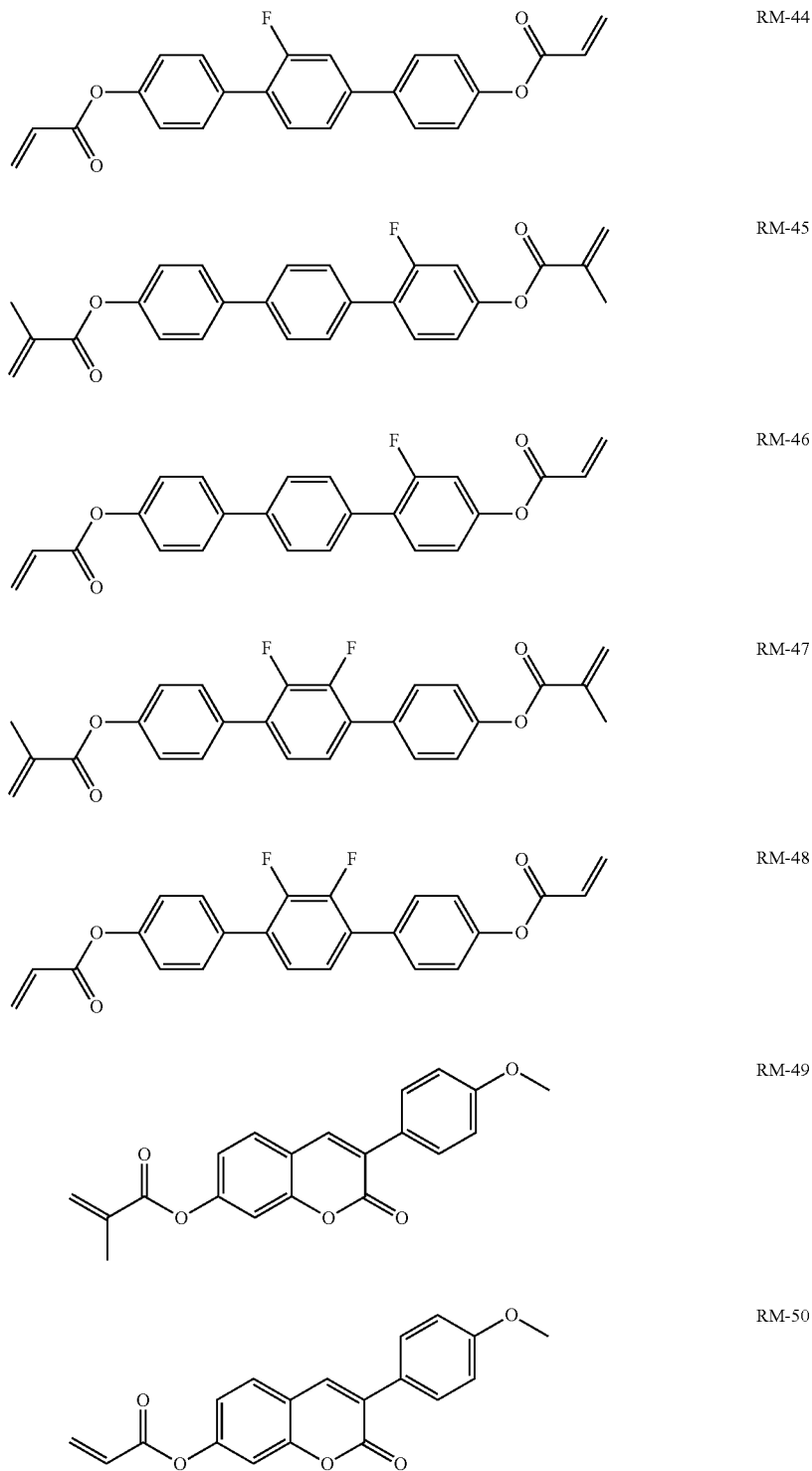

TABLE E-continued

Table E shows example compounds which can preferably be used as reactive mesogenic compounds in the LC media in accordance with the present invention. If the mixtures according to the invention comprise one or more reactive compounds, they are preferably employed in amounts of 0.01-5% by weight. It may also be necessary to add an initiator or a mixture of two or more initiators for the polymerization. The initiator or initiator mixture is preferably added in amounts of 0.001-2% by weight, based on the mixture. A suitable initiator is, for example, Irgacure (BASF) or Irganox (BASF).

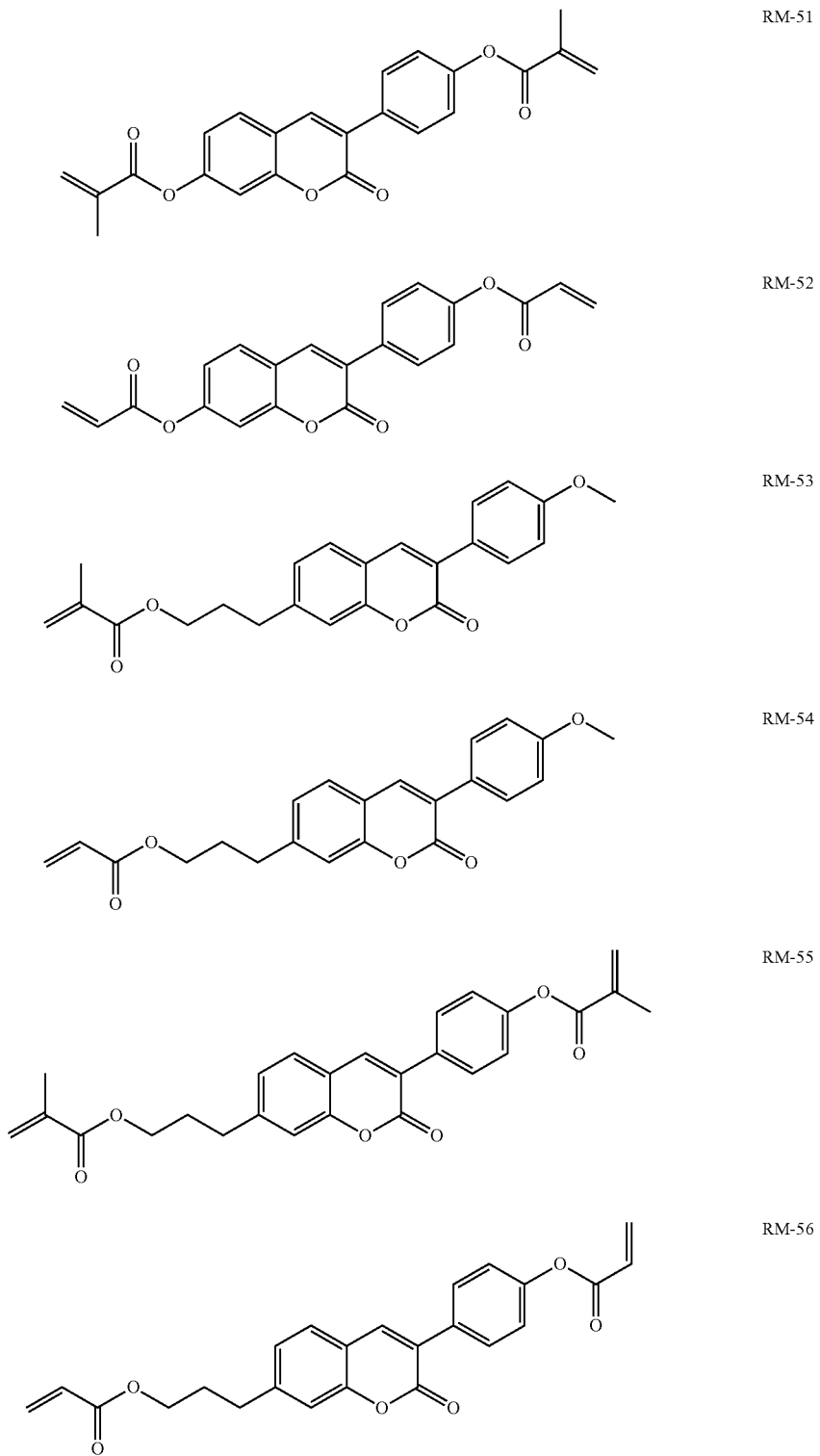

TABLE E-continued

Table E shows example compounds which can preferably be used as reactive mesogenic compounds in the LC media in accordance with the present invention. If the mixtures according to the invention comprise one or more reactive compounds, they are preferably employed in amounts of 0.01-5% by weight. It may also be necessary to add an initiator or a mixture of two or more initiators for the polymerization. The initiator or initiator mixture is preferably added in amounts of 0.001-2% by weight, based on the mixture. A suitable initiator is, for example, Irgacure (BASF) or Irganox (BASF).

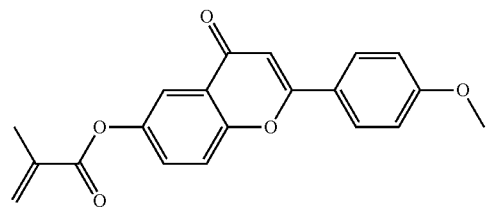 [SMILES: C=C(C)C(=O)Oc1ccc2oc(-c3ccc(OC)cc3)cc(=O)c2c1]

RM-57

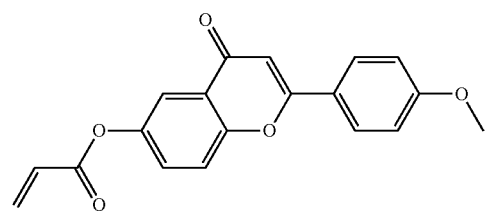

RM-58

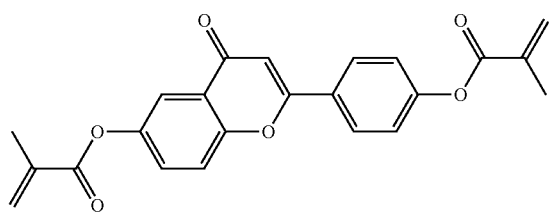 [SMILES: C=C(C)C(=O)Oc1ccc(-c2cc(=O)c3cc(OC(=O)C(=C)C)ccc3o2)cc1]

RM-59

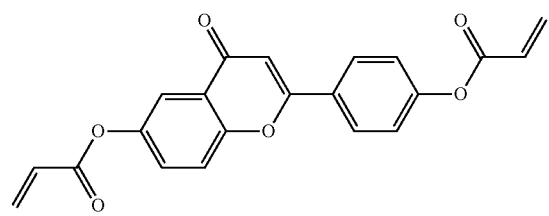 [SMILES: C=CC(=O)Oc1ccc(-c2cc(=O)c3cc(OC(=O)C=C)ccc3o2)cc1]

RM-60

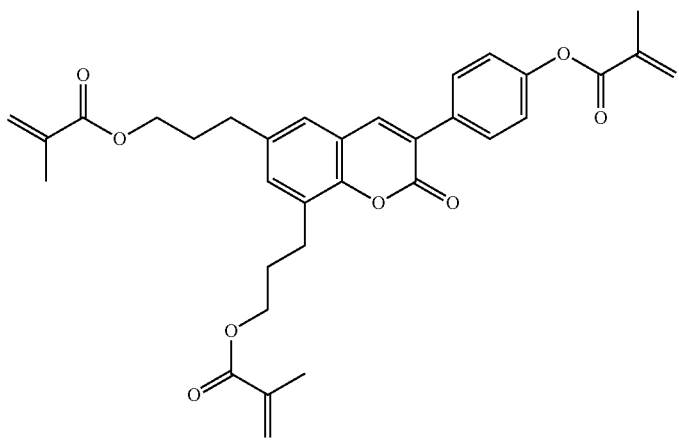 [SMILES: C=C(C)C(=O)OCCCc1cc(CCCOC(=O)C(=C)C)c2oc(=O)c(-c3ccc(OC(=O)C(=C)C)cc3)cc2c1]

RM-61

TABLE E-continued

Table E shows example compounds which can preferably be used as reactive mesogenic compounds in the LC media in accordance with the present invention. If the mixtures according to the invention comprise one or more reactive compounds, they are preferably employed in amounts of 0.01-5% by weight. It may also be necessary to add an initiator or a mixture of two or more initiators for the polymerization. The initiator or initiator mixture is preferably added in amounts of 0.001-2% by weight, based on the mixture. A suitable initiator is, for example, Irgacure (BASF) or Irganox (BASF).

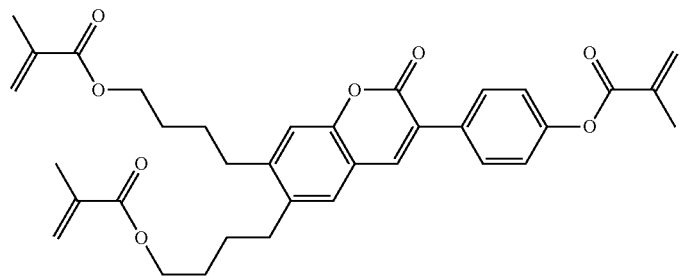 [SMILES: C=C(C)C(=O)OCCCCc1cc2cc(-c3ccc(OC(=O)C(=C)C)cc3)c(=O)oc2cc1CCCCOC(=O)C(=C)C]
RM-62

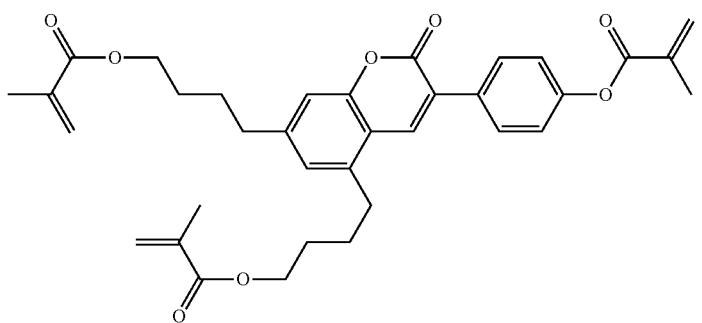 [SMILES: C=C(C)C(=O)OCCCCc1cc(CCCCOC(=O)C(=C)C)c2cc(-c3ccc(OC(=O)C(=C)C)cc3)c(=O)oc2c1]
RM-63

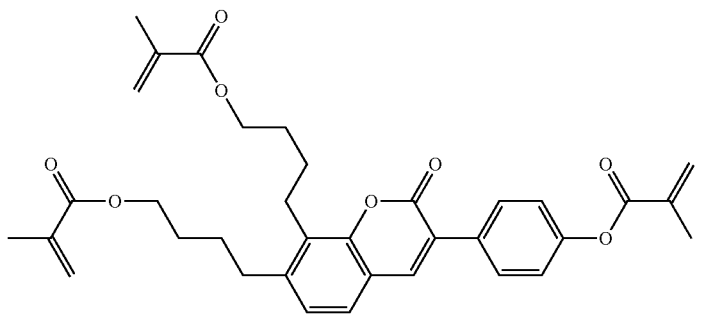 [SMILES: C=C(C)C(=O)OCCCCc1ccc2cc(-c3ccc(OC(=O)C(=C)C)cc3)c(=O)oc2c1CCCCOC(=O)C(=C)C]
RM-64

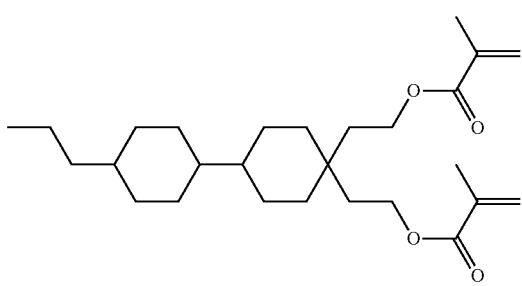 [SMILES: C=C(C)C(=O)OCCC1(CCOC(=O)C(=C)C)CCC(C2CCC(CCC)CC2)CC1]
RM-65

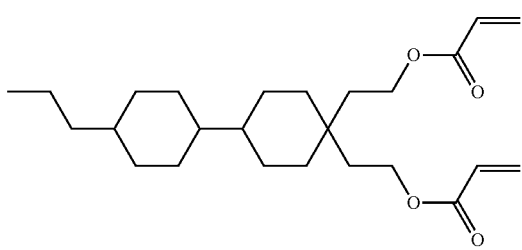 [SMILES: C=CC(=O)OCCC1(CCOC(=O)C=C)CCC(C2CCC(CCC)CC2)CC1]
RM-66

TABLE E-continued

Table E shows example compounds which can preferably be used as reactive mesogenic compounds in the LC media in accordance with the present invention. If the mixtures according to the invention comprise one or more reactive compounds, they are preferably employed in amounts of 0.01-5% by weight. It may also be necessary to add an initiator or a mixture of two or more initiators for the polymerization. The initiator or initiator mixture is preferably added in amounts of 0.001-2% by weight, based on the mixture. A suitable initiator is, for example, Irgacure (BASF) or Irganox (BASF).

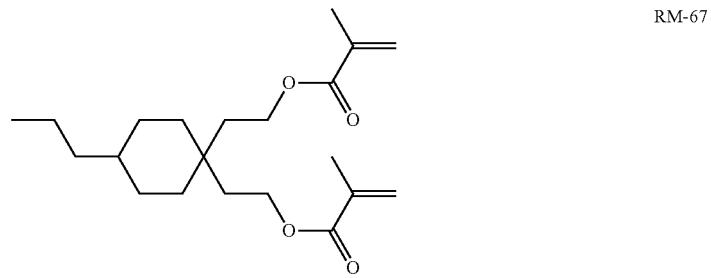

RM-67

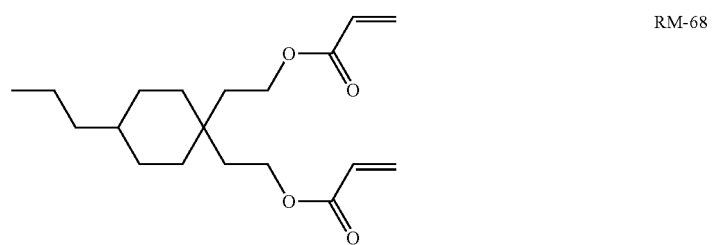

RM-68

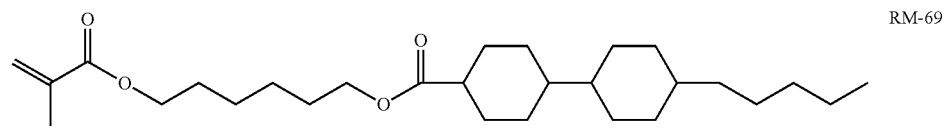

RM-69

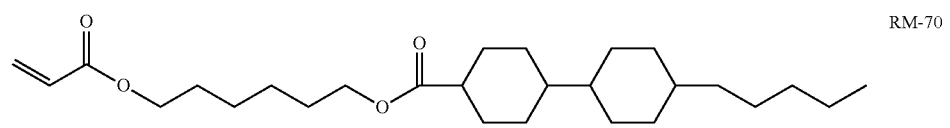

RM-70

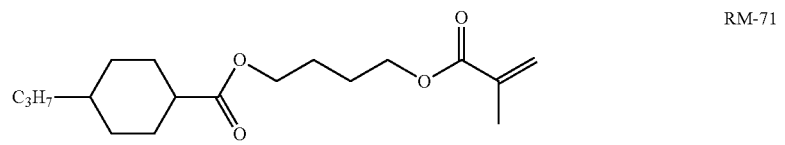

RM-71

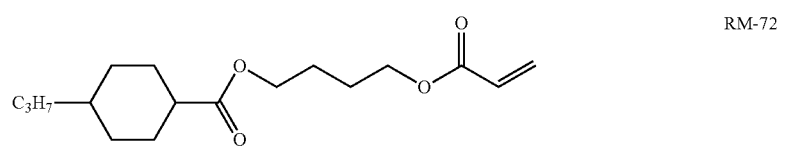

RM-72

TABLE E-continued

Table E shows example compounds which can preferably be used as reactive mesogenic compounds in the LC media in accordance with the present invention. If the mixtures according to the invention comprise one or more reactive compounds, they are preferably employed in amounts of 0.01-5% by weight. It may also be necessary to add an initiator or a mixture of two or more initiators for the polymerization. The initiator or initiator mixture is preferably added in amounts of 0.001-2% by weight, based on the mixture. A suitable initiator is, for example, Irgacure (BASF) or Irganox (BASF).

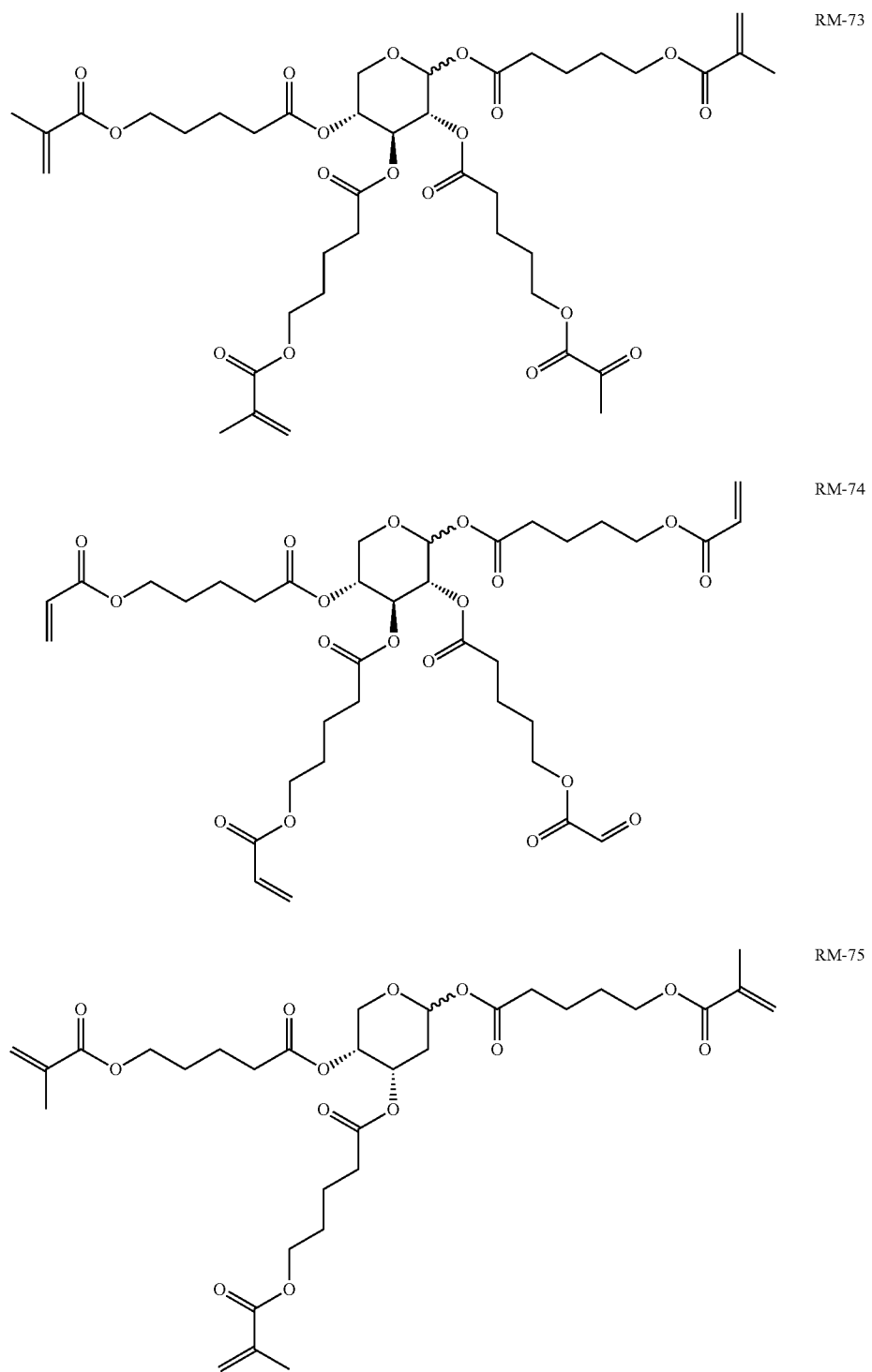

TABLE E-continued

Table E shows example compounds which can preferably be used as reactive mesogenic compounds in the LC media in accordance with the present invention. If the mixtures according to the invention comprise one or more reactive compounds, they are preferably employed in amounts of 0.01-5% by weight. It may also be necessary to add an initiator or a mixture of two or more initiators for the polymerization. The initiator or initiator mixture is preferably added in amounts of 0.001-2% by weight, based on the mixture. A suitable initiator is, for example, Irgacure (BASF) or Irganox (BASF).

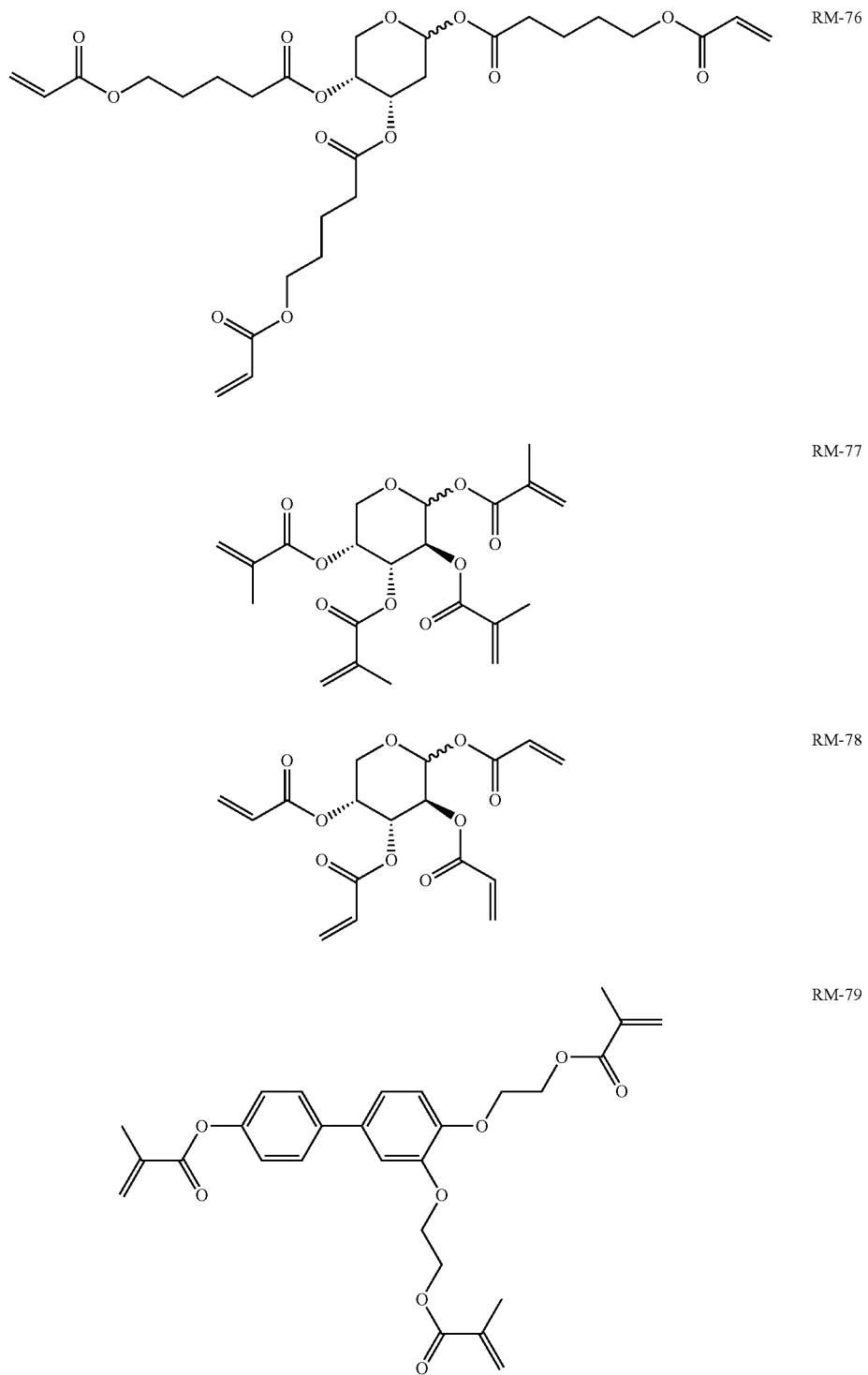

TABLE E-continued

Table E shows example compounds which can preferably be used as reactive mesogenic compounds in the LC media in accordance with the present invention. If the mixtures according to the invention comprise one or more reactive compounds, they are preferably employed in amounts of 0.01-5% by weight. It may also be necessary to add an initiator or a mixture of two or more initiators for the polymerization. The initiator or initiator mixture is preferably added in amounts of 0.001-2% by weight, based on the mixture. A suitable initiator is, for example, Irgacure (BASF) or Irganox (BASF).

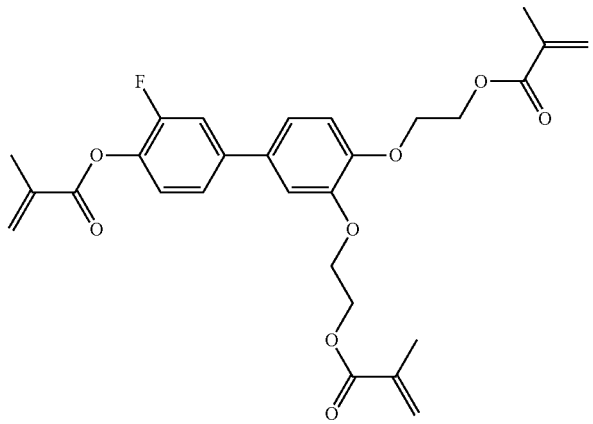 [SMILES: C=C(C)C(=O)OCCOc1ccc(-c2ccc(OC(=O)C(=C)C)c(F)c2)cc1OCCOC(=O)C(=C)C]

RM-80

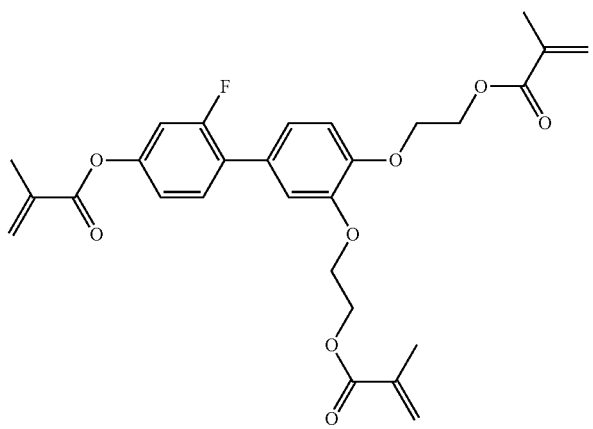 [SMILES: C=C(C)C(=O)OCCOc1ccc(-c2ccc(OC(=O)C(=C)C)cc2F)cc1OCCOC(=O)C(=C)C]

RM-81

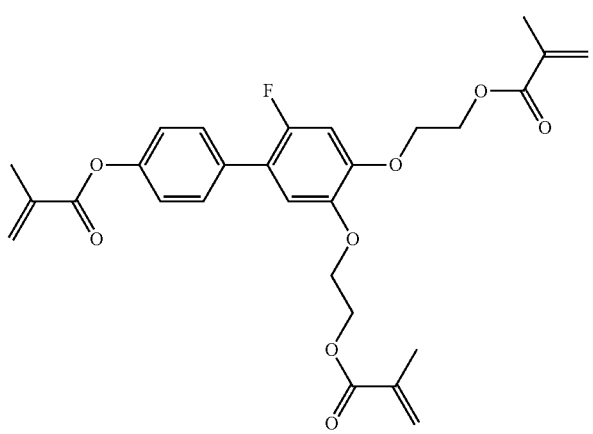 [SMILES: C=C(C)C(=O)OCCOc1cc(F)c(-c2ccc(OC(=O)C(=C)C)cc2)cc1OCCOC(=O)C(=C)C]

RM-82

TABLE E-continued

Table E shows example compounds which can preferably be used as reactive mesogenic compounds in the LC media in accordance with the present invention. If the mixtures according to the invention comprise one or more reactive compounds, they are preferably employed in amounts of 0.01-5% by weight. It may also be necessary to add an initiator or a mixture of two or more initiators for the polymerization. The initiator or initiator mixture is preferably added in amounts of 0.001-2% by weight, based on the mixture. A suitable initiator is, for example, Irgacure (BASF) or Irganox (BASF).

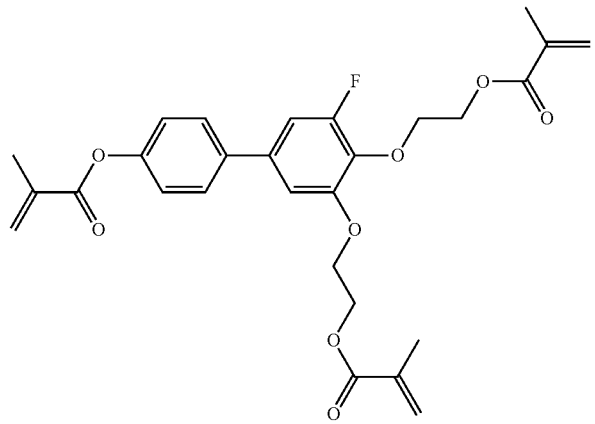 [SMILES: C=C(C)C(=O)OCCOc1cc(-c2ccc(OC(=O)C(=C)C)cc2)cc(F)c1OCCOC(=O)C(=C)C]

RM-83

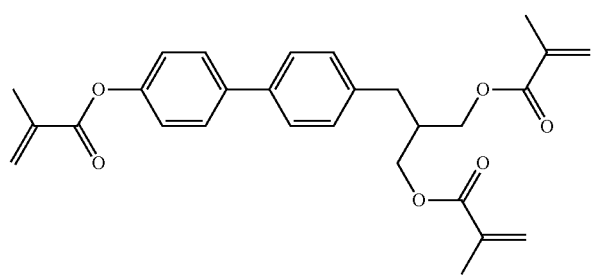 [SMILES: C=C(C)C(=O)OCC(COC(=O)C(=C)C)Cc1ccc(-c2ccc(OC(=O)C(=C)C)cc2)cc1]

RM-84

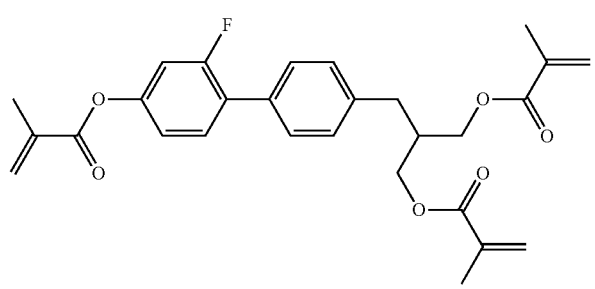 [SMILES: C=C(C)C(=O)OCC(COC(=O)C(=C)C)Cc1ccc(-c2ccc(OC(=O)C(=C)C)cc2F)cc1]

RM-85

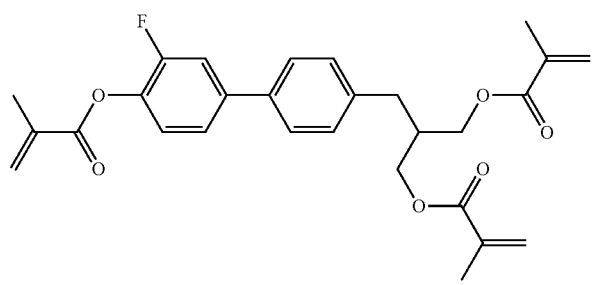 [SMILES: C=C(C)C(=O)OCC(COC(=O)C(=C)C)Cc1ccc(-c2ccc(OC(=O)C(=C)C)c(F)c2)cc1]

RM-86

TABLE E-continued

Table E shows example compounds which can preferably be used as reactive mesogenic compounds in the LC media in accordance with the present invention. If the mixtures according to the invention comprise one or more reactive compounds, they are preferably employed in amounts of 0.01-5% by weight. It may also be necessary to add an initiator or a mixture of two or more initiators for the polymerization. The initiator or initiator mixture is preferably added in amounts of 0.001-2% by weight, based on the mixture. A suitable initiator is, for example, Irgacure (BASF) or Irganox (BASF).

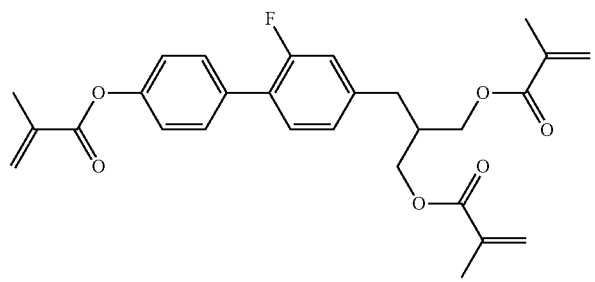

RM-87

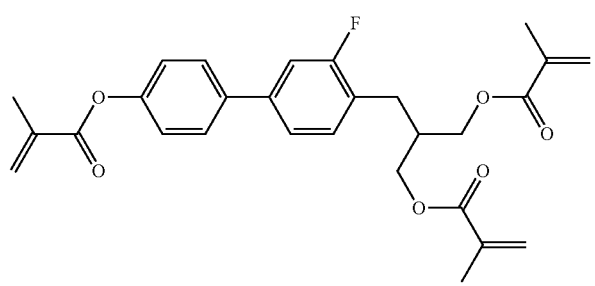 [SMILES: C=C(C)C(=O)OCC(COC(=O)C(=C)C)Cc1ccc(-c2ccc(OC(=O)C(=C)C)cc2)cc1F]

RM-88

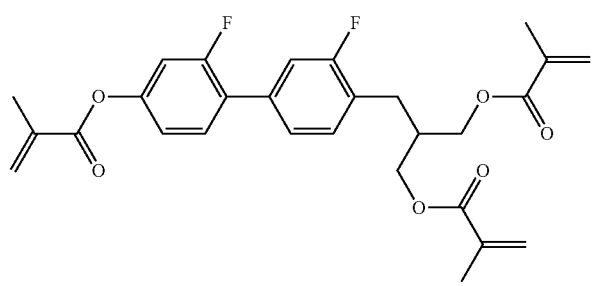 [SMILES: C=C(C)C(=O)OCC(COC(=O)C(=C)C)Cc1ccc(-c2ccc(OC(=O)C(=C)C)cc2F)cc1F]

RM-89

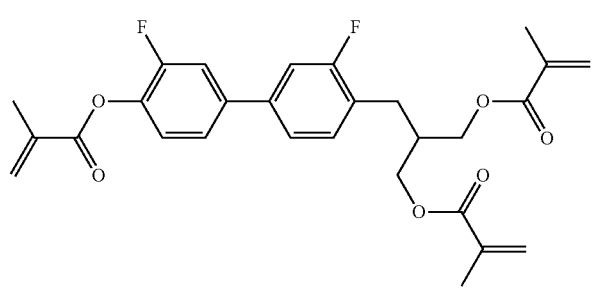

RM-90

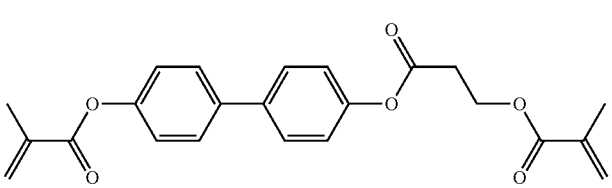 [SMILES: C=C(C)C(=O)OCCC(=O)Oc1ccc(-c2ccc(OC(=O)C(=C)C)cc2F)cc1]

RM-91

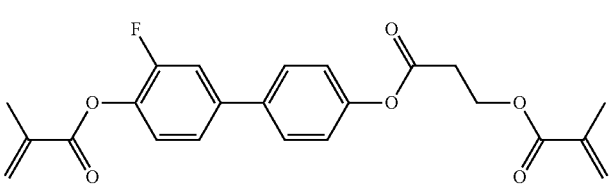

RM-92

TABLE E-continued

Table E shows example compounds which can preferably be used as reactive mesogenic compounds in the LC media in accordance with the present invention. If the mixtures according to the invention comprise one or more reactive compounds, they are preferably employed in amounts of 0.01-5% by weight. It may also be necessary to add an initiator or a mixture of two or more initiators for the polymerization. The initiator or initiator mixture is preferably added in amounts of 0.001-2% by weight, based on the mixture. A suitable initiator is, for example, Irgacure (BASF) or Irganox (BASF).

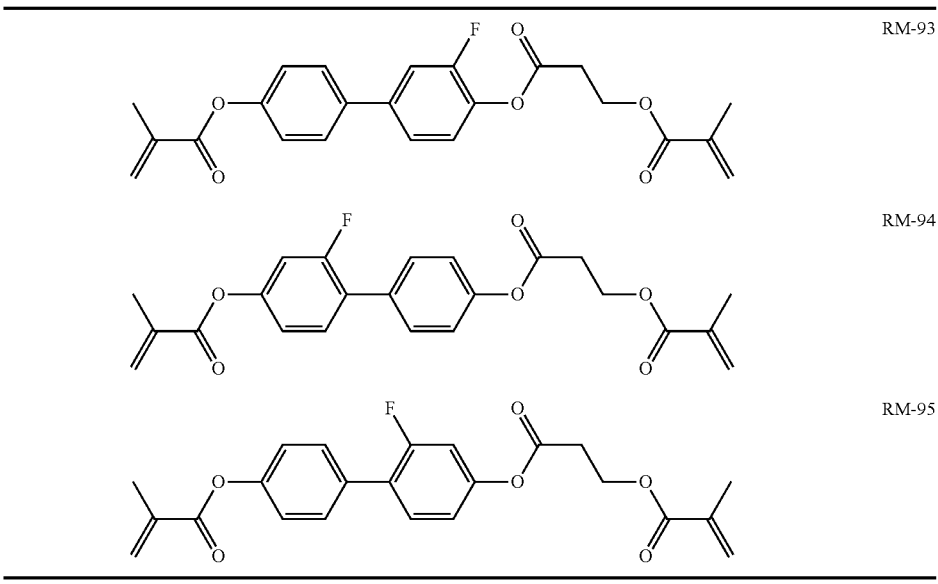

RM-93

RM-94

RM-95

In a preferred embodiment, the mixtures according to the invention comprise one or more polymerizable compounds, preferably selected from the polymerizable compounds of the formulae RM-1 to RM-95. Media of this type are suitable, in particular, for PS-VA, PSA, SS-VA, SA-VA, PS-FFS and PS-IPS applications. Of the reactive mesogens shown in Table E, compounds RM-1, RM-2, RM-3, RM-4, RM-5, RM-9, RM-17, RM-35, RM41, RM-61, RM-79, RM-80 and RM-91 are particularly preferred.

WORKING EXAMPLES

The following examples are intended to explain the invention without limiting it. In the examples, m.p. denotes the melting point and C denotes the clearing point of a liquid-crystalline substance in degrees Celsius; boiling temperatures are denoted by b.p. Furthermore: C denotes crystalline solid state, S denotes smectic phase (the index denotes the phase type), N denotes nematic state, Ch denotes cholesteric phase, I denotes isotropic phase, $T_g$ denotes glass-transition temperature. The number between two symbols indicates the conversion temperature in degrees Celsius.

The host mixture used for determination of the optical anisotropy Δn of the compounds of the formula I is the commercial mixture ZLI-4792 (Merck KGaA). The dielectric anisotropy Δ∈ is determined using commercial mixture ZLI-2857. The physical data of the compound to be investigated are obtained from the change in the dielectric constants of the host mixture after addition of the compound to be investigated and extrapolation to 100% of the compound employed. In general, 10% of the compound to be investigated are dissolved in the host mixture, depending on the solubility.

Unless indicated otherwise, parts or percent data denote parts by weight or percent by weight.

The compounds of the formula

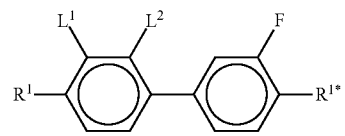

indicated below are prepared in accordance with Schemes 10-18:

| $R^1$ | $R^{1*}$ | $L^1$ | $L^2$ | |
|---|---|---|---|---|
| CH$_3$O | OCH$_3$ | F | F | C 139 I |
| CH$_3$O | OC$_2$H$_5$ | F | F | C 77 I; Δn = 0.1806; Δε = −10.2; γ$_1$ = 141 |
| CH$_3$O | OC$_3$H$_7$ | F | F | C 84 I; Δn = 0.1649; Δε = −8.3; γ$_1$ = 186 |
| CH$_3$O | OC$_4$H$_9$ | F | F | |
| CH$_3$O | OC$_5$H$_{11}$ | F | F | |
| CH$_3$O | OC$_6$H$_{13}$ | F | F | |
| CH$_3$O | OCH$_3$ | F | Cl | |
| CH$_3$O | OC$_2$H$_5$ | F | Cl | |
| CH$_3$O | OC$_3$H$_7$ | F | Cl | |
| CH$_3$O | OC$_4$H$_9$ | F | Cl | |
| CH$_3$O | OC$_5$H$_{11}$ | F | Cl | |
| CH$_3$O | OC$_6$H$_{13}$ | F | Cl | |
| CH$_3$O | OCH$_3$ | Cl | F | |
| CH$_3$O | OC$_2$H$_5$ | Cl | F | |
| CH$_3$O | OC$_3$H$_7$ | Cl | F | |
| CH$_3$O | OC$_4$H$_9$ | Cl | F | |
| CH$_3$O | OC$_5$H$_{11}$ | Cl | F | |
| CH$_3$O | OC$_6$H$_{13}$ | Cl | F | |
| C$_2$H$_5$O | OCH$_3$ | F | F | C 81 I; Δn = 0.1748; Δε = −9.8; γ$_1$ = 164 |
| C$_2$H$_5$O | OC$_2$H$_5$ | F | F | C 81 I; Δn = 0.1772; Δε = −9.0; γ$_1$ = 148 |
| C$_2$H$_5$O | OC$_3$H$_7$ | F | F | C 67 I; Δn = 0.1672; Δε = −9.4; γ$_1$ = 165 |
| C$_2$H$_5$O | OC$_4$H$_9$ | F | F | C 50 I; Δn = 0.1630; Δε = −9.2; γ$_1$ = 160 |
| C$_2$H$_5$O | OC$_5$H$_{11}$ | F | F | C 47 I; Δn = 0.1613; Δε = −8.8; γ$_1$ = 163 |
| C$_2$H$_5$O | OC$_6$H$_{13}$ | F | F | C 42 I; Δn = 0.1601; Δε = −8.7; γ$_1$ = 185 |
| C$_2$H$_5$O | OCH$_3$ | F | Cl | |
| C$_2$H$_5$O | OC$_2$H$_5$ | F | Cl | |

-continued

| R¹ | R¹* | L¹ | L² | |
|---|---|---|---|---|
| C₂H₅O | OC₃H₇ | F | Cl | |
| C₂H₅O | OC₄H₉ | F | Cl | |
| C₂H₅O | OC₅H₁₁ | F | Cl | |
| C₂H₅O | OC₆H₁₃ | F | Cl | |
| C₂H₅O | OCH₃ | Cl | F | |
| C₂H₅O | OC₂H₅ | Cl | F | |
| C₂H₅O | OC₃H₇ | Cl | F | |
| C₂H₅O | OC₄H₉ | Cl | F | |
| C₂H₅O | OC₅H₁₁ | Cl | F | |
| C₂H₅O | OC₆H₁₃ | Cl | F | |
| C₃H₇O | OCH₃ | F | F | C 89 I; Δn = 0.1689; Δε = −8.2; γ₁ = 174 |
| C₃H₇O | OC₂H₅ | F | F | C 54 I; Δn = 0.1709; Δε = −9.1; γ₁ = 158 |
| C₃H₇O | OC₃H₇ | F | F | C 70 I; Δn = 0.1607; Δε = −7.6; γ₁ = 158 |
| C₃H₇O | OC₄H₉ | F | F | C 47 I; Δn = 0.1640; Δε = −8.5; γ₁ = 126 |
| C₃H₇O | OC₅H₁₁ | F | F | |
| C₃H₇O | OC₆H₁₃ | F | F | |
| C₃H₇O | OCH₃ | Cl | F | |
| C₃H₇O | OC₂H₅ | Cl | F | |
| C₃H₇O | OC₃H₇ | Cl | F | |
| C₃H₇O | OC₄H₉ | Cl | F | |
| C₃H₇O | OC₅H₁₁ | Cl | F | |
| C₃H₇O | OC₆H₁₃ | Cl | F | |
| C₃H₇O | OCH₃ | F | Cl | |
| C₃H₇O | OC₂H₅ | F | Cl | |
| C₃H₇O | OC₃H₇ | F | Cl | |
| C₃H₇O | OC₄H₉ | F | Cl | |
| C₃H₇O | OC₅H₁₁ | F | Cl | |
| C₃H₇O | OC₆H₁₃ | F | Cl | |
| C₄H₉O | OCH₃ | F | F | |
| C₄H₉O | OC₂H₅ | F | F | C 45 N (24) I; Δn = 0.1649; Δε = −10.2; γ₁ = 132 |
| C₄H₉O | OC₃H₇ | F | F | C 50 I; Δn = 0.1671; Δε = −9.2; γ₁ = 131 |
| C₄H₉O | OC₄H₉ | F | F | C 47 I; Δn = 0.1589; Δε = −9.1; γ₁ = 134 |
| C₄H₉O | OC₅H₁₁ | F | F | |
| C₄H₉O | OC₆H₁₃ | F | F | |
| C₄H₉O | OCH₃ | Cl | F | |
| C₄H₉O | OC₂H₅ | Cl | F | |
| C₄H₉O | OC₃H₇ | Cl | F | |
| C₄H₉O | OC₄H₉ | Cl | F | |
| C₄H₉O | OC₅H₁₁ | Cl | F | |
| C₄H₉O | OC₆H₁₃ | Cl | F | |
| C₄H₉O | OCH₃ | F | Cl | |
| C₄H₉O | OC₂H₅ | F | Cl | |
| C₄H₉O | OC₃H₇ | F | Cl | |
| C₄H₉O | OC₄H₉ | F | Cl | |
| C₄H₉O | OC₅H₁₁ | F | Cl | |
| C₄H₉O | OC₆H₁₃ | F | Cl | |
| C₅H₁₁O | OCH₃ | F | F | |
| C₅H₁₁O | OC₂H₅ | F | F | C 36 S$_B$ (19) N (19) I; Δn = 0.1625; Δε = −9.5; γ₁ = 135 |
| C₅H₁₁O | OC₃H₇ | F | F | C 43 I; Δn = 0.1540; Δε = −9.2; γ₁ = 132 |
| C₅H₁₁O | OC₄H₉ | F | F | C 39 I; Δn = 0.1486; Δε = −8.6; γ₁ = 136 |
| C₅H₁₁O | OC₅H₁₁ | F | F | |
| C₅H₁₁O | OC₆H₁₃ | F | F | |
| C₅H₁₁O | OCH₃ | Cl | F | |
| C₅H₁₁O | OC₂H₅ | Cl | F | |
| C₅H₁₁O | OC₃H₇ | Cl | F | |
| C₅H₁₁O | OC₄H₉ | Cl | F | |
| C₅H₁₁O | OC₅H₁₁ | Cl | F | |
| C₅H₁₁O | OC₆H₁₃ | Cl | F | |
| C₅H₁₁O | OCH₃ | F | Cl | |
| C₅H₁₁O | OC₂H₅ | F | Cl | |
| C₅H₁₁O | OC₃H₇ | F | Cl | |
| C₅H₁₁O | OC₄H₉ | F | Cl | |
| C₅H₁₁O | OC₅H₁₁ | F | Cl | |
| C₅H₁₁O | OC₆H₁₃ | F | Cl | |
| C₆H₁₃O | OCH₃ | F | F | |
| C₆H₁₃O | OC₂H₅ | F | F | |
| C₆H₁₃O | OC₃H₇ | F | F | |
| C₆H₁₃O | OC₄H₉ | F | F | |
| C₆H₁₃O | OC₅H₁₁ | F | F | |
| C₆H₁₃O | OC₆H₁₃ | F | F | |
| C₆H₁₃O | OCH₃ | Cl | F | |
| C₆H₁₃O | OC₂H₅ | Cl | F | |
| C₆H₁₃O | OC₃H₇ | Cl | F | |
| C₆H₁₃O | OC₄H₉ | Cl | F | |
| C₆H₁₃O | OC₅H₁₁ | Cl | F | |
| C₆H₁₃O | OC₆H₁₃ | Cl | F | |
| C₆H₁₃O | OCH₃ | F | Cl | |
| C₆H₁₃O | OC₂H₅ | F | Cl | |
| C₆H₁₃O | OC₃H₇ | F | Cl | |
| C₆H₁₃O | OC₄H₉ | F | Cl | |
| C₆H₁₃O | OC₅H₁₁ | F | Cl | |
| C₆H₁₃O | OC₆H₁₃ | F | Cl | |

The following compounds of the formula

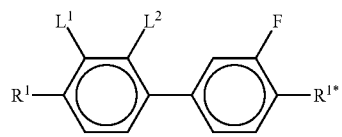

are prepared analogously:

| R¹ | R¹* | L¹ | L² | |
|---|---|---|---|---|
| CH₃ | CH₃ | F | F | C 49 I; Δn = 0.1679; Δε = −3.3; γ₁ = 38 |
| CH₃ | C₂H₅ | F | F | |
| CH₃ | C₃H₇ | F | F | |
| CH₃ | C₄H₉ | F | F | |
| CH₃ | C₅H₁₁ | F | F | |
| CH₃ | C₆H₁₃ | F | F | |
| CH₃ | CH₃ | F | Cl | |
| CH₃ | C₂H₅ | F | Cl | |
| CH₃ | C₃H₇ | F | Cl | |
| CH₃ | C₄H₉ | F | Cl | |
| CH₃ | C₅H₁₁ | F | Cl | |
| CH₃ | C₆H₁₃ | F | Cl | |
| CH₃ | CH₃ | Cl | F | |
| CH₃ | C₂H₅ | Cl | F | |
| CH₃ | C₃H₇ | Cl | F | |
| CH₃ | C₄H₉ | Cl | F | |
| CH₃ | C₅H₁₁ | Cl | F | |
| CH₃ | C₆H₁₃ | Cl | F | |
| C₂H₅ | CH₃ | F | F | |
| C₂H₅ | C₂H₅ | F | F | |
| C₂H₅ | C₃H₇ | F | F | |
| C₂H₅ | C₄H₉ | F | F | |
| C₂H₅ | C₅H₁₁ | F | F | |
| C₂H₅ | C₆H₁₃ | F | F | |
| C₂H₅ | CH₃ | F | Cl | |
| C₂H₅ | C₂H₅ | F | Cl | |
| C₂H₅ | C₃H₇ | F | Cl | |
| C₂H₅ | C₄H₉ | F | Cl | |
| C₂H₅ | C₅H₁₁ | F | Cl | |
| C₂H₅ | C₆H₁₃ | F | Cl | |
| C₂H₅ | CH₃ | Cl | F | |
| C₂H₅ | C₂H₅ | Cl | F | |
| C₂H₅ | C₃H₇ | Cl | F | |
| C₂H₅ | C₄H₉ | Cl | F | |
| C₂H₅ | C₅H₁₁ | Cl | F | |
| C₂H₅ | C₆H₁₃ | Cl | F | |
| C₃H₇ | CH₃ | F | F | |
| C₃H₇ | C₂H₅ | F | F | |
| C₃H₇ | C₃H₇ | F | F | |
| C₃H₇ | C₄H₉ | F | F | |
| C₃H₇ | C₅H₁₁ | F | F | |
| C₃H₇ | C₆H₁₃ | F | F | |
| C₃H₇ | CH₃ | Cl | F | |
| C₃H₇ | C₂H₅ | Cl | F | |
| C₃H₇ | C₃H₇ | Cl | F | |
| C₃H₇ | C₄H₉ | Cl | F | |
| C₃H₇ | C₅H₁₁ | Cl | F | |
| C₃H₇ | C₆H₁₃ | Cl | F | |
| C₃H₇ | CH₃ | F | Cl | |
| C₃H₇ | C₂H₅ | F | Cl | |
| C₃H₇ | C₃H₇ | F | Cl | |

-continued

| R¹ | R¹* | L¹ | L² |
|---|---|---|---|
| C₃H₇ | C₄H₉ | F | Cl |
| C₃H₇ | C₅H₁₁ | F | Cl |
| C₃H₇ | C₆H₁₃ | F | Cl |
| C₄H₉ | CH₃ | F | F |
| C₄H₉ | C₂H₅ | F | F |
| C₄H₉ | C₃H₇ | F | F |
| C₄H₉ | C₄H₉ | F | F |
| C₄H₉ | C₅H₁₁ | F | F |
| C₄H₉ | C₆H₁₃ | F | F |
| C₄H₉ | CH₃ | Cl | F |
| C₄H₉ | C₂H₅ | Cl | F |
| C₄H₉ | C₃H₇ | Cl | F |
| C₄H₉ | C₄H₉ | Cl | F |
| C₄H₉ | C₅H₁₁ | Cl | F |
| C₄H₉ | C₆H₁₃ | Cl | F |
| C₄H₉ | CH₃ | F | Cl |
| C₄H₉ | C₂H₅ | F | Cl |
| C₄H₉ | C₃H₇ | F | Cl |
| C₄H₉ | C₄H₉ | F | Cl |
| C₄H₉ | C₅H₁₁ | F | Cl |
| C₄H₉ | C₆H₁₃ | F | Cl |
| C₅H₁₁ | CH₃ | F | F |
| C₅H₁₁ | C₂H₅ | F | F |
| C₅H₁₁ | C₃H₇ | F | F |
| C₅H₁₁ | C₄H₉ | F | F |
| C₅H₁₁ | C₅H₁₁ | F | F |
| C₅H₁₁ | C₆H₁₃ | F | F |
| C₅H₁₁ | CH₃ | Cl | F |
| C₅H₁₁ | C₂H₅ | Cl | F |
| C₅H₁₁ | C₃H₇ | Cl | F |
| C₅H₁₁ | C₄H₉ | Cl | F |
| C₅H₁₁ | C₅H₁₁ | Cl | F |
| C₅H₁₁ | C₆H₁₃ | Cl | F |
| C₅H₁₁ | CH₃ | F | Cl |
| C₅H₁₁ | C₂H₅ | F | Cl |
| C₅H₁₁ | C₃H₇ | F | Cl |
| C₅H₁₁ | C₄H₉ | F | Cl |
| C₅H₁₁ | C₅H₁₁ | F | Cl |
| C₅H₁₁ | C₆H₁₃ | F | Cl |
| C₆H₁₃ | CH₃ | F | F |
| C₆H₁₃ | C₂H₅ | F | F |
| C₆H₁₃ | C₃H₇ | F | F |
| C₆H₁₃ | C₄H₉ | F | F |
| C₆H₁₃ | C₅H₁₁ | F | F |
| C₆H₁₃ | C₆H₁₃ | F | F |
| C₆H₁₃ | CH₃ | Cl | F |
| C₆H₁₃ | C₂H₅ | Cl | F |
| C₆H₁₃ | C₃H₇ | Cl | F |
| C₆H₁₃ | C₄H₉ | Cl | F |
| C₆H₁₃ | C₅H₁₁ | Cl | F |
| C₆H₁₃ | C₆H₁₃ | Cl | F |
| C₆H₁₃ | CH₃ | F | Cl |
| C₆H₁₃ | C₂H₅ | F | Cl |
| C₆H₁₃ | C₃H₇ | F | Cl |
| C₆H₁₃ | C₄H₉ | F | Cl |
| C₆H₁₃ | C₅H₁₁ | F | Cl |
| C₆H₁₃ | C₆H₁₃ | F | Cl |

The following compounds of the formula

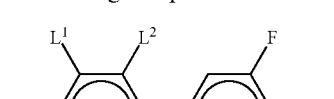

are prepared analogously:

| R¹ | R¹* | L¹ | L² | |
|---|---|---|---|---|
| CH₃ | OCH₃ | F | F | |
| CH₃ | OC₂H₅ | F | F | C 59 I; $\Delta n = 0.1770$; $\Delta\varepsilon = -5.4$; $\gamma_1 = 89$ |
| CH₃ | OC₃H₇ | F | F | |
| CH₃ | OC₄H₉ | F | F | C 40 I; $\Delta n = 0.1643$; $\Delta\varepsilon = -5.4$; $\gamma_1 = 110$ |
| CH₃ | OC₅H₁₁ | F | F | |
| CH₃ | OC₆H₁₃ | F | F | |
| CH₃ | OCH₃ | F | Cl | |
| CH₃ | OC₂H₅ | F | Cl | |
| CH₃ | OC₃H₇ | F | Cl | |
| CH₃ | OC₄H₉ | F | Cl | |
| CH₃ | OC₅H₁₁ | F | Cl | |
| CH₃ | OC₆H₁₃ | F | Cl | |
| CH₃ | OCH₃ | Cl | F | |
| CH₃ | OC₂H₅ | Cl | F | |
| CH₃ | OC₃H₇ | Cl | F | |
| CH₃ | OC₄H₉ | Cl | F | |
| CH₃ | OC₅H₁₁ | Cl | F | |
| CH₃ | OC₆H₁₃ | Cl | F | |
| C₂H₅ | OCH₃ | F | F | |
| C₂H₅ | OC₂H₅ | F | F | C 15 I; $\Delta n = 0.1674$; $\Delta\varepsilon = -5.5$; $\gamma_1 = 85$ |
| C₂H₅ | OC₃H₇ | F | F | |
| C₂H₅ | OC₄H₉ | F | F | $T_G$ $-70$ C 3 I; $\Delta n = 0.1513$; $\Delta\varepsilon = -5.2$; $\gamma_1 = 95$ |
| C₂H₅ | OC₅H₁₁ | F | F | |
| C₂H₅ | OC₆H₁₃ | F | F | |
| C₂H₅ | OCH₃ | F | Cl | |
| C₂H₅ | OC₂H₅ | F | Cl | |
| C₂H₅ | OC₃H₇ | F | Cl | |
| C₂H₅ | OC₄H₉ | F | Cl | |
| C₂H₅ | OC₅H₁₁ | F | Cl | |
| C₂H₅ | OC₆H₁₃ | F | Cl | |
| C₂H₅ | OCH₃ | Cl | F | |
| C₂H₅ | OC₂H₅ | Cl | F | |
| C₂H₅ | OC₃H₇ | Cl | F | |
| C₂H₅ | OC₄H₉ | Cl | F | |
| C₂H₅ | OC₅H₁₁ | Cl | F | |
| C₂H₅ | OC₆H₁₃ | Cl | F | |
| C₃H₇ | OCH₃ | F | F | |
| C₃H₇ | OC₂H₅ | F | F | |
| C₃H₇ | OC₃H₇ | F | F | |
| C₃H₇ | OC₄H₉ | F | F | |
| C₃H₇ | OC₅H₁₁ | F | F | |
| C₃H₇ | OC₆H₁₃ | F | F | |
| C₃H₇ | OCH₃ | Cl | F | |
| C₃H₇ | OC₂H₅ | Cl | F | |
| C₃H₇ | OC₃H₇ | Cl | F | |
| C₃H₇ | OC₄H₉ | Cl | F | |
| C₃H₇ | OC₅H₁₁ | Cl | F | |
| C₃H₇ | OC₆H₁₃ | Cl | F | |
| C₃H₇ | OCH₃ | F | Cl | |
| C₃H₇ | OC₂H₅ | F | Cl | |
| C₃H₇ | OC₃H₇ | F | Cl | |
| C₃H₇ | OC₄H₉ | F | Cl | |
| C₃H₇ | OC₅H₁₁ | F | Cl | |
| C₃H₇ | OC₆H₁₃ | F | Cl | |
| C₄H₉ | OCH₃ | F | F | |
| C₄H₉ | OC₂H₅ | F | F | |
| C₄H₉ | OC₃H₇ | F | F | |
| C₄H₉ | OC₄H₉ | F | F | |
| C₄H₉ | OC₅H₁₁ | F | F | |
| C₄H₉ | OC₆H₁₃ | F | F | |
| C₄H₉ | OCH₃ | Cl | F | |
| C₄H₉ | OC₂H₅ | Cl | F | |
| C₄H₉ | OC₃H₇ | Cl | F | |
| C₄H₉ | OC₄H₉ | Cl | F | |
| C₄H₉ | OC₅H₁₁ | Cl | F | |
| C₄H₉ | OC₆H₁₃ | Cl | F | |
| C₄H₉ | OCH₃ | F | Cl | |
| C₄H₉ | OC₂H₅ | F | Cl | |
| C₄H₉ | OC₃H₇ | F | Cl | |
| C₄H₉ | OC₄H₉ | F | Cl | |
| C₄H₉ | OC₅H₁₁ | F | Cl | |
| C₄H₉ | OC₆H₁₃ | F | Cl | |
| C₅H₁₁ | OCH₃ | F | F | |
| C₅H₁₁ | OC₂H₅ | F | F | |
| C₅H₁₁ | OC₃H₇ | F | F | |
| C₅H₁₁ | OC₄H₉ | F | F | |
| C₅H₁₁ | OC₅H₁₁ | F | F | |
| C₅H₁₁ | OC₆H₁₃ | F | F | |
| C₅H₁₁ | OCH₃ | Cl | F | |
| C₅H₁₁ | OC₂H₅ | Cl | F | |

| R¹ | R¹* | L¹ | L² |
|---|---|---|---|
| C₅H₁₁ | OC₃H₇ | Cl | F |
| C₅H₁₁ | OC₄H₉ | Cl | F |
| C₅H₁₁ | OC₅H₁₁ | Cl | F |
| C₅H₁₁ | OC₆H₁₃ | Cl | F |
| C₅H₁₁ | OCH₃ | F | Cl |
| C₅H₁₁ | OC₂H₅ | F | Cl |
| C₅H₁₁ | OC₃H₇ | F | Cl |
| C₅H₁₁ | OC₄H₉ | F | Cl |
| C₅H₁₁ | OC₅H₁₁ | F | Cl |
| C₅H₁₁ | OC₆H₁₃ | F | Cl |
| C₆H₁₃ | OCH₃ | F | F |
| C₆H₁₃ | OC₂H₅ | F | F |
| C₆H₁₃ | OC₃H₇ | F | F |
| C₆H₁₃ | OC₄H₉ | F | F |
| C₆H₁₃ | OC₅H₁₁ | F | F |
| C₆H₁₃ | OC₆H₁₃ | F | F |
| C₆H₁₃ | OCH₃ | Cl | F |
| C₆H₁₃ | OC₂H₅ | Cl | F |
| C₆H₁₃ | OC₃H₇ | Cl | F |
| C₆H₁₃ | OC₄H₉ | Cl | F |
| C₆H₁₃ | OC₅H₁₁ | Cl | F |
| C₆H₁₃ | OC₆H₁₃ | Cl | F |
| C₆H₁₃ | OCH₃ | F | Cl |
| C₆H₁₃ | OC₂H₅ | F | Cl |
| C₆H₁₃ | OC₃H₇ | F | Cl |
| C₆H₁₃ | OC₄H₉ | F | Cl |
| C₆H₁₃ | OC₅H₁₁ | F | Cl |
| C₆H₁₃ | OC₆H₁₃ | F | Cl |

The following compounds of the formula

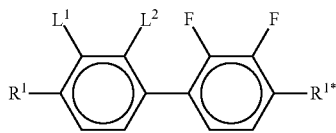

are prepared analogously:

| R¹ | R¹* | L¹ | L² | |
|---|---|---|---|---|
| CH₃O | OCH₃ | F | F | |
| CH₃O | OC₂H₅ | F | F | |
| CH₃O | OC₃H₇ | F | F | |
| CH₃O | OC₄H₉ | F | F | |
| CH₃O | OC₅H₁₁ | F | F | |
| CH₃O | OC₆H₁₃ | F | F | |
| CH₃O | OCH₃ | F | Cl | |
| CH₃O | OC₂H₅ | F | Cl | |
| CH₃O | OC₃H₇ | F | Cl | |
| CH₃O | OC₄H₉ | F | Cl | |
| CH₃O | OC₅H₁₁ | F | Cl | |
| CH₃O | OC₆H₁₃ | F | Cl | |
| CH₃O | OCH₃ | Cl | F | |
| CH₃O | OC₂H₅ | Cl | F | |
| CH₃O | OC₃H₇ | Cl | F | |
| CH₃O | OC₄H₉ | Cl | F | |
| CH₃O | OC₅H₁₁ | Cl | F | |
| CH₃O | OC₆H₁₃ | Cl | F | |
| C₂H₅O | OC₂H₅ | F | F | |
| C₂H₅O | OC₃H₇ | F | F | C 79 I; Δn = 0.1582; Δε = −13.0; |
| C₂H₅O | OC₄H₉ | F | F | C 63 I; Δn = 0.1631; Δε = −13.9; γ₁ = 251 |
| C₂H₅O | OC₅H₁₁ | F | F | C 63 I; Δn = 0.1446; Δε = −12.9; γ₁ = 259 |
| C₂H₅O | OC₆H₁₃ | F | F | |
| C₂H₅O | OC₂H₅ | F | Cl | |
| C₂H₅O | OC₃H₇ | F | Cl | |
| C₂H₅O | OC₄H₉ | F | Cl | |
| C₂H₅O | OC₅H₁₁ | F | Cl | |
| C₂H₅O | OC₆H₁₃ | F | Cl | |
| C₂H₅O | OC₂H₅ | Cl | F | |
| C₂H₅O | OC₃H₇ | Cl | F | |
| C₂H₅O | OC₄H₉ | Cl | F | |
| C₂H₅O | OC₅H₁₁ | Cl | F | |
| C₂H₅O | OC₆H₁₃ | Cl | F | |
| C₃H₇O | OC₃H₇ | F | F | C 87 I; Δn = 0.1494; Δε = −11.7 |
| C₃H₇O | OC₄H₉ | F | F | C 67 I; Δn = 0.1525; Δε = −12.8; γ₁ = 275 |
| C₃H₇O | OC₅H₁₁ | F | F | C 57 I; Δn = 0.1381; Δε = −11.9; γ₁ = 254 |
| C₃H₇O | OC₆H₁₃ | F | F | |
| C₃H₇O | OC₃H₇ | Cl | F | |
| C₃H₇O | OC₄H₉ | Cl | F | |
| C₃H₇O | OC₅H₁₁ | Cl | F | |
| C₃H₇O | OC₆H₁₃ | Cl | F | |
| C₃H₇O | OC₃H₇ | F | Cl | |
| C₃H₇O | OC₄H₉ | F | Cl | |
| C₃H₇O | OC₅H₁₁ | F | Cl | |
| C₃H₇O | OC₆H₁₃ | F | Cl | |
| C₄H₉O | OC₄H₉ | F | F | C 75 I; Δn = 0.1503; Δε = −12.2 |
| C₄H₉O | OC₅H₁₁ | F | F | |
| C₄H₉O | OC₆H₁₃ | F | F | |
| C₄H₉O | OC₄H₉ | Cl | F | |
| C₄H₉O | OC₅H₁₁ | Cl | F | |
| C₄H₉O | OC₆H₁₃ | Cl | F | |
| C₄H₉O | OC₄H₉ | F | Cl | |
| C₄H₉O | OC₅H₁₁ | F | Cl | |
| C₄H₉O | OC₆H₁₃ | F | Cl | |
| C₅H₁₁O | OC₅H₁₁ | F | F | |
| C₅H₁₁O | OC₆H₁₃ | F | F | |
| C₅H₁₁O | OC₅H₁₁ | Cl | F | |
| C₅H₁₁O | OC₆H₁₃ | Cl | F | |
| C₅H₁₁O | OC₅H₁₁ | F | Cl | |
| C₅H₁₁O | OC₆H₁₃ | F | Cl | |
| C₆H₁₃O | OC₆H₁₃ | F | F | |
| C₆H₁₃O | OC₆H₁₃ | Cl | F | |
| C₆H₁₃O | OC₆H₁₃ | F | Cl | |

The following compounds of the formula

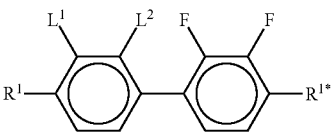

are prepared analogously:

| R¹ | R¹* | L¹ | L² | |
|---|---|---|---|---|
| CH₃ | OCH₃ | F | F | |
| CH₃ | OC₂H₅ | F | F | C 116 I |
| CH₃ | OC₃H₇ | F | F | C 64 I; Δn = 0.1494; Δε = −10.2; γ₁ = 161 |
| CH₃ | OC₄H₉ | F | F | C 40 I; Δn = 0.1471; Δε = −10.3; γ₁ = 177 |
| CH₃ | OC₅H₁₁ | F | F | |
| CH₃ | OC₆H₁₃ | F | F | |
| CH₃ | OCH₃ | F | Cl | |
| CH₃ | OC₂H₅ | F | Cl | |
| CH₃ | OC₃H₇ | F | Cl | |
| CH₃ | OC₄H₉ | F | Cl | |
| CH₃ | OC₅H₁₁ | F | Cl | |
| CH₃ | OC₆H₁₃ | F | Cl | |
| CH₃ | OCH₃ | Cl | F | |
| CH₃ | OC₂H₅ | Cl | F | |
| CH₃ | OC₃H₇ | Cl | F | |
| CH₃ | OC₄H₉ | Cl | F | |
| CH₃ | OC₅H₁₁ | Cl | F | |
| CH₃ | OC₆H₁₃ | Cl | F | |
| C₂H₅ | OCH₃ | F | F | |
| C₂H₅ | OC₂H₅ | F | F | C 75 I; Δn = 0.1597; Δε = −10.2; γ₁ = 119 |
| C₂H₅ | OC₃H₇ | F | F | C 36 I; Δn = 0.1452; Δε = −9.2 |
| C₂H₅ | OC₄H₉ | F | F | C 28 I; Δn = 0.1485; Δε = −9.7; γ₁ = 151 |
| C₂H₅ | OC₅H₁₁ | F | F | |
| C₂H₅ | OC₆H₁₃ | F | F | |
| C₂H₅ | OCH₃ | F | Cl | |

| $R^1$ | $R^{1*}$ | $L^1$ | $L^2$ | |
|---|---|---|---|---|
| $C_2H_5$ | $OC_2H_5$ | F | Cl | |
| $C_2H_5$ | $OC_3H_7$ | F | Cl | |
| $C_2H_5$ | $OC_4H_9$ | F | Cl | |
| $C_2H_5$ | $OC_5H_{11}$ | F | Cl | |
| $C_2H_5$ | $OC_6H_{13}$ | F | Cl | |
| $C_2H_5$ | $OCH_3$ | Cl | F | |
| $C_2H_5$ | $OC_2H_5$ | Cl | F | |
| $C_2H_5$ | $OC_3H_7$ | Cl | F | |
| $C_2H_5$ | $OC_4H_9$ | Cl | F | |
| $C_2H_5$ | $OC_5H_{11}$ | Cl | F | |
| $C_2H_5$ | $OC_6H_{13}$ | Cl | F | |
| $C_3H_7$ | $OCH_3$ | F | F | |
| $C_3H_7$ | $OC_2H_5$ | F | F | C 68 I; $\Delta n = 0.1633$; $\Delta\varepsilon = -9.9$; $\gamma_1 = 105$ |
| $C_3H_7$ | $OC_3H_7$ | F | F | |
| $C_3H_7$ | $OC_4H_9$ | F | F | |
| $C_3H_7$ | $OC_5H_{11}$ | F | F | |
| $C_3H_7$ | $OC_6H_{13}$ | F | F | |
| $C_3H_7$ | $OCH_3$ | Cl | F | |
| $C_3H_7$ | $OC_2H_5$ | Cl | F | |
| $C_3H_7$ | $OC_3H_7$ | Cl | F | |
| $C_3H_7$ | $OC_4H_9$ | Cl | F | |
| $C_3H_7$ | $OC_5H_{11}$ | Cl | F | |
| $C_3H_7$ | $OC_6H_{13}$ | Cl | F | |
| $C_3H_7$ | $OCH_3$ | F | Cl | |
| $C_3H_7$ | $OC_2H_5$ | F | Cl | |
| $C_3H_7$ | $OC_3H_7$ | F | Cl | |
| $C_3H_7$ | $OC_4H_9$ | F | Cl | |
| $C_3H_7$ | $OC_5H_{11}$ | F | Cl | |
| $C_3H_7$ | $OC_6H_{13}$ | F | Cl | |
| $C_4H_9$ | $OCH_3$ | F | F | |
| $C_4H_9$ | $OC_2H_5$ | F | F | |
| $C_4H_9$ | $OC_3H_7$ | F | F | |
| $C_4H_9$ | $OC_4H_9$ | F | F | |
| $C_4H_9$ | $OC_5H_{11}$ | F | F | |
| $C_4H_9$ | $OC_6H_{13}$ | F | F | |
| $C_4H_9$ | $OCH_3$ | Cl | F | |
| $C_4H_9$ | $OC_2H_5$ | Cl | F | |
| $C_4H_9$ | $OC_3H_7$ | Cl | F | |
| $C_4H_9$ | $OC_4H_9$ | Cl | F | |
| $C_4H_9$ | $OC_5H_{11}$ | Cl | F | |
| $C_4H_9$ | $OC_6H_{13}$ | Cl | F | |
| $C_4H_9$ | $OCH_3$ | F | Cl | |
| $C_4H_9$ | $OC_2H_5$ | F | Cl | |
| $C_4H_9$ | $OC_3H_7$ | F | Cl | |
| $C_4H_9$ | $OC_4H_9$ | F | Cl | |
| $C_4H_9$ | $OC_5H_{11}$ | F | Cl | |
| $C_4H_9$ | $OC_6H_{13}$ | F | Cl | |
| $C_5H_{11}$ | $OCH_3$ | F | F | |
| $C_5H_{11}$ | $OC_2H_5$ | F | F | |
| $C_5H_{11}$ | $OC_3H_7$ | F | F | |
| $C_5H_{11}$ | $OC_4H_9$ | F | F | |
| $C_5H_{11}$ | $OC_5H_{11}$ | F | F | |
| $C_5H_{11}$ | $OC_6H_{13}$ | F | F | |
| $C_5H_{11}$ | $OCH_3$ | Cl | F | |
| $C_5H_{11}$ | $OC_2H_5$ | Cl | F | |
| $C_5H_{11}$ | $OC_3H_7$ | Cl | F | |
| $C_5H_{11}$ | $OC_4H_9$ | Cl | F | |
| $C_5H_{11}$ | $OC_5H_{11}$ | Cl | F | |
| $C_5H_{11}$ | $OC_6H_{13}$ | Cl | F | |
| $C_5H_{11}$ | $OCH_3$ | F | Cl | |
| $C_5H_{11}$ | $OC_2H_5$ | F | Cl | |
| $C_5H_{11}$ | $OC_3H_7$ | F | Cl | |
| $C_5H_{11}$ | $OC_4H_9$ | F | Cl | |
| $C_5H_{11}$ | $OC_5H_{11}$ | F | Cl | |
| $C_5H_{11}$ | $OC_6H_{13}$ | F | Cl | |
| $C_6H_{13}$ | $OCH_3$ | F | F | |
| $C_6H_{13}$ | $OC_2H_5$ | F | F | |
| $C_6H_{13}$ | $OC_3H_7$ | F | F | |
| $C_6H_{13}$ | $OC_4H_9$ | F | F | |
| $C_6H_{13}$ | $OC_5H_{11}$ | F | F | |
| $C_6H_{13}$ | $OC_6H_{13}$ | F | F | |
| $C_6H_{13}$ | $OCH_3$ | Cl | F | |
| $C_6H_{13}$ | $OC_2H_5$ | Cl | F | |
| $C_6H_{13}$ | $OC_3H_7$ | Cl | F | |
| $C_6H_{13}$ | $OC_4H_9$ | Cl | F | |
| $C_6H_{13}$ | $OC_5H_{11}$ | Cl | F | |
| $C_6H_{13}$ | $OC_6H_{13}$ | Cl | F | |
| $C_6H_{13}$ | $OCH_3$ | F | Cl | |
| $C_6H_{13}$ | $OC_2H_5$ | F | Cl | |
| $C_6H_{13}$ | $OC_3H_7$ | F | Cl | |
| $C_6H_{13}$ | $OC_4H_9$ | F | Cl | |
| $C_6H_{13}$ | $OC_5H_{11}$ | F | Cl | |
| $C_6H_{13}$ | $OC_6H_{13}$ | F | Cl | |

The following compounds of the formula

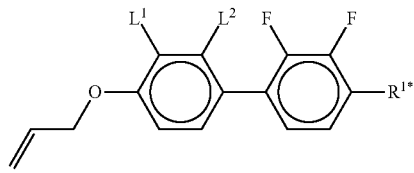

are prepared analogously:

| $R^{1*}$ | $L^1$ | $L^2$ | |
|---|---|---|---|
| $OCH_3$ | F | F | |
| $OC_2H_5$ | F | F | |
| $OC_3H_7$ | F | F | |
| $OC_4H_9$ | F | F | C 68 I; $\Delta n = 0.1631$; $\Delta\varepsilon = -13.0$; $\gamma_1 = 146$ |
| $OC_5H_{11}$ | F | F | |
| $OC_6H_{13}$ | F | F | |
| $OCH_3$ | F | Cl | |
| $OC_2H_5$ | F | Cl | |
| $OC_3H_7$ | F | Cl | |
| $OC_4H_9$ | F | Cl | |
| $OC_5H_{11}$ | F | Cl | |
| $OC_6H_{13}$ | F | Cl | |
| $OCH_3$ | Cl | F | |
| $OC_2H_5$ | Cl | F | |
| $OC_3H_7$ | Cl | F | |
| $OC_4H_9$ | Cl | F | |
| $OC_5H_{11}$ | Cl | F | |
| $OC_6H_{13}$ | Cl | F | |

The following compounds of the formulae

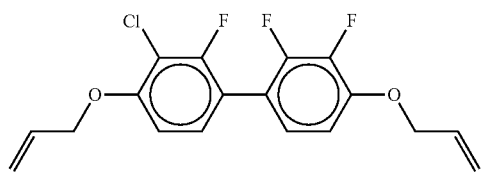

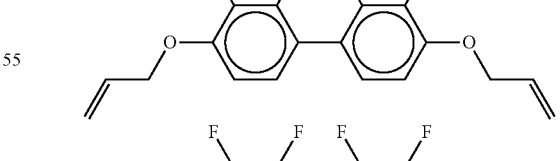

C 85 I; $\Delta n=0.1819$; $\Delta\varepsilon=-12.8$ are prepared analogously.

Above and below, the symbols and abbreviations have the following meanings:

$V_0$ threshold voltage, capacitive [V] at 20° C.

$\Delta n$ the optical anisotropy measured at 20° C. and 589 nm $\Delta \varepsilon$ the dielectric anisotropy at 20° C. and 1 kHz cl.p. clearing point [° C.]

$K_1$ elastic constant, "splay" deformation at 20° C. [pN]

$K_3$ elastic constant, "bend" deformation at 20° C. [pN]

$\gamma_1$ rotational viscosity measured at 20° C. [mPa·s], determined by the rotation method in a magnetic field LTS low-temperature stability (nematic phase), determined in test cells.

The display used for measurement of the threshold voltage has two plane-parallel outer plates at a separation of 20 μm and electrode layers with alignment layers comprising SE-1211 (Nissan Chemicals) on top on the insides of the outer plates, which effect a homeotropic alignment of the liquid crystals.

All concentrations in this application, unless explicitly indicated otherwise, relate to the corresponding mixture or mixture component. All physical properties are determined in accordance with "Merck Liquid Crystals, Physical Properties of Liquid Crystals", status November 1997, Merck KGaA, Germany, and apply to a temperature of 20° C., unless explicitly indicated otherwise.

MIXTURE EXAMPLES

Example M1

| | | | |
|---|---|---|---|
| CC-3-V | 41.00% | Clearing point [° C.]: | 73.5 |
| CCY-3-O1 | 6.00% | Δn [589 nm, 20° C.]: | 0.1007 |
| CCY-3-O2 | 11.00% | Δε [1 kHz, 20° C.]: | −3.6 |
| CCY-4-O2 | 4.00% | ε∥ [1 kHz, 20° C.]: | 3.7 |
| CPY-2-O2 | 6.00% | K₁ [pN, 20° C.]: | 13.1 |
| CPY-3-O2 | 10.00% | K₃ [pN, 20° C.]: | 14.8 |
| CY-3-O2 | 5.00% | γ₁ [mPa · s, 20° C.]: | 89 |
| PY-3-O2 | 11.00% | V₀ [20° C., V]: | 2.16 |
| YG-2O-O2 | 3.00% | | |
| YG-2O-O3 | 3.00% | | |

Example M2

| | | | |
|---|---|---|---|
| CC-3-V | 39.00% | Clearing point [° C.]: | 74.0 |
| CCY-3-O1 | 7.00% | Δn [589 nm, 20° C.]: | 0.1006 |
| CCY-3-O2 | 11.00% | Δε [1 kHz, 20° C.]: | −3.7 |
| CCY-4-O2 | 4.00% | ε∥ [1 kHz, 20° C.]: | 3.7 |
| CPY-2-O2 | 6.00% | K₁ [pN, 20° C.]: | 13.0 |
| CPY-3-O2 | 10.00% | K₃ [pN, 20° C.]: | 14.9 |
| CY-3-O2 | 7.00% | γ₁ [mPa · s, 20° C.]: | 92 |
| PY-3-O2 | 12.00% | V₀ [20° C., V]: | 2.13 |
| YG-2O-O2 | 2.00% | | |
| YG-2O-O3 | 2.00% | | |

Example M3

| | | | |
|---|---|---|---|
| CC-3-V | 40.00% | Clearing point [° C.]: | 73.5 |
| CCY-3-O1 | 4.50% | Δn [589 nm, 20° C.]: | 0.1001 |
| CCY-3-O2 | 11.00% | Δε [1 kHz, 20° C.]: | −3.6 |
| CCY-4-O2 | 4.50% | ε∥ [1 kHz, 20° C.]: | 3.7 |
| CPY-2-O2 | 7.50% | K₁ [pN, 20° C.]: | 12.9 |
| CPY-3-O2 | 10.00% | K₃ [pN, 20° C.]: | 14.7 |
| CY-3-O2 | 7.00% | γ₁ [mPa · s, 20° C.]: | 89 |
| PY-3-O2 | 11.50% | V₀ [20° C., V]: | 2.15 |
| YG-2O-O4 | 4.00% | | |

Example M4

| | | | |
|---|---|---|---|
| CC-3-V | 40.00% | Clearing point [° C.]: | 73.5 |
| CCY-3-O1 | 4.50% | Δn [589 nm, 20° C.]: | 0.0999 |
| CCY-3-O2 | 11.00% | Δε [1 kHz, 20° C.]: | −3.5 |
| CCY-4-O2 | 4.50% | ε∥ [1 kHz, 20° C.]: | 3.7 |
| CPY-2-O2 | 7.50% | K₁ [pN, 20° C.]: | 12.8 |
| CPY-3-O2 | 10.00% | K₃ [pN, 20° C.]: | 14.5 |
| CY-3-O2 | 7.00% | γ₁ [mPa · s, 20° C.]: | 89 |
| PY-3-O2 | 11.50% | V₀ [20° C., V]: | 2.14 |
| YG-2O-O5 | 4.00% | | |

Example M5

| | | | |
|---|---|---|---|
| CC-3-V | 41.00% | Clearing point [° C.]: | 72.5 |
| CCY-3-O1 | 4.00% | Δn [589 nm, 20° C.]: | 0.0998 |
| CCY-3-O2 | 11.00% | Δε [1 kHz, 20° C.]: | −3.5 |
| CCY-4-O2 | 5.00% | ε∥ [1 kHz, 20° C.]: | 3.6 |
| CPY-2-O2 | 6.50% | K₁ [pN, 20° C.]: | 12.8 |
| CPY-3-O2 | 10.00% | K₃ [pN, 20° C.]: | 14.3 |
| CY-3-O2 | 5.00% | γ₁ [mPa · s, 20° C.]: | 87 |
| PY-3-O2 | 11.50% | V₀ [20° C., V]: | 2.14 |
| YG-2O-O5 | 6.00% | | |

Example M6

For the preparation of a PS-VA mixture, 99.7% of the mixture in accordance with Example M1 are mixed with 0.3% of the polymerizable compound of the formula

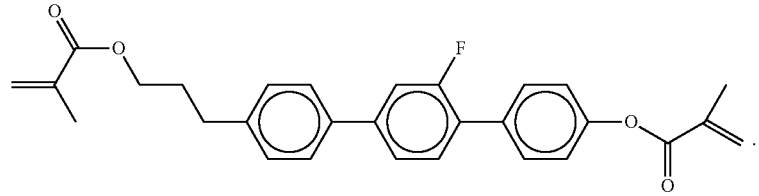

Example M7

For the preparation of a PS-VA mixture, 99.75% of the mixture in accordance with Example M1 are mixed with 0.25% of the polymerizable compound of the formula

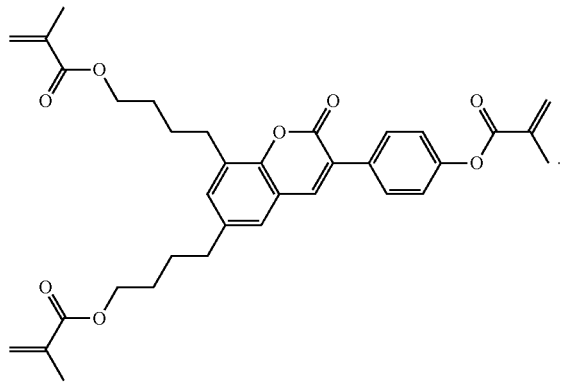 [SMILES: C=C(C)C(=O)OCCCCc1cc(CCCCOC(=O)C(=C)C)c2oc(=O)c(-c3ccc(OC(=O)C(=C)C)cc3)cc2c1]

Example M8

For the preparation of a PS-VA mixture, 99.8% of the mixture in accordance with Example M1 are mixed with 0.2% of the polymerizable compound of the formula

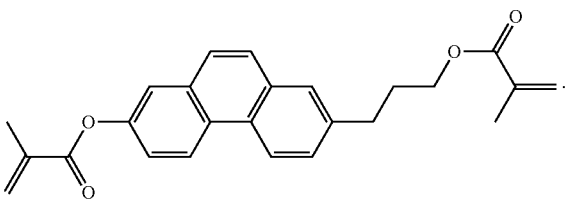 [SMILES: C=C(C)C(=O)OCCCc1ccc2c(ccc3cc(OC(=O)C(=C)C)ccc32)c1]

Example M9

For the preparation of a PS-VA mixture, 99.75% of the mixture in accordance with Example M1 are mixed with 0.25% of the polymerizable compound of the formula

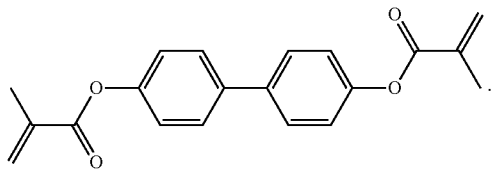 [SMILES: C=C(C)C(=O)Oc1ccc(-c2ccc(OC(=O)C(=C)C)cc2)cc1]

Example M10

For the preparation of a PS-VA mixture, 99.75% of the mixture in accordance with Example M1 are mixed with 0.25% of the polymerizable compound of the formula

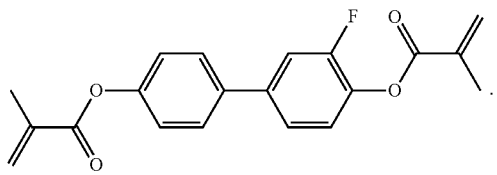 [SMILES: C=C(C)C(=O)Oc1ccc(-c2ccc(OC(=O)C(=C)C)c(F)c2)cc1]

Example M11

For the preparation of a PS-VA mixture, 99.75% of the mixture in accordance with Example M1 are mixed with 0.25% of the polymerizable compound of the formula

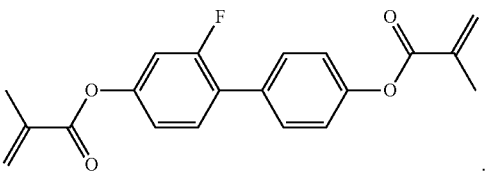

Example M12

For the preparation of a PS-VA mixture, 99.8% of the mixture in accordance with Example M1 are mixed with 0.2% of the polymerizable compound of the formula

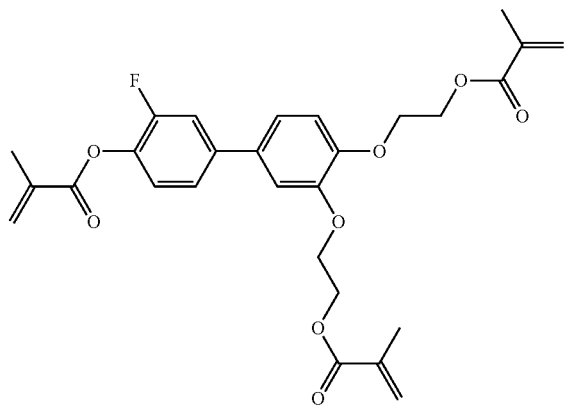

Example M13

For the preparation of a PS-VA mixture, 99.8% of the mixture in accordance with Example M1 are mixed with 0.2% of the polymerizable compound of the formula

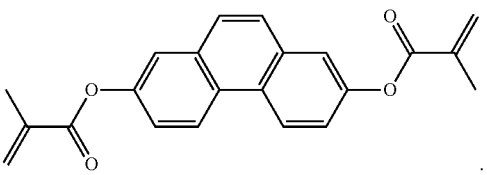

Example M14

For the preparation of a PS-VA mixture, 99.75% of the mixture in accordance with Example M2 are mixed with 0.25% of the polymerizable compound of the formula

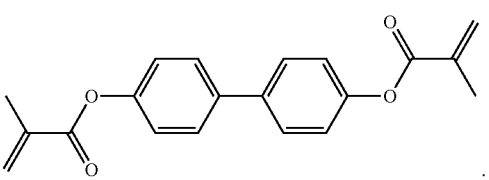 [SMILES: C=C(C)C(=O)Oc1ccc(-c2ccc(OC(=O)C(=C)C)cc2)cc1]

Example M15

For the preparation of a PS-VA mixture, 99.7% of the mixture in accordance with Example M2 are mixed with 0.3% of the polymerizable compound of the formula

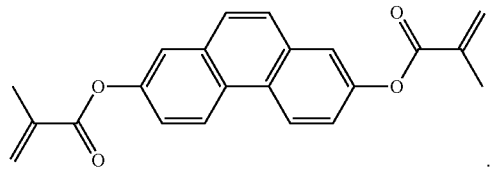

Example M16

For the preparation of a PS-VA mixture, 99.7% of the mixture in accordance with Example M2 are mixed with 0.3% of the polymerizable compound of the formula

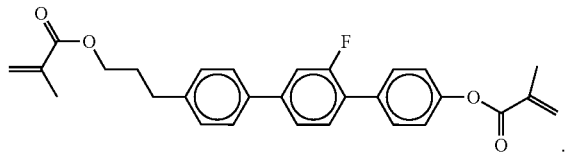

Example M17

For the preparation of a PS-VA mixture, 99.75% of the mixture in accordance with Example M2 are mixed with 0.25% of the polymerizable compound of the formula

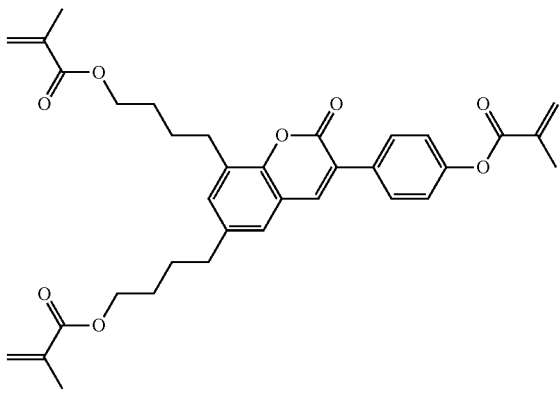

Example M18

For the preparation of a PS-VA mixture, 99.7% of the mixture in accordance with Example M2 are mixed with 0.3% of the polymerizable compound of the formula

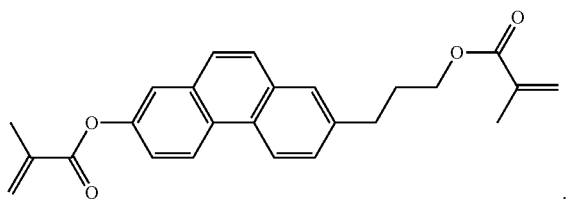 [SMILES: C=C(C)C(=O)OCCCc1ccc2c(ccc3cc(OC(=O)C(=C)C)ccc32)c1]

Example M19

For the preparation of a PS-VA mixture, 99.75% of the mixture in accordance with Example M2 are mixed with 0.25% of the polymerizable compound of the formula

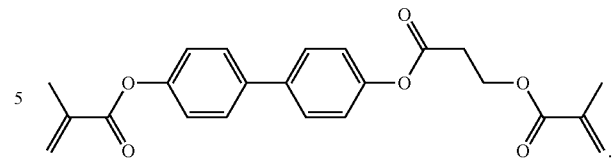

Example M20

For the preparation of a PS-VA mixture, 99.75% of the mixture in accordance with Example M2 are mixed with 0.25% of the polymerizable compound of the formula

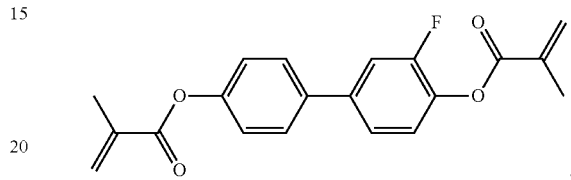

Example M21

For the preparation of a PS-VA mixture, 99.75% of the mixture in accordance with Example M2 are mixed with 0.25% of the polymerizable compound of the formula

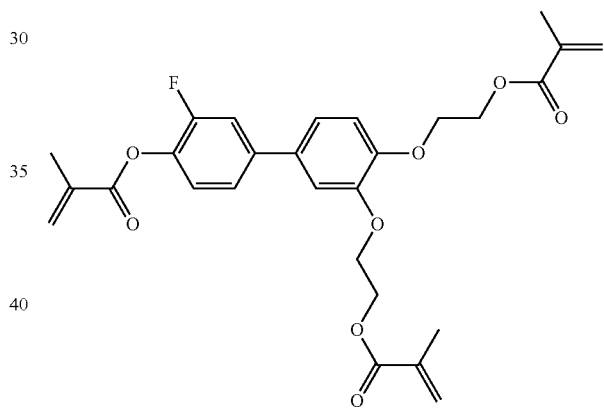

Example M22

For the preparation of a PS-VA mixture, 99.75% of the mixture in accordance with Example M3 are mixed with 0.25% of the polymerizable compound of the formula

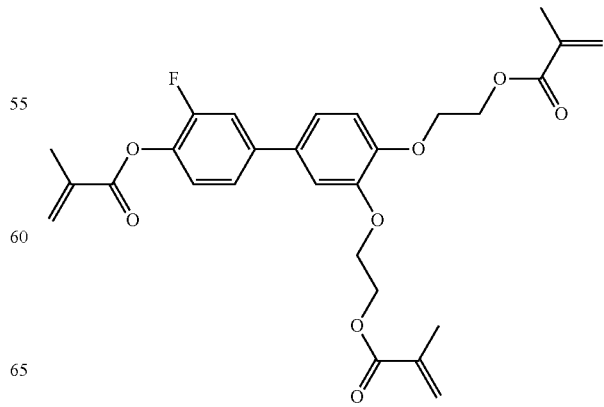

Example M23

For the preparation of a PS-VA mixture, 99.8% of the mixture in accordance with Example M3 are mixed with 0.2% of the polymerizable compound of the formula

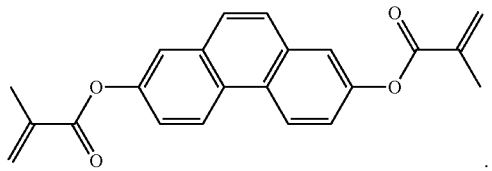 [SMILES: C=C(C)C(=O)Oc1ccc2c(ccc3cc(OC(=O)C(=C)C)ccc32)c1]

Example M24

For the preparation of a PS-VA mixture, 99.7% of the mixture in accordance with Example M3 are mixed with 0.3% of the polymerizable compound of the formula

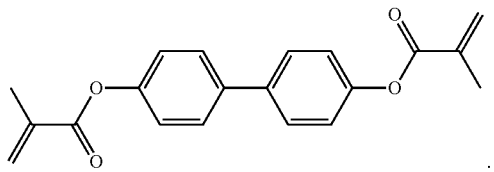 [SMILES: C=C(C)C(=O)Oc1ccc(-c2ccc(OC(=O)C(=C)C)cc2)cc1]

Example M25

For the preparation of a PS-VA mixture, 99.7% of the mixture in accordance with Example M3 are mixed with 0.3% of the polymerizable compound of the formula

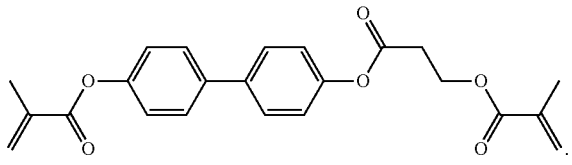 [SMILES: C=C(C)C(=O)OCCC(=O)Oc1ccc(-c2ccc(OC(=O)C(=C)C)cc2)cc1]

Example M26

For the preparation of a PS-VA mixture, 99.7% of the mixture in accordance with Example M3 are mixed with 0.3% of the polymerizable compound of the formula

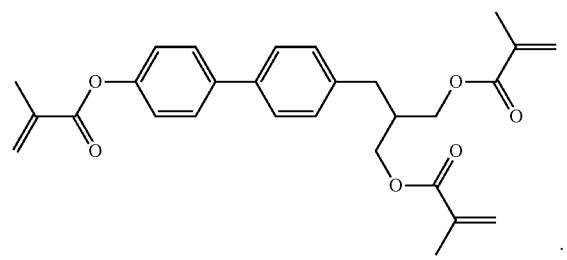 [SMILES: C=C(C)C(=O)OCC(COC(=O)C(=C)C)Cc1ccc(-c2ccc(OC(=O)C(=C)C)cc2)cc1]

Example M27

For the preparation of a PS-VA mixture, 99.7% of the mixture in accordance with Example M3 are mixed with 0.3% of the polymerizable compound of the formula

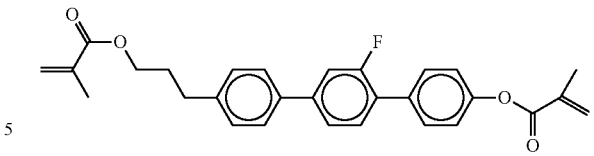

Example M28

For the preparation of a PS-VA mixture, 99.7% of the mixture in accordance with Example M4 are mixed with 0.3% of the polymerizable compound of the formula

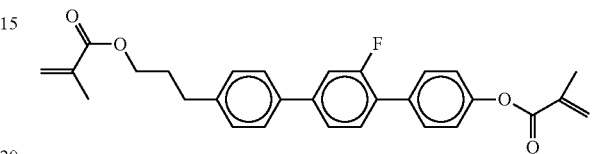

Example M29

For the preparation of a PS-VA mixture, 99.75% of the mixture in accordance with Example M4 are mixed with 0.25% of the polymerizable compound of the formula

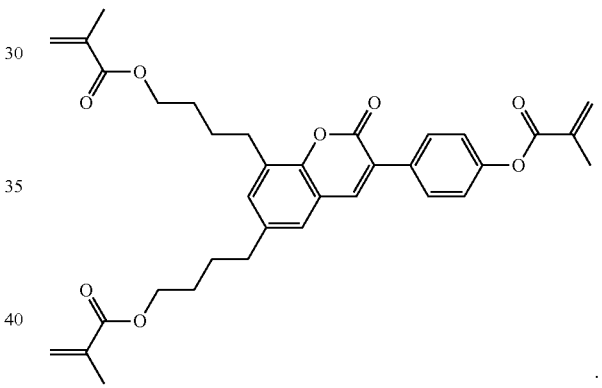

Example M30

For the preparation of a PS-VA mixture, 99.75% of the mixture in accordance with Example M4 are mixed with 0.25% of the polymerizable compound of the formula

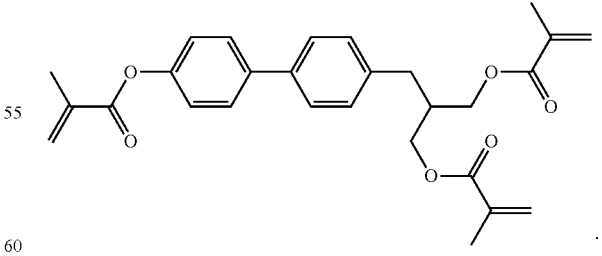

Example M31

For the preparation of a PS-VA mixture, 99.7% of the mixture in accordance with Example M4 are mixed with 0.3% of the polymerizable compound of the formula

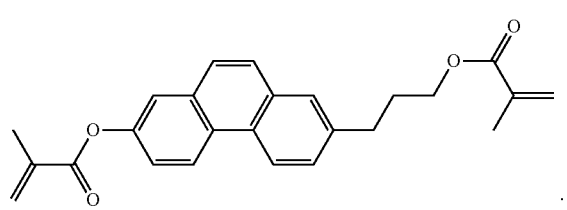 [SMILES: C=C(C)C(=O)OCCCc1ccc2c(ccc3cc(OC(=O)C(=C)C)ccc32)c1]

Example M32

For the preparation of a PS-VA mixture, 99.75% of the mixture in accordance with Example M4 are mixed with 0.25% of the polymerizable compound of the formula

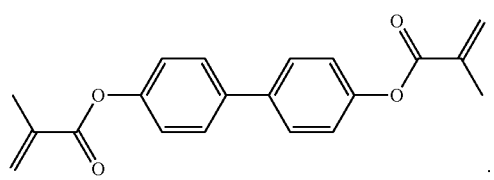 [SMILES: C=C(C)C(=O)Oc1ccc(-c2ccc(OC(=O)C(=C)C)cc2)cc1]

Example M33

For the preparation of a PS-VA mixture, 99.75% of the mixture in accordance with Example M4 are mixed with 0.25% of the polymerizable compound of the formula

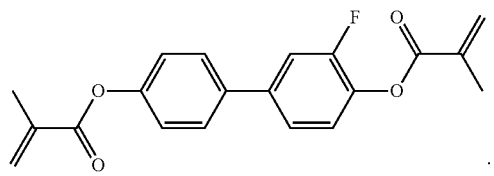 [SMILES: C=C(C)C(=O)Oc1ccc(-c2ccc(OC(=O)C(=C)C)c(F)c2)cc1]

Example M34

For the preparation of a PS-VA mixture, 99.7% of the mixture in accordance with Example M5 are mixed with 0.3% of the polymerizable compound of the formula

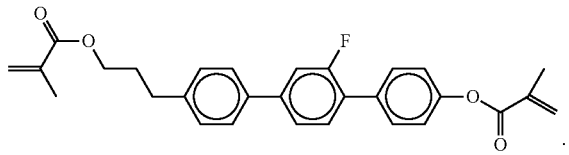

Example M35

For the preparation of a PS-VA mixture, 99.75% of the mixture in accordance with Example M5 are mixed with 0.25% of the polymerizable compound of the formula

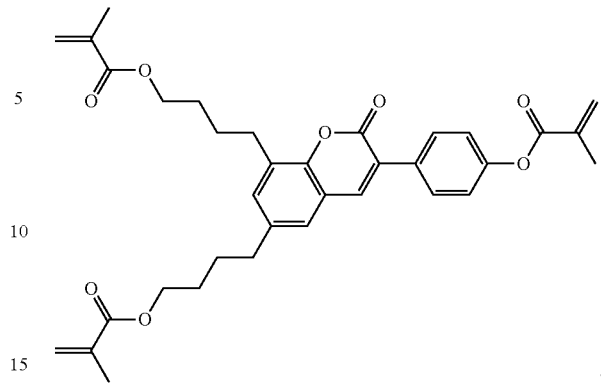

Example M36

For the preparation of a PS-VA mixture, 99.8% of the mixture in accordance with Example M5 are mixed with 0.2% of the polymerizable compound of the formula

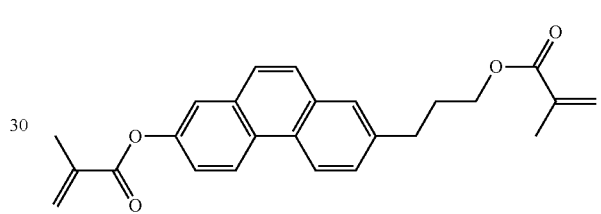

Example M37

For the preparation of a PS-VA mixture, 99.75% of the mixture in accordance with Example M5 are mixed with 0.25% of the polymerizable compound of the formula

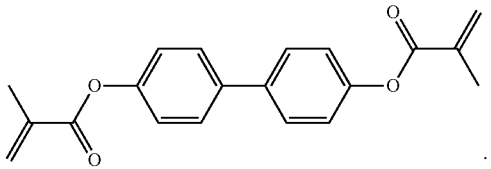

Example M38

For the preparation of a PS-VA mixture, 99.75% of the mixture in accordance with Example M5 are mixed with 0.25% of the polymerizable compound of the formula

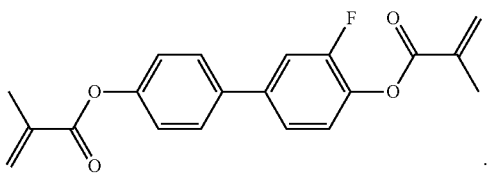

Example M39

For the preparation of a PS-VA mixture, 99.75% of the mixture in accordance with Example M5 are mixed with 0.25% of the polymerizable compound of the formula

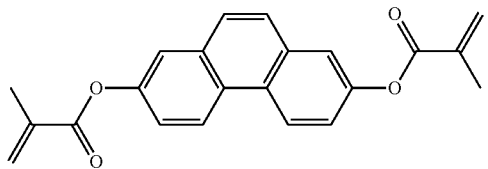

Example M40

For the preparation of a PS-VA mixture, 99.75% of the mixture in accordance with Example M5 are mixed with 0.25% of the polymerizable compound of the formula

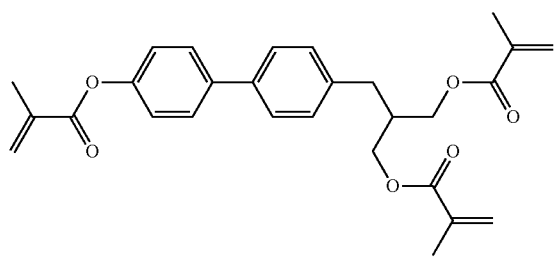

Example M41

| | | | |
|---|---|---|---|
| CC-3-V | 35.50% | Clearing point [° C.]: | 75.0 |
| CC-3-V1 | 8.00% | $\Delta n$ [589 nm, 20° C.]: | 0.1078 |
| CCY-3-O1 | 6.00% | $\Delta\varepsilon$ [1 kHz, 20° C.]: | −2.9 |
| CCY-3-O2 | 10.00% | $\varepsilon_\parallel$ [1 kHz, 20° C.]: | 3.5 |
| CCY-4-O2 | 3.50% | $K_1$ [pN, 20° C.]: | 13.9 |
| CPY-3-O2 | 11.50% | $K_3$ [pN, 20° C.]: | 15.5 |
| PY-3-O2 | 12.50% | $\gamma_1$ [mPa·s, 20° C.]: | 86 |
| PYP-2-3 | 5.00% | $V_0$ [20° C., V]: | 2.45 |
| PP-1-2V1 | 2.00% | | |
| YG-2O-O5 | 6.00% | | |

Example M42

| | | | |
|---|---|---|---|
| CC-3-V | 35.50% | Clearing point [° C.]: | 75.5 |
| CC-3-V1 | 8.00% | $\Delta n$ [589 nm, 20° C.]: | 0.1085 |
| CCY-3-O1 | 6.00% | $\Delta\varepsilon$ [1 kHz, 20° C.]: | −2.9 |
| CCY-3-O2 | 10.00% | $\varepsilon_\parallel$ [1 kHz, 20° C.]: | 3.5 |
| CCY-4-O2 | 3.50% | $K_1$ [pN, 20° C.]: | 14.2 |
| CPY-3-O2 | 11.50% | $K_3$ [pN, 20° C.]: | 15.8 |
| PY-3-O2 | 12.50% | $\gamma_1$ [mPa·s, 20° C.]: | 87 |
| PYP-2-3 | 5.00% | $V_0$ [20° C., V]: | 2.45 |
| PP-1-2V1 | 2.00% | | |
| YG-4O-O2 | 6.00% | | |

Example M43

| | | | |
|---|---|---|---|
| CC-3-V | 35.50% | Clearing point [° C.]: | 75.0 |
| CC-3-V1 | 8.00% | $\Delta n$ [589 nm, 20° C.]: | 0.1077 |
| CCY-3-O1 | 6.00% | $\Delta\varepsilon$ [1 kHz, 20° C.]: | −2.9 |
| CCY-3-O2 | 10.00% | $\varepsilon_\parallel$ [1 kHz, 20° C.]: | 3.5 |
| CCY-4-O2 | 3.50% | $K_1$ [pN, 20° C.]: | 14.1 |
| CPY-3-O2 | 11.50% | $K_3$ [pN, 20° C.]: | 15.5 |
| PY-3-O2 | 12.50% | $\gamma_1$ [mPa·s, 20° C.]: | 86 |
| PYP-2-3 | 5.00% | $V_0$ [20° C., V]: | 2.45 |
| PP-1-2V1 | 2.00% | | |
| YG-5O-O2 | 6.00% | | |

Example M44

| | | | |
|---|---|---|---|
| CC-3-V1 | 8.00% | Clearing point [° C.]: | 75.0 |
| CCH-23 | 19.00% | $\Delta n$ [589 nm, 20° C.]: | 0.0968 |
| CCH-34 | 4.00% | $\Delta\varepsilon$ [1 kHz, 20° C.]: | −3.4 |
| CCH-35 | 7.00% | $\varepsilon_\parallel$ [1 kHz, 20° C.]: | 3.6 |
| CCP-3-1 | 5.50% | $K_1$ [pN, 20° C.]: | 15.4 |
| CCY-3-O2 | 11.50% | $K_3$ [pN, 20° C.]: | 16.0 |
| CCY-3-O1 | 8.00% | $\gamma_1$ [mPa·s, 20° C.]: | 106 |
| CPY-3-O2 | 9.50% | $V_0$ [20° C., V]: | 2.28 |
| CY-3-O2 | 9.00% | | |
| PY-3-O2 | 15.50% | | |
| YG-2O-O5 | 3.00% | | |

Example M45

| | | | |
|---|---|---|---|
| CC-3-V | 41.50% | Clearing point [° C.]: | 74.5 |
| CCY-3-O1 | 5.00% | $\Delta n$ [589 nm, 20° C.]: | 0.1000 |
| CCY-3-O2 | 9.50% | $\Delta\varepsilon$ [1 kHz, 20° C.]: | −3.6 |
| CCY-4-O2 | 6.50% | $\varepsilon_\parallel$ [1 kHz, 20° C.]: | 3.7 |
| CPY-2-O2 | 7.50% | $K_1$ [pN, 20° C.]: | 13.0 |
| CPY-3-O2 | 10.00% | $K_3$ [pN, 20° C.]: | 14.7 |
| CY-3-O2 | 3.00% | $\gamma_1$ [mPa·s, 20° C.]: | 91 |
| PY-3-O2 | 12.00% | $V_0$ [20° C., V]: | 2.12 |
| YY-V1O-O4 | 5.00% | | |

Example M46

| | | | |
|---|---|---|---|
| CC-3-V | 36.50% | Clearing point [° C.]: | 80.0 |
| CY-3-O2 | 5.00% | $\Delta n$ [589 nm, 20° C.]: | 0.1082 |
| CCY-3-O1 | 5.00% | $\Delta\varepsilon$ [1 kHz, 20° C.]: | −3.7 |
| CCY-3-O2 | 10.00% | $\varepsilon_\parallel$ [1 kHz, 20° C.]: | 3.7 |
| CCY-4-O2 | 7.50% | $K_1$ [pN, 20° C.]: | 13.7 |
| CPY-2-O2 | 6.00% | $K_3$ [pN, 20° C.]: | 14.9 |
| CPY-3-O2 | 10.00% | $\gamma_1$ [mPa·s, 20° C.]: | 109 |
| PYP-2-3 | 5.00% | $V_0$ [20° C., V]: | 2.12 |
| PY-3-O2 | 7.00% | | |
| YG-2O-O5 | 8.00% | | |

Example M47

| | | | |
|---|---|---|---|
| CC-3-V | 33.50% | Clearing point [° C.]: | 75.0 |
| CC-3-V1 | 8.00% | $\Delta n$ [589 nm, 20° C.]: | 0.1079 |
| CCY-3-O1 | 6.00% | $\Delta\varepsilon$ [1 kHz, 20° C.]: | −3.0 |
| CCY-3-O2 | 11.00% | $\varepsilon_\parallel$ [1 kHz, 20° C.]: | 3.5 |
| CCY-4-O2 | 5.00% | $K_1$ [pN, 20° C.]: | 13.9 |
| CPY-3-O2 | 11.50% | $K_3$ [pN, 20° C.]: | 16.0 |

-continued

| | | | |
|---|---|---|---|
| PY-3-O2 | 10.50% | γ1 [mPa · s, 20° C.]: | 91 |
| PYP-2-3 | 5.00% | $V_0$ [20° C., V]: | 2.43 |
| PP-1-2V1 | 3.50% | | |
| YY-3-O2 | 6.00% | | |

Example M48

| | | | |
|---|---|---|---|
| CC-3-V | 38.00% | Clearing point [° C.]: | 73.0 |
| CCY-3-O1 | 6.00% | Δn [589 nm, 20° C.]: | 0.0998 |
| CCY-3-O2 | 11.00% | Δε [1 kHz, 20° C.]: | −3.7 |
| CCY-4-O2 | 4.50% | $ε_∥$ [1 kHz, 20° C.]: | 3.8 |
| CPY-2-O2 | 8.00% | $K_1$ [pN, 20° C.]: | 12.4 |
| CPY-3-O2 | 10.50% | $K_3$ [pN, 20° C.]: | 14.3 |
| CY-3-O2 | 7.00% | $γ_1$ [mPa · s, 20° C.]: | 94 |
| PY-3-O2 | 11.00% | $V_0$ [20° C., V]: | 2.06 |
| YY-2-O3 | 4.00% | | |

Example M49

| | | | |
|---|---|---|---|
| CC-3-V | 35.00% | Clearing point [° C.]: | 75.5 |
| CC-3-V1 | 8.00% | Δn [589 nm, 20° C.]: | 0.1077 |
| CCY-3-O1 | 6.00% | Δε [1 kHz, 20° C.]: | −3.0 |
| CCY-3-O2 | 10.00% | $ε_∥$ [1 kHz, 20° C.]: | 3.5 |
| CCY-4-O2 | 4.50% | $K_1$ [pN, 20° C.]: | 14.0 |
| CPY-3-O2 | 11.50% | $K_3$ [pN, 20° C.]: | 15.8 |
| PY-3-O2 | 10.00% | $γ_1$ [mPa · s, 20° C.]: | 90 |
| PYP-2-3 | 5.00% | $V_0$ [20° C., V]: | 2.42 |
| PP-1-2V1 | 4.00% | | |
| YY-4O-O3 | 6.00% | | |

Example M50

For the preparation of a PS-VA mixture, 99.75% of the mixture in accordance with Example M45 are mixed with 0.25% of the polymerizable compound of the formula

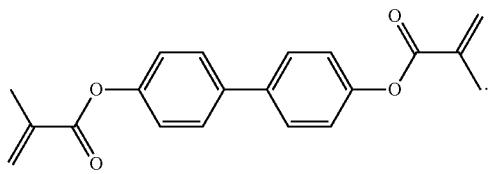

Example M51

For the preparation of a PS-VA mixture, 99.7% of the mixture in accordance with Example M48 are mixed with 0.3% of the polymerizable compound of the formula

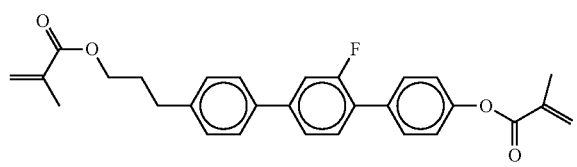

Example M52

For the preparation of a PS-VA mixture, 99.75% of the mixture in accordance with Example M49 are mixed with 0.25% of the polymerizable compound of the formula

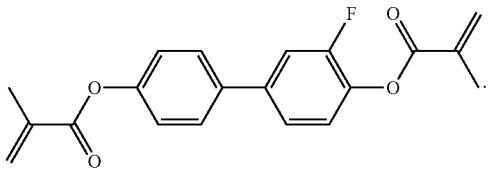

Example M53

| | | | |
|---|---|---|---|
| CC-3-V | 35.50% | Clearing point [° C.]: | 80.0 |
| CY-3-O2 | 7.50% | Δn [589 nm, 20° C.]: | 0.1077 |
| CCY-3-O1 | 5.00% | Δε [1 kHz, 20° C.]: | −3.8 |
| CCY-3-O2 | 10.00% | $ε_∥$ [1 kHz, 20° C.]: | 3.7 |
| CCY-4-O2 | 7.50% | $ε_⊥$ [1 kHz, 20° C.]: | 7.4 |
| CPY-2-O2 | 6.50% | $K_1$ [pN, 20° C.]: | 13.5 |
| CPY-3-O2 | 10.00% | $K_3$ [pN, 20° C.]: | 15.1 |
| PYP-2-3 | 5.00% | $γ_1$ [mPa · s, 20° C.]: | 110 |
| PY-3-O2 | 7.00% | $V_0$ [20° C, V]: | 2.12 |
| YG-2O-O5 | 6.00% | | |

Example M54

| | | | |
|---|---|---|---|
| CC-3-V | 36.50% | Clearing point [° C.]: | 80.0 |
| CY-3-O2 | 5.00% | Δn [589 nm, 20° C.]: | 0.1082 |
| CCY-3-O1 | 5.00% | Δε [1 kHz, 20° C.]: | −3.7 |
| CCY-3-O2 | 10.00% | $ε_∥$ [1 kHz, 20° C.]: | 3.7 |
| CCY-4-O2 | 7.50% | $ε_⊥$ [1 kHz, 20° C.]: | 7.4 |
| CPY-2-O2 | 6.00% | $K_1$ [pN, 20° C.]: | 13.7 |
| CPY-3-O2 | 10.00% | $K_3$ [pN, 20° C.]: | 14.9 |
| PYP-2-3 | 5.00% | $γ_1$ [mPa · s, 20° C.]: | 109 |
| PY-3-O2 | 7.00% | $V_0$ [20° C., V]: | 2.12 |
| YG-2O-O5 | 8.00% | | |

Example M55

| | | | |
|---|---|---|---|
| CC-3-V | 33.00% | Clearing point [° C.]: | 79.5 |
| CCY-3-O1 | 5.00% | Δn [589 nm, 20° C.]: | 0.1020 |
| CCY-3-O2 | 10.00% | Δε [1 kHz, 20° C.]: | −4.4 |
| CLY-3-O2 | 7.00% | $ε_∥$ [1 kHz, 20° C.]: | 3.8 |
| CLY-3-O3 | 3.00% | $ε_⊥$ [1 kHz, 20° C.]: | 8.2 |
| CPY-2-O2 | 6.00% | $K_1$ [pN, 20° C.]: | 13.9 |
| CPY-3-O2 | 11.00% | $K_3$ [pN, 20° C.]: | 15.8 |
| CY-3-O2 | 13.00% | $γ_1$ [mPa · s, 20° C.]: | 119 |
| PY-3-O2 | 4.00% | $V_0$ [20° C., V]: | 1.99 |
| YG-2O-O5 | 8.00% | | |

Example M56

| | | | |
|---|---|---|---|
| CY-3-O2 | 21.00% | Clearing point [° C.]: | 85.0 |
| CCY-3-O1 | 9.00% | Δn [589 nm, 20° C.]: | 0.1013 |
| CCY-3-O2 | 11.00% | Δε [1 kHz, 20° C.]: | −5.1 |
| CCY-4-O2 | 9.50% | $ε_∥$ [1 kHz, 20° C.]: | 4.0 |

-continued

| | | | |
|---|---|---|---|
| CPY-2-O2 | 6.00% | $\varepsilon_\perp$ [1 kHz, 20° C.]: | 9.2 |
| CPY-3-O2 | 12.00% | $K_1$ [pN, 20° C.]: | 14.9 |
| CC-3-V | 26.00% | $K_3$ [pN, 20° C.]: | 16.7 |
| YG-2O-O5 | 5.50% | $\gamma_1$ [mPa·s, 20° C.]: | 150 |
| | | $V_0$ [20° C., V]: | 1.91 |

Example M57

| | | | |
|---|---|---|---|
| CC-3-V | 35.50% | Clearing point [° C.]: | 75.0 |
| CC-3-V1 | 8.00% | $\Delta n$ [589 nm, 20° C.]: | 0.1078 |
| CCY-3-O1 | 6.00% | $\Delta\varepsilon$ [1 kHz, 20° C.]: | -2.9 |
| CCY-3-O2 | 10.00% | $\varepsilon_\parallel$ [1 kHz, 20° C.]: | 3.5 |
| CCY-4-O2 | 3.50% | $\varepsilon_\perp$ [1 kHz, 20° C.]: | 6.3 |
| CPY-3-O2 | 11.50% | $K_1$ [pN, 20° C.]: | 13.9 |
| PY-3-O2 | 12.50% | $K_3$ [pN, 20° C.]: | 15.5 |
| PYP-2-3 | 5.00% | $\gamma_1$ [mPa·s, 20° C.]: | 86 |
| PP-1-2V1 | 2.00% | $V_0$ [20° C., V]: | 2.45 |
| YG-2O-O5 | 6.00% | | |

Example M58

| | | | |
|---|---|---|---|
| CC-3-V | 15.00% | Clearing point [° C.]: | 76.0 |
| CC-3-V1 | 9.00% | $\Delta n$ [589 nm, 20° C.]: | 0.1079 |
| CCH-23 | 11.00% | $\Delta\varepsilon$ [1 kHz, 20° C.]: | -3.1 |
| CCH-34 | 7.50% | $\varepsilon_\parallel$ [1 kHz, 20° C.]: | 3.5 |
| CCY-3-O1 | 5.00% | $\varepsilon_\perp$ [1 kHz, 20° C.]: | 6.5 |
| CCY-3-O2 | 12.00% | $K_1$ [pN, 20° C.]: | 14.5 |
| CPY-2-O2 | 2.50% | $K_3$ [pN, 20° C.]: | 14.8 |
| CPY-3-O2 | 10.00% | $\gamma_1$ [mPa·s, 20° C.]: | 96 |
| CY-3-O2 | 3.00% | $V_0$ [20° C., V]: | 2.33 |
| PY-3-O2 | 11.00% | | |
| PYP-2-3 | 8.00% | | |
| YG-2O-O5 | 6.00% | | |

Example M59

| | | | |
|---|---|---|---|
| CC-3-V1 | 8.00% | Clearing point [° C.]: | 75.0 |
| CCH-23 | 19.00% | $\Delta n$ [589 nm, 20° C.]: | 0.0968 |
| CCH-34 | 4.00% | $\Delta\varepsilon$ [1 kHz, 20° C.]: | -3.4 |
| CCH-35 | 7.00% | $\varepsilon_\parallel$ [1 kHz, 20° C.]: | 3.6 |
| CCP-3-1 | 5.50% | $\varepsilon_\perp$ [1 kHz, 20° C.]: | 7.0 |
| CCY-3-O2 | 11.50% | $K_1$ [pN, 20° C.]: | 15.4 |
| CCY-3-O1 | 8.00% | $K_3$ [pN, 20° C.]: | 16.0 |
| CPY-3-O2 | 9.50% | $\gamma_1$ [mPa·s, 20° C.]: | 106 |
| CY-3-O2 | 9.00% | $V_0$ [20° C., V]: | 2.28 |
| PY-3-O2 | 15.50% | | |
| YG-2O-O5 | 3.00% | | |

Example M60

For the preparation of a PS-VA mixture, 99.75% of the mixture in accordance with Example M53 are mixed with 0.25% of the polymerizable compound of the formula

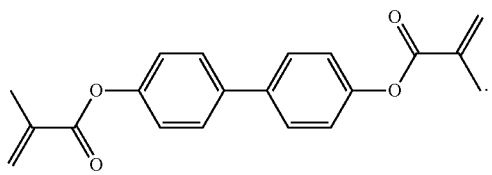

Example M61

For the preparation of a PS-VA mixture, 99.7% of the mixture in accordance with Example M53 are mixed with 0.3% of the polymerizable compound of the formula

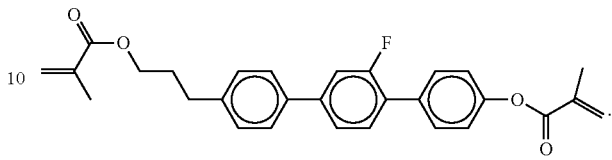

Example M62

For the preparation of a PS-VA or PS-FFS mixture, 99.75% of the mixture in accordance with Example M55 are mixed with 0.25% of the polymerizable compound of the formula

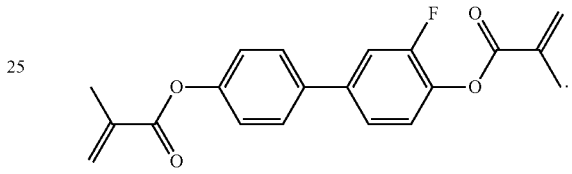

Example M63

| | | | |
|---|---|---|---|
| CC-3-V | 25.00% | Clearing point [° C.]: | 75.0 |
| CCP-3-1 | 6.50% | $\Delta n$ [589 nm, 20° C.]: | 0.0993 |
| CCY-3-O1 | 8.00% | $\Delta\varepsilon$ [1 kHz, 20° C.]: | -3.2 |
| CCY-3-O2 | 11.00% | $\varepsilon_\parallel$ [1 kHz, 20° C.]: | 3.6 |
| CPY-3-O2 | 11.00% | $\varepsilon_\perp$ [1 kHz, 20° C.]: | 6.8 |
| CPY-2-O2 | 4.00% | $K_1$ [pN, 20° C.]: | 12.2 |
| B-2O-O5 | 4.00% | $K_3$ [pN, 20° C.]: | 14.8 |
| YY-V1O-O4 | 2.00% | $\gamma_1$ [mPa·s, 20° C.]: | 73 |
| CC-V-V | 18.50% | $V_0$ [20° C., V]: | 2.28 |
| PY-1-O2 | 5.00% | | |
| PY-2-O2 | 5.00% | | |

Example M64

For the preparation of a PS-VA or PS-FFS mixture, 99.75% of the mixture in accordance with Example M63 are mixed with 0.25% of the polymerizable compound of the formula

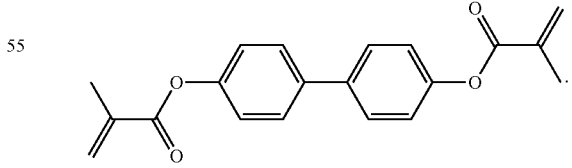

Example M65

For the preparation of a PS-VA or PS-FFS mixture, 99.75% of the mixture in accordance with Example M63 are mixed with 0.25% of the polymerizable compound of the formula

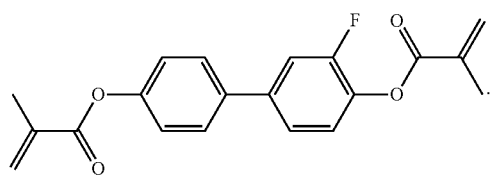

Example M66

For the preparation of a PS-VA or PS-FFS mixture, 99.75% of the mixture in accordance with Example M6 are mixed with 0.3% of the polymerizable compound of the formula

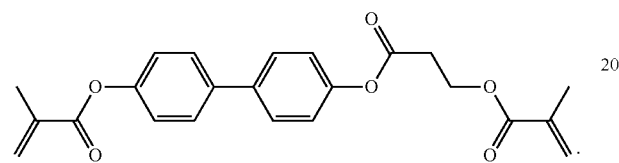

It goes without saying that the above mentioned mixture examples for PS-VA applications are also suitable for SS-VA, SA-VA, PS-FFS and PS-IPS applications.

In order to stabilize the mixtures in accordance with Examples M1 to M66, one or two of the stabilizers a) to h) indicated below a)

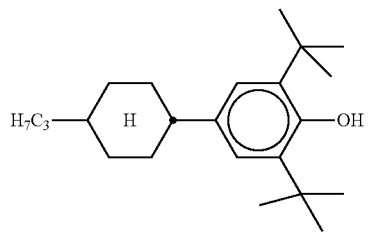

b)

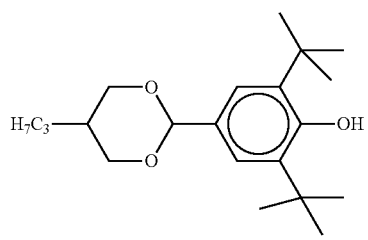

c)

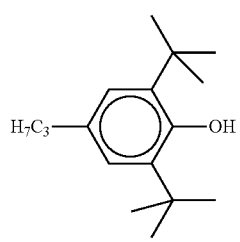

d)

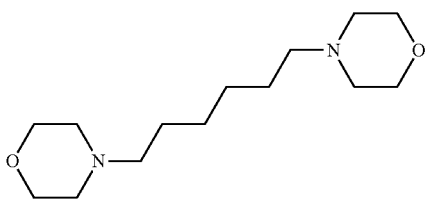 [SMILES: C(CCCN1CCOCC1)CCN1CCOCC1]

e)

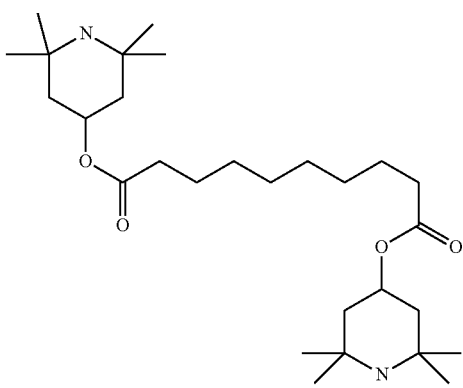

f)

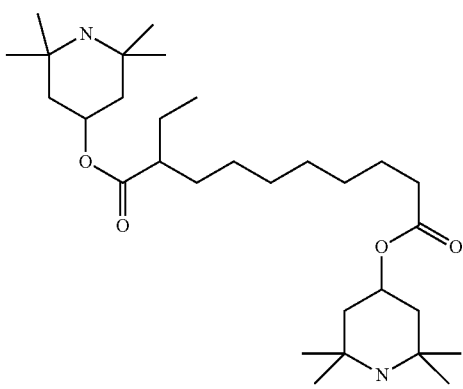

g)

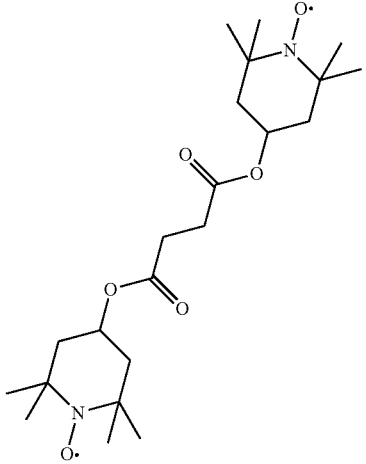

h)

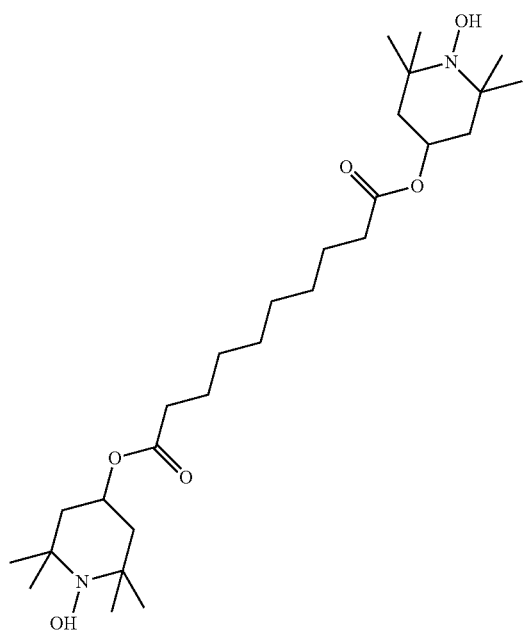

can be added to the mixtures in amounts of in each case 0.015%, based on the mixture.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The entire disclosures of all applications, patents and publications, cited herein and of corresponding German Patent Application No. 10 2013 021 683.4, filed Dec. 19, 2013, are incorporated by reference herein.

The invention claimed is:

1. A liquid-crystalline medium based on a mixture of polar compounds, comprising at least one compound selected from the group of compounds of formulae I-2, I-5 and I-6:

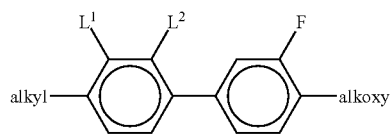
I-2

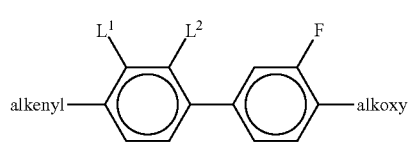
I-5

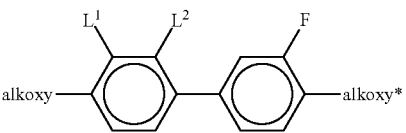
I-6 in which
alkyl denotes a straight-chain alkyl radical having 1-5 C atoms,
alkenyl denotes a straight-chain alkenyl radical having 2-5 C atoms,
alkoxy and alkoxy* each, independently of one another, denote a straight-chain alkoxy radical having 1-5 C atoms, and
$L^1$ and $L^2$ each, independently of one another, denote F or Cl; and
20-50% by weight of the compound of the formula CC-3-V:

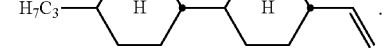
CC-3-V

2. The liquid-crystalline medium according to claim 1, wherein said medium comprises at least one compound of the formulae I-1, I-3, I-4, and I-7 to I-31,

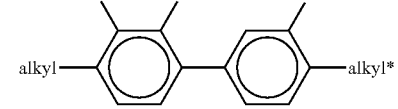
I-1

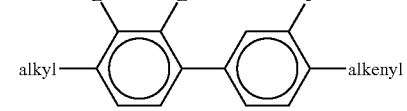
I-3

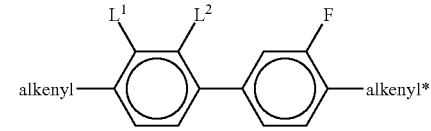
I-4

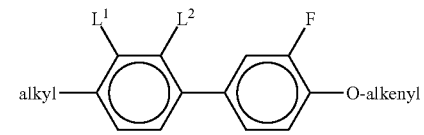
I-7

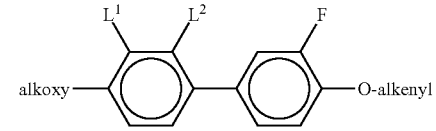
I-8

I-9

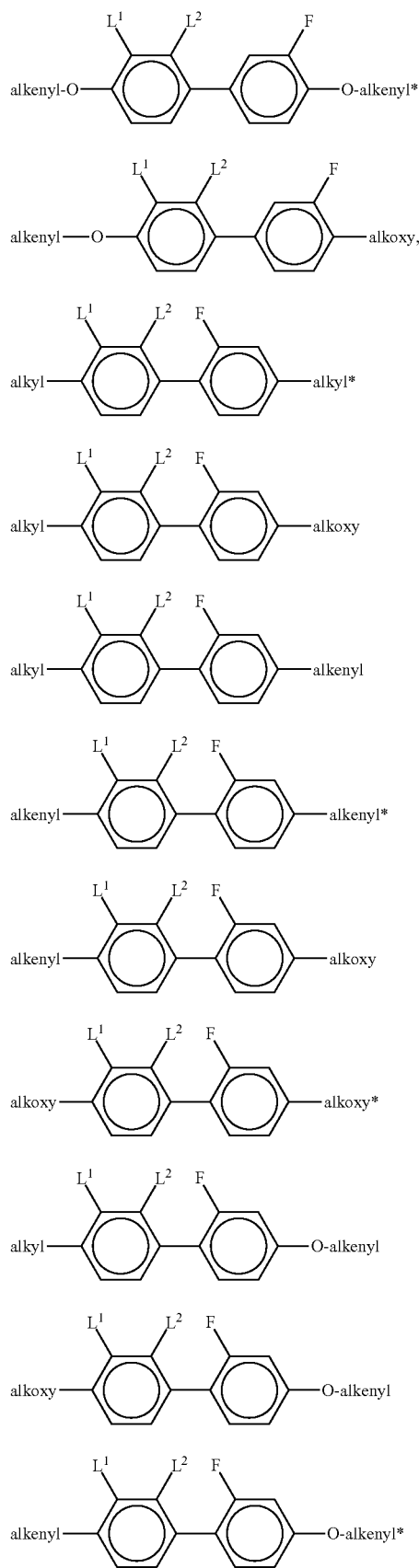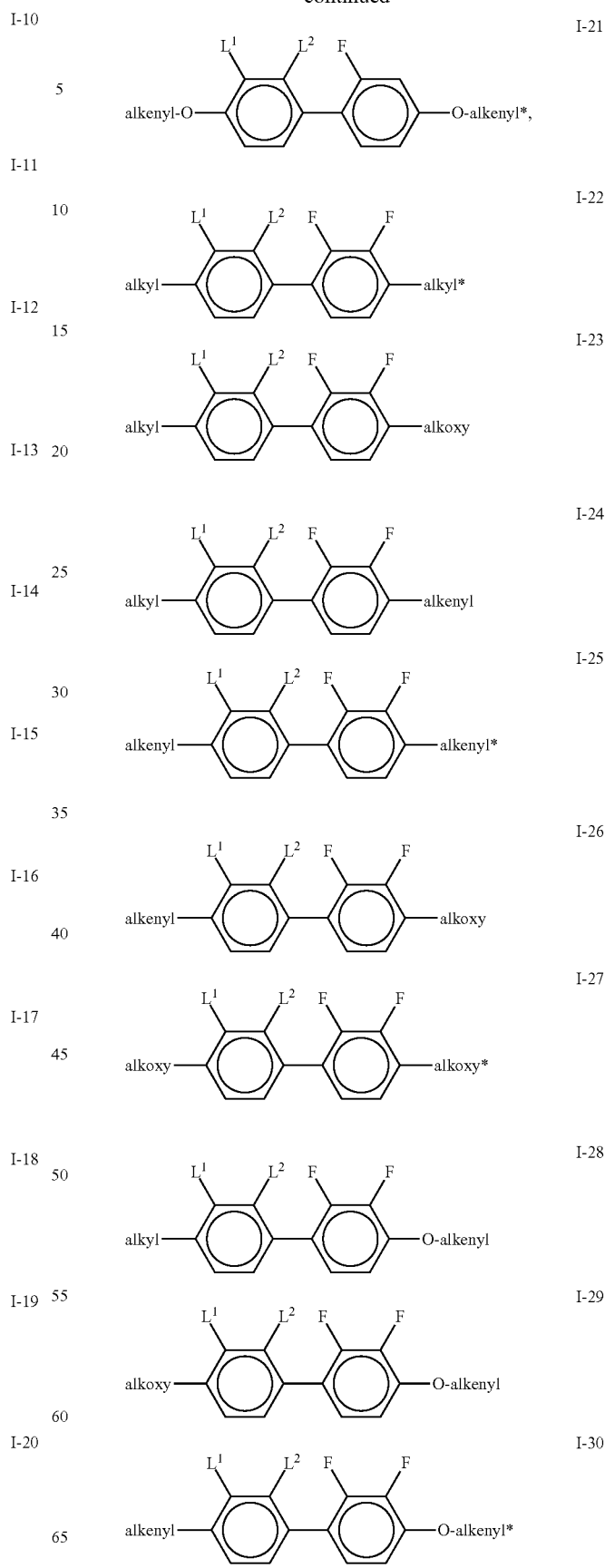

-continued

I-31

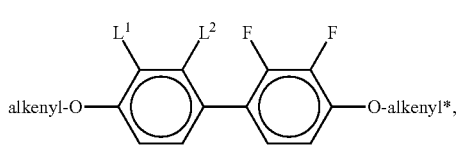

in which
- alkyl and alkyl* each, independently of one another, denote a straight-chain alkyl radical having 1-6 C atoms,
- alkenyl and alkenyl* each, independently of one another, denote a straight-chain alkenyl radical having 2-6 C atoms,
- alkoxy and alkoxy* each, independently of one another, denote a straight-chain alkoxy radical having 1-6 C atoms, and
- $L^1$ and $L^2$ each, independently of one another, denote F or Cl.

3. The liquid-crystalline medium according to claim 1, wherein said medium additionally comprises one or more compounds selected from the group of the compounds of formulae IIA, IIB and IIC,

IIA

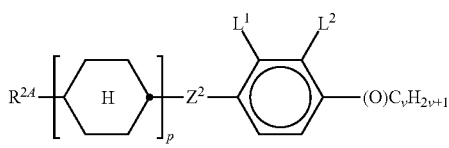

IIB

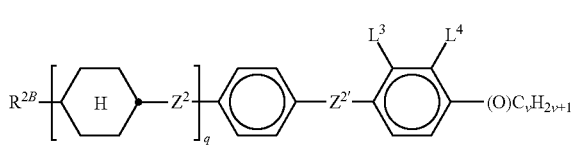

IIC

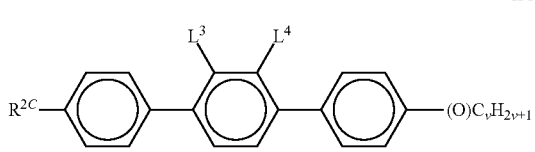

in which
- $R^{2A}$, $R^{2B}$ and $R^{2C}$ each, independently of one another, denote H, an alkyl radical having up to 15 C atoms which is unsubstituted, monosubstituted by CN or $CF_3$ or at least monosubstituted by halogen, where, in addition, one or more $CH_2$ groups in these radicals are each optionally replaced by —O—, —S—,

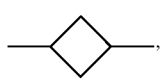

—C≡C—, —CH═CH—, —CF$_2$O—, —OCF$_2$—, —OC—O— or —O—CO— in such a way that O atoms are not linked directly to one another,
- $L^{1-4}$ each, independently of one another, denote F or Cl,
- $Z^2$ and $Z^{2'}$ each, independently of one another, denote a single bond, —CH$_2$CH$_2$—, —CH═CH—, —CF$_2$O—, —OCF$_2$—, —CH$_2$O—, —OCH$_2$—, —COO—, —OCO—, —C$_2$F$_4$—, —CF═CF—, or —CH═CHCH$_2$O—, p denotes 0, 1 or 2,
q denotes 0 or 1,
(O)C$_v$H$_{2v+1}$ denotes C$_v$H$_{2v+1}$ or OC$_v$H$_{2v+1}$, and
v denotes 1 to 6.

4. The liquid-crystalline medium according to claim 1, wherein said medium additionally comprises one or more compounds of formula III,

III

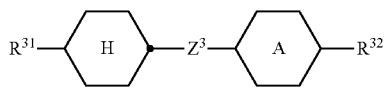

in which
- $R^{31}$ and $R^{32}$ each, independently of one another, denote a straight-chain alkyl, alkoxyalkyl or alkoxy radical having up to 12 C atoms,

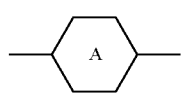

denotes

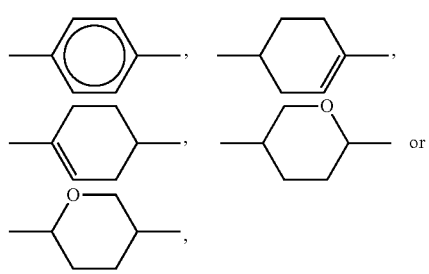

and
$Z^3$ denotes a single bond, —CH$_2$CH$_2$—, —CH═CH—, —CF$_2$O—, —OCF$_2$—, —CH$_2$O—, —OCH$_2$—, —COO—, —OCO—, —C$_2$F$_4$—, —C$_4$H$_9$—, or —CF═CF—.

5. The liquid-crystalline medium according to claim 1, wherein said medium additionally comprises one or more compounds of formulae L-1 to L-11,

L-1

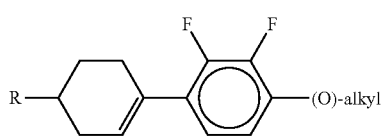

L-2

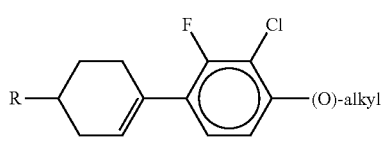

L-3

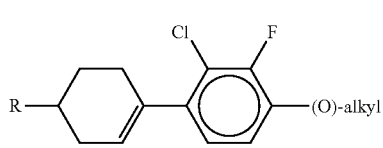

-continued

L-4
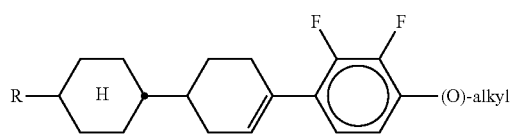

L-5
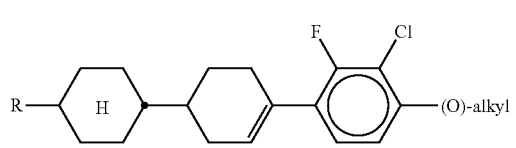

L-6
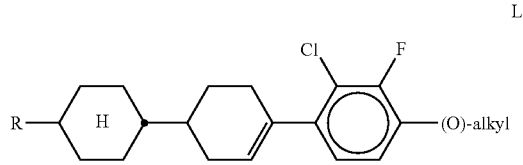

L-7
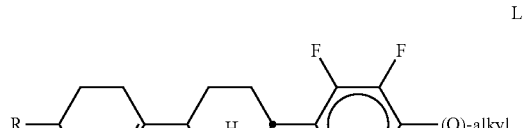

L-8
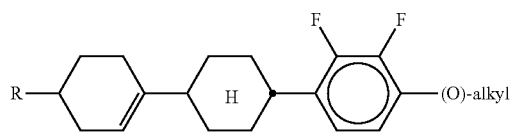

L-9
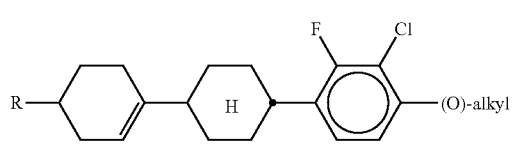

L-10
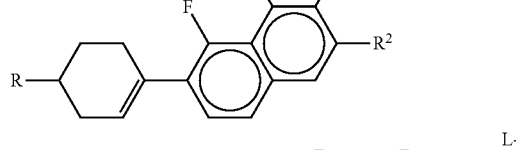

L-11
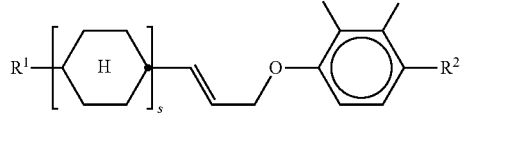

in which

R, $R^1$ and $R^2$ each, independently of one another, denotes H, an alkyl radical having up to 15 C atoms which is unsubstituted, monosubstituted by CN or $CF_3$ or at least monosubstituted by halogen, where, in addition, one or more $CH_2$ groups in these radicals are each optionally replaced by —O—, —S—,

—C≡C—, —CH=CH—, —$CF_2$O—, —O$CF_2$—, —OC—O— or —O—CO— in such a way that O atoms are not linked directly to one another, alkyl denotes an alkyl radical having 1-6 C atoms, (O)-alkyl denotes alkyl or O-alkyl, alkyl denotes an alkyl radical having 1-6 C atoms, and s denotes 1 or 2.

6. The liquid-crystalline medium according to claim 1, wherein said medium additionally comprises one or more terphenyls of formulae T-1 to T-21, T-1
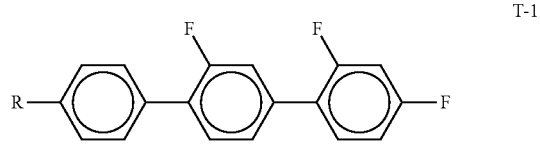

T-2

T-3
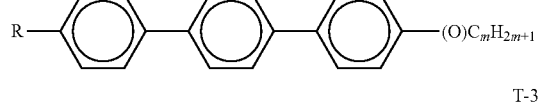

T-4
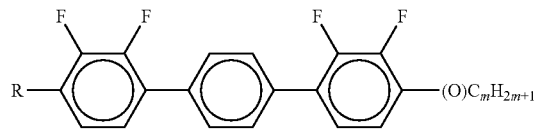

T-5
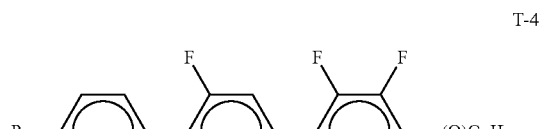

T-6
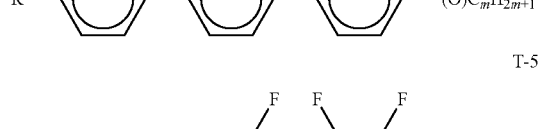

T-7
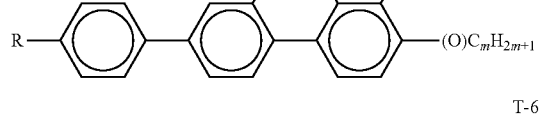

T-8
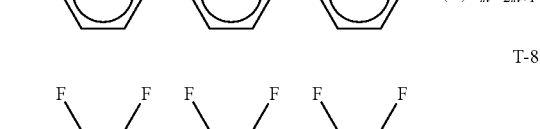

T-9
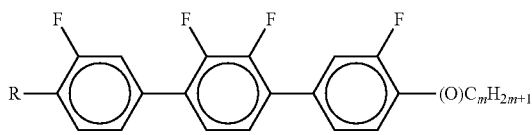
T-10
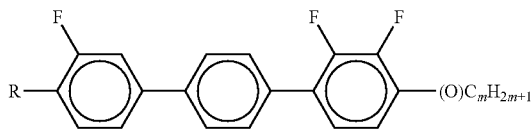
T-11
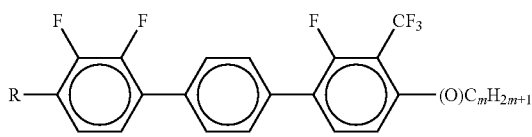
T-12
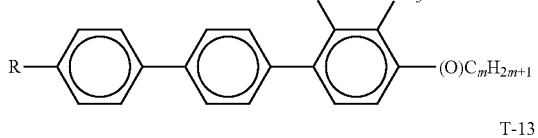
T-13
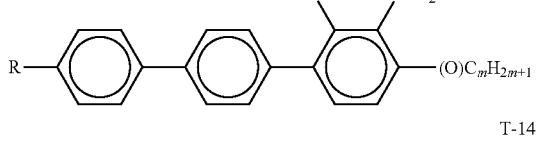
T-14
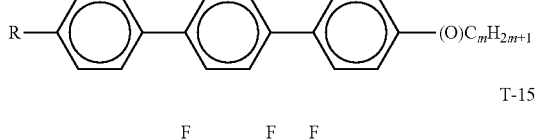
T-15
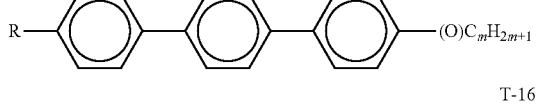
T-16
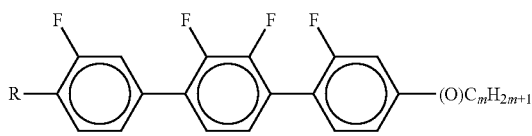
T-17
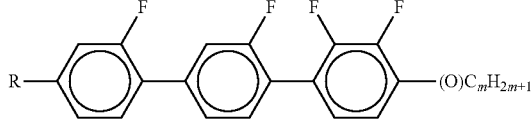
T-18
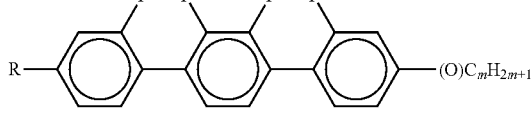
T-19
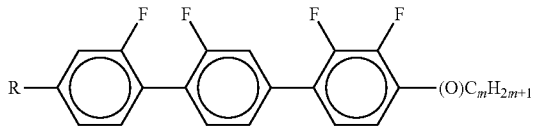
T-20
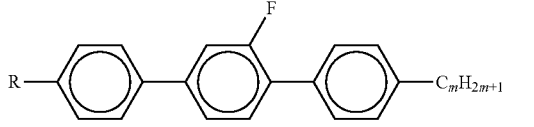
T-21
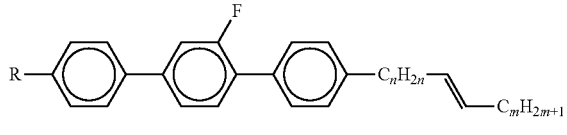
in which
R denotes a straight-chain alkyl or alkoxy radical having 1-7 C atoms,
$(O)C_mH_{2m+1}$ denotes $C_mH_{2m+1}$ or $OC_mH_{2m+1}$
m denotes 0, 1, 2, 3, 4, 5 or 6, and
n denotes 0, 1, 2, 3 or 4.
7. The liquid-crystalline medium according to claim 1, wherein said medium additionally comprises one or more compounds of formulae O-1 to O-17,
O-1
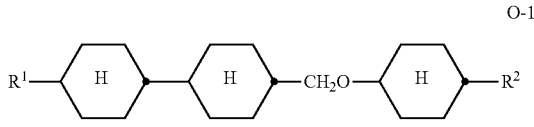
O-2
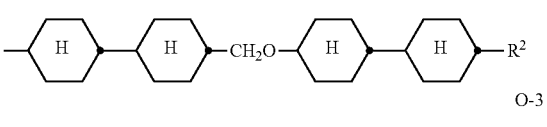
O-3
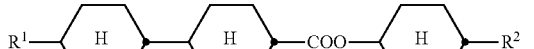
O-4
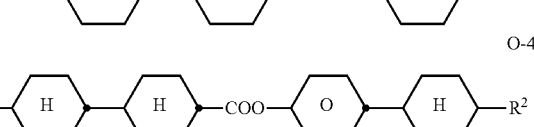
O-5
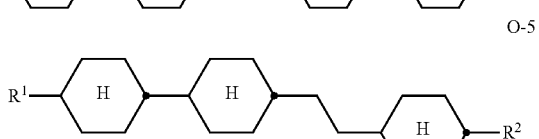
O-6
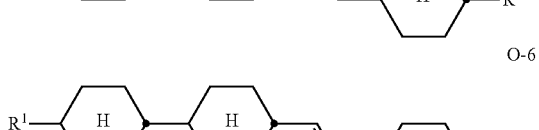
O-7
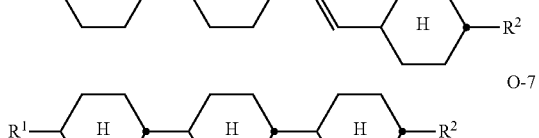

-continued

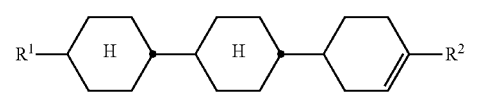 O-8

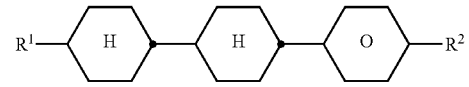 O-9

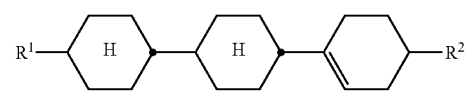 O-10

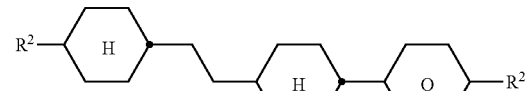 O-11

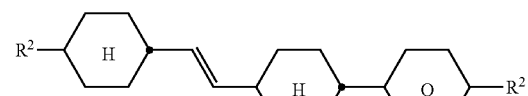 O-12

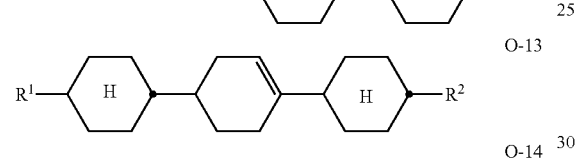 O-13

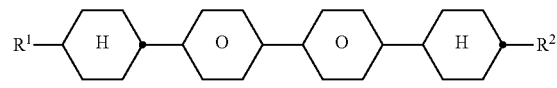 O-14

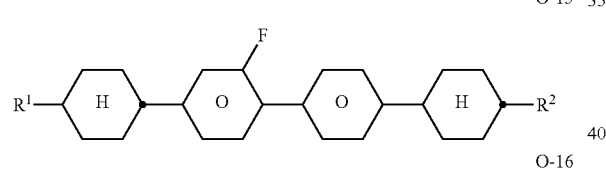 O-15

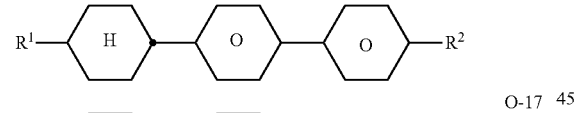 O-16

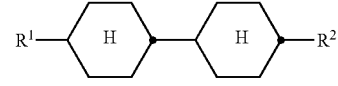 O-17 in which
$R^1$ and $R^2$ each, independently of one another, denotes H, an alkyl radical having up to 15 C atoms which is unsubstituted, monosubstituted by CN or $CF_3$ or at least monosubstituted by halogen, where, in addition, one or more $CH_2$ groups in these radicals are each optionally replaced by —O—, —S—,

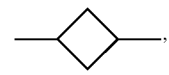

—C≡C—, —CH=CH—, —$CF_2$O—, —O$CF_2$—, —OC—O— or —O—CO— in such a way that O atoms are not linked directly to one another.

8. The liquid-crystalline medium according to claim 1, wherein said medium additionally comprises one or more indane compounds of formula In,

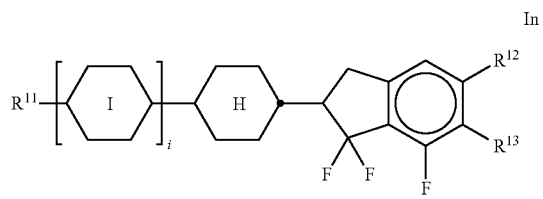 In in which
$R^{11}$, $R^{12}$, $R^{13}$ denote a straight-chain alkyl, alkoxy, alkoxyalkyl or alkenyl radical having 1-5 C atoms,
$R^{12}$ and $R^{13}$ additionally may also denote halogen,

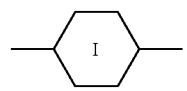

denotes

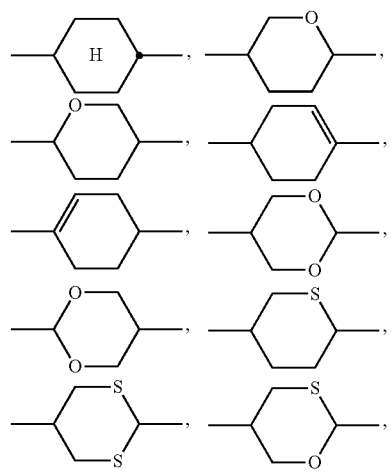

and
i denotes 0, 1 or 2.

9. The liquid-crystalline medium according to claim 1, wherein the proportion of compounds of formulae I-2, I-5, and I-6 in the mixture as a whole is 1-30% by weight.

10. The liquid-crystalline medium according to claim 1, wherein said medium additionally comprises one or more compounds from the following formulae

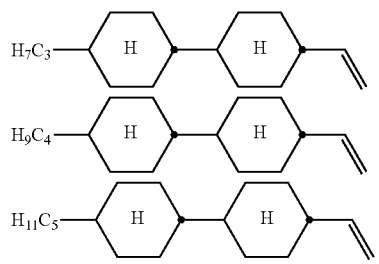

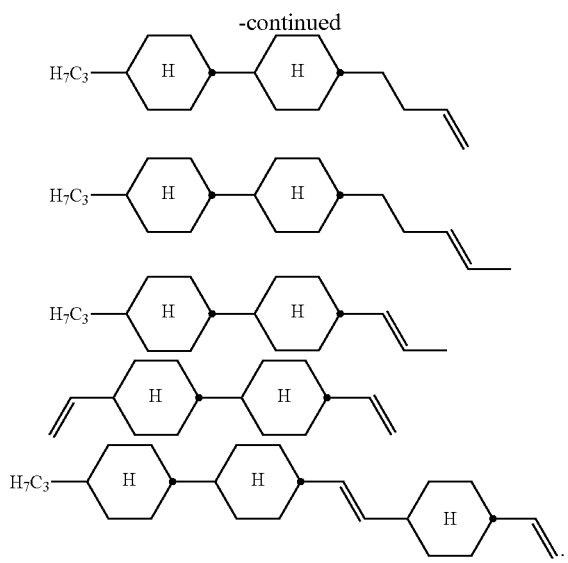

11. The liquid-crystalline medium according to claim 1, wherein said medium further comprises at least one polymerizable reactive mesogen compound.

12. The liquid-crystalline medium according to claim 1, wherein said medium further comprises one or more additives.

13. The liquid-crystalline medium according to claim 12, wherein said additive is selected from the group of free-radical scavengers, antioxidants and/or UV stabilizers.

14. A process for the preparation of a liquid-crystalline medium according to claim 1, comprising:
mixing at least one compound selected from the group of compounds of formulae I-2, I-5 and I-6 with at least one further liquid-crystalline compound, and optionally one or more additives and optionally at least one polymerizable reactive mesogen compound.

15. An electro-optical display comprising a medium according to claim 1.

16. An electro-optical display having active-matrix addressing, comprising, as dielectric, a liquid-crystalline medium according to claim 1.

17. An electro-optical display according to claim 16, wherein said display is a VA, PSA, PS-VA, PALC, IPS, PS-IPS, PM-VA, SA-VA, SS-VA, FFS or PS-FFS display.

18. The liquid-crystalline medium according to claim 1, wherein $L^1$ and $L^2$ are both F.

19. The liquid-crystalline medium according to claim 1, wherein in said at least one compound selected from the group of compounds of formulae I-2, I-5 and I-6 either alkoxy or alkoxy* is a straight-chain alkoxy radical having 5 C atoms.

20. The liquid-crystalline medium according to claim 1, wherein in said at least one compound selected from the group of compounds of formulae I-2, I-5 and I-6 either alkoxy or alkoxy* is a straight-chain alkoxy radical having 4 C atoms.

21. The liquid-crystalline medium according to claim 1, wherein said at least one compound selected from the group of compounds of formulae I-2, I-5 and I-6 is a compound of formula I-2A:

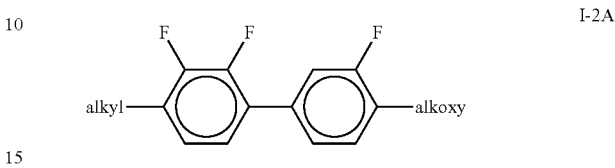

I-2A wherein
alkyl is a straight-chain alkyl radical having 1-5 C atoms, and alkoxy is a straight-chain alkoxy radical having 1-5 C atoms.

22. The liquid-crystalline medium according to claim 1, wherein said at least one compound selected from the group of compounds of formulae I-2, I-5 and I-6 is a compound of formula I-6A:

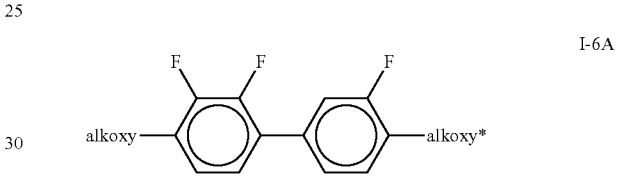

I-6A wherein
alkoxy and alkoxy* each, independently of one another, denote a straight-chain alkoxy radical having 1-5 C atoms.

23. The liquid-crystalline medium according to claim 1, wherein said at least one compound selected from the group of compounds of formulae I-2, I-5 and I-6 comprises at least one compound of formula I-2.

24. The liquid-crystalline medium according to claim 1, wherein said at least one compound selected from the group of compounds of formulae I-2, I-5 and I-6 comprises at least one compound of formula I-5.

25. The liquid-crystalline medium according to claim 1, wherein said at least one compound selected from the group of compounds of formulae I-2, I-5 and I-6 comprises at least one compound of formula I-6.

26. The liquid-crystalline medium according to claim 1, wherein said medium has a $\Delta\epsilon$ of −3.0 to −8.0.

27. The liquid-crystalline medium according to claim 1, wherein said medium has a rotational viscosity $\gamma_1$ at 20° C. of ≤120 mPa·s.

28. The liquid-crystalline medium according to claim 3, wherein said medium comprises one or more compounds selected from formula IIC.

* * * * *